United States Patent
Kubo

(10) Patent No.: US 7,379,137 B2
(45) Date of Patent: May 27, 2008

(54) LIQUID CRYSTAL DISPLAY DEVICE

(75) Inventor: Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 475 days.

(21) Appl. No.: 11/047,714

(22) Filed: Feb. 2, 2005

(65) Prior Publication Data

US 2005/0168674 A1 Aug. 4, 2005

(30) Foreign Application Priority Data

| Feb. 2, 2004 | (JP) | ............................. 2004-025197 |
| Feb. 12, 2004 | (JP) | ............................. 2004-034892 |
| Jun. 11, 2004 | (JP) | ............................. 2004-173547 |

(51) Int. Cl.
*G02F 1/1335* (2006.01)
*G02F 1/1337* (2006.01)

(52) U.S. Cl. ..................... 349/114; 349/129; 349/130

(58) Field of Classification Search ............... 349/114, 349/130, 129
See application file for complete search history.

(56) References Cited

U.S. PATENT DOCUMENTS

| 4,368,523 A | 1/1983 | Kawate |
| 4,955,698 A | 9/1990 | Knoll et al. |
| 5,132,819 A | 7/1992 | Noriyama et al. |
| 5,164,851 A | 11/1992 | Kanemori et al. |
| 5,179,456 A | 1/1993 | Aizawa et al. |
| 5,182,664 A | 1/1993 | Clerc |
| 5,245,450 A | 9/1993 | Ukai et al. |
| 5,260,818 A | 11/1993 | Wu |
| 5,289,174 A | 2/1994 | Suzuki |
| 5,309,264 A | 5/1994 | Lien et al. |
| 5,331,447 A | 7/1994 | Someya et al. |
| 5,363,294 A | 11/1994 | Yamamoto et al. |

(Continued)

FOREIGN PATENT DOCUMENTS

EP 0 884 626 A2 12/1998

(Continued)

OTHER PUBLICATIONS

Jisaki et al, "Development of transflective LCD for high contrast and wide viewing angle by using homeotropic alignment", Asia Display/IDW '01, pp. 133-136.

(Continued)

*Primary Examiner*—Mike Qi
(74) *Attorney, Agent, or Firm*—Nixon & Vanderhye, P.C.

(57) ABSTRACT

The liquid crystal display device of the present invention includes picture element regions each include a transparent region for providing a transmission mode display and a reflection region for providing a reflection mode display. In each of the picture element regions, the first electrode includes a solid area formed of a conductive film and a non-solid area with no conductive film provided, the liquid crystal layer, in the presence of an applied voltage, forms liquid crystal domains each in a radially-inclined orientation by an inclined electric field generated in the vicinity of the solid area. The second substrate includes a stepped portion having an upper tier located in the reflection region, a lower tier located in the transmission region and a side surface connecting the upper tier and the lower tier to each other, and the side surface of the stepped portion is located in the reflection region and is covered with the second electrode.

35 Claims, 65 Drawing Sheets

U.S. PATENT DOCUMENTS

| | | | |
|---|---|---|---|
| 5,408,345 A | 4/1995 | Mitsui et al. |
| 5,434,687 A | 7/1995 | Kawata et al. |
| 5,477,358 A | 12/1995 | Rosenblatt et al. |
| 5,512,336 A | 4/1996 | Yamahara |
| 5,558,927 A | 9/1996 | Aruga et al. |
| 5,594,570 A | 1/1997 | Hirata et al. |
| 5,602,662 A | 2/1997 | Rosenblatt et al. |
| 5,608,556 A | 3/1997 | Koma |
| 5,636,043 A | 6/1997 | Uemura et al. |
| 5,646,702 A | 7/1997 | Akinwande et al. |
| 5,666,179 A | 9/1997 | Koma |
| 5,668,651 A | 9/1997 | Yamada et al. |
| 5,673,092 A | 9/1997 | Horie et al. |
| 5,699,137 A | 12/1997 | Kishimoto |
| 5,726,728 A | 3/1998 | Kondo et al. |
| 5,748,276 A | 5/1998 | Uno et al. |
| 5,753,093 A | 5/1998 | Raguse et al. |
| 5,995,176 A | 11/1999 | Sibahara |
| 6,061,117 A | 5/2000 | Horie et al. |
| 6,097,464 A | 8/2000 | Liu |
| 6,141,077 A | 10/2000 | Hirata et al. |
| 6,169,593 B1 | 1/2001 | Kanaya et al. |
| 6,175,398 B1 | 1/2001 | Yamada et al. |
| 6,195,140 B1 | 2/2001 | Kubo et al. |
| 6,201,592 B1 | 3/2001 | Terashita et al. |
| 6,222,599 B1 | 4/2001 | Yoshida et al. |
| 6,256,082 B1 | 7/2001 | Suzuki et al. |
| 6,266,122 B1 | 7/2001 | Kishimoto et al. |
| 6,287,649 B1 | 9/2001 | Fukushima et al. |
| 6,330,047 B1 | 12/2001 | Kubo et al. |
| 6,335,780 B1 | 1/2002 | Kurihara et al. |
| 6,339,462 B1 | 1/2002 | Kishimoto et al. |
| 6,340,998 B1 | 1/2002 | Kim et al. |
| 6,341,002 B1 | 1/2002 | Shimizu et al. |
| 6,342,938 B1 | 1/2002 | Song et al. |
| 6,384,887 B1 | 5/2002 | Yasuda et al. |
| 6,384,889 B1 | 5/2002 | Miyachi et al. |
| 6,504,592 B1 | 1/2003 | Takatori et al. |
| 6,512,564 B1 | 1/2003 | Yoshida et al. |
| 6,542,212 B2 | 4/2003 | Yoshida et al. |
| 6,567,144 B1 | 5/2003 | Kim et al. |
| 6,573,964 B1 | 6/2003 | Takizawa et al. |
| 6,573,965 B1 | 6/2003 | Liu et al. |
| 6,577,366 B1 | 6/2003 | Kim et al. |
| 6,593,982 B2 | 7/2003 | Yoon et al. |
| 6,600,539 B2 | 7/2003 | Song |
| 6,614,497 B2 | 9/2003 | Yamada |
| 6,630,975 B1 | 10/2003 | Terashita |
| 6,657,695 B1 | 12/2003 | Song et al. |
| 6,661,488 B1 | 12/2003 | Takeda et al. |
| 6,710,825 B2 * | 3/2004 | Kubo et al. ............... 349/48 |
| 6,788,375 B2 | 9/2004 | Ogishima et al. |
| 6,812,986 B2 | 11/2004 | Takatori et al. |
| 6,822,723 B2 | 11/2004 | Song et al. |
| 6,862,062 B2 * | 3/2005 | Kubo et al. ............... 349/129 |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,995,826 B2 | 2/2006 | Kubo et al. |
| 7,253,872 B2 * | 8/2007 | Kume et al. ............... 349/191 |
| 2001/0024257 A1 | 9/2001 | Kubo et al. |
| 2002/0036740 A1 | 3/2002 | Kubo et al. |
| 2002/0036744 A1 | 3/2002 | Kubo et al. |
| 2002/0060764 A1 | 5/2002 | Taniguchi et al. |
| 2002/0063834 A1 | 5/2002 | Sawasaki et al. |
| 2002/0075436 A1 | 6/2002 | Kubo et al. |
| 2002/0159012 A1 | 10/2002 | Yamada |
| 2002/0171792 A1 | 11/2002 | Kubota et al. |
| 2003/0076464 A1 | 4/2003 | Ozawa et al. |
| 2003/0107695 A1 | 6/2003 | Kubo et al. |
| 2004/0041770 A1 | 3/2004 | Kubo et al. |
| 2004/0201810 A1 | 10/2004 | Kubo et al. |
| 2005/0001947 A1 | 1/2005 | Ogishima et al. |
| 2005/0140876 A1 * | 6/2005 | Kubo ............... 349/114 |

FOREIGN PATENT DOCUMENTS

| | | |
|---|---|---|
| JP | 03-209440 | 9/1991 |
| JP | 04-139402 | 5/1992 |
| JP | 04-293018 | 10/1992 |
| JP | 04-318816 | 11/1992 |
| JP | 05-289108 | 11/1993 |
| JP | 06-043461 | 2/1994 |
| JP | 6-75238 A | 3/1994 |
| JP | 06-118909 | 4/1994 |
| JP | 6-301036 | 10/1994 |
| JP | 07-036058 | 2/1995 |
| JP | 07-234400 | 9/1995 |
| JP | 7-281176 A | 10/1995 |
| JP | 07-311383 | 11/1995 |
| JP | 08-292423 | 11/1996 |
| JP | 09-258266 | 10/1997 |
| JP | 09-269509 | 10/1997 |
| JP | 10-186330 A | 7/1998 |
| JP | 10-301114 A | 11/1998 |
| JP | 11-109417 A | 4/1999 |
| JP | 11-242225 | 9/1999 |
| JP | 2000-47217 | 2/2000 |
| JP | 2000-47253 | 2/2000 |
| JP | 2000-075296 | 3/2000 |
| JP | 2000-305110 | 11/2000 |
| JP | 2001-343647 A | 12/2001 |
| JP | 2002-055343 A | 2/2002 |
| KR | 1999-0048949 | 7/1999 |
| WO | 00/22677 | 4/2000 |

OTHER PUBLICATIONS

Jignesh Gandhi et al., "Performance Enhancement of reflective CMOS Twistes Nematic Disp Projection Applications Using Compensating Films", pp. 1-6, reprinted from http://www/hanoah.com/publication/sid99 paper Jignesh final pdf. (1999).

Thomson-CSFILR-Jan. 2000, Optical compensation for displays (2pgs).

* cited by examiner

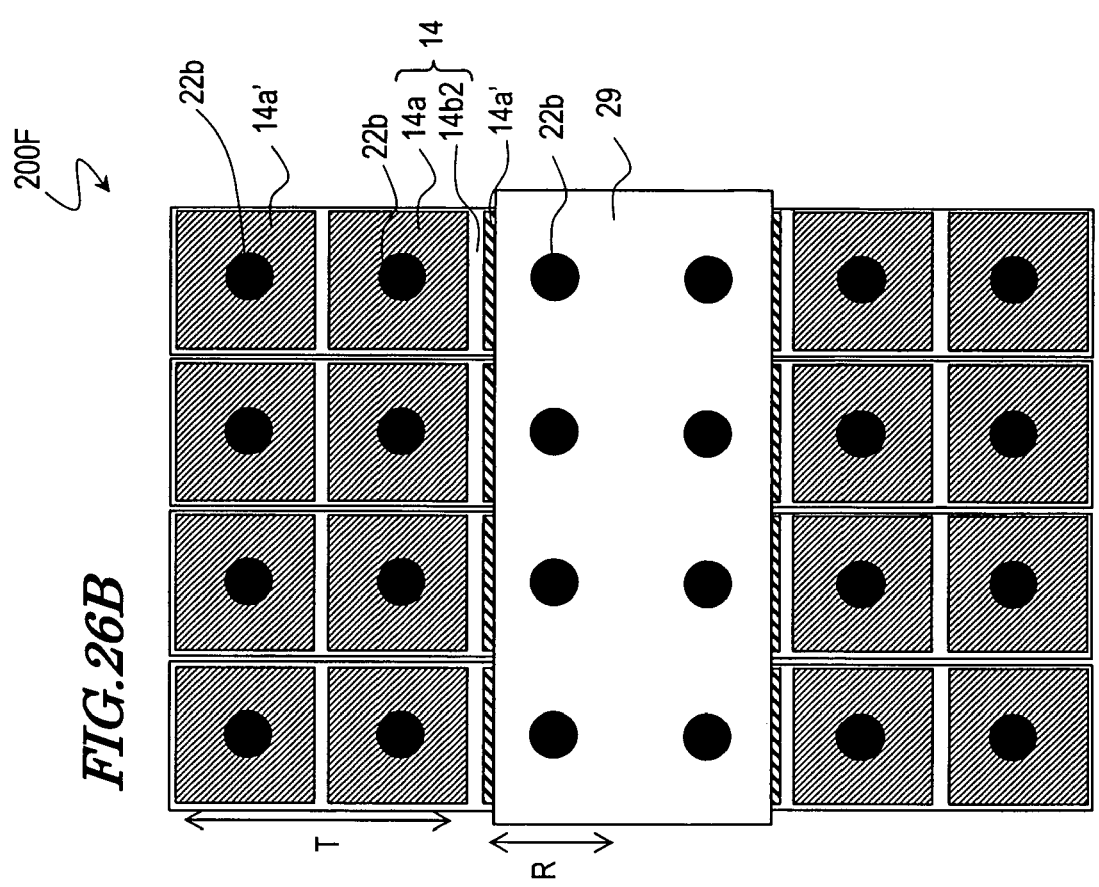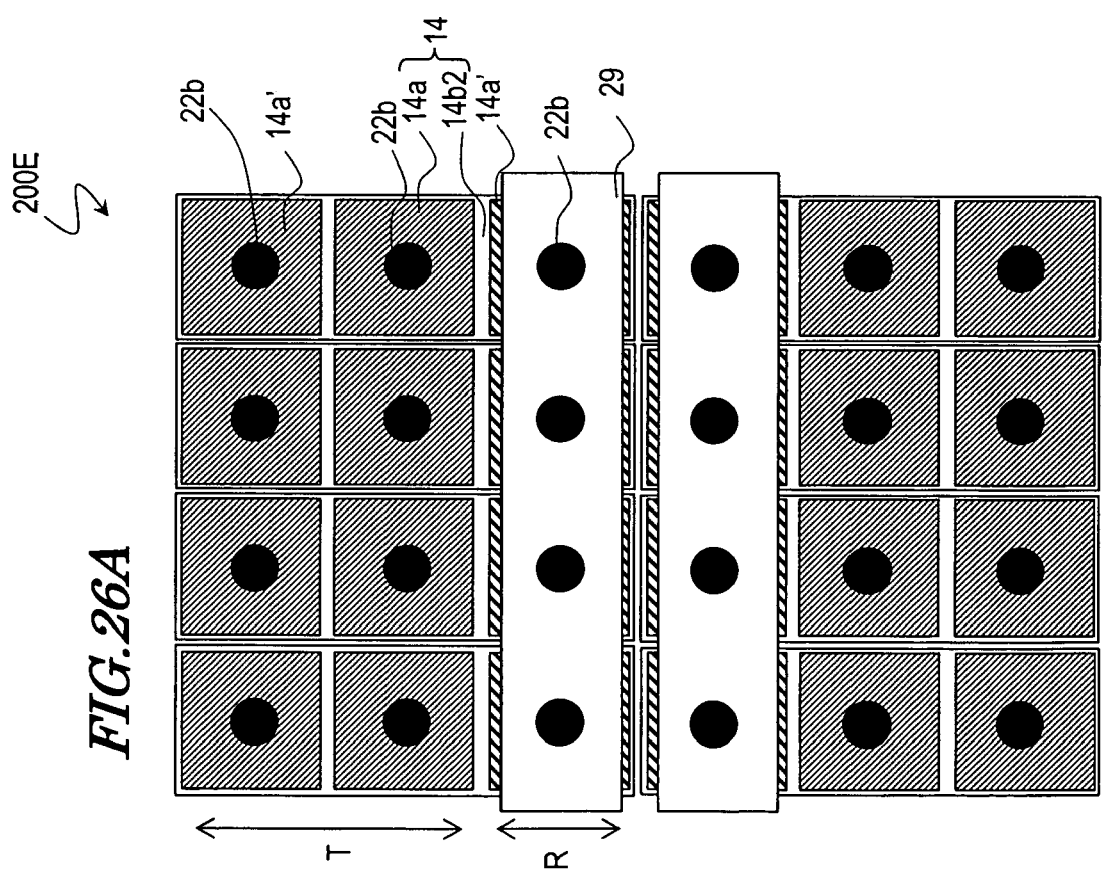

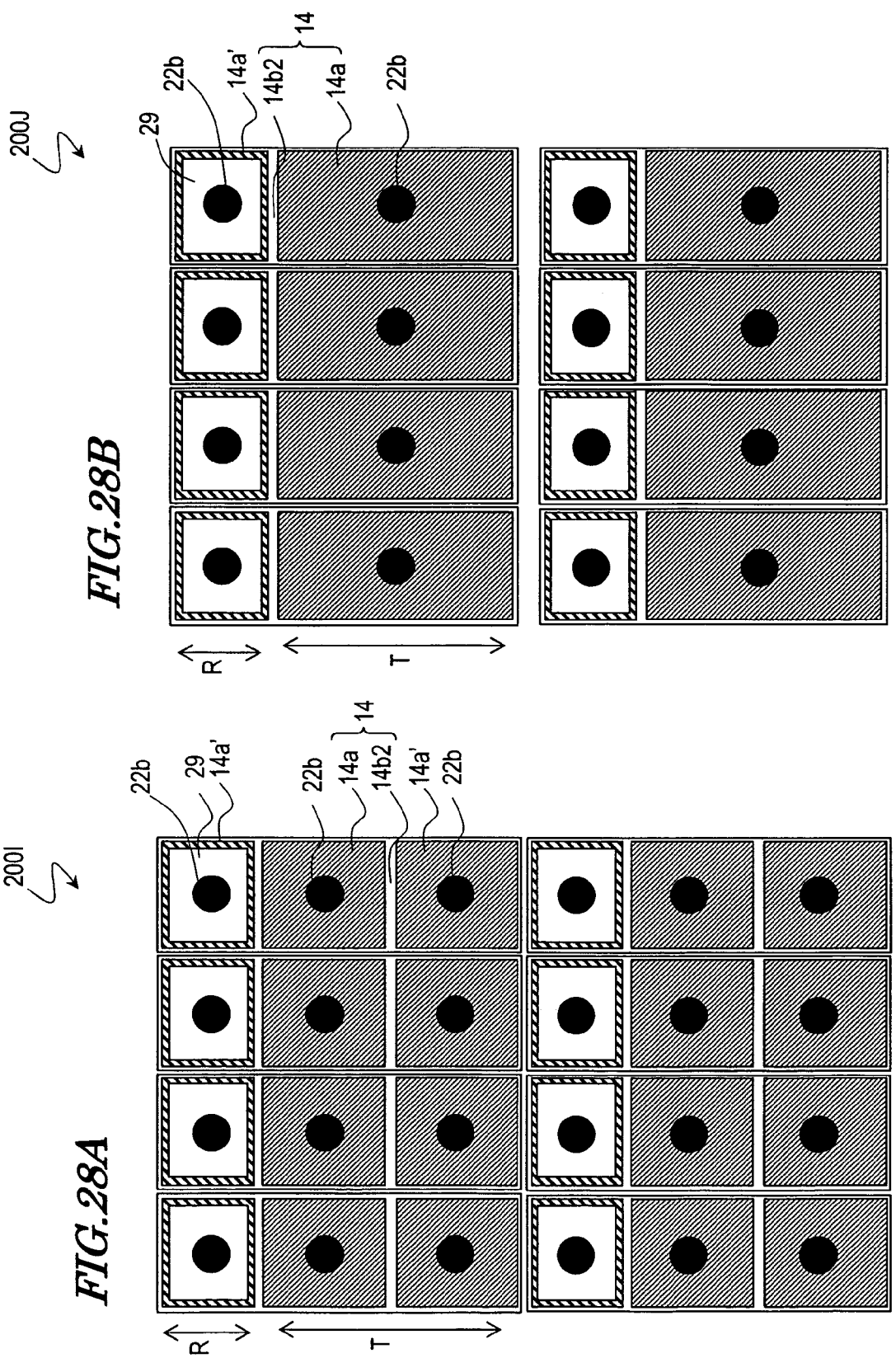

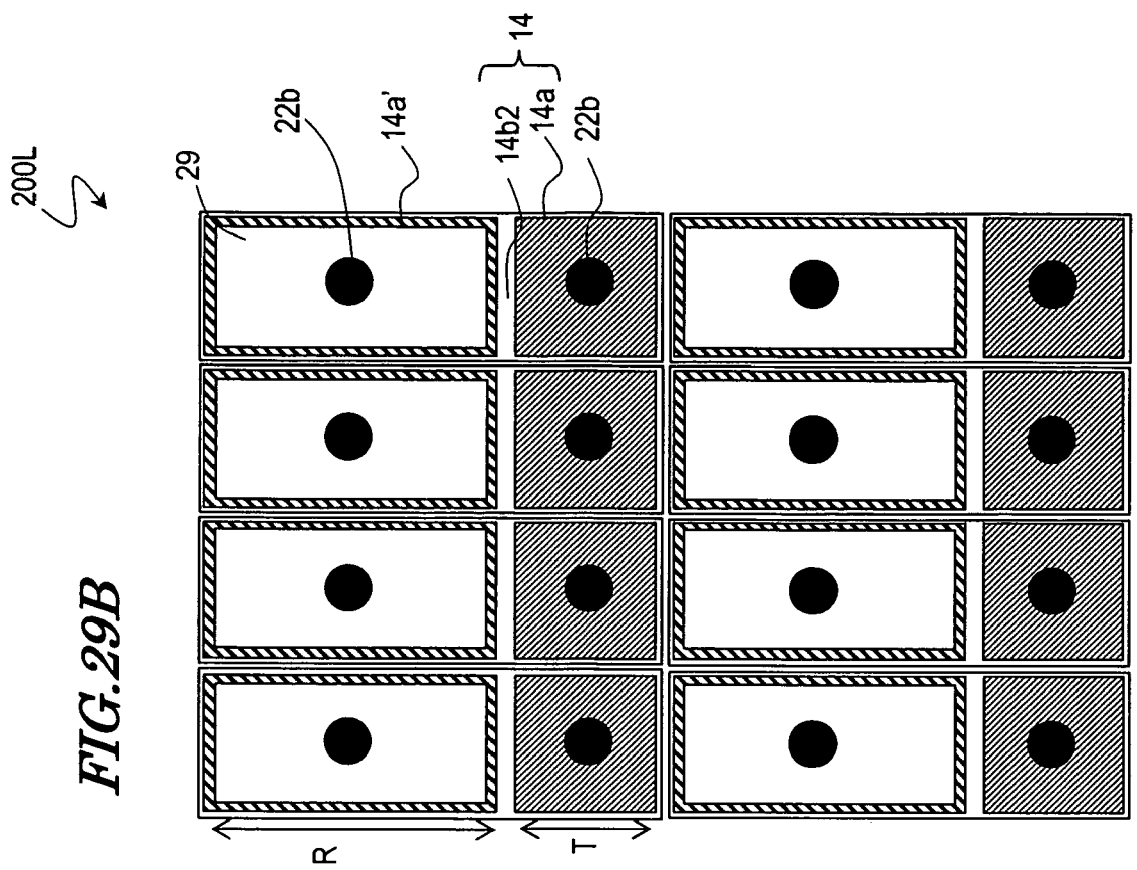
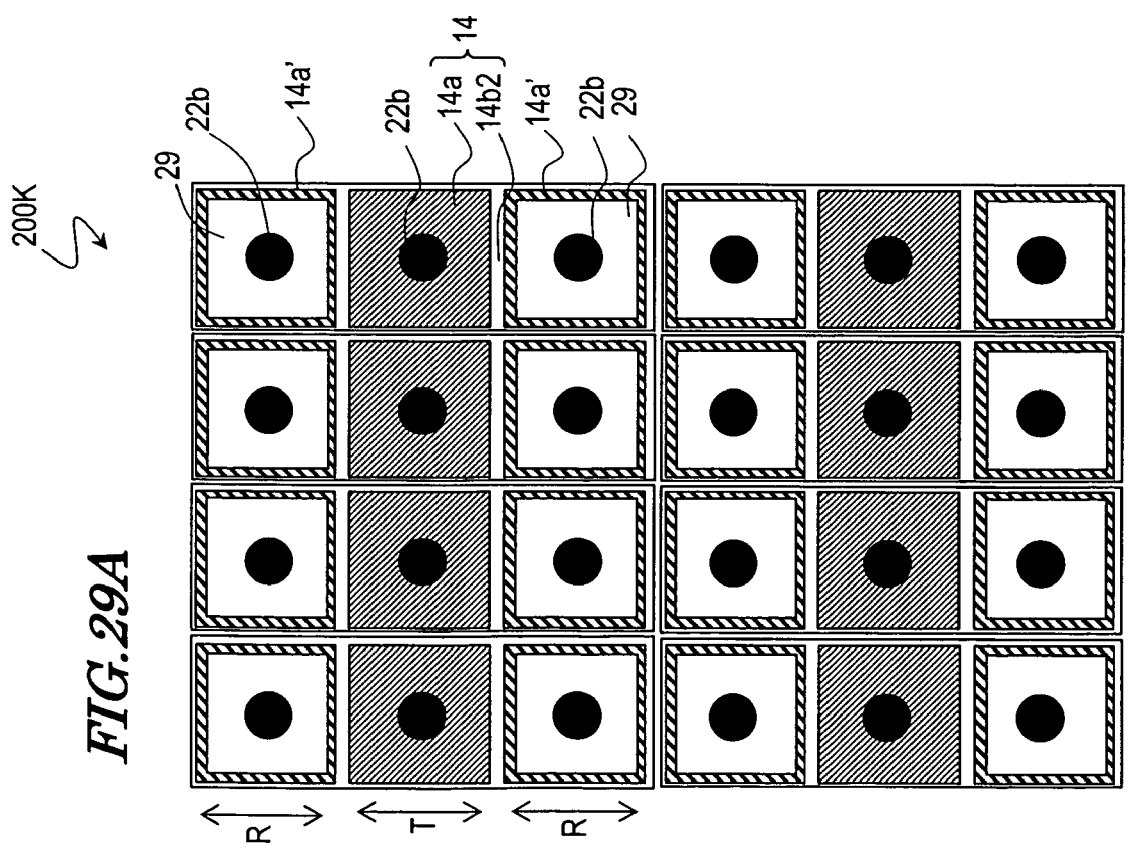

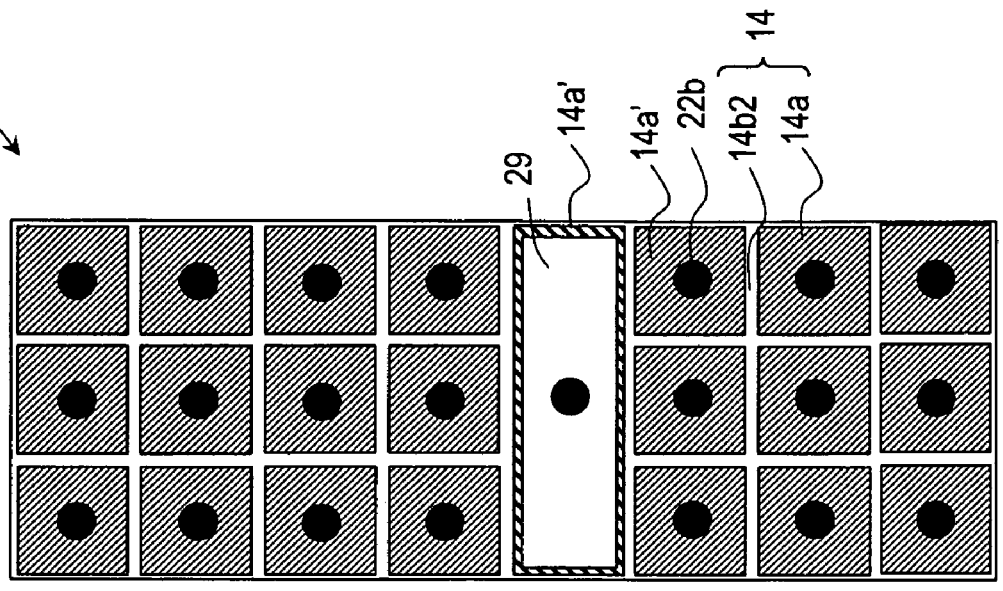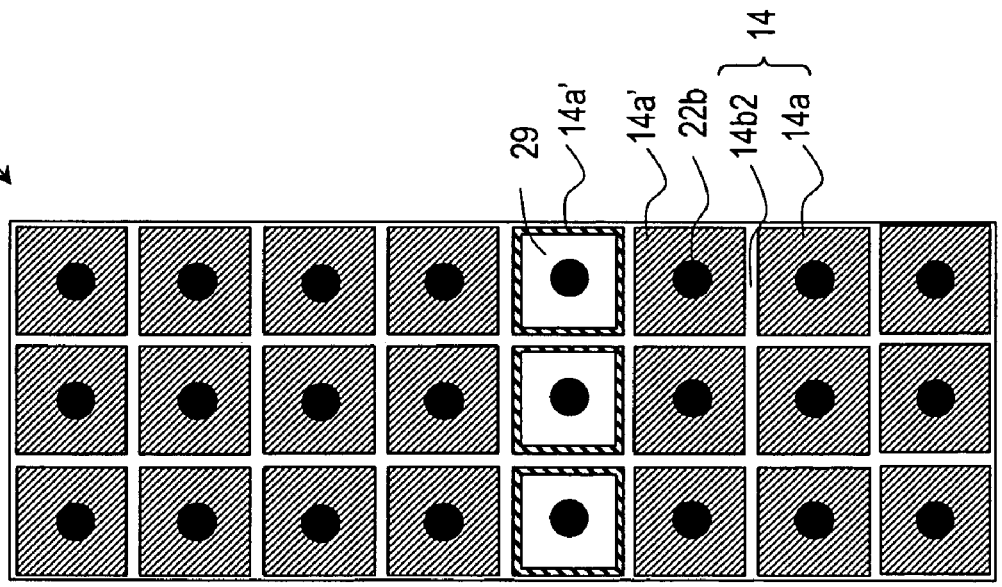

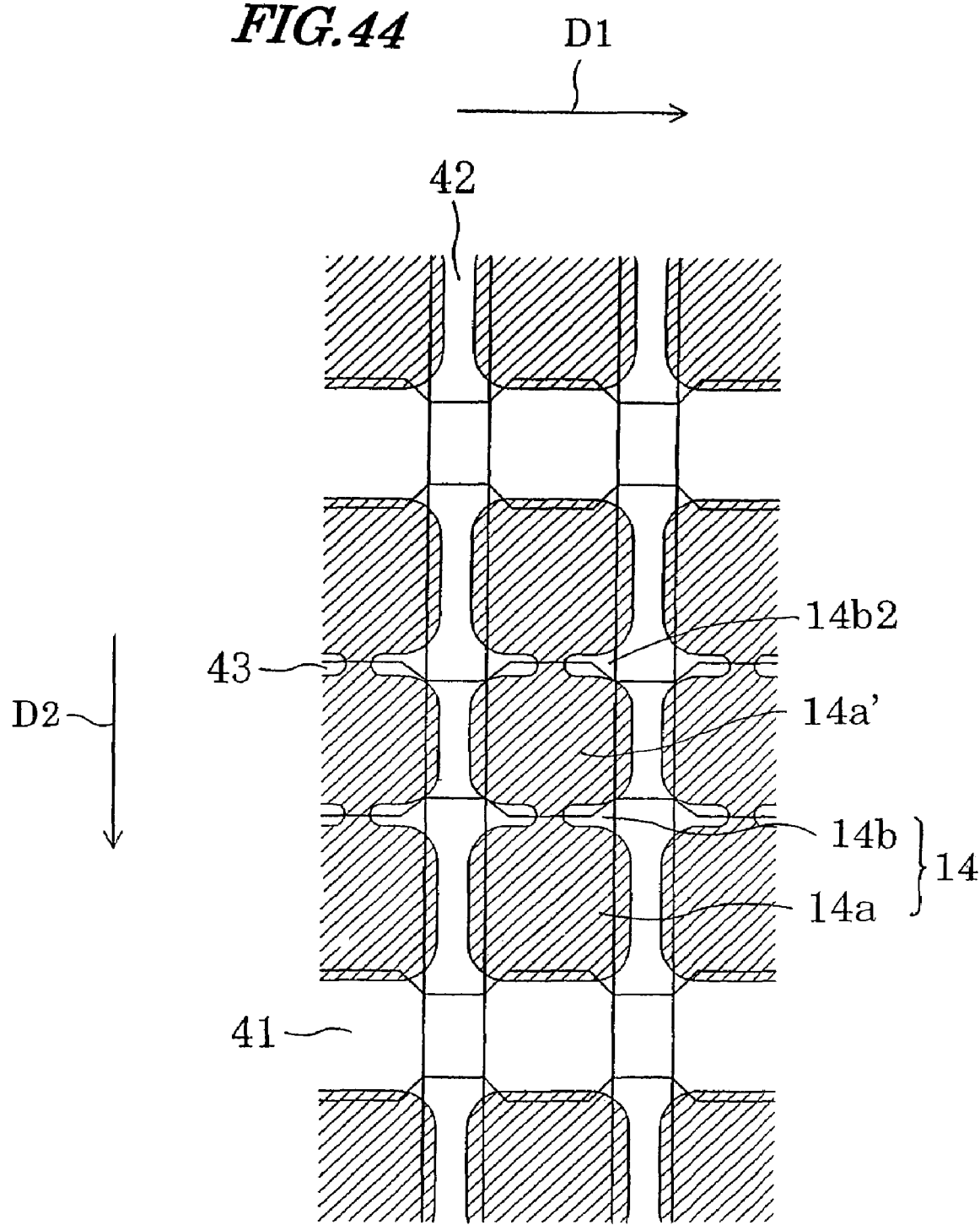

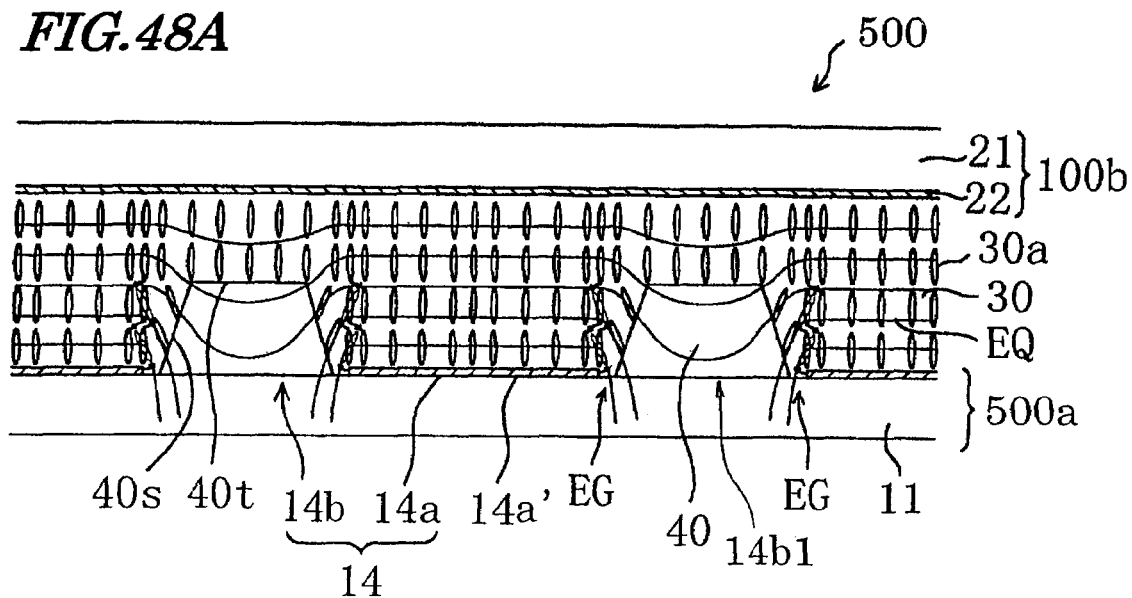
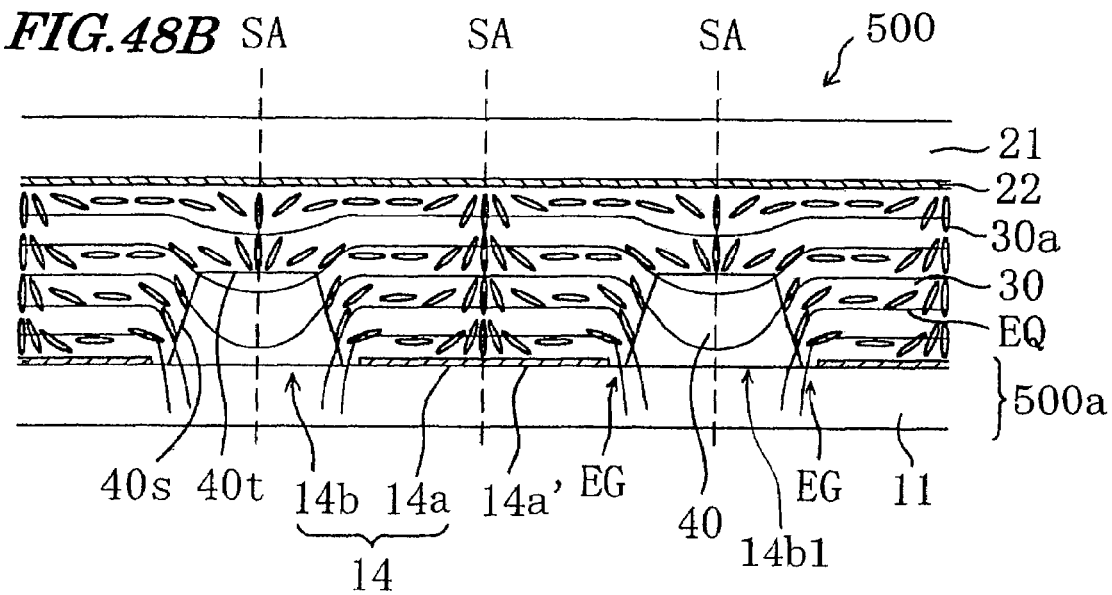

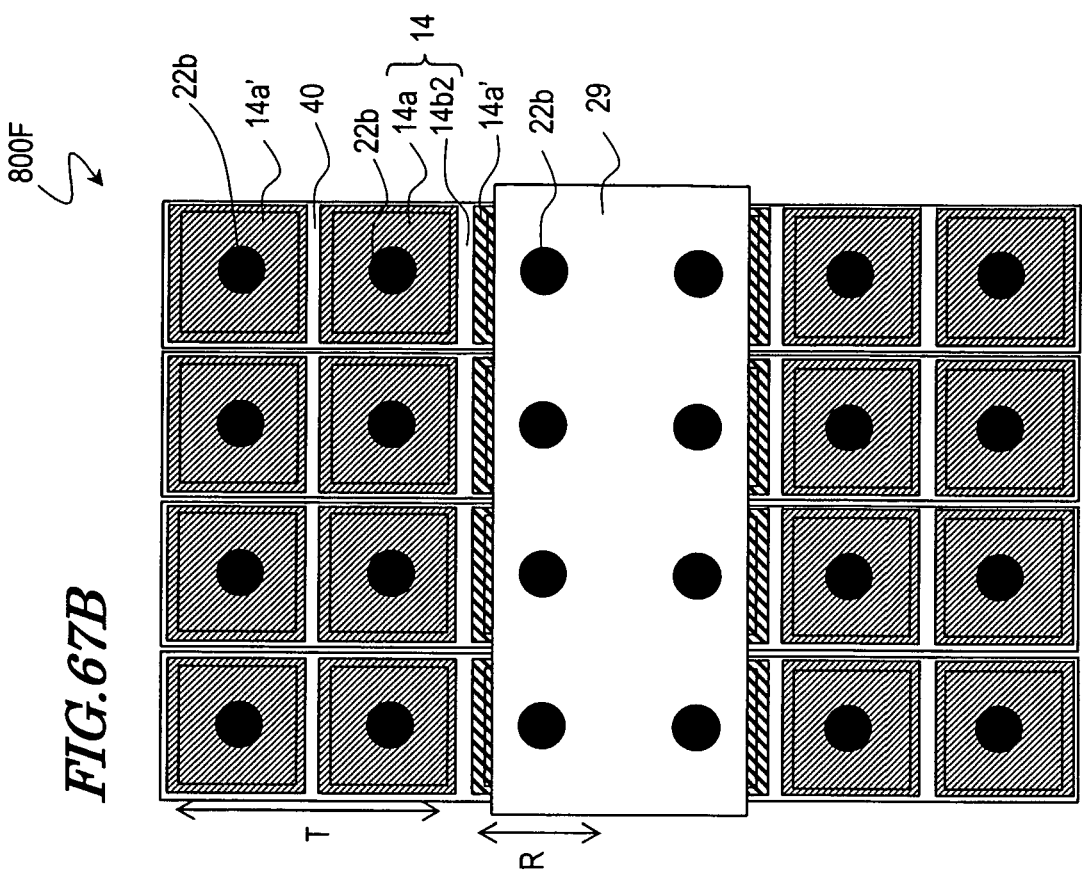
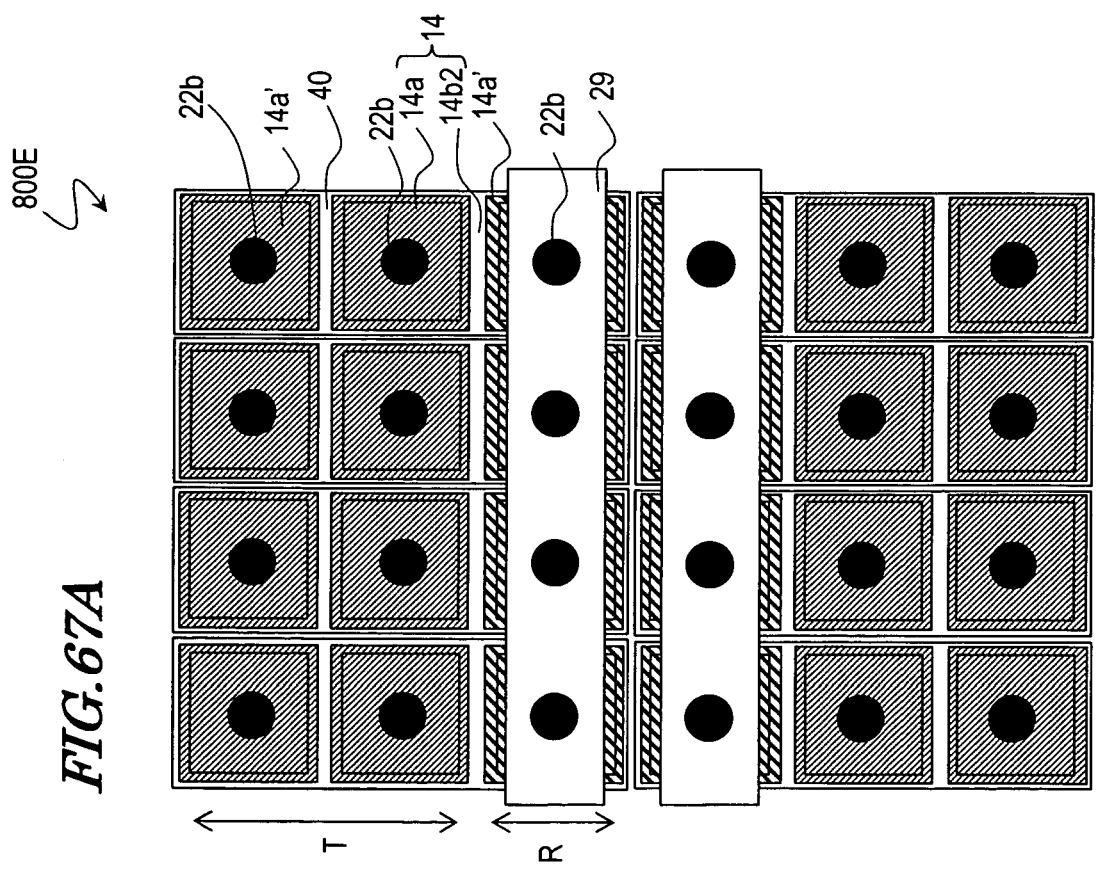

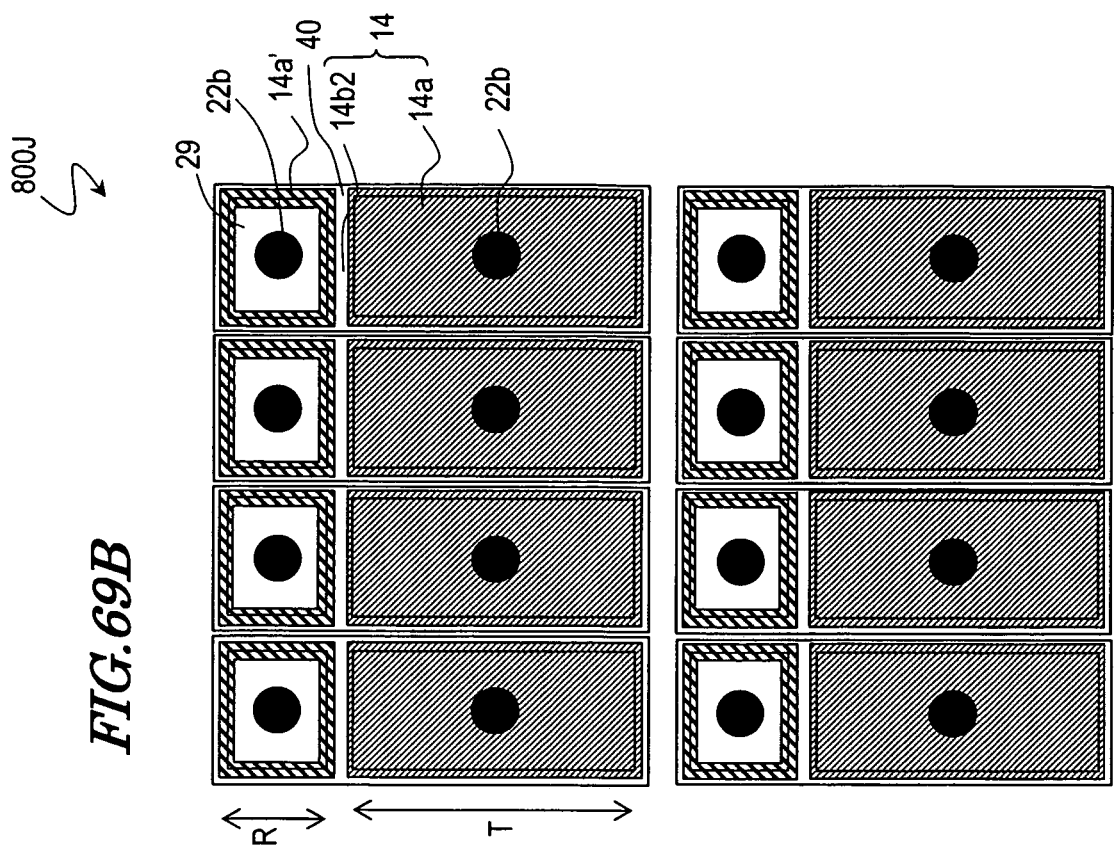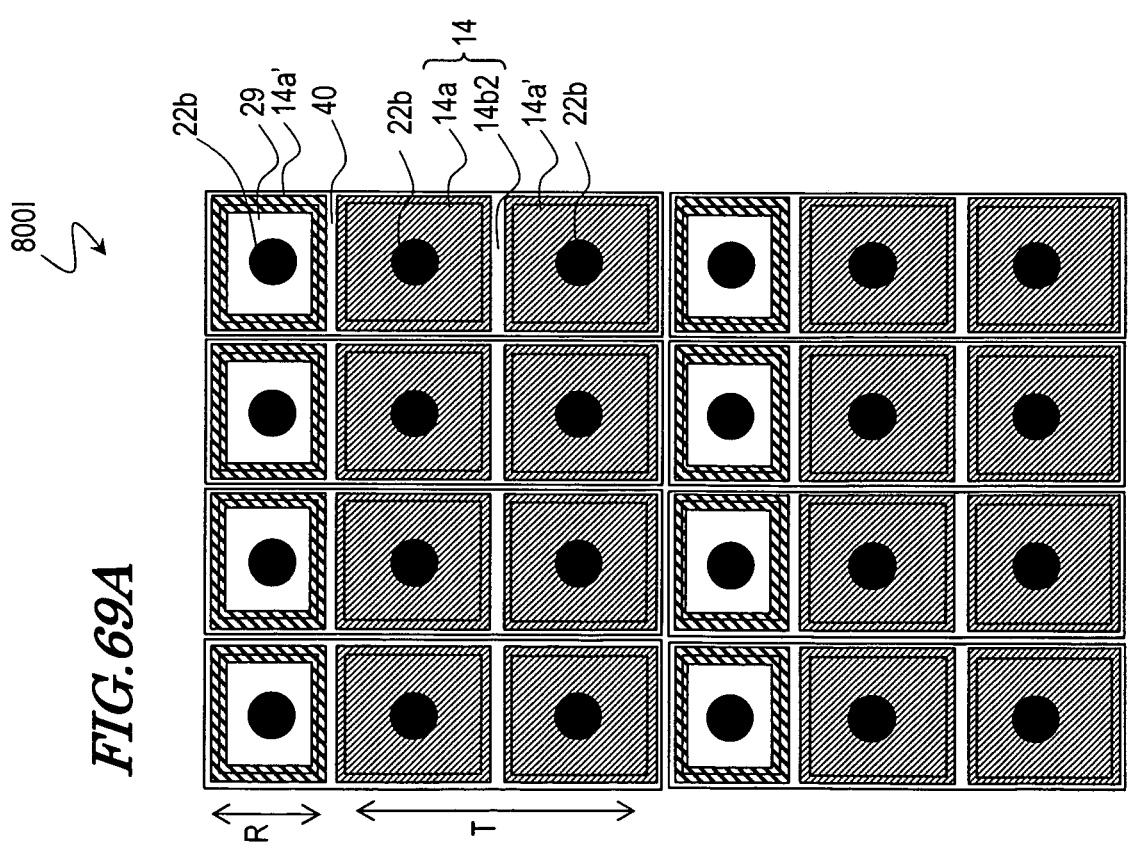

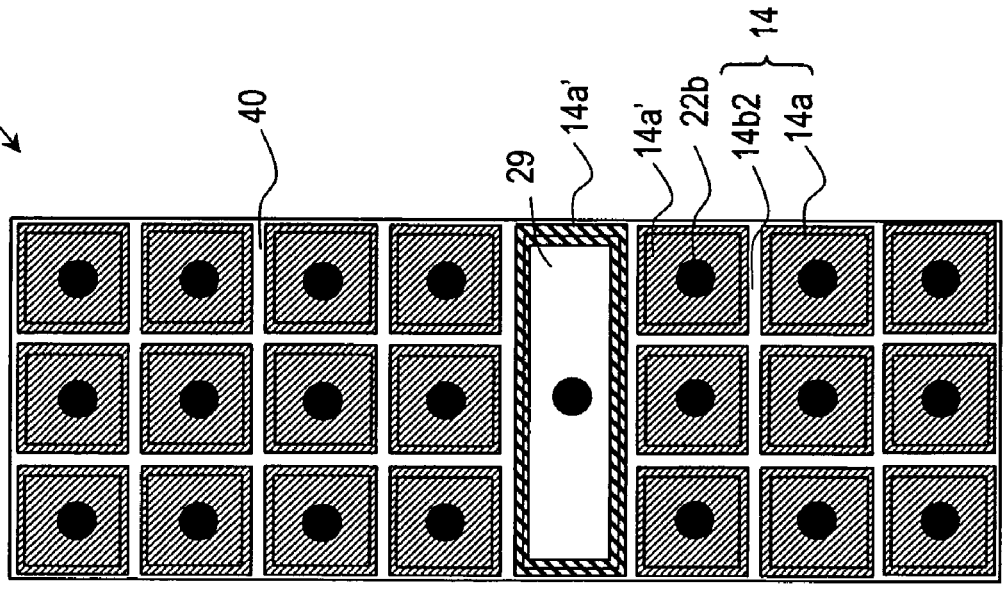
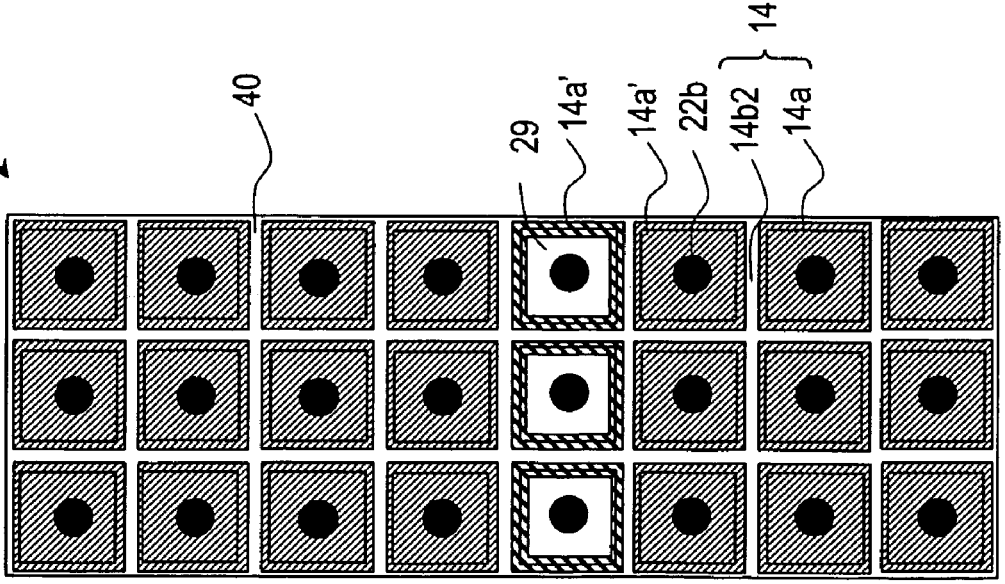

LIQUID CRYSTAL DISPLAY DEVICE

BACKGROUND OF THE INVENTION

1. Field of the Invention

The present invention relates to a liquid crystal display device, and more particularly to a liquid crystal display device having a wide viewing angle characteristic and being capable of producing a high quality display.

2. Description of the Related Art

In recent years, liquid crystal display devices, which are thin and light in weight, are used as displays of personal computers and mobile information terminal devices. However, conventional twisted nematic (TN) type and super twisted nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate thereto. Another approach is to employ a transverse electric field mode in which a horizontal electric field with respect to the substrate plane is applied across the liquid crystal layer. Transverse electric field mode liquid crystal display devices have been attracting public attention and are mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to be able to precisely control these factors and thus to realize stable production of the device.

In order to realize a uniform display without display non-uniformity with a DAP mode liquid crystal display device, an alignment control is necessary. An alignment control can be provided by, for example, subjecting the surface of an alignment film to an alignment treatment by rubbing. However, when a vertical alignment film is subjected to a rubbing treatment, rubbing streaks are likely to appear in the displayed image, and it is not suitable for mass-production.

In view of this, the present inventor, along with others, has disclosed, in Japanese Laid-Open Patent Publication No. 2003-43525, yet another approach for performing an alignment control without a rubbing treatment, in which a plurality of openings are provided in one of a pair of electrodes opposing each other via a liquid crystal layer therebetween so that the orientation direction of the liquid crystal molecules is controlled by an inclined electric field produced at the edge portions of these openings. With this approach, a stable orientation with a sufficient degree of continuity in the orientation of the liquid crystal molecules can be obtained across the entirety of each picture element, thereby improving the viewing angle and realizing a high-quality display.

Liquid crystal display devices capable of producing a high-quality display both outdoors and indoors have been proposed in the art (see, for example, Japanese Laid-Open Patent Publication No. 11-101992). A liquid crystal display device of this type is called a "transmission-reflection liquid crystal display device", and includes, in each picture element region, a reflection region where an image is displayed in a reflection mode and a transmission region where an image is displayed in a transmission mode.

However, optimal configurations have not yet been found for cases where the alignment control using an inclined electric field is applied to a transmission-reflection liquid crystal display device.

SUMMARY OF THE INVENTION

It is therefore an object of this invention to provide a transmission-reflection liquid crystal display device having a wide viewing angle characteristic and a high display quality.

According to a first aspect of the invention, a liquid crystal display device includes a first substrate; a second substrate; and a liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer therebetween. In each of the plurality of picture element regions, the first electrode includes a solid area formed of a conductive film and a non-solid area with no conductive film provided, the liquid crystal layer is in a vertical orientation state when no voltage is applied between the first electrode and the second electrode, and when a voltage is applied between the first electrode and the second electrode, forms a plurality of first liquid crystal domains each in a radially-inclined orientation at least above the solid area of the first electrode by an inclined electric field generated in the vicinity of the solid area. The plurality of picture element regions each include a transparent region for providing a transmission mode display using light incident from the side of the first substrate and a reflection region for providing a reflection mode display using light incident from the side of the second substrate. In each of the plurality of picture element regions, a thickness dr of the liquid crystal layer in the reflection region is smaller than a thickness dt of the liquid crystal layer in the transmission region, the second substrate includes a stepped portion having an upper tier located in the reflection region, a lower tier located in the transmission region and a side surface connecting the upper tier and the lower tier to each other, and the side surface of the stepped portion is located in the reflection region and is covered with the second electrode.

In one preferable embodiment of the invention, an orientation of the plurality of first liquid crystal domains is continuous with an orientation of the liquid crystal layer above the non-solid area.

In one preferable embodiment of the invention, the solid area of the first electrode includes a plurality of unit solid areas each substantially surrounded by the non-solid area, and each of the plurality of first liquid crystal domains is formed in correspondence with each of the plurality of unit solid areas.

In one preferable embodiment of the invention, each of the plurality of unit solid areas has a shape having rotational symmetry.

In one preferable embodiment of the invention, each of the plurality of unit solid areas has a generally circular shape.

In one preferable embodiment of the invention, each of the plurality of unit solid areas has a generally rectangular shape.

In one preferable embodiment of the invention, each of the plurality of unit solid areas has a generally rectangular shape with generally arc-shaped corner portions.

In one preferable embodiment of the invention, each of the plurality of unit solid areas has a shape with acute angle corners.

In one preferable embodiment of the invention, in each of the plurality of picture element regions, a thickness de of the liquid crystal layer above an edge portion of at least one unit solid area of the plurality of unit solid areas is smaller than a thickness dc of the liquid crystal layer above a central portion of the at least one unit solid area.

In one preferable embodiment of the invention, a height of a surface of the edge portion of the at least one unit solid area is higher than a height of a surface of the central portion of the at least one unit solid area.

In one preferable embodiment of the invention, the first substrate includes a transparent substrate and an interlayer insulating film provided between the transparent substrate and the first electrode. The interlayer insulating film has a first region in which a height of one surface of the interlayer insulating film which is closer to the liquid crystal layer continuously changes. The edge portion of the at least one unit solid area is located above the first region.

In one preferable embodiment of the invention, the interlayer insulating film has a second region in which the height of the one surface of the interlayer insulating film which is closer to the liquid crystal layer is substantially constant. The central portion of the at least one unit solid area is located above the second region.

In one preferable embodiment of the invention, light incident on the liquid crystal layer is circularly-polarized light, and the liquid crystal layer modulates the circularly-polarized light to perform display.

In one preferable embodiment of the invention, when a voltage is applied between the first electrode and the second electrode, at least one second liquid crystal domain in a radially-inclined orientation is formed above the non-solid area by the inclined electric field.

In one preferable embodiment of the invention, an orientation of the plurality of first liquid crystal domains is continuous with an orientation of the at least one second liquid crystal domain.

In one preferable embodiment of the invention, the non-solid area of the first electrode has at least one opening.

In one preferable embodiment of the invention, the at least one opening is a plurality of openings, and at least some of the plurality of openings have substantially the same shape and substantially the same size and are located to form at least one unit lattice having rotational symmetry.

In one preferable embodiment of the invention, each of the at least some of the plurality of openings has a shape having rotational symmetry.

In one preferable embodiment of the invention, the non-solid area of the first electrode includes at least one cut-out area.

In one preferable embodiment of the invention, the at least one cut-out area is a plurality of cut-out areas, and the plurality of cut-out areas are regularly arranged.

In one preferable embodiment of the invention, in each of the plurality of picture element regions, the non-solid area of the first electrode has an area which is smaller than an area of the solid area of the first electrode.

In one preferable embodiment of the invention, the second substrate includes an orientation-regulating structure in a region corresponding to at least one first liquid crystal domain of the plurality of first liquid crystal domains, the orientation-regulating structure exerting an orientation-regulating force for placing liquid crystal molecules in the at least one first liquid crystal domain into a radially-inclined orientation at least in the presence of an applied voltage.

In one preferable embodiment of the invention, the orientation-regulating structure is provided in a region corresponding to a central portion of the at least one liquid crystal domain.

In one preferable embodiment of the invention, the orientation-regulating structure exerts an orientation-regulating force for placing the liquid crystal molecules into a radially-inclined orientation also in the absence of an applied voltage.

In one preferable embodiment of the invention, the orientation-regulating structure is at least one protrusion protruding into the liquid crystal layer.

In one preferable embodiment of the invention, the at least one protrusion includes a protrusion located in the reflection region, and a thickness of the liquid crystal layer is defined by the protrusion located in the reflection region.

In one preferable embodiment of the invention, the at least one protrusion is a plurality of protrusions which include a protrusion located in the transmission region.

In one preferable embodiment of the invention, at least one of the first substrate and the second substrate includes a light shielding layer for shielding light against the protrusion located in the transmission region.

In one preferable embodiment of the invention, the second substrate includes a single protrusion located in the transmission region in each of the plurality of picture element regions.

In one preferable embodiment of the invention, the first protrusion has a side surface that is inclined by an angle less than 90° with respect to the substrate plane of the second substrate.

In one preferable embodiment of the invention, the orientation-regulating structure may include a horizontal orientation surface provided on one side of the second substrate that is closer to the liquid crystal layer.

In one preferable embodiment of the invention, the orientation-regulating structure exerts an orientation-regulating force for orienting the liquid crystal molecules into a radially-inclined orientation only in the presence of an applied voltage.

In one preferable embodiment of the invention, the orientation-regulating structure may include an opening provided in. the second electrode.

In one preferable embodiment of the invention, the first substrate includes at least one protrusion having an inclining surface above the non-solid area, a cross-sectional shape of the protrusion in a plane of the first substrate is conformed to a shape of a boundary between the solid area and the non-solid area, and the inclining surface of the protrusion has an orientation-regulating force for inclining liquid crystal molecules in the liquid crystal layer in the same direction as an orientation-regulating direction provided by the inclined electric field.

In one preferable embodiment of the invention, the protrusion covers an edge portion of the solid area of the first electrode.

In one preferable embodiment of the invention, the first electrode includes a transparent electrode for defining the transmission region and a reflection electrode for defining the reflection region.

In one preferable embodiment of the invention, the second substrate further includes a transparent dielectric layer selectively provided in the reflection region in each of the plurality of picture element regions.

In one preferable embodiment of the invention, the transparent dielectric layer provided in each of the plurality of picture element regions is continuous with the transparent dielectric layer provided in at least one of the picture element regions adjacent to each picture element region.

In one preferable embodiment of the invention, the first substrate further includes a switching device provided in correspondence with each of the plurality of picture element regions. The first electrode is a picture element electrode provided for each of the plurality of picture element regions and switched by the switching device, and the second electrode is at least one counter electrode opposing the plurality of picture element electrodes.

In one preferable embodiment of the invention, the plurality of picture element regions are arranged in a matrix pattern including a plurality of rows and a plurality of columns; and a polarity of a voltage applied across the liquid crystal layer in a first picture element region among the plurality of picture element regions is different from a polarity of a voltage applied across the liquid crystal layer in a second picture element region among the plurality of picture element regions that belongs to the same row as that of the first picture element region and belongs to a column adjacent to a column to which the first picture element region belongs in each frame.

In one preferable embodiment of the invention, the plurality of picture element regions each have a shape whose longitudinal direction is defined in the column direction and whose width direction is defined in the row direction.

In one preferable embodiment of the invention, a polarity of a voltage applied across the liquid crystal layer in a plurality of picture element regions belonging to one column among the plurality of picture element regions is inverted for every n rows (where n is an integer of 1 or more) in each frame.

In one preferable embodiment of the invention, a polarity of a voltage applied across the liquid crystal layer in the first picture element region is different from a polarity of a voltage applied across the liquid crystal layer in a third picture element region that belongs to the same column as that of the first picture element region and belongs to a row adjacent to a row to which the first picture element region belongs in each frame.

According to a second aspect of the invention, a liquid crystal display device includes a first substrate; a second substrate; and a liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer therebetween. In each of the picture element regions, the first electrode includes a solid area formed of a conductive film and a non-solid area with no conductive film provided, the liquid crystal layer is in a vertical orientation state when no voltage is applied between the first electrode and the second electrode, and when a voltage is applied between the first electrode and the second electrode, forms a plurality of first liquid crystal domains each in a radially-inclined orientation at least above the solid area of the first electrode by an inclined electric field generated in the vicinity of the solid area. The plurality of picture element regions each include a transparent region for providing a transmission mode display using light incident from the side of the first substrate and a reflection region for providing a reflection mode display using light incident from the side of the second substrate, and a thickness dr of the liquid crystal layer in the reflection region is smaller than a thickness dt of the liquid crystal layer in the transmission region. The second substrate includes a stepped portion having an upper tier located in the reflection region, a lower tier located in the transmission region and a side surface connecting the upper tier and the lower tier to each other, and the side surface of the stepped portion is located in the reflection region and is covered with the second electrode. In each of the plurality of picture element regions, first substrate includes at least one protrusion having an inclining surface above the non-solid area, a cross-sectional shape of the protrusion in a plane of the first substrate is conformed to a shape of a boundary between the solid area and the non-solid area, the inclining surface of the protrusion has an orientation-regulating force for inclining liquid crystal molecules in the liquid crystal layer in the same direction as an orientation-regulating direction provided by the inclined electric field, and the protrusion covers an edge portion of the solid area of the first electrode.

The present invention, which forms liquid crystal domains taking a radially-inclined orientation stably and with a high level of continuity, realizes a transmission-reflection liquid crystal display device having a wide viewing angle characteristic and a high display quality.

In the first aspect of the present invention, a multigap structure is realized by providing a stepped portion on a substrate which is different from the substrate including an electrode for generating an inclined electric field for forming a radially-inclined orientation. This is advantageous for the production process. The side surface of the stepped portion is located in the reflection region and is covered with an electrode, and therefore the deterioration in the display quality caused by the inclination of the side surface of the stepped portion can be suppressed.

In the second aspect of the present invention, an electrode for generating an inclined electric field for placing the liquid crystal molecules into a radially-inclined orientation, and a protrusion having a side surface having an orientation-regulating force in the same direction as that of the orientation-regulating force of the inclined electric field, cooperatively perform orientation regulation. This provides a stable radially-inclined orientation. In addition, since the protrusion covers an edge portion of the solid area of the electrode, a stable radially-inclined orientation can be realized regardless of the driving voltage conditions.

As described above, the present invention provides a transmission-reflection liquid crystal display device having a wide viewing angle characteristic and a high display quality provide.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1A and FIG. 1B schematically illustrate a structure of a liquid crystal display device 100 of the present invention, wherein FIG. 1A is a plan view, and FIG. 1B is a cross-sectional view taken along line 1B-1B' of FIG. 1A.

FIG. 16A and FIG. 16B schematically illustrate another liquid crystal display device 200 of the present invention, wherein FIG. 16A is a plan view, and FIG. 16B is a cross-sectional view taken along line 16B-16B' of FIG. 16A.

FIG. 17A to FIG. 17C are cross-sectional views schematically illustrating the liquid crystal display device 200, wherein FIG. 17A illustrates a state in the absence of an applied voltage, FIG. 17B illustrates a state where an orientation has just started to change (initial ON state), and FIG. 17C illustrates a steady state.

FIG. 18A and FIG. 18B schematically illustrate still another liquid crystal display device 200' of the present invention, wherein FIG. 18A is a plan view, and FIG. 18B is a cross-sectional view taken along line 18B-18B' of FIG. 18A.

FIG. 19A to FIG. 19C are cross-sectional views schematically illustrating the liquid crystal display device 200', wherein FIG. 19A illustrates a state in the absence of an applied voltage, FIG. 19B illustrates a state where an orientation has just started to change (initial ON state), and FIG. 19C illustrates a steady state.

FIG. 20A to FIG. 20C are cross-sectional views schematically illustrating a liquid crystal display device including a protrusion (rib) that functions also as a spacer, wherein FIG. 20A illustrates a state in the absence of an applied voltage, FIG. 20B illustrates a state where an orientation has just started to change (initial ON state), and FIG. 20C illustrates a steady state.

FIG. 26A is a plan view schematically illustrating still another liquid crystal display device 200E of the present invention, and FIG. 26B is a plan view schematically illustrating still another liquid crystal display device 200F of the present invention.

FIG. 28A is a plan view schematically illustrating still another liquid crystal display device 200I of the present invention, and FIG. 28B is a plan view schematically illustrating still another liquid crystal display device 200J of the present invention.

FIG. 29A is a plan view schematically illustrating still another liquid crystal display device 200K of the present invention, and FIG. 29B is a plan view schematically illustrating still another liquid crystal display device 200L of the present invention.

FIG. 32A is a plan view schematically illustrating still another liquid crystal display device 200Q of the present invention, and FIG. 32B is a plan view schematically illustrating still another liquid crystal display device 200R of the present invention.

FIG. 38A and FIG. 38B schematically illustrate a structure of still another liquid crystal display device 400 of the present invention, wherein FIG. 38A is a plan view, and FIG. 38B is a cross-sectional view taken along line 38B-38B' of FIG. 38A.

FIG. 44 illustrates a structure of a picture element electrode in which unit solid areas are arranged in one line.

FIG. 46A and FIG. 46B schematically illustrate a structure of still another liquid crystal display device 500 of the present invention, wherein FIG. 46A is a plan view, and FIG. 46B is a cross-sectional view taken along line 46B-46B' of FIG. 46A.

FIG. 48A and FIG. 48B illustrate a liquid crystal layer 30 of the liquid crystal display device 500 in the presence of an applied voltage thereacross, wherein FIG. 48A schematically illustrates a state where an orientation has just started to change (initial ON state), and FIG. 48B schematically illustrates a steady state.

FIG. 54A and FIG. 54B schematically illustrate a structure of still another liquid crystal display device 700 of the present invention, wherein FIG. 54A is a plan view, and FIG. 54B is a cross-sectional view taken along line 54B-54B' of FIG. 54A.

FIG. 57A and FIG. 57B schematically illustrate a structure of still another liquid crystal display device 800 of the present invention, wherein FIG. 57A is a plan view, and FIG. 57B is a cross-sectional view taken along line 57B-57B' of FIG. 57A.

FIG. 58A to FIG. 58C are cross-sectional views schematically illustrating the liquid crystal display device 800, wherein FIG. 58A illustrates a state in the absence of an applied voltage, FIG. 58B illustrates a state where an orientation has just started to change (initial ON state), and FIG. 58C illustrates a steady state.

FIG. 59A and FIG. 59B schematically illustrate a structure of still another liquid crystal display device 800' of the present invention, wherein FIG. 59A is a plan view, and FIG. 59B is a cross-sectional view taken along line 59B-59B' of FIG. 59A.

FIG. 60A to FIG. 60C are cross-sectional views schematically illustrating the liquid crystal display device 800', wherein FIG. 60A illustrates a state in the absence of an applied voltage, FIG. 60B illustrates a state where an orientation has just started to change (initial ON state), and FIG. 60C illustrates a steady state.

FIG. 61A to FIG. 61C are cross-sectional views schematically illustrating a liquid crystal display device including a protrusion (rib) that functions also as a spacer, wherein FIG. 61A illustrates a state in the absence of an applied voltage, FIG. 61B illustrates a state where an orientation has just started to change (initial ON state), and FIG. 61C illustrates a steady state.

FIG. 67A is a plan view schematically illustrating still another liquid crystal display device 800E of the present invention, and FIG. 67B is a plan view schematically illustrating still another liquid crystal display device 800F of the present invention.

FIG. 69A is a plan view schematically illustrating still another liquid crystal display device 800I of the present invention, and FIG. 69B is a plan view schematically illustrating still another liquid crystal display device 800J of the present invention.

FIG. 73A is a plan view schematically illustrating still another liquid crystal display device 800Q of the present invention, and FIG. 73B is a plan view schematically illustrating still another liquid crystal display device 800R of the present invention.

DETAILED DESCRIPTION OF PREFERRED EMBODIMENTS

Hereinafter, preferred embodiments of the present invention will be described with reference to the accompanying drawings.

The liquid crystal display device of the present invention has desirable display characteristics and thus can be suitably used as an active matrix type liquid crystal display device. An embodiment of the present invention will now be described with respect to an active matrix type liquid crystal display device using thin film transistors (TFTs). The present invention is not limited thereto, but may alternatively be used with an active matrix type liquid crystal display device using an MIM structure.

Note that in the present specification, a region of a liquid crystal display device corresponding to a "picture element", which is the minimum unit of display, will be referred to as a "picture element region". In a color liquid crystal display device, a plurality of "picture elements" including R, G and B "picture elements" correspond to one "pixel". In an active matrix type liquid crystal display device, a picture element region is defined by a picture element electrode and a counter electrode opposing the picture element electrode. In a passive matrix type liquid crystal display device, a picture element region is defined as a region where one of column electrodes arranged in a stripe pattern crosses one of row electrodes also arranged in a stripe pattern perpendicular to the column electrodes. In an arrangement with a black matrix, strictly speaking, a picture element region is a portion of each region across which a voltage is applied according to the intended display state that corresponds to an opening of the black matrix.

Embodiment 1

Figure 1A:
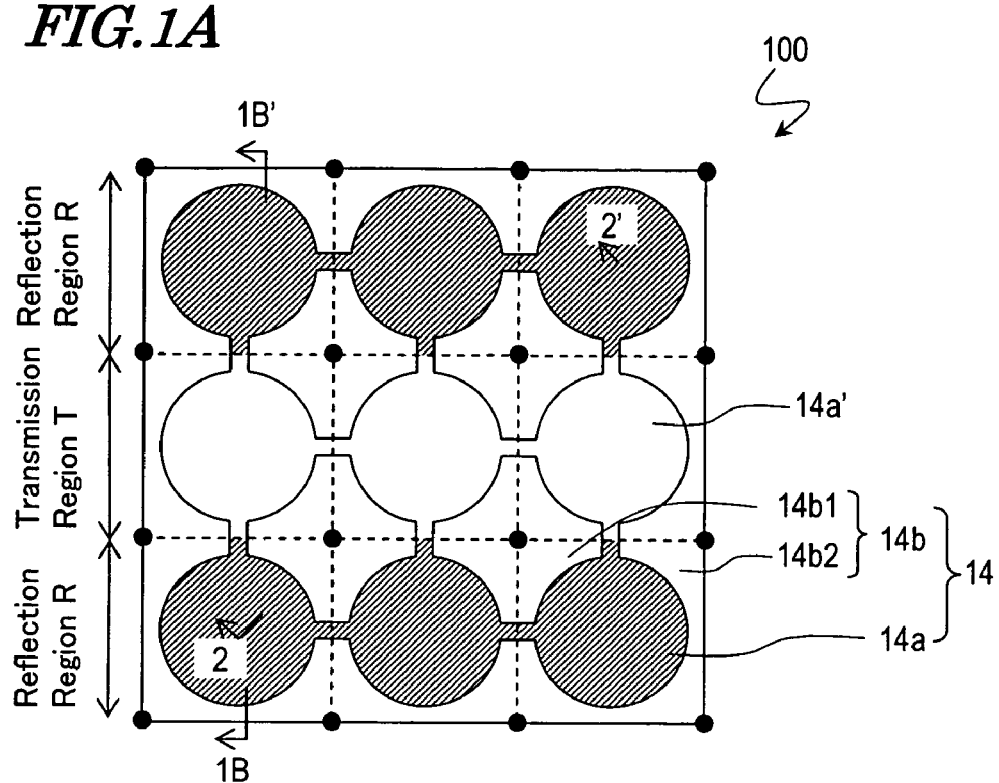
Figure 1B:
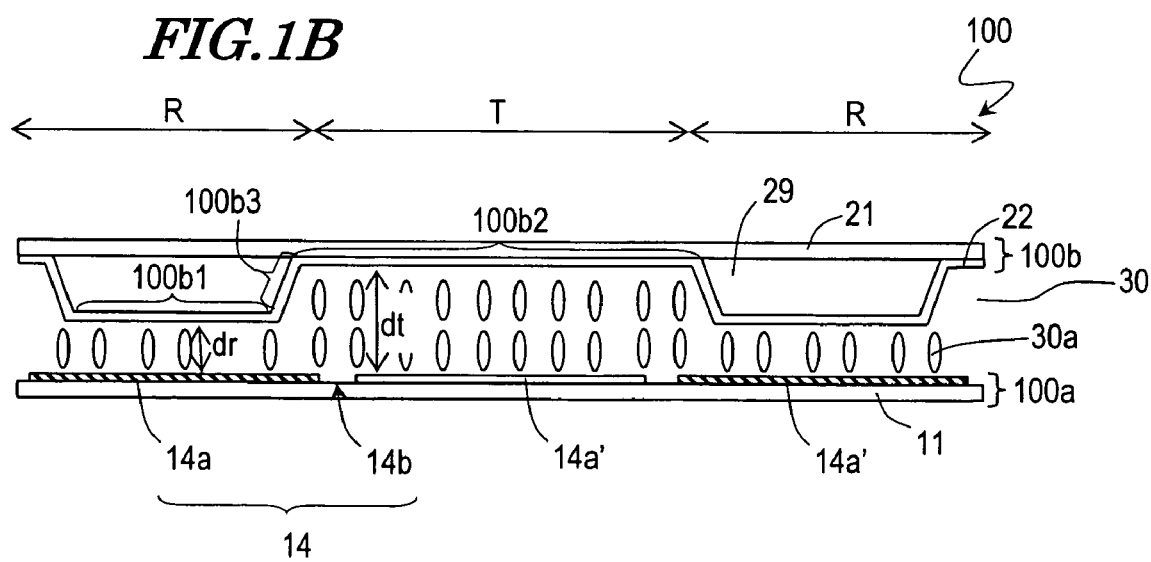

The structure of one picture element region of a liquid crystal display device 100 according to the present embodiment will now be described with reference to FIG. 1A and FIG. 1B. In the following description, a color filter and a black matrix are omitted for the sake of simplicity. Moreover, in subsequent figures, each element having substantially the same function as the corresponding element in the liquid crystal display device 100 will be denoted by the same reference numeral and will not be further described below. FIG. 1A is a plan view illustrating the picture element region of the liquid crystal display device 100 as viewed in the substrate normal direction, and FIG. 1B is a cross-sectional view taken along line 1B-1B' of FIG. 1A. FIG. 1B illustrates a state where no voltage is applied across a liquid crystal layer.

The liquid crystal display device 100 includes an active matrix substrate (hereinafter referred to as a "TFT substrate") 100a, a counter substrate (referred to also as a "color filter substrate") 100b, and a liquid crystal layer 30 provided between the TFT substrate 100a and the counter substrate 100b. Liquid crystal molecules 30a of the liquid crystal layer 30 have a negative dielectric anisotropy, and are aligned vertical to the surface of a vertical alignment film (not shown), as illustrated in FIG. 1B, in the absence of an applied voltage across the liquid crystal layer 30 by virtue of the vertical alignment film, as a vertical alignment layer provided on one surface of each of the TFT substrate 100a and the counter substrate 100b that is closer to the liquid crystal layer 30. This state is described as the liquid crystal layer 30 being in a vertical alignment. Note, however, that the liquid crystal molecules 30a of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 85° or more with respect to the surface of the vertical alignment film.

The TFT substrate 100a of the liquid crystal display device 100 includes a transparent substrate (e.g., a glass substrate) 11 and a picture element electrode 14 provided on the surface of the transparent substrate 11. The counter substrate 100b includes a transparent substrate (e.g., a glass substrate) 21 and a counter electrode 22 provided on the surface of the transparent substrate 21. The orientation of the liquid crystal layer 30 changes for each picture element region according to the voltage applied between the picture element electrode 14 and the counter electrode 22, which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

Each picture element region includes a transmission region T where an image is displayed in a transmission mode using light coming from the side of the TFT substrate 100a (typically, light from the backlight) and a reflection region R where an image is displayed in a reflection mode using light coming from the side of the counter substrate 100b (typically ambient light). In the present embodiment, the picture element electrode 14 includes a transparent electrode made of a transparent conductive material and a reflection electrode made of a light-reflecting conductive material. The transmission region T is defined by the transparent electrode, and the reflection region R is defined by the reflection electrode. Note that if the surface of the reflection electrode is provided with minute irregularities, light can be scattered by the reflection electrode, and it is thereby possible to realize a white display that is close to paper white.

While light used for displaying an image passes through the liquid crystal layer 30 only once in the transmission mode, it passes through the liquid crystal layer 30 twice in the reflection mode. By setting a thickness dr of the liquid crystal layer 30 in the reflection region R to be smaller than a thickness dt of the liquid crystal layer 30 in the transmission region T, as illustrated in FIG. 1B, the retardation given by the liquid crystal layer 30 to light used in the reflection mode can be made close to the retardation given by the liquid crystal layer 30 to light used in the transmission mode. By setting the thickness dr of the liquid crystal layer 30 in the reflection region R to be about ½ the thickness dt of the liquid crystal layer 30 in the transmission region T, the retardations given by the liquid crystal layer 30 to light in these display modes can be made substantially equal to each other.

The counter substrate 100b has a stepped portion including an upper tier (an upper level surface) 100b1 located in the reflection region R, a lower tier (a lower level surface) 100b2 located in the transmission region T, and a side surface 100b3 connecting the upper tier 100b1 and the lower tier 100b2 to each other, whereby the thickness dr of the liquid crystal layer 30 in the reflection region R is smaller than the thickness dt of the liquid crystal layer 30 in the transmission region T. Specifically, the stepped portion of the counter substrate 100b is formed by providing a transparent dielectric layer 29 selectively in the reflection region R of the counter substrate 100b. The side surface 100b3 of the stepped portion is located in the reflection region R, and is covered by the counter electrode 22.

Next, the structure and the function of the picture element electrode 14 provided in the liquid crystal display device 100 of the present invention will be described.

As illustrated in FIG. 1A and FIG. 1B, the picture element electrode 14 includes a solid area (a solid portion) 14a formed of a conductive film (e.g., an ITO film or an aluminum film) and a non-solid area (a non-solid portion) 14b with no conductive film provided therein.

The solid area 14a includes a plurality of areas each substantially surrounded by the non-solid portion 14b (each of such areas will be referred to as a "unit solid area 14a'"). The unit solid areas 14a' have substantially the same shape and substantially the same size as one another, and each solid area 14a' has a generally circular shape. Typically, the plurality of unit solid areas 14a' are electrically connected together in each picture element region. In the embodiment shown in FIG. 1A and FIG. 1B, the picture element electrode 14 includes nine unit solid areas 14a'. Three of the nine (in the center row in FIG. 1A) are transparent electrode areas, and the remaining six (in the upper row and the lower row in FIG. 1A) are reflection electrode areas.

The non-solid area 14b includes a plurality of openings 14b1, which have substantially the same shape and substantially the same size as one another, and are arranged so that the respective centers thereof form a square lattice pattern. The unit solid area 14a' at the center of the picture element electrode 14 is substantially surrounded by four openings 14b1 whose respective centers are located at the four lattice points that form one unit lattice. Each of the openings 14b1 has a generally star-like shape having four quarter-arc-shaped sides (edges), with a four-fold rotation axis at the center among the four sides.

The non-solid area 14b further includes a plurality of cut-out areas 14b2. The plurality of cut-out areas 14b2 are located at edge portions of the picture element region. The cut-out areas 14b2, which are located in areas corresponding to the sides of the picture element region, each have a shape corresponding to about a half of the shape of each opening 14b1. The cut-out areas 14b2, which are located in areas corresponding to the corners of the picture element region, each have a shape corresponding to about a quarter of the shape of each opening 14b1. The unit solid areas 14a' which are located in the edge portions of the picture element region are each substantially surrounded by the respective cut-out areas 14b2 and the respective opening 14b1. The cut-out areas 14b2 are regularly arranged, and the openings 14b1 and the cut-out areas 14b2 form unit lattices in the entirety of the picture element region (to the end portions thereof). The openings 14b1 and the cut-out areas 14b2 are formed by patterning a conductive film which is used for the picture element electrode 14.

When a voltage is applied between the picture element electrode 14 having such a structure as described above and the counter electrode 22, an inclined electric field is produced around (near the periphery of) the solid area 14a, i.e., at the edge portion of the non-solid area 14b, thereby producing a plurality of liquid crystal domains each taking a radially-inclined orientation. The liquid crystal domain is produced in each region corresponding to the opening 14b1 and in each region corresponding to the unit solid area 14a'.

The picture element electrode 14 in this embodiment is square, but the shape of the picture element electrode 14 is not limited thereto. A general shape of the picture element electrode 14 is close to a rectangle (encompassing a square and an oblong rectangle), so that the openings 14b1 and the cut-out areas 14b2 are regularly arranged in a square lattice pattern. Even when the picture element electrode 14 is not rectangular, the effects of the present invention are provided as long as the openings 14b1 and the cut-out areas 14b2 are arranged regularly (e.g., in a square lattice pattern as described above) such that liquid crystal domains are formed in the entirety of the picture element region.

Figure 2A:
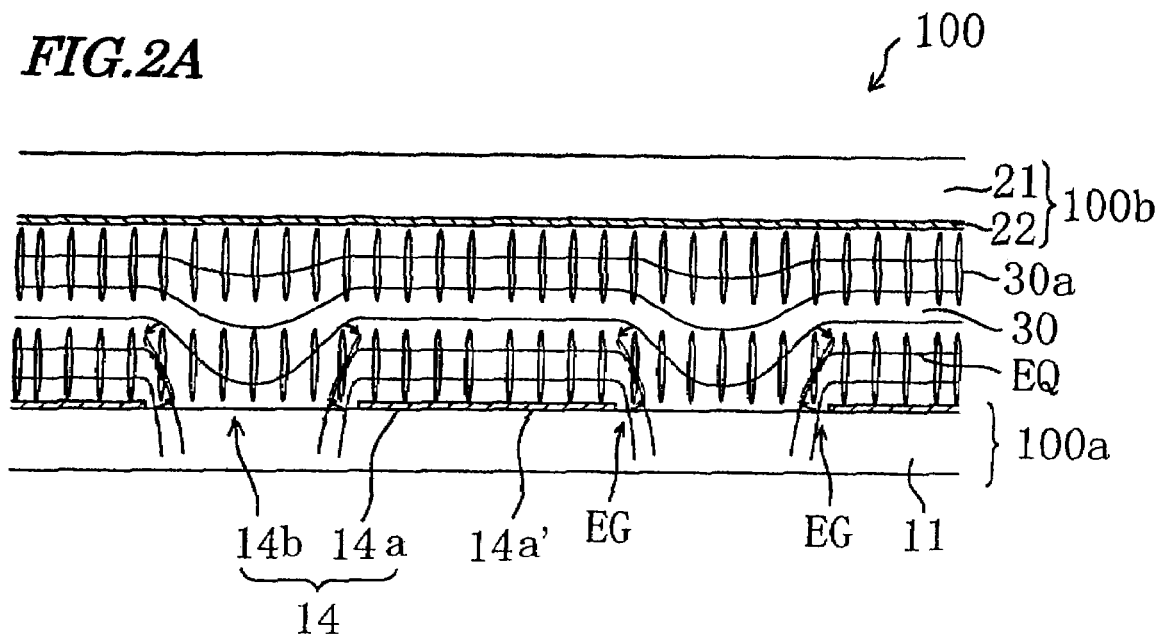
FIG. 2A and FIG. 2B illustrate a liquid crystal layer 30 of the liquid crystal display device 100 in the presence of an applied voltage thereacross, wherein FIG. 2A schematically illustrates a state where an orientation has just started to change (initial ON state), and FIG. 2B schematically illustrates a steady state.
Figure 2B:
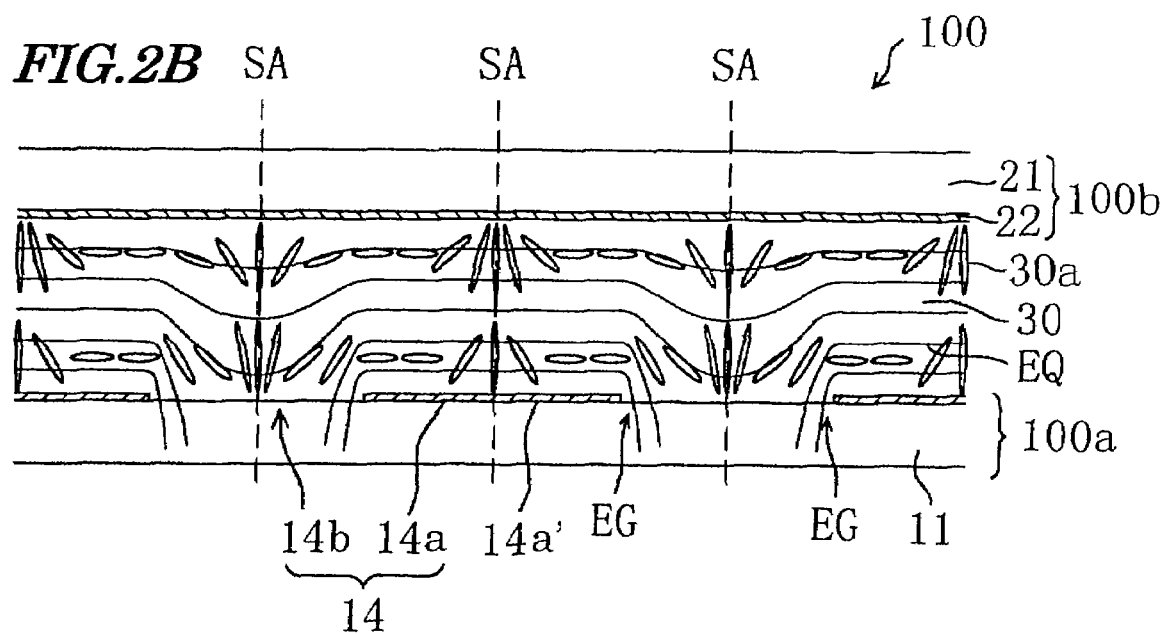

The mechanism by which liquid crystal domains are formed by an inclined electric field as described above will be described with reference to FIG. 2A and FIG. 2B. FIG. 2A and FIG. 2B each illustrate the liquid crystal layer 30 with a voltage being applied thereacross. FIG. 2A schematically illustrates a state where the orientation of the liquid crystal molecules 30a has just started to change (initial ON state) according to the voltage applied across the liquid crystal layer 30. FIG. 2B schematically illustrates a state where the orientation of the liquid crystal molecules 30a has changed and become steady according to the applied voltage. Curves EQ in FIG. 2A and FIG. 2B denote equipotential lines. Note that while FIG. 2A and FIG. 2B are cross-sectional views taken along line 2-2' of FIG. 1A, the stepped portion of the counter substrate 100b is not shown in these figures for the sake of simplicity.

When the picture element electrode 14 and the counter electrode 22 are at the same potential (a state where no voltage is applied across the liquid crystal layer 30), the liquid crystal molecules 30a in each picture element region are aligned vertical to the surfaces of the substrates 11 and 21, as illustrated in FIG. 1B.

When a voltage is applied across the liquid crystal layer 30, a potential gradient represented by the equipotential lines EQ shown in FIG. 2A (perpendicular to the electric force line) is produced. The equipotential lines EQ are parallel to the surface of the solid area 14a and the counter electrode 22 in the liquid crystal layer 30 located between the solid area 14a of the picture element electrode 14 and the counter electrode 22, and drop in a region corresponding to the non-solid area 14b of the picture element region. An inclined electric field represented by an inclined portion of the equipotential lines EQ is produced in the liquid crystal layer 30 above an edge portion EG of the non-solid area 14b (the peripheral portion of and within the non-solid area 14b including the boundary between the solid area 14a and the non-solid area 14b).

A torque acts upon the liquid crystal molecules 30a having a negative dielectric anisotropy so as to direct the axial orientation of the liquid crystal molecules 30a to be parallel to the equipotential lines EQ (perpendicular to the electric force line). Therefore, as indicated by arrows in FIG. 3A, the liquid crystal molecules 30a above the right edge portion EG of each non-solid area 14b incline (rotate) clockwise and the liquid crystal molecules 30a above the left edge portion EG of each non-solid area 14b incline (rotate) counterclockwise. As a result, the liquid crystal molecules 30a above the edge portions EG are oriented parallel to the corresponding portions of the equipotential lines EQ.

Referring to FIG. 3A to FIG. 3D, the change in the orientation of the liquid crystal molecules 30a will now be described in greater detail.

Figure 3A:
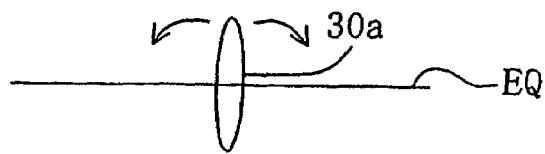
FIG. 3A to FIG. 3D each schematically illustrate the relationship between an electric force line and an orientation of a liquid crystal molecule.

When an electric field is produced in the liquid crystal layer 30, a torque acts upon the liquid crystal molecules 30a having a negative dielectric anisotropy so as to direct the axial orientation thereof to be parallel to an equipotential line EQ. As illustrated in FIG. 3A, when an electric field represented by an equipotential line EQ perpendicular to the axial orientation of the liquid crystal molecule 30a is produced, either a torque urging the liquid crystal molecule 30a to incline clockwise or a torque urging the liquid crystal molecule 30a to incline counterclockwise occurs with the same probability. Therefore, the liquid crystal layer 30 between the pair of parallel plate-shape electrodes opposing each other has some liquid crystal molecules 30a that are subject to a clockwise torque and some other liquid crystal molecules 30a that are subject to a counterclockwise torque. As a result, the transition to the intended orientation according to the voltage applied across the liquid crystal layer 30 may not proceed smoothly.

Figure 3B:
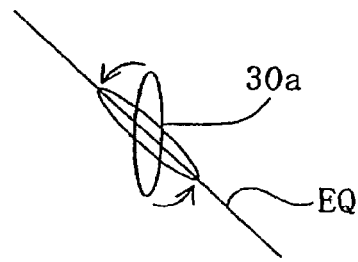
Figure 3C:
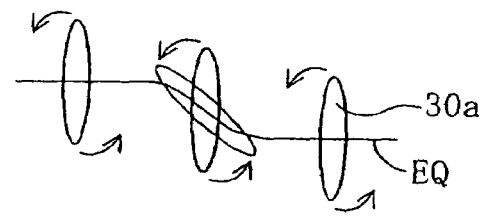
Figure 3D:
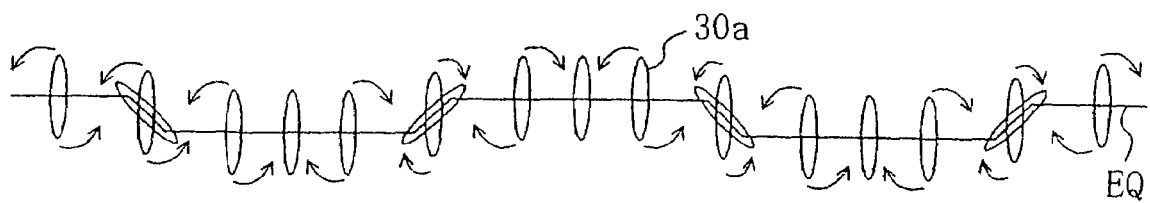

When an electric field represented by a portion of the equipotential lines EQ inclined with respect to the axial orientation of the liquid crystal molecules 30a (an inclined electric field) is produced at the edge portion EG of the non-solid area 14b of the liquid crystal display device 100 of the present invention, as illustrated in FIG. 2A, the liquid crystal molecules 30a incline in whichever direction (the counterclockwise direction in the illustrated example) that requires less rotation for the liquid crystal molecules 30a to be parallel to the equipotential line EQ, as illustrated in FIG. 3B. The liquid crystal molecules 30a in a region where an electric field represented by an equipotential line EQ perpendicular to the axial orientation of the liquid crystal molecules 30a is produced incline in the same direction as the liquid crystal molecules. 30a located on the inclined portion of the equipotential lines EQ, so that the orientation thereof is continuous (in conformity) with the orientation of the liquid crystal molecules 30a located on the inclined portion of the equipotential lines EQ as illustrated in FIG. 3C. As illustrated in FIG. 3D, when an electric field such that the equipotential line EQ forms a continuous concave/convex pattern, the liquid crystal molecules 30a located on a flat portion of the equipotential line EQ are oriented so as to conform with the orientation direction defined by the liquid crystal molecules 30a located on adjacent inclined portions of the equipotential line EQ. The phrase "being located on an equipotential line EQ" as used herein means "being located within an electric field that is represented by the equipotential line EQ".

The change in the orientation of the liquid crystal molecules 30a, starting from those that are located on the inclined portion of the equipotential lines EQ, proceeds as described above and reaches a steady state, which is schematically illustrated in FIG. 2B. The liquid crystal molecules 30a located around the central portion of the opening 14b1 are influenced substantially equally by the respective orientations of the liquid crystal molecules 30a at the opposing edge portions EG of the opening 14b1, and therefore retain their orientation perpendicular to the equipotential lines EQ. The liquid crystal molecules 30a away from the center of the opening 14b1 incline by the influence of the orientation of other liquid crystal molecules 30a at the closer edge portion EG, thereby forming an inclined orientation that is symmetric about the center SA (FIG. 2B) of the opening 14b1. The orientation as viewed in a direction perpendicular to the display plane of the liquid crystal display device 100 (a direction perpendicular to the surfaces of the substrates 11 and 21) is a state where the liquid crystal molecules 30a have a radial axial orientation (not shown) about the center of the opening 14b1. In the present specification, such an orientation will be referred to as a "radially-inclined orientation". In addition, a region of the liquid crystal layer 30 that takes a radially-inclined orientation about a single axis will be referred to as a "liquid crystal domain".

A liquid crystal domain in which the liquid crystal molecules 30a take a radially-inclined orientation is formed also in a region corresponding to the unit solid area 14a' substantially surrounded by the non-solid area 14b. The liquid crystal molecules 30a in a region corresponding to the unit solid area 14a' are influenced by the orientation of the liquid crystal molecules 30a at each edge portion EG of the non-solid area 14b so as to take a radially-inclined orientation that is symmetric about the center SA of the unit solid area 14a' (corresponding to the center of a unit lattice formed by the non-solid area 14b).

The radially-inclined orientation in a liquid crystal domain formed above the unit solid area 14a' and the radially-inclined orientation formed above the opening 14b1 are continuous with each other, and are both in conformity with the orientation of the liquid crystal molecules 30a at the edge portion EG of the non-solid area 14b. The liquid crystal molecules 30a in the liquid crystal domain formed above the opening 14b1 are oriented in the shape of a cone that spreads upwardly (toward the substrate 100b), and the liquid crystal molecules 30a in the liquid crystal domain formed above the unit solid area 14a' are oriented in the shape of a cone that spreads downwardly (toward the substrate 100a). The orientation in the liquid crystal domain formed above the unit solid area 14a' is also in conformity with the orientation of the liquid crystal molecules 30a in the liquid crystal layer 30 above the cut-out area 14b2. As described above, the radially-inclined orientation in a liquid crystal domain formed above the solid area 14a and that in a liquid crystal layer formed above the non-solid area 14b (including the liquid crystal domain formed above the opening 14b1) are continuous with each other. Therefore, no disclination line (orientation defect) is formed along the boundary therebetween, thereby preventing a decrease in the display quality due to occurrence of a disclination line.

In order to alleviate the viewing angle dependence of the display quality of a liquid crystal display device in all azimuth angles, the existence probabilities of the liquid crystal molecules 30a oriented in various azimuth angle directions preferably have rotational symmetry, and more preferably have axial symmetry, in each picture element region. In other words, the liquid crystal domains formed in the entirety of the picture element region are preferably arranged to have rotational symmetry, and further axial symmetry. However, it is not absolutely necessary that the liquid crystal domains have rotational symmetry in the entirety of the picture element region. It is sufficient as long as the liquid crystal layer in the picture element region is formed as a set of liquid crystal domains which are arranged so as to have rotational symmetry (or axial symmetry) (e.g., as a set of a plurality of liquid crystal domains arranged in a square lattice pattern). Therefore, it is not absolutely necessary for the plurality of openings 14b1 in the picture element region to be arranged to have rotational symmetry in the entirety of the picture element region. It is sufficient as long as the picture element region includes a set of openings 14b1 which are arranged so as to have rotational symmetry (or axial symmetry) (e.g., as a set of a plurality of openings arranged in a square lattice pattern). The same is applicable to the unit solid areas 14a' substantially surrounded by the openings 14b1 (and also by the cut-out areas 14b2). The shape of each liquid crystal domain preferably has rotation symmetry and even axial symmetry, and the shape of each opening 14b1 and each unit solid area 14a' also preferably have rotation symmetry and even axial symmetry.

Note that a sufficient voltage may not be applied across the liquid crystal layer 30 around the central portion of the opening 14b1, whereby the liquid crystal layer 30 around the central portion of the opening 14b1 does not contribute to the display. In other words, even if the radially-inclined orientation of the liquid crystal layer 30 around the central portion of the opening 14b1 is disturbed to some extent (e.g., even if the central axis is shifted from the center of the opening 14b1), the display quality may not be decreased.

Therefore, as long as the liquid crystal domain is formed at least corresponding to a unit solid area 14a', it is possible to obtain a continuity of the liquid crystal molecules in each picture element region and to realize a wide viewing angle characteristic and a high display quality.

As described above with reference to FIG. 2A and FIG. 2B, the picture element electrode 14 of the liquid crystal display device 100 of the present invention includes a non-solid area 14b with no conductive film, and produces, in the liquid crystal layer 30 in the picture element region, an electric field represented by equipotential lines EQ having inclined portions. The liquid crystal molecules 30a having a negative dielectric anisotropy in the liquid crystal layer 30, which are in a vertical alignment in the absence of an applied voltage, change the orientation direction thereof, with the change in the orientation of those liquid crystal molecules 30a located on the inclined portion of the equipotential lines EQ serving as a trigger. Thus, a liquid crystal domain having a stable radially-inclined orientation is formed above the opening 14b1 and the unit solid area 14a'. A display is produced by the change in the orientation of the liquid crystal molecules in the liquid crystal domain according to the voltage applied across the liquid crystal layer.

The shape (as viewed in the substrate normal direction) and arrangement of the unit solid areas 14a', the openings 14b1 and the cut-out areas 14b2 of the picture element electrode 14 will be described.

The display characteristics of a liquid crystal display device exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability. Therefore, each unit solid area 14a' preferably has a shape such that liquid crystal domains are formed in each picture element region so that the liquid crystal molecules 30a in each liquid crystal domain corresponding to the unit solid area 14a' are oriented in all azimuth angles with substantially the same probability. More specifically, the shape of the unit solid area 14a' preferably has rotational symmetry (more preferably, symmetry with at least a two-fold rotation axis) about a symmetry axis extending through the center of each unit solid area 14a' (in the normal direction). The shape of the opening 14b1 also preferably has rotational symmetry, and the openings 14b1 are also preferably arranged so as to have rotational symmetry.

It is not absolutely necessary that the unit solid areas 14a' and the openings 14b1 are arranged to have rotational symmetry in the entirety of the picture element region. The liquid crystal molecules 30a are oriented in all azimuth angles with substantially the same probability in the entirety of the picture element region as long as, as shown in FIG. 1A, the picture element region is formed of a combination of, for example, a plurality of square lattices (having symmetry with a four-fold rotation axis) as the minimum unit.

The orientation of the liquid crystal molecules 30a when the generally star-shaped openings 14b1 surrounding the generally circular unit solid area 14a' are arranged in a square lattice pattern, as illustrated in FIG. 1A, will be described with reference to FIG. 4A to FIG. 4C.

Figure 4A:
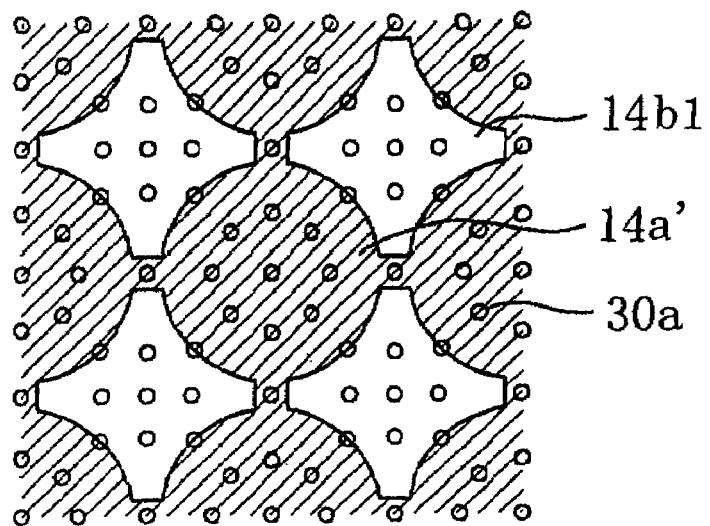
FIG. 4A to FIG. 4C each schematically illustrate an orientation of liquid crystal molecules in the liquid crystal display device 100 as viewed in a substrate normal direction.
Figure 4B:
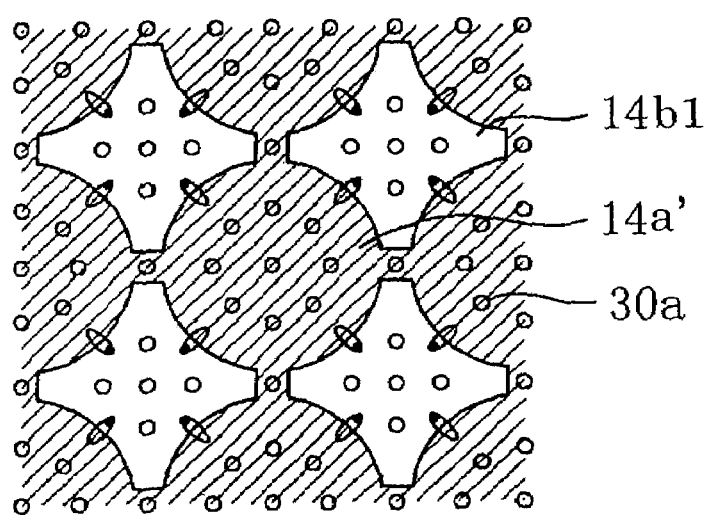
Figure 4C:
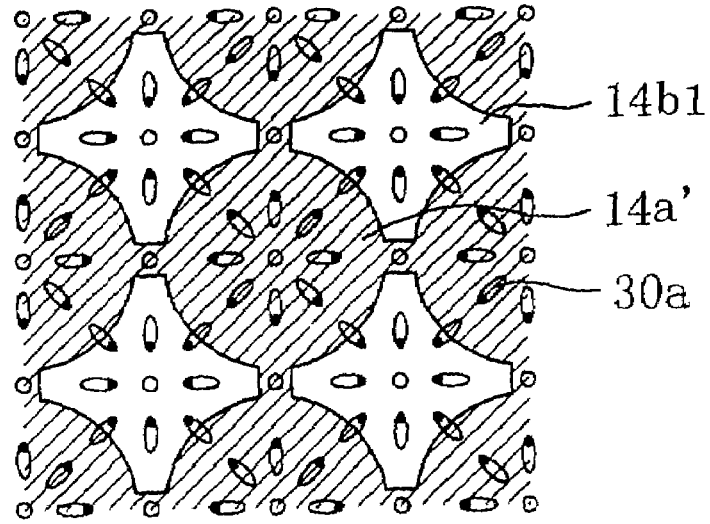

FIG. 4A to FIG. 4C each schematically illustrate an orientation of the liquid crystal molecules 30a as viewed in the substrate normal direction. In figures, such as FIG. 4B and FIG. 4C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the picture element electrode 14 is provided. This similarly applies to all of the subsequent figures. A single unit lattice (formed by four openings 14b1) in the picture element region illustrated in FIG. 1A will be described below. Cross-sectional views taken along the respective diagonals of FIG. 4A to FIG. 4C correspond to FIG. 1B, FIG. 2A and FIG. 2B, respectively, and FIG. 1B, FIG. 2A and FIG. 2B will also be referred to in the following description.

When the picture element electrode 14 and the counter electrode 22 are at the same potential, i.e., in a state where no voltage is applied across the liquid crystal layer 30, the liquid crystal molecules 30a whose orientation direction is regulated by the vertical alignment layer (not shown) provided on one side of each of the TFT substrate 100a and the counter substrate 100b that is closer to the liquid crystal layer 30 take a vertical alignment as illustrated in FIG. 4A.

When an electric field is applied across the liquid crystal layer 30 so as to produce an electric field represented by equipotential lines EQ shown in FIG. 2A, a torque acts upon the liquid crystal molecules 30a having a negative dielectric anisotropy so as to direct the axial orientation thereof to be parallel to the equipotential lines EQ. As described above with reference to FIG. 3A and FIG. 3B, for the liquid crystal molecules 30a under an electric field. represented by equipotential lines EQ perpendicular to the molecular axis thereof, the direction in which the liquid crystal molecules 30a are to incline (rotate) is not uniquely defined (FIG. 3A), whereby the orientation change (inclination or rotation) does not easily occur. In contrast, for the liquid crystal molecules 30a placed under equipotential lines EQ inclined with respect to the molecular axis of the liquid crystal molecules 30a, the direction of inclination (rotation) is uniquely defined, whereby the orientation change easily occurs. Therefore, as illustrated in FIG. 4B, the liquid crystal molecules 30a start inclining from the edge portions of the openings 14b1 where the molecular axis of the liquid crystal molecules 30a is inclined with respect to the equipotential lines EQ. Then, as described above with reference to FIG. 3C, the surrounding liquid crystal molecules 30a incline so as to conform with the orientation of the already-inclined liquid crystal molecules 30a at the edge portions of the openings 14b1. Then, the axial orientation of the liquid crystal molecules 30a becomes stable as illustrated in FIG. 4C (radially-inclined orientation).

As described above, when the shape of the openings 14b1 has rotational symmetry, the liquid crystal molecules 30a in the picture element region successively incline, starting from the edge portion of each opening 14b1 toward the center of the opening 14b1 upon application of a voltage. As a result, those liquid crystal molecules 30a around the center of each opening 14b1, where the respective orientation-regulating forces from the liquid crystal molecules 30a at the edge portions are in equilibrium, remain in a vertical alignment with respect to the substrate plane. The surrounding liquid crystal molecules 30a are inclined in a radial pattern about those liquid crystal molecules 30a around the center of each opening 14b1, with the degree of inclination gradually increasing away from the center of the opening 14b1.

The liquid crystal molecules 30a in a region corresponding to the generally circular unit solid area 14a' surrounded by the four generally star-shaped openings 14b1 arranged in a square lattice pattern also incline so as to conform with the orientation of the liquid crystal molecules 30a that have been inclined by an inclined electric field produced at the edge portion of each opening 14b1. As a result, those liquid crystal molecules 30a around the center of the unit solid area 14a', where the respective orientation-regulating forces from the liquid crystal molecules 30a at the edge portions are in equilibrium, remain in a vertical alignment with respect to the substrate plane. The surrounding liquid crystal molecules 30a are inclined in a radial pattern about those liquid crystal molecules 30a around the center of the unit solid area 14a', with the degree of inclination gradually increasing away from the center of the unit solid area 14a'.

As described above, when liquid crystal domains in each of which the liquid crystal molecules 30a take a radially-inclined orientation are arranged in a square lattice pattern, the existence probabilities of the liquid crystal molecules 30a of the respective axial orientations have rotational symmetry, whereby it is possible to realize a high-quality display without non-uniformity for any viewing angle. In order to reduce the viewing angle dependence of a liquid crystal domain taking a radially-inclined orientation, the liquid crystal domain preferably has a high degree of rotational symmetry (preferably with at least a two-fold rotation axis, and more preferably with at least a four-fold rotation axis).

Figure 5A:
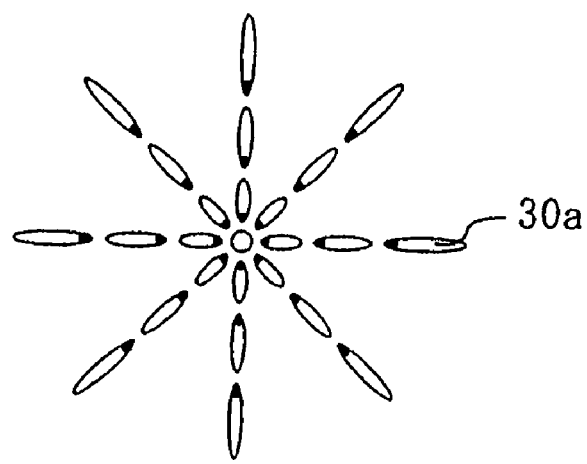
FIG. 5A to FIG. 5C schematically illustrate exemplary radially-inclined orientations of liquid crystal molecules.
Figure 5B:
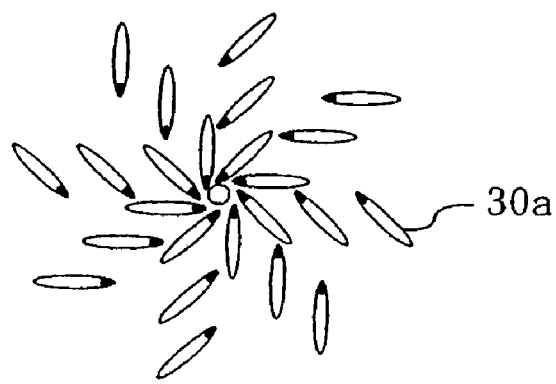
Figure 5C:
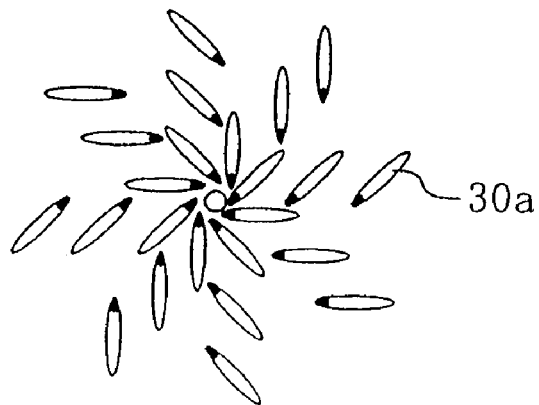

For the radially-inclined orientation of the liquid crystal molecules 30a, a radially-inclined orientation having a counterclockwise or clockwise spiral pattern, as illustrated in FIG. 5B or FIG. 5C, respectively, is more stable than the simple radially-inclined orientation as illustrated in FIG. 5A. The spiral orientation is different from a normal twist orientation (in which the orientation direction of the liquid crystal molecules 30a spirally changes along the thickness of the liquid crystal layer 30). In the spiral orientation, the orientation direction of the liquid crystal molecules 30a does not substantially change along the thickness of the liquid crystal layer 30 for a minute region. In other words, the orientation in a cross section (in a plane parallel to the layer plane) at any thickness of the liquid crystal layer 30 is as illustrated in FIG. 5B or FIG. 5C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30a take a radially-inclined orientation of a counterclockwise or clockwise spiral pattern about the opening 14b1 or the unit solid area 14a', as illustrated in FIG. 5B or FIG. 5C, respectively, in the presence of an applied voltage. Whether the spiral pattern is counterclockwise or clockwise is determined by the type of chiral agent used. Thus, by controlling the liquid crystal layer 30 above the opening 14b1 or the unit solid area 14a' into a radially-inclined orientation of a spiral pattern in the presence of an applied voltage, the direction of the spiral pattern of the radially-inclined liquid crystal molecules 30a about other liquid crystal molecules 30a standing vertical to the substrate plane can be constant in all liquid crystal domains. Therefore, it is possible to realize a uniform display without display non-uniformity. Since the direction of the spiral pattern around the liquid crystal molecules 30a standing vertical to the substrate plane is definite, the response speed upon application of a voltage across the liquid crystal layer 30 is also improved.

Moreover, when a larger amount of a chiral agent is added, the orientation of the liquid crystal molecules 30a changes in a spiral pattern along the thickness of the liquid crystal layer 30 as in a normal twisted orientation. Where the orientation of the liquid crystal molecules 30a does not change in a spiral pattern along the thickness of the liquid crystal layer 30, the liquid crystal molecules 30a which are oriented perpendicular or parallel to the polarization axis of the polarization plate do not give a phase difference to the incident light. Therefore, incident light passing through a region of such an orientation does not contribute to the transmittance. In contrast, where the orientation of the liquid crystal molecules 30a changes in a spiral pattern along the thickness of the liquid crystal layer 30, the liquid crystal molecules 30a that are oriented perpendicular or parallel to the polarization axis of the polarization plate also give a phase difference to the incident light, and the optical rotatory power can also be utilized. Therefore, incident light passing through a region of such an orientation also contributes to the transmittance. Thus, it is possible to obtain a liquid crystal display device capable of producing a bright display.

FIG. 1A illustrates an example in which the unit solid areas 14a' each have a generally circular shape and the openings 14b1 each have a generally star-like shape and are arranged in a square lattice pattern. However, the shape of the unit solid areas 14a' and the shape and arrangement of the openings 14b1 are not limited to those of the example above.

Figure 6A:
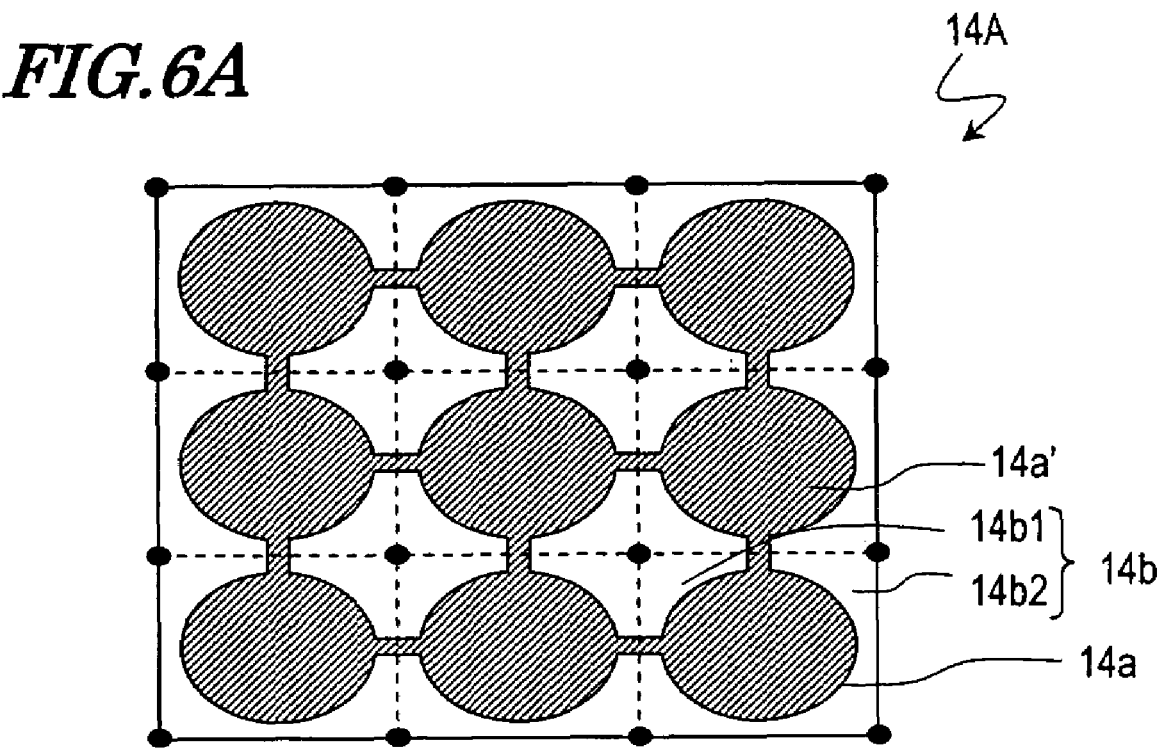
FIGS. 6A and 6B are plan views each schematically illustrating another picture element electrode usable in a liquid crystal display device of the present invention.
Figure 6B:
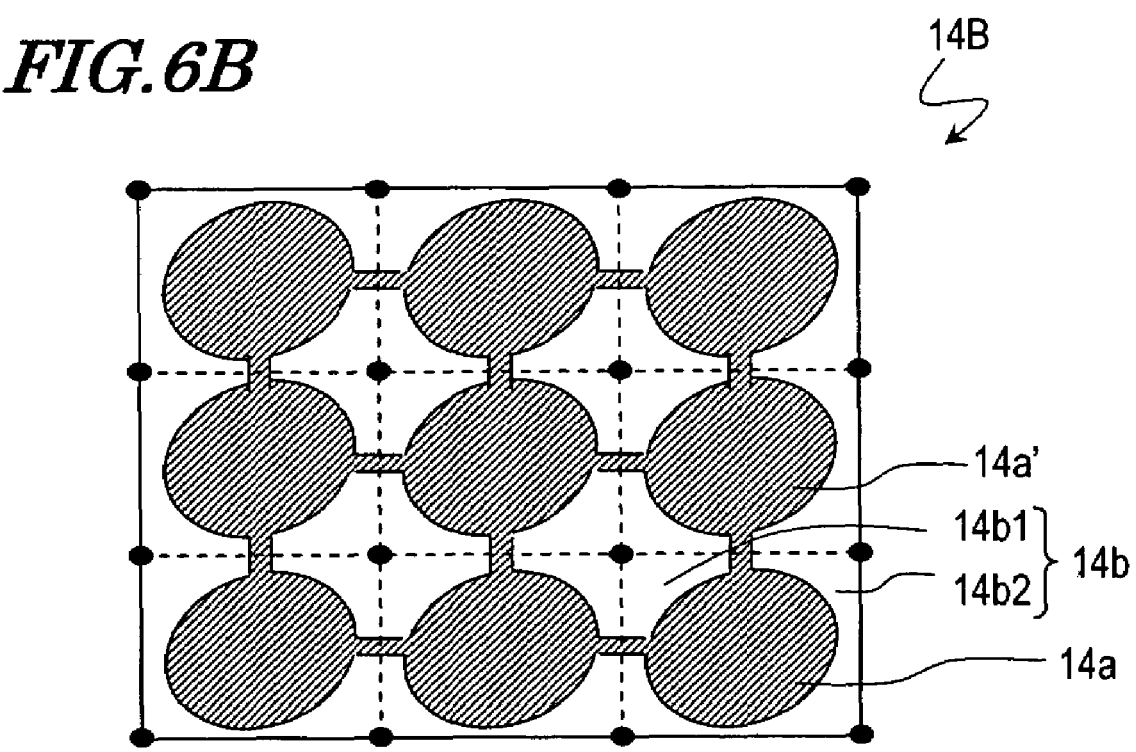

FIG. 6A and FIG. 6B are plan views respectively illustrating the picture element electrodes 14A and 14B having respective openings 14b1 and the unit solid areas 14a' of different shapes.

The openings 14b1 and the unit solid areas 14a' of the picture element electrodes 14A and 14B illustrated in FIG. 6A and FIG. 6B, respectively, are slightly distorted from those of the openings 14b1 and the unit solid areas 14a' illustrated in FIG. 1A. The openings 14b1 and the unit solid areas 14a' of the picture element electrodes 14A and 14B are regularly arranged so as to have a two-fold rotation axis (not a four-fold rotation axis) to form oblong rectangular unit lattices. In both of the picture element electrodes 14A and 14B, the openings 14b1 have a distorted star-like shape, and the unit solid areas 14a' have a generally elliptical shape (a distorted circular shape). The picture element electrodes 14A and 14B also provide a liquid crystal display device having a high display quality and a desirable viewing angle characteristic.

Figure 7A:
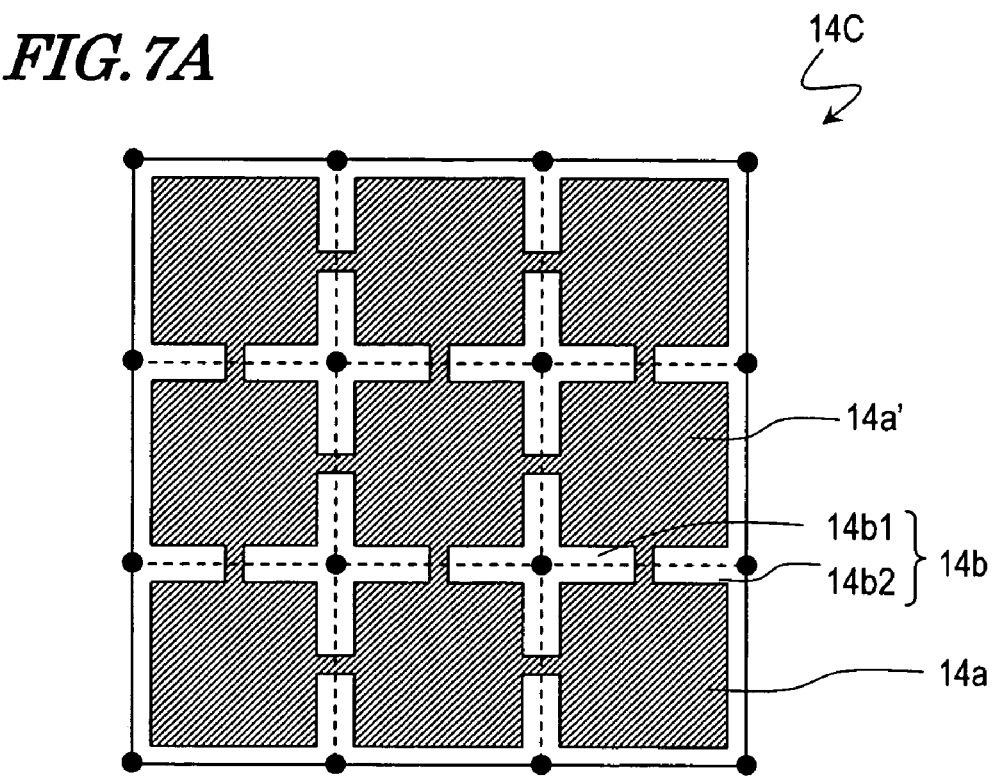
FIGS. 7A and 7B are plan views each schematically illustrating still another picture element electrode usable in a liquid crystal display device of the present invention.
Figure 7B:
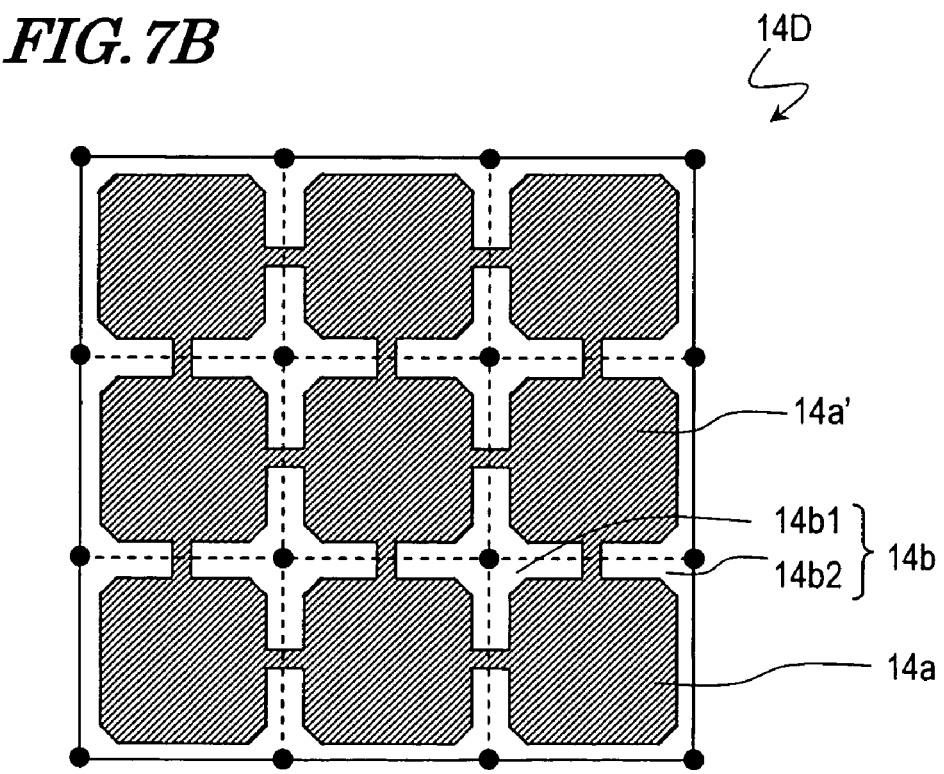

Moreover, picture element electrodes 14C and 14D as illustrated in FIG. 7A and FIG. 7B, respectively, are also usable.

In the picture element electrodes 14C and 14D, generally cross-shaped openings 14b1 are arranged in a square lattice pattern so that each unit solid area 14a' has a generally square shape. Of course, these patterns may be distorted so that there are oblong rectangular unit lattices. As described above, it is possible to obtain a liquid crystal display device having a high display quality and a desirable viewing angle characteristic alternatively by regularly arranging the generally rectangular (encompassing square and oblong rectangular) unit solid areas 14a'.

Notably, the shape of the openings 14b1 and/or the unit solid areas 14a' is preferably a circle or an ellipse than a rectangle, in order to stabilize the radially-inclined orientation. It is believed that a radially-inclined orientation is more stable with circular or elliptical openings 14b1 and/or unit solid areas 14a' because the edge of each opening 14b1 and/or each unit solid area 14a' is more continuous (smooth), whereby the orientation direction of the liquid crystal molecules 30a changes more continuously (smoothly).

Figure 8A:
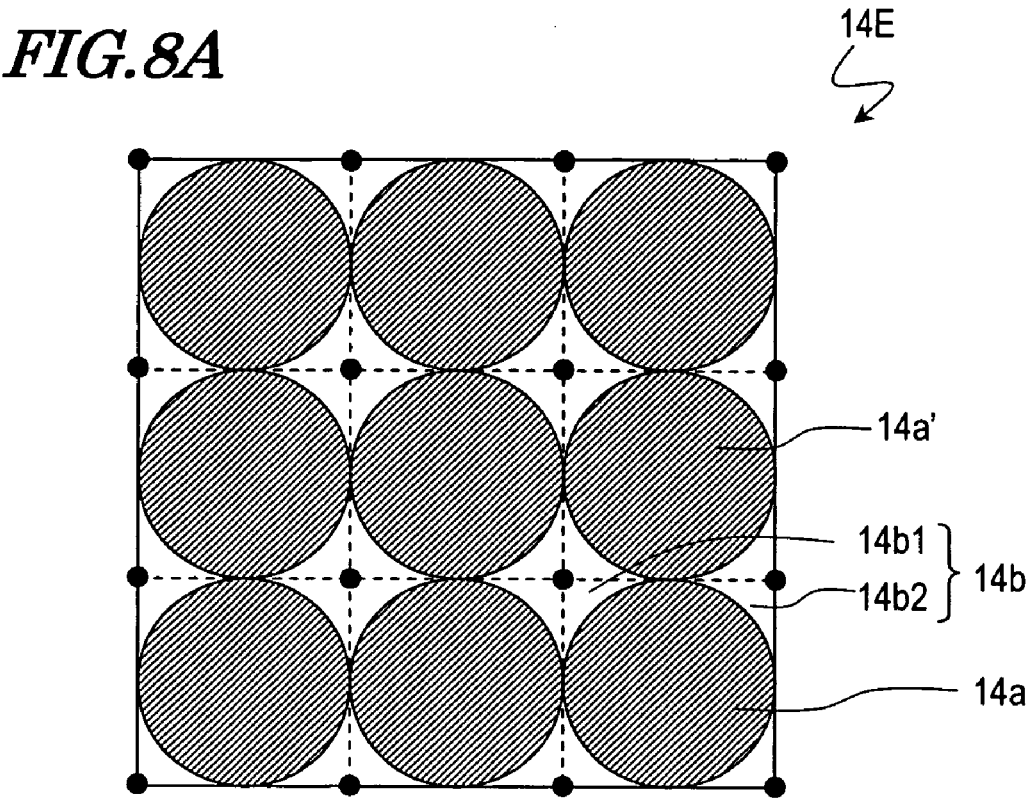
FIGS. 8A and 8B are plan views each schematically illustrating still another picture element electrode usable in a liquid crystal display device of the present invention.
Figure 8B:
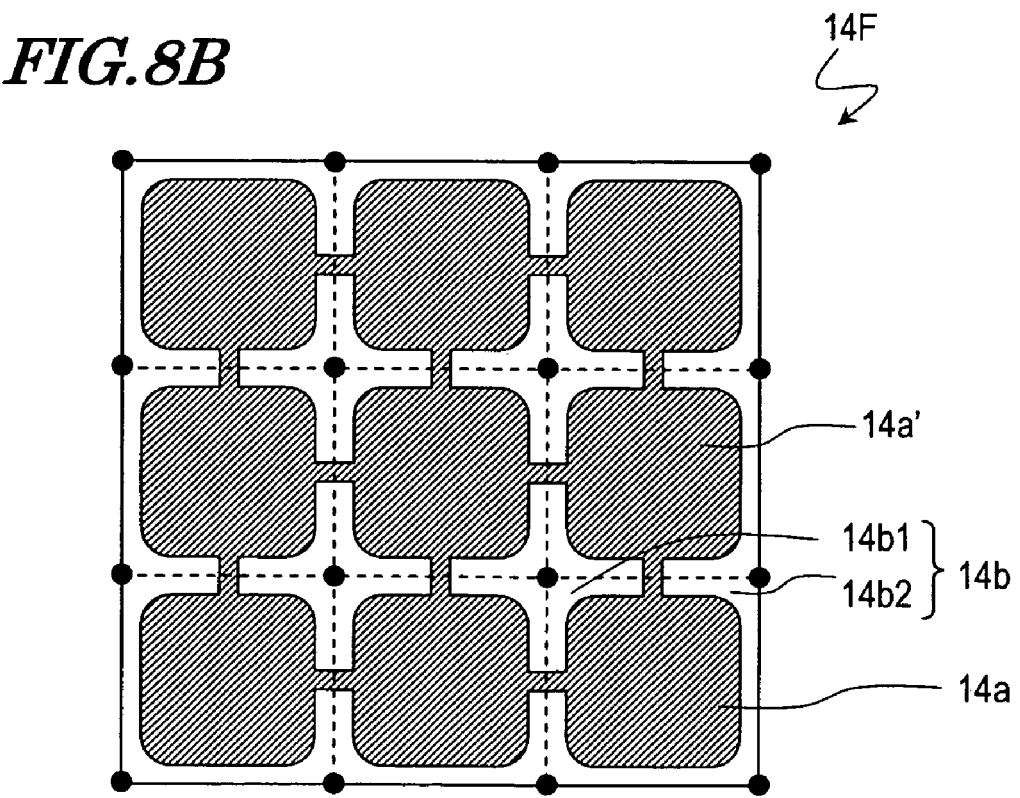

In view of the continuity of the orientation direction of the liquid crystal molecules 30a described above, picture element electrodes 14E and 14F as illustrated in FIG. 8A and FIG. 8B respectively are also usable. The picture element electrode 14E illustrated in FIG. 8A is a variation of the picture element electrode 14A illustrated in FIG. 1A, and has openings 14b1 defined only by four arcs. The picture element electrode 14F illustrated in FIG. 8B is a variation of the picture element electrode 14D illustrated in FIG. 7B, and the sides of the openings 14b1 bordered with the unit solid areas 14a' are in an arc. In both of the picture element electrodes 14E and 14F, the openings 14b1 and the unit solid areas 14a' are arranged in a square lattice pattern and have a four-fold rotation axis. Alternatively, as illustrated in FIG. 6A and FIG. 6B, the openings 14b1 and the unit solid areas 14a' may be distorted to be arranged in a oblong rectangular lattice pattern and have a two-fold rotation axis.

Figure 9A:
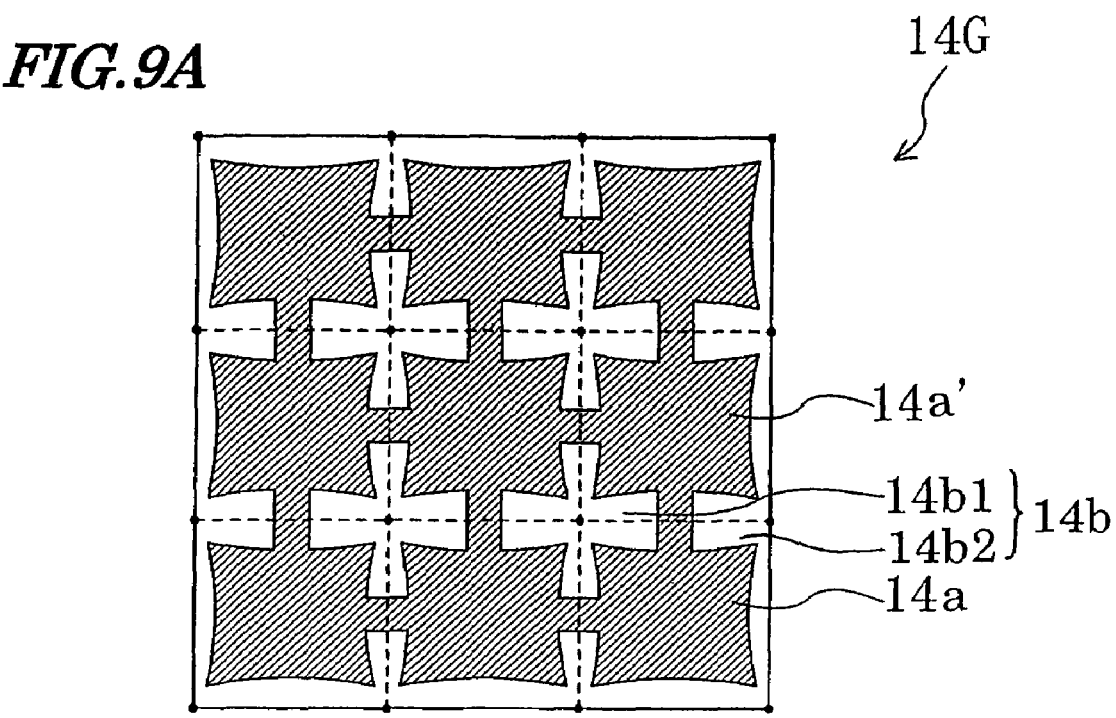
FIGS. 9A and 9B are plan views each schematically illustrating still another picture element electrode usable in a liquid crystal display device of the present invention.
Figure 9B:
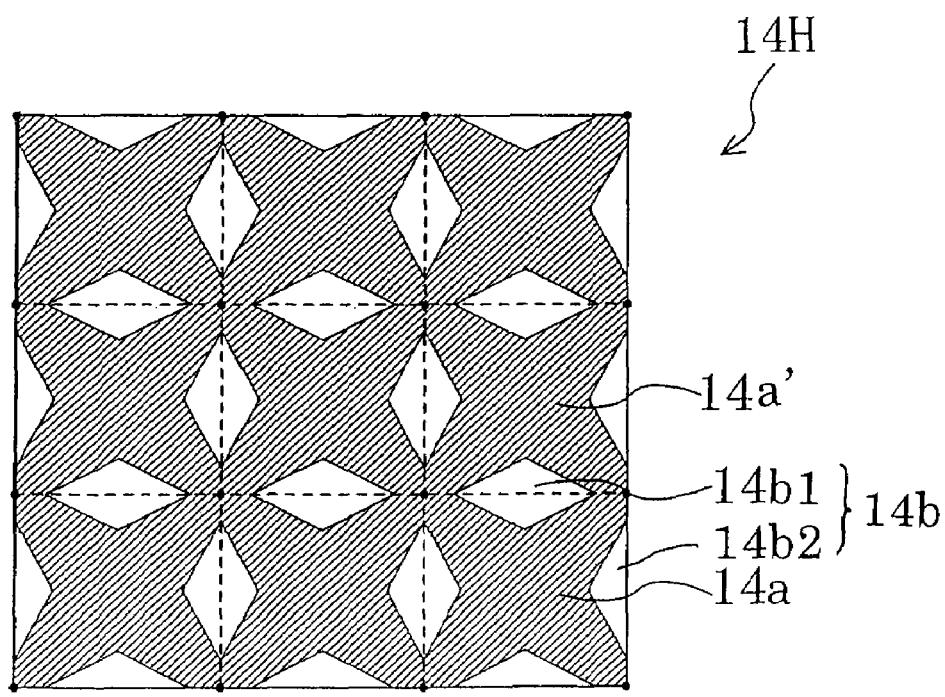

In view of the response speed, picture element electrodes 14G and 14H as illustrated in FIG. 9A and FIG. 9B respectively are also usable. The picture element electrode 14G illustrated in FIG. 9A is a variation of the picture element electrode 14C illustrated in FIG. 7A including generally square unit solid areas 14a'. In the picture element electrode 14G, the unit solid areas 14a' have a distorted square shape with acute angle corner portions. In the picture element electrode 14H illustrated in FIG. 9B, the unit solid areas 14a' have a generally star-like shape having eight sides (edges) with a four-fold rotation axis at the center thereof and also have four acute angle corner portions. The term "acute angle corner portion" as used herein refers to a corner or a rounded corner having an angle less than 90°.

When the unit solid areas 14a' have acute angle corner portions as illustrated in FIG. 9A and FIG. 9B, the number of edge portions in which an inclined electric field is generated is increased. Therefore, the inclined electric field acts on a greater number of liquid crystal molecules 30a. The number of liquid crystal molecules 30a that initially start inclining in response to an electric field is increased, thereby reducing the amount of time required for a radially-inclined orientation to be formed entirely across the picture element region. As a result, the response speed to the application of a voltage across the liquid crystal layer 30 is improved.

Moreover, when the unit solid areas 14a' have acute angle corner portions, the existence probability of the liquid crystal molecules 30a that are oriented in a particular azimuth angle direction can be increased (or decreased) as compared to the case where the unit solid areas 14a' have a generally circular shape or a generally rectangular shape. In other words, a high directivity can be introduced to the existence probabilities of the liquid crystal molecules 30a oriented in various azimuth angle directions. Therefore, when an acute angle corner is employed in the unit solid areas 14a' in a liquid crystal display device including a polarization plate in which linearly-polarized light is incident upon the liquid crystal layer 30, it is possible to decrease the existence probability of the liquid crystal molecules 30a oriented vertical or horizontal to the polarization axis of the polarization plate, i.e., the liquid crystal molecules 30a that do not give a phase difference to the incident light. This improves the light transmittance and realizes a brighter display.

FIGS. 6A and 6B, 7A and 7B, 8A and 8B, 9A and 9B illustrate a structure in which each picture element region includes a plurality of openings 14b1. Alternatively, as described with reference to FIG. 1B, a plurality of liquid crystal domains can be formed in each picture element region by providing one opening 14b1 in the picture element region, or by providing only a cut-out area 14b2 with no opening 14b1. It is not absolutely necessary to form liquid crystal domains in region(s) corresponding to the opening(s) 14b1 of the picture element electrode 14. It is sufficient as long as liquid crystal domains taking a radially-inclined orientation are formed in correspondence with the solid area 14a (unit solid areas 14a'). With this structure, even though the liquid crystal domains formed in correspondence with the openings 14b1 do not have a radially-inclined orientation, the continuity of the orientation of the liquid crystal molecules 30a is realized. in the picture element region. Therefore, the radially-inclined orientation of the liquid crystal domains provided in correspondence with the solid area 14a is stabilized. Especially as illustrated in FIG. 7A and FIG. 7B, when the openings 14b1 have a small area, the degree of contribution of the openings 14b1 to the display is also small. Therefore, the decrease in the display quality caused by the absence of the liquid crystal domains taking a radially-inclined orientation in correspondence with the openings 14b1 is negligible.

Figure 10:
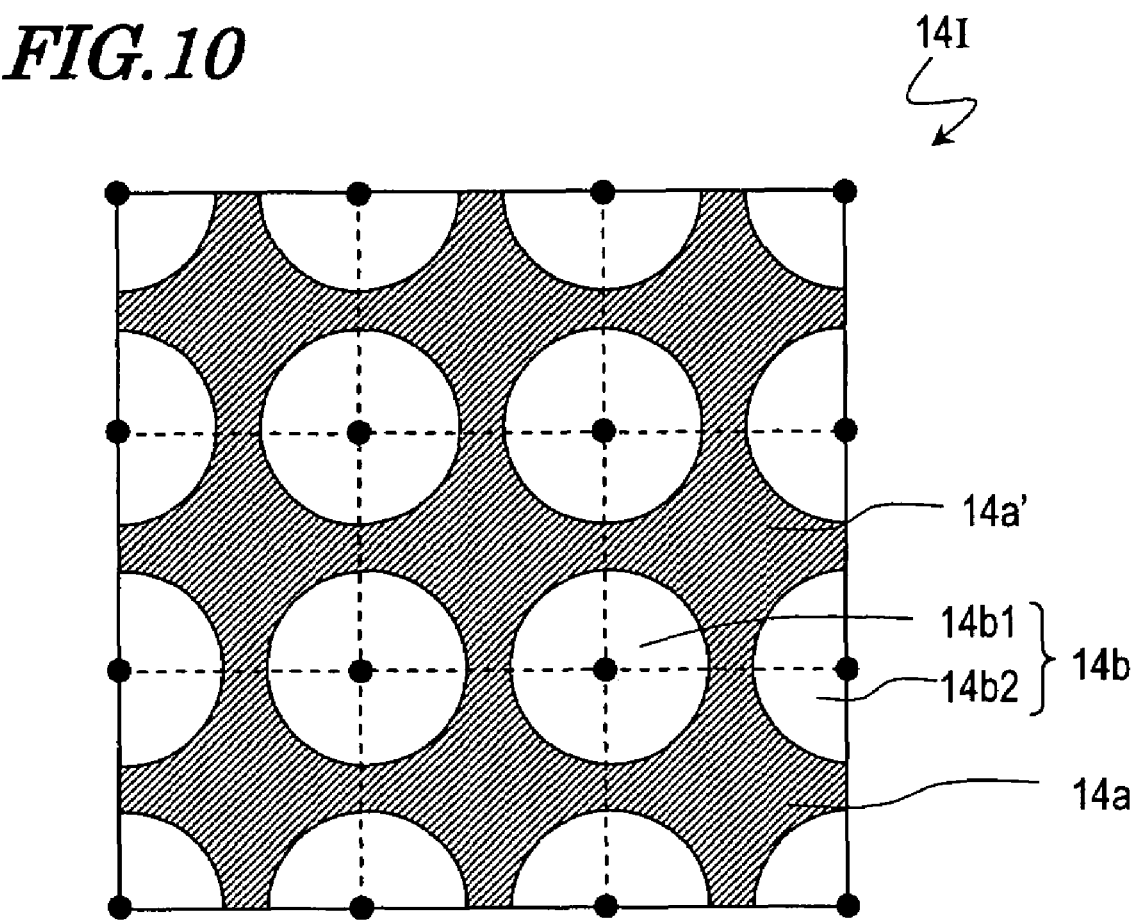
FIG. 10 is a plan view schematically illustrating still another picture element electrode usable in a liquid crystal display device of the present invention.
Figure 11A:
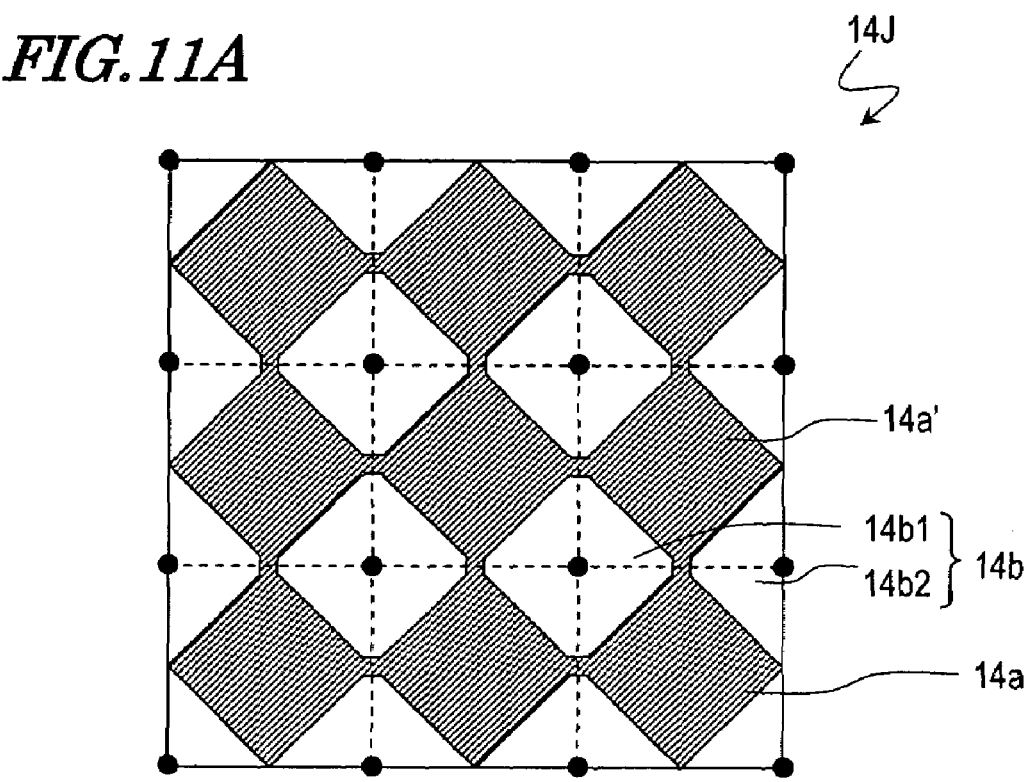
FIGS. 11A and 11B are plan views each schematically illustrating still another picture element electrode usable in a liquid crystal display device of the present invention.
Figure 11B:
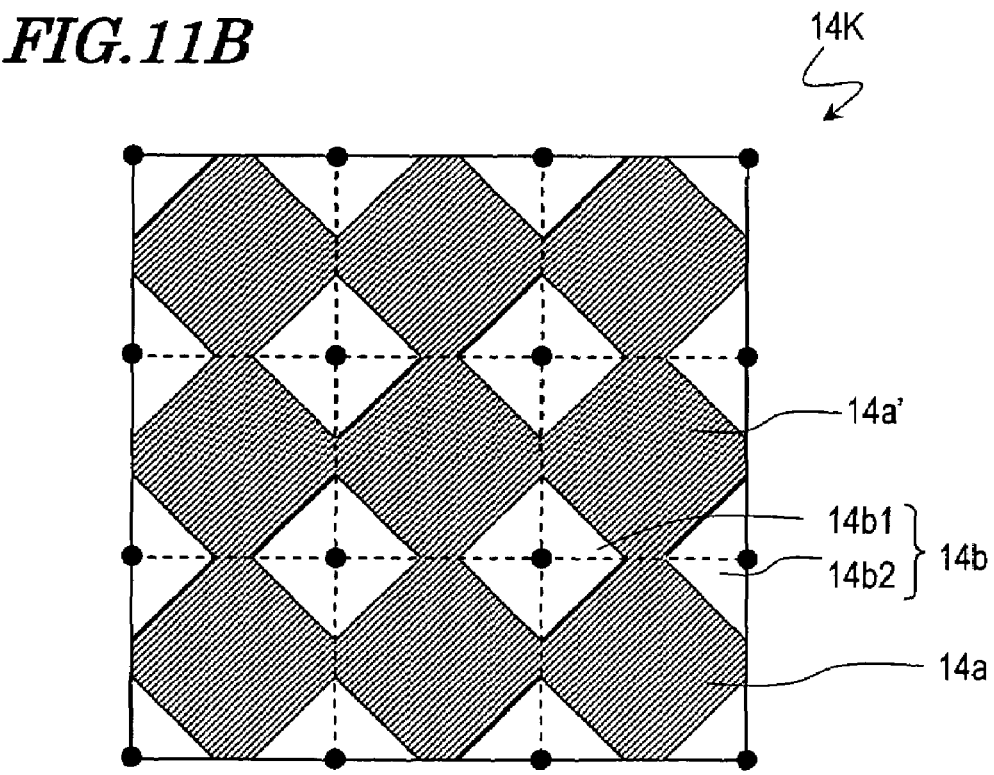

In the above-described examples, the openings 14b1 are generally star-shaped or generally cross-shaped and the unit solid areas 14a' are generally circular, generally elliptical, generally square (rectangular) or generally rectangular with rounded corners. Alternatively, the openings 14b1 and the unit solid areas 14a' may be inverted in a negative/positive manner. FIG. 10 is a plan view illustrating a picture element electrode 14I having a pattern in which the openings 14b1 and the unit solid areas 14a' of the picture element electrode 14 illustrated in FIG. 1A are inverted in a negative/positive manner. The picture element electrode 14I illustrated in FIG. 10 has substantially the same functions and effects as those of the picture element electrode 14 illustrated in FIG. 1A. FIG. 11A and FIG. 11B respectively illustrate a picture element electrode 14J and a picture element electrode 14K. The picture element electrode 14K has a pattern in which the openings 14b1 and the unit solid areas 14a' of the picture element electrode 14J are inverted in a negative/positive manner. Where the openings 14b1 and the unit solid areas 14a' are both generally square as in the case of the picture element electrode 14J and 14K, the pattern obtained by the negative/positive inversion may result in the same pattern as the pre-inversion pattern.

Even in the case where the openings 14b1 and the unit solid areas 14a' are inverted as illustrated in FIG. 10, it is preferable to form cut-out areas 14b2 (each having a shape corresponding to about a half or a quarter of each opening 14b1) in the edge portions of the picture element electrode 14, such that the unit solid areas 14a' have rotational symmetry. With such a pattern, the effect by the inclined electric field is provided in the edge portions of the picture element region as in the central portions thereof, which realizes a stable radially-inclined orientation in the entirety of the picture element region.

With or without the negative/position inversion, the length of the boundary between the non-solid area 14b and the solid area 14a is the same. No difference is presented by the difference in these patterns in terms of the function of generating an inclined electric field. However, the area ratio of the unit solid areas 14a' with respect to the entire area of the picture element region may be different between these patterns. More specifically, the area of the unit solid areas 14a' for generating an electric field acting on the liquid crystal molecules 30a in the liquid crystal layer 30 (the area actually having the conductive film) may be different between these patterns.

The voltage applied across the liquid crystal domains formed in correspondence with the openings 14b1 is lower than the voltage applied across the liquid crystal domains formed in correspondence with the unit solid areas 14a'. Therefore, with a normally black display, the display provided by the liquid crystal domains in correspondence with the openings 14b1 is darker. It is preferable to decrease the area ratio of the non-solid area 14b and increase the area ratio of the unit solid areas 14a' in each picture element region.

Now, the relationship between the shape of the unit solid areas 14a' with the stability of a radially-inclined orientation and the transmittance value will be described.

A research by the present inventor revealed that with the spacing (arrangement pitch) of the unit solid areas 14a' being constant, the orientation stability is higher as the shape of the unit solid areas 14a' is closer to a circle or an ellipse. This is because as the shape of the unit solid areas 14a' is closer to a circle or an ellipse, the continuity in the orientation direction of the liquid crystal molecules 30a in a radially-inclined orientation is higher.

It was also revealed that the transmittance is higher as the shape of the unit solid areas 14a' is closer to a rectangle such as a square or an oblong rectangle. This is because as the shape of the unit solid areas 14a' is closer to a rectangle, the area ratio of the unit solid areas 14a' is higher, thereby increasing the area of the liquid crystal layer that is directly influenced by the electric field produced by the electrodes (the area defined in the plane perpendicular to the substrate normal direction) and thus increasing the effective aperture ratio.

Therefore, the shape of the unit solid area 14a' can be determined in view of the intended orientation stability and the intended transmittance.

When the each unit solid area 14a' has a generally square shape with generally arc-shaped corner portions, as illustrated in FIG. 8B, it is possible to realize both of a relatively high orientation stability and a relatively high transmittance. Of course, substantially the same effects can be obtained when the unit solid areas 14a' have a generally rectangular shape with generally arc-shaped corner portions. Note that due to limitations on the production process, the corner portions of the unit solid areas 14a' formed of a conductive film may not be arc-shaped strictly speaking, but may instead be an obtuse polygonal shape (a shape including a plurality of angles exceeding 90°), and the corner portions may have a slightly distorted arc shape (e.g., a portion of an ellipse) or a distorted polygonal shape, instead of a quarter-arc shape or a regular polygonal shape (e.g., a portion of a regular polygon). Alternatively, the corner portions may have a shape that is a combination of curves and an obtuse angle. The term "generally arc shape" as used herein encompasses any of these shapes. Note that due to similar process-related reasons, the generally-circular unit solid areas 14a' as illustrated in FIG. 1A may have a polygonal shape or a distorted shape instead of a strictly circular shape.

Note that it has been stated above that the surface of the reflection electrode may be provided with minute irregularities in order to realize a white display that is close to paper white. Even when the surface of the reflection electrode is provided with such minute irregularities, equipotential lines parallel to the surface (in conformity with the minute irregularities) are formed in the presence of an applied voltage. Therefore, the surface of the reflection electrode with minute irregularities does not exert an orientation-regulating force that controls the orientation direction of the liquid crystal molecules in the presence of an applied voltage, and thus does not affect the formation of a radially-inclined orientation.

Figure 12:
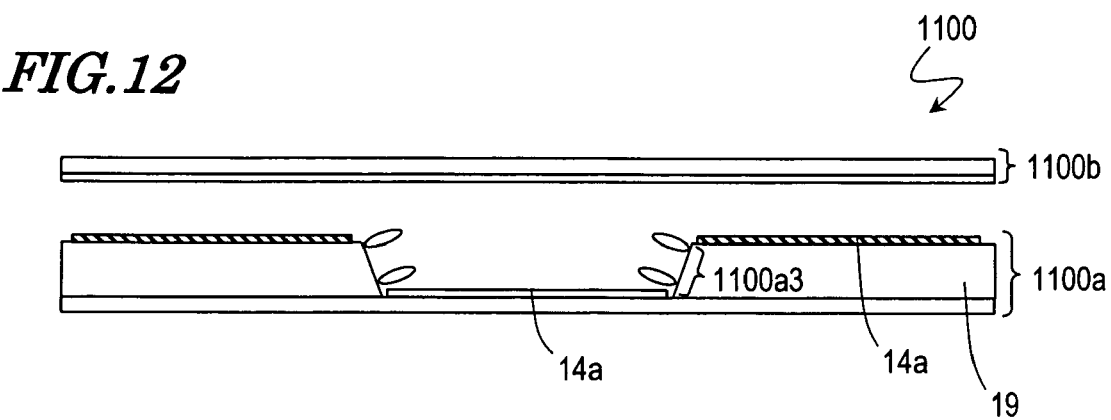
FIG. 12 is a cross-sectional view schematically illustrating a liquid crystal display device 1100 of a comparative example.

The description above has been primarily directed to the electrode structure of the TFT substrate 100a and the function thereof. Now, the structure of the counter substrate 100b and the function thereof will be described with reference to FIG. 1B and FIG. 12. FIG. 12 schematically illustrates a cross-section of a liquid crystal display device 1100 of a comparative example. The liquid crystal display device 1100 of the comparative example is similar to the liquid crystal display device 100 in that the picture element electrode 14 of a TFT substrate 1100a includes a plurality of unit solid areas 14a' and that liquid crystal domains each taking a radially-inclined orientation in the presence of an applied voltage are formed. However, the liquid crystal display device 1100 is different from the liquid crystal display device 100 in that a counter substrate 1100b is not provided with a stepped portion, but the TFT substrate 1100a is provided with a stepped portion by providing an insulating film 19 under the reflection electrode of the TFT substrate 1100a.

As illustrated in FIG. 1B, in the liquid crystal display device 100 of the present invention, the counter substrate 100b includes a stepped portion including the upper tier 100b1 located in the reflection region R, the lower tier 100b2 located in the transmission region T, and the side surface 100b3 connecting the upper tier 100b1 and the lower tier 100b2 to each other. Owing to such a structure, the thickness dr of the liquid crystal layer 30 in the reflection region R is smaller than the thickness dt of the liquid crystal layer 30 in the transmission region T. Thus, a stepped portion is provided on the counter substrate 100b, but not on the TFT substrate 100a, thereby realizing a multigap structure suitable for displaying an image both in a transmission mode and a reflection mode. Therefore, it is not necessary to provide a stepped portion using the insulating film 19 or the like, under the reflection electrode, as in the liquid crystal display device 1100 of the comparative example illustrated in FIG. 12. Thus, it is possible to simplify the production process of the TFT substrate 100a.

With a multigap structure, the side surface of a stepped portion is inclined with respect to the substrate plane, whereby liquid crystal molecules that are oriented vertical to the side surface cause light leakage in a black display and lower the contrast ratio. However, in the liquid crystal display device 100, the side surface 100b3 of the stepped portion is located in the reflection region R, as illustrated in FIG. 1B. Therefore, the contrast ratio is not lowered in the transmission region T, thus suppressing the deterioration in the display quality. The reflection region R has a lower contrast ratio than the transmission region T in the first place, and the required level of display characteristics for the reflection region R is also lower. Therefore, even if some light leakage occurs in the reflection region R, it does not significantly affect the display. In contrast, in the liquid crystal display device 1100 of the comparative example illustrated in FIG. 12, a side surface 1100a3 of the stepped portion is not located in the reflection region R, whereby transmitted light (light that is used for displaying an image in a transmission mode) leaks, thus significantly deteriorating the display quality.

Figure 13A:
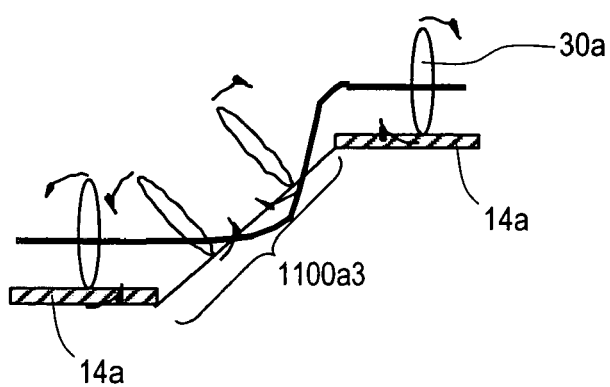
FIG. 13A and FIG. 13B each schematically illustrate the relationship between an electric force line and an orientation of a liquid crystal molecule on a side surface of a stepped portion of the liquid crystal display device 1100 of the comparative example.
Figure 13B:
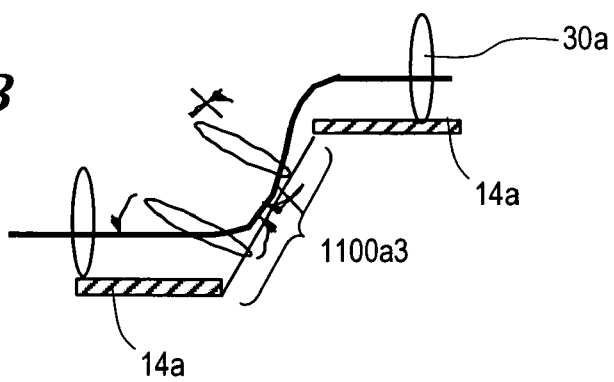

Moreover, in the liquid crystal display device 1100 of the comparative example illustrated in FIG. 12, the side surface 1100a3 of the stepped portion is not covered with an electrode. Referring to FIG. 13A, while an alignment control is done by using an inclined electric field produced around the side surface 1100a3, since the side surface 1100a3 is inclined with respect to the substrate plane, whereby the alignment control may be difficult depending on the level of the applied voltage, the inclination angle of the side surface 1100a3, etc. For example, as illustrated in FIG. 13B, if the inclination angle of the side surface 1100a3 is large, the angle between the equipotential line EQ and the liquid crystal molecules 30a may be close to 90°, in which case the orientation-regulating force is significantly weak.

Figure 14:
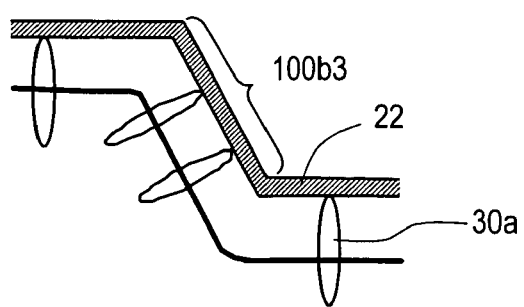
FIG. 14 schematically illustrates the relationship between an electric force line and an orientation of a liquid crystal molecule on a side surface of a stepped portion of the liquid crystal display device 100 of the present invention.

In contrast, in the liquid crystal display device 100, the counter substrate 100b is provided with a stepped portion, whereby the side surface 100b3 of the stepped portion can be covered with the electrode 22. Along the side surface 100b3 covered with the electrode 22, as illustrated in FIG. 14, the equipotential line EQ is parallel to the side surface 100b3 and perpendicular to the liquid crystal molecules 30a, whereby the orientation-regulating force is not exerted.

As described above, in the liquid crystal display device 100 of the present invention, a multigap structure is realized by providing a stepped portion on a substrate different from the substrate that is provided with an electrode for producing an inclined electric field for forming a radially-inclined orientation. In addition, the side surface 100b3 of the stepped portion is located in the reflection region R while being covered with the electrode 22. Owing to such a structure, it is possible to obtain advantages related to the production process and to suppress the deterioration in the display quality due to the inclination of the side surface 100b3 of the stepped portion.

The liquid crystal display device 100 of the present embodiment may employ the same arrangement as a vertical alignment type liquid crystal display device known in the art, and may be produced by a known production method, except that the picture element electrode 14 is patterned as predetermined so as to have the solid area 14a and the non-solid area 14b and that the counter substrate 100b includes a stepped portion.

Note that in the present embodiment, the transparent dielectric layer (e.g., a transparent resin layer) 29 is selectively formed in the reflection region R to provide a stepped portion in the counter substrate 100b. Alternatively, different materials may be used for the color filter layer in the reflection region R and that in the transmission region T, with the thickness of the color filter layer in the reflection region R being larger than that in the transmission region T, thus forming a stepped portion. Since light used in the transmission mode passes through the color filter layer only once while light used in the reflection mode passes through the color filter layer twice, if the optical density of the color filter layer in the transmission region T is the same as that in the reflection region R, the color purity and/or the brightness will be lower in the reflection region R. However, where different materials are used for the color filter layer in the reflection region R and that in the transmission region T as described above, the optical density of the color filter layer in the reflection region R can be made smaller than that in the transmission region T. Thus, it is possible to improve the color purity and/or the brightness in the reflection region R.

Typically, a vertical alignment film (not shown) as a vertical alignment layer is provided on one side of each of the picture element electrode 14 and the counter electrode 22 that is closer to the liquid crystal layer 30, so as to vertically align the liquid crystal molecules having a negative dielectric anisotropy.

The liquid crystal material may be a nematic liquid crystal material having a negative dielectric anisotropy. A guest-host mode liquid crystal display device can be obtained by adding a dichroic dye to a nematic liquid crystal material having a negative dielectric anisotropy. A guest-host mode liquid crystal display device does not require a polarization plate.

A so-called "vertical alignment type liquid crystal display device", including a liquid crystal layer in which liquid crystal molecules having a negative dielectric anisotropy are vertically aligned in the absence of an applied voltage, is capable of displaying an image in various display modes. For example, a vertical alignment type liquid crystal display device may be used in an optical rotation mode or in a display mode that is a combination of an optical rotation mode and a birefringence mode, in addition to a birefringence mode in which an image is displayed by controlling the birefringence of the liquid crystal layer with an electric field. It is possible to obtain a birefringence-mode liquid crystal display device by providing a pair of polarization plates on the outer side (the side away from the liquid crystal layer 30) of the pair of substrates (e.g., the TFT substrate and the counter substrate) of any of the liquid crystal display devices described above. Moreover, a phase difference compensator (typically a phase plate) may be provided as necessary. Furthermore, a liquid crystal display device with a high brightness can be obtained also by using generally circularly-polarized light.

Embodiment 2

The liquid crystal display device of the present embodiment is different from the liquid crystal display device 100 of Embodiment 1 in that the counter substrate includes an orientation-regulating structure.

FIG. 15A to FIG. 15E each schematically illustrate a counter substrate 200b having an orientation-regulating structure 28. Each element having substantially the same function as that of the liquid crystal display device 100 will be denoted by the same reference numeral and will not be further described.

Figure 15A:
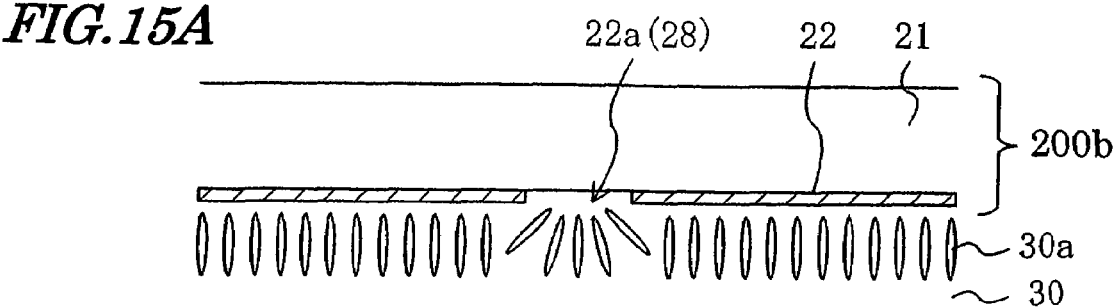
FIG. 15A to FIG. 15E each schematically illustrate a counter substrate 200b including an orientation-regulating structure 28.
Figure 15B:
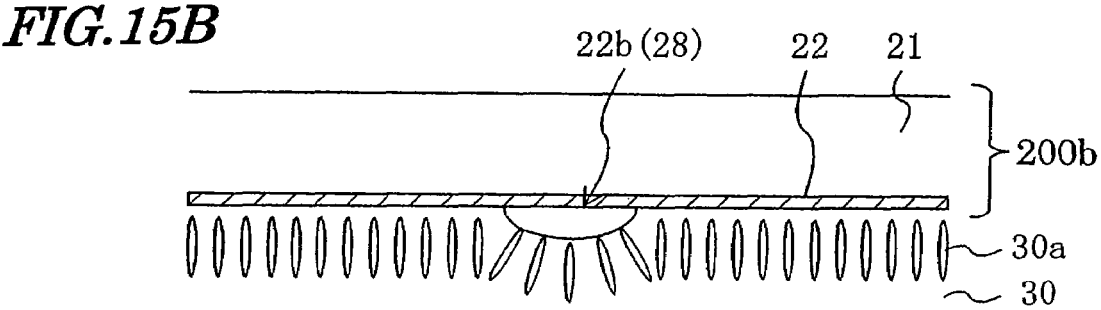
Figure 15C:
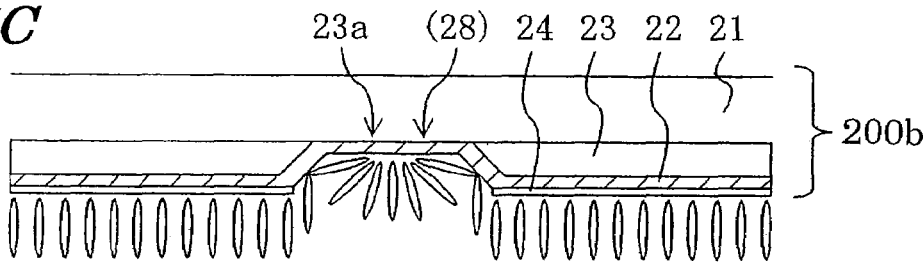
Figure 15D:
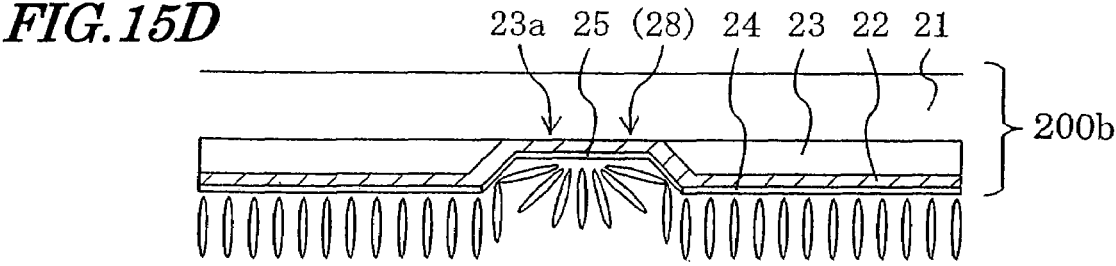
Figure 15E:
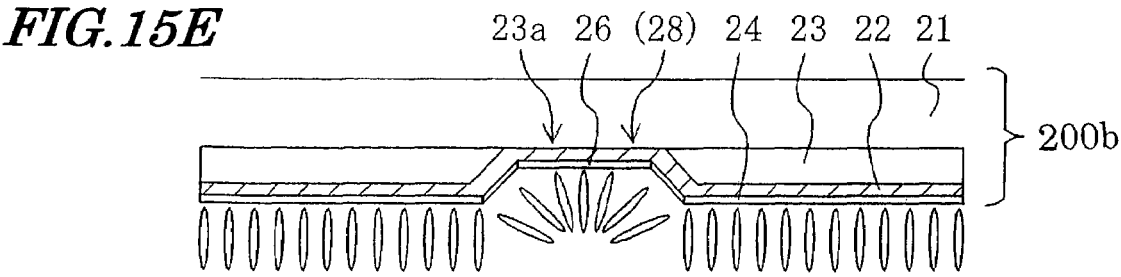

Each of the orientation-regulating structures 28 illustrated in FIG. 15A to FIG. 15E functions to orient the liquid crystal molecules 30a of the liquid crystal layer 30 into a radially-inclined orientation. Note that the orientation-regulating structure 28 illustrated in FIG. 15A to FIG. 15D and that illustrated in FIG. 15E are different in terms of the direction in which the liquid crystal molecules 30a are to be inclined.

The direction in which the liquid crystal molecules 30a are inclined by the orientation-regulating structures 28 illustrated in FIG. 15A to FIG. 15D is aligned with the orientation direction of the radially-inclined orientation of each liquid crystal domain that is formed in a region corresponding to the unit solid area 14a' (see, for example, FIG. 1A and FIG. 1B) of the picture element electrode 14. In contrast, the direction in which the liquid crystal molecules 30a are inclined by the orientation-regulating structure 28 illustrated in FIG. 15E is aligned with the orientation direction of the radially-inclined orientation of each liquid crystal domain that is formed in a region corresponding to the opening 14b1 (see, for example, FIG. 1A and FIG. 1B) of the picture element electrode 14.

The orientation-regulating structure 28 illustrated in FIG. 15A is formed by an opening 22a of the counter electrode 22. A vertical alignment film (not shown) is provided on one surface of the counter substrate 200b that is closer to the liquid crystal layer 30.

The orientation-regulating structure 28 exerts an orientation-regulating force only in the presence of an applied voltage. Since the orientation-regulating structure 28 is only required to exert an orientation-regulating force upon the liquid crystal molecules 30a in each liquid crystal domain in a radially-inclined orientation formed by the electrode structure of the TFT substrate 100a, the size of the opening 22a is smaller than the opening 14b1 provided in the TFT substrate 100a, and smaller than the unit solid area 14a' (see, for example, FIG. 1A). For example, a sufficient effect can be obtained only with an area less than or equal to one half of that of the opening 14b1 or the unit solid area 14a'. When the opening 22a of the counter electrode 22 is provided so as to oppose the central portion of the unit solid area 14a' of the picture element electrode 14, the continuity of the orientation of the liquid crystal molecules 30a increases, and it is possible to fix the position of the central axis of the radially-inclined orientation.

As described above, when a structure exerting an orientation-regulating force only in the presence of an applied voltage is employed as the orientation-regulating structure, substantially all of the liquid crystal molecules 30a of the liquid crystal layer 30 take a vertical alignment in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force, whereby an after image may be observed when a considerable stress is applied upon the liquid crystal panel.

Each of the orientation-regulating structures 28 illustrated in FIG. 15B to FIG. 15D exerts an orientation-regulating force regardless of the presence/absence of an applied voltage, whereby it is possible to obtain a stable radially-inclined orientation at any display gray level, and there is provided a high resistance to a stress.

The orientation-regulating structure 28 illustrated in FIG. 15B includes a protrusion (rib) 22b that is provided on the counter electrode 22 so as to protrude into the liquid crystal layer 30. While there is no particular limitation on the material of the protrusion 22b, the protrusion 22b can be easily provided by using a dielectric material such as a resin. A vertical alignment film (not shown) is provided on one surface of the counter substrate 200b that is closer to the liquid crystal layer 30. The protrusion 22b orients the liquid crystal molecules 30a into a radially-inclined orientation by virtue of the configuration of the surface thereof (with a vertical alignment power). It is preferred to use a resin material that deforms by heat, in which case it is possible to easily form the protrusion 22b having a slightly-humped cross section as illustrated in FIG. 15B through a heat treatment after patterning. The protrusion 22b having a slightly-humped cross section with a vertex (e.g., a portion of a sphere) as illustrated in FIG. 19B or a conical protrusion provides a desirable effect of fixing the central position of the radially-inclined orientation.

The orientation-regulating structure 28 illustrated in FIG. 15C is provided as a surface having a horizontal alignment power facing the liquid crystal layer 30 that is provided in an opening (or a depressed portion) 23a in a dielectric layer 23 formed under the counter electrode 22 (i.e., on one side of the counter electrode 22 that is closer to the substrate 21). A vertical alignment film 24 is provided so as to cover one side of the counter substrate 200b that is closer to the liquid crystal layer 30 while leaving a region corresponding to the opening 23a uncovered, whereby the surface in the opening 23a functions as a horizontal alignment surface. Alternatively, a horizontal alignment film 25 may be provided only in the opening 23a as illustrated in FIG. 15D.

The horizontal alignment film illustrated in FIG. 15D can be provided by, for example, once providing the vertical alignment film 24 across the entire surface of the counter substrate 200b, and then selectively irradiating a portion of the vertical alignment film 24 in the opening 23a with UV light so as to reduce the vertical alignment power thereof. The horizontal orientation power required for the orientation-regulating structure 28 does not have to be so high that the resulting pretilt angle is as small as that resulting from an alignment film used in a TN type liquid crystal display device. For example, a pretilt angle of 45° or less is sufficient.

As illustrated in FIG. 15C and FIG. 15D, on the horizontal orientation surface in the opening 23a, the liquid crystal molecules 30a are urged to be horizontal with respect to the substrate plane. As a result, the liquid crystal molecules 30a form an orientation that is continuous with the orientation of the surrounding, vertically aligned liquid crystal molecules 30a on the vertical alignment film 24, thereby obtaining a radially-inclined orientation as illustrated in FIG. 15C and FIG. 15D.

A radially-inclined orientation can be obtained only by selectively providing a horizontal orientation surface (e.g., the surface of the electrode, or a horizontal alignment film) on the flat surface of the counter electrode 22 without providing a depressed portion (that is formed by the opening in the dielectric layer 23) on the surface of the counter electrode 22. However, the radially-inclined orientation can be further stabilized by virtue of the surface configuration of the depressed portion.

It is preferred to use a color filter layer or an overcoat layer of a color filter layer as the dielectric layer 23, for example, to form the depressed portion in the surface of the counter substrate 200b that is closer to the liquid crystal layer 30, because it adds nothing to the process. In the structures illustrated in FIG. 15C and FIG. 15D, there is little decrease in light efficiency because there is no region where a voltage is applied across the liquid crystal layer 30 via the protrusion 22b as is in the structure illustrated in FIG. 15B.

In the orientation-regulating structure 28 illustrated in FIG. 15E, a depressed portion is formed on one side of the counter substrate 200b that is closer to the liquid crystal layer 30 by using the opening 23a of the dielectric layer 23, as in the orientation-regulating structure 28 illustrated in FIG. 15D, and a horizontal alignment film 26 is formed only in the bottom portion of the depressed portion. Instead of forming the horizontal alignment film 26, the surface of the counter electrode 22 may be exposed as illustrated in FIG. 15C.

Figure 16A:
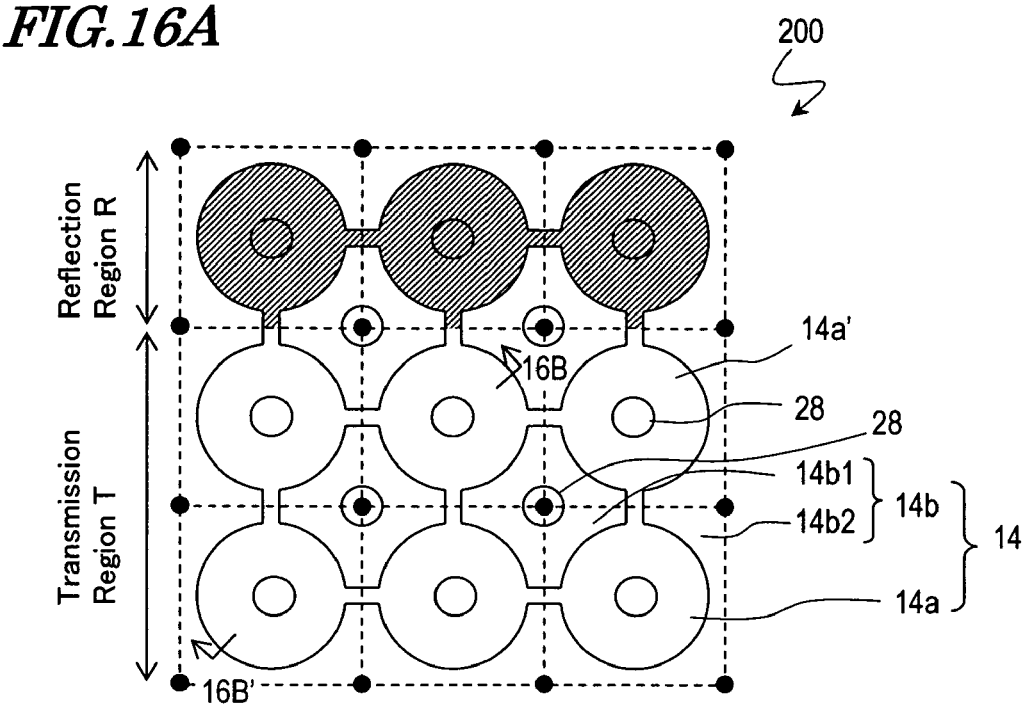
Figure 16B:
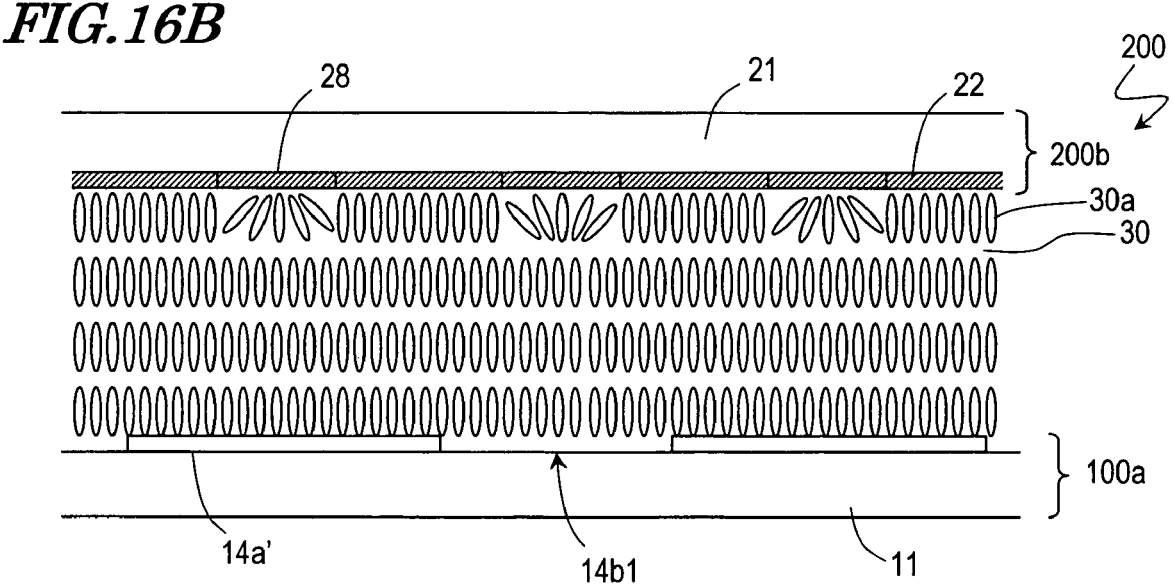

A liquid crystal display device 200 having any of the orientation-regulating structures as described above is shown in FIG. 16A and FIG. 16B. FIG. 16A is a plan view, and FIG. 16B is a cross-sectional view taken along line 16A-16A' of FIG. 16A.

The liquid crystal display device 200 includes the TFT substrate 100a having the picture element electrode 14 including a solid area 14a and a non-solid area 14b, and the counter substrate 200b having the orientation-regulating structure 28. The structure of the TFT substrate 100a is not limited to the structure illustrated herein, but may be any other structure described above. Moreover, while a structure that exerts an orientation-regulating force even in the absence of an applied voltage (FIG. 15B to FIG. 15D and FIG. 15E) will be used as the orientation-regulating structure 28, the orientation-regulating structure 28 illustrated in FIG. 15B to FIG. 15D can be replaced with that illustrated in FIG. 15A.

Among the orientation-regulating structures 28 provided in the counter substrate 200b of the liquid crystal display device 200, the orientation-regulating structure 28 provided around the center of a region opposing the solid area 14a of the picture element electrode 14 is one of those illustrated in FIG. 15B to FIG. 15D, and the orientation-regulating structure 28 provided around the center of a region opposing the non-solid area 14b of the picture element electrode 14 is one illustrated in FIG. 15E.

Figure 17A:
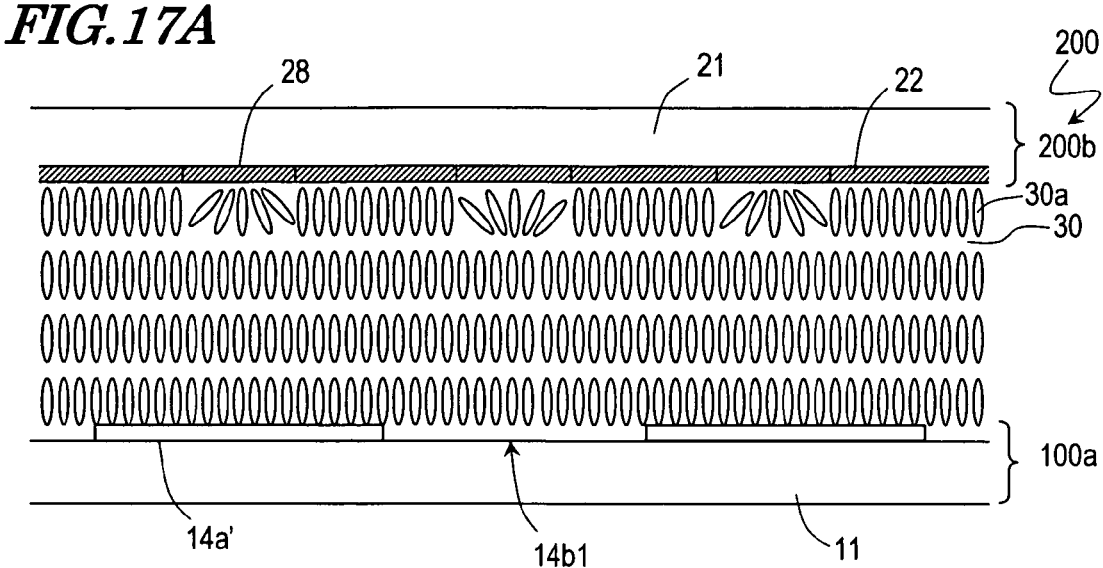
Figure 17B:
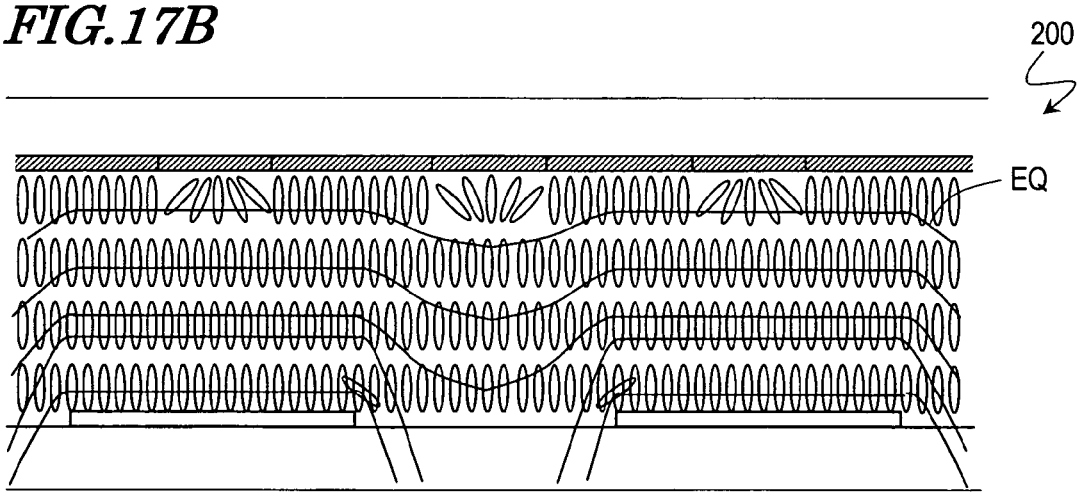
Figure 17C:
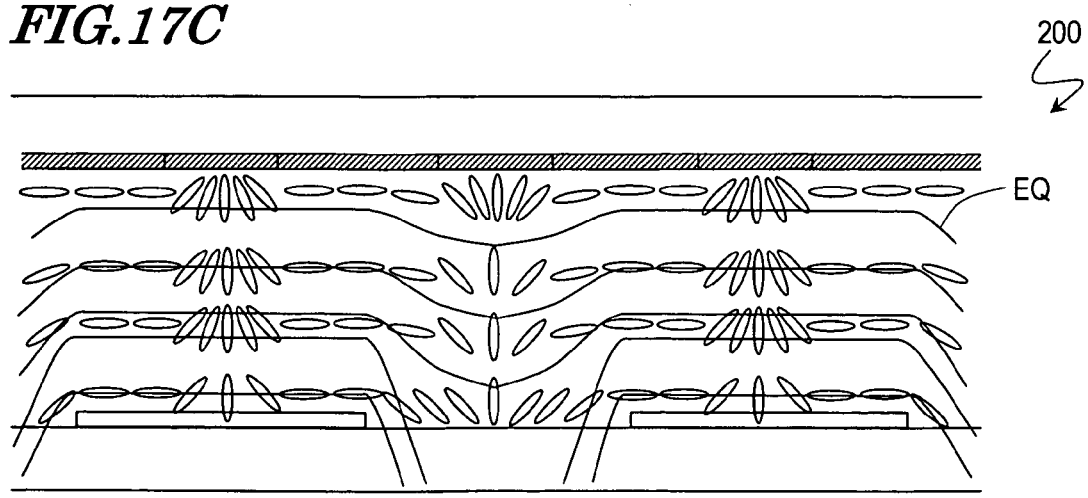

With such an arrangement, in the presence of an applied voltage across the liquid crystal layer 30, i.e., in the presence of an applied voltage between the picture element electrode 14 and the counter electrode 22, the direction of the radially-inclined orientation formed by the unit solid area 14a' of the picture element electrode 14 is aligned with the direction of the radially-inclined orientation formed by the orientation-regulating structure 28, thereby stabilizing the radially-inclined orientation. This is schematically shown in FIG. 17A to FIG. 17C. FIG. 17A illustrates a state in the absence of an applied voltage, FIG. 17B illustrates a state where the orientation has just started to change (initial ON state) after application of a voltage, and FIG. 17C schematically illustrates a steady state during the voltage application.

As illustrated in FIG. 17A, the orientation-regulating force exerted by the orientation-regulating structure (FIG. 15B to FIG. 15D) 28 acts upon the liquid crystal molecules 30a in the vicinity thereof even in the absence of an applied voltage, thereby forming a radially-inclined orientation.

When voltage application begins, an electric field represented by equipotential lines EQ shown in FIG. 17B is produced (by the electrode structure of the TFT substrate 100a), and a liquid crystal domain in which the liquid crystal molecules 30a are in a radially-inclined orientation is formed in each region corresponding to the opening 14b1 and each region corresponding to the unit solid area 14a', and the liquid crystal layer 30 reaches a steady state as illustrated in FIG. 17C. The inclination direction of the liquid crystal molecules 30a in each liquid crystal domain coincides with the direction in which the liquid crystal molecules 30a are inclined by the orientation-regulating force exerted by the orientation-regulating structure 28 that is provided in a corresponding region.

When a stress is applied upon the liquid crystal display device 200 in a steady state, the radially-inclined orientation of the liquid crystal layer 30 once collapses, but upon removal of the stress, the radially-inclined orientation is restored because of the orientation-regulating forces from the unit solid area 14a' and the orientation-regulating structure 28 acting upon the liquid crystal molecules 30a. Therefore, the occurrence of an after image due to a stress is suppressed. When the orientation-regulating force from the orientation-regulating structure 28 is excessively strong, retardation occurs even in the absence of an applied voltage due to the radially-inclined orientation, whereby the display contrast ratio may decrease. However, the orientation-regulating force from the orientation-regulating structure 28 does not have to be strong because it is only required to have an effect of stabilizing a radially-inclined orientation formed by an inclined electric field and fixing the central axis position thereof. Therefore, an orientation-regulating force that would not cause such a degree of retardation as to deteriorate the display quality is sufficient.

For example, when the protrusion (rib) 22b illustrated in FIG. 15B is employed, each protrusion 22b may have a diameter of about 15 μm and a height (thickness) of about 1 μm for the unit solid area 14a' having a diameter of about 30 μm to about 35 μm, thereby obtaining a sufficient orientation-regulating force and suppressing the reduction in the contrast ratio due to retardation to a practical level.

Figure 18A:
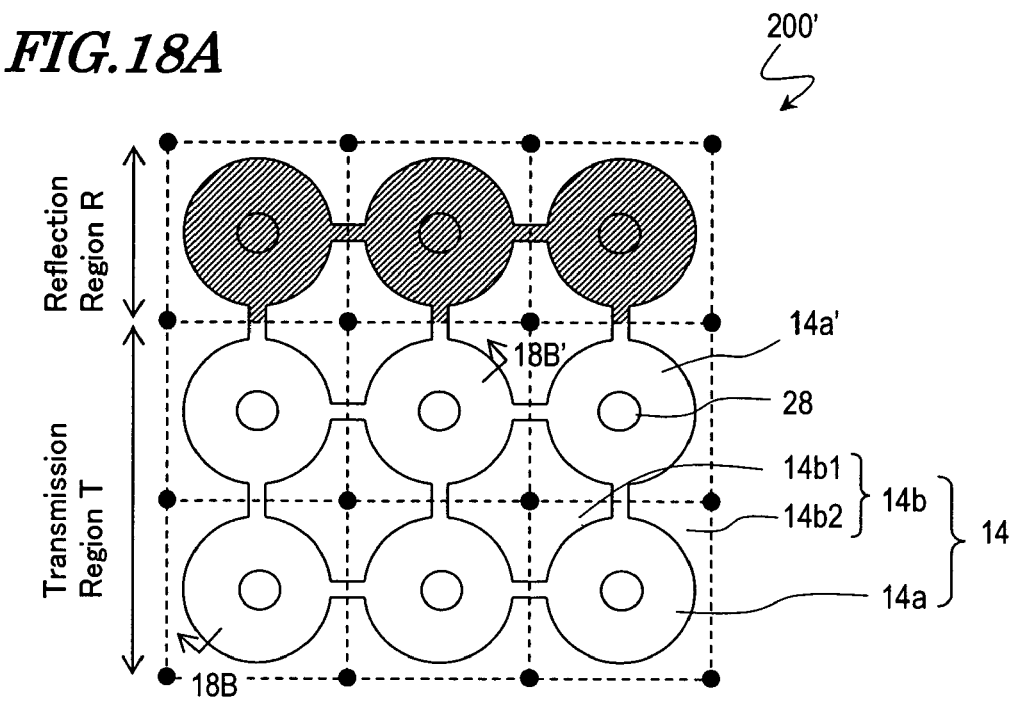
Figure 18B:
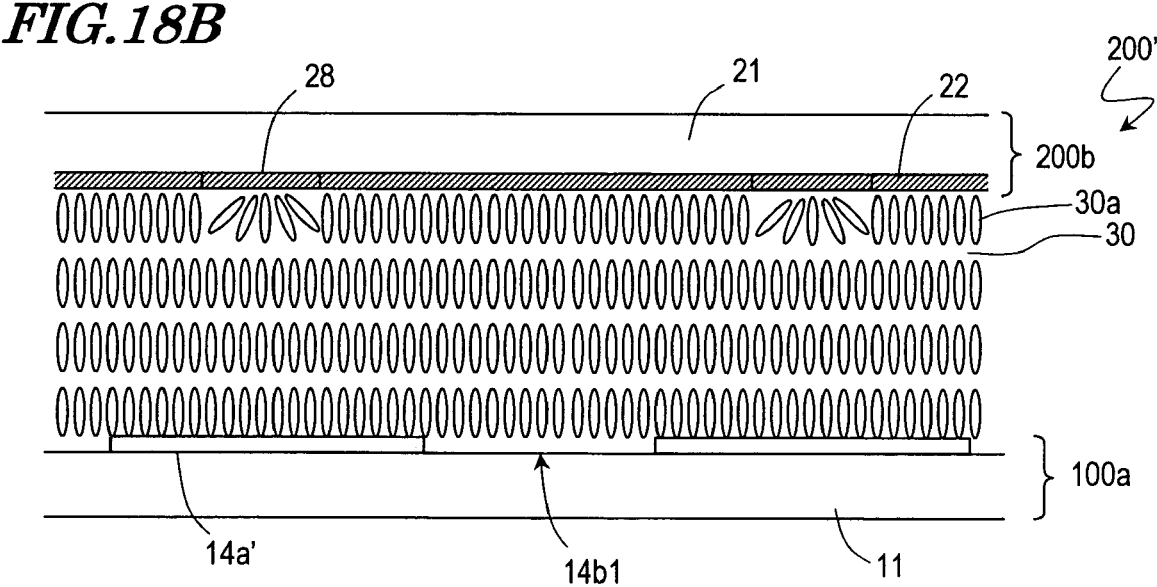

FIG. 18A and FIG. 18B illustrate another liquid crystal display device 200' including an orientation-regulating structure.

The liquid crystal display device 200' does not have the orientation-regulating structure in a region opposing the opening 14b1 of the picture element electrode 14. Formation of the orientation-regulating structure 28 illustrated in FIG. 15E which should be formed in a region opposing the opening 14b1 introduces difficulties into the process. Therefore, in view of the productivity, it is preferred to use only one of the orientation-regulating structures 28 illustrated in FIG. 15A to FIG. 15D. Particularly, the orientation-regulating structure 28 illustrated in FIG. 15B is preferred because it can be produced by a simple process.

Figure 19A:
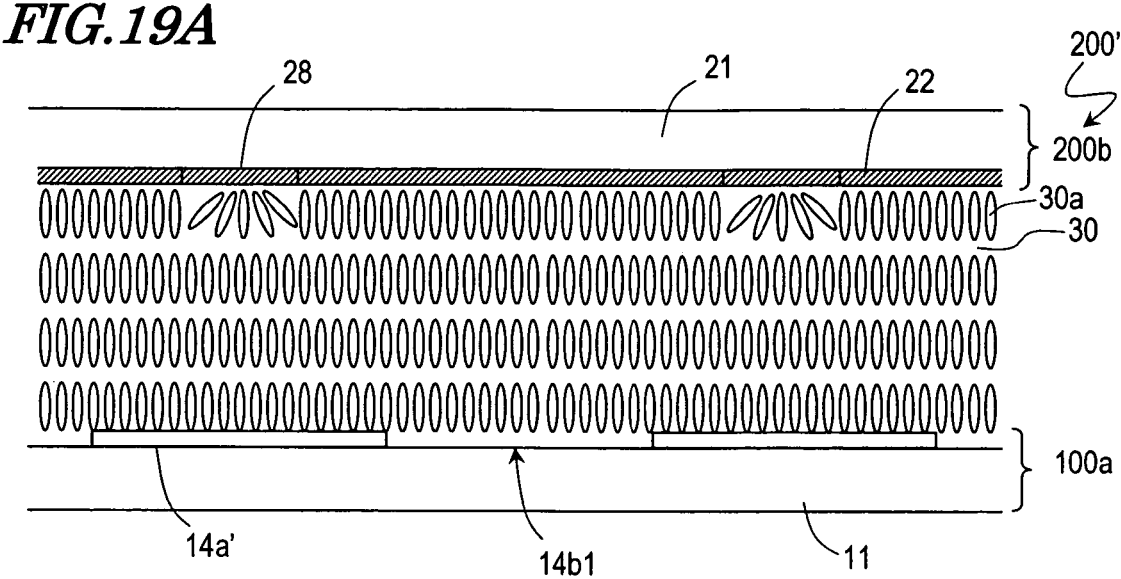
Figure 19B:
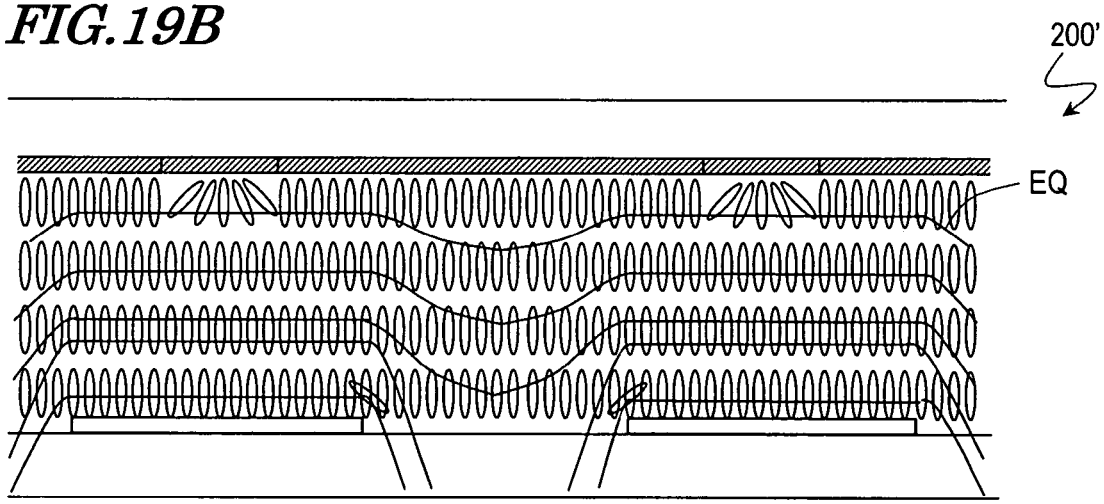
Figure 19C:
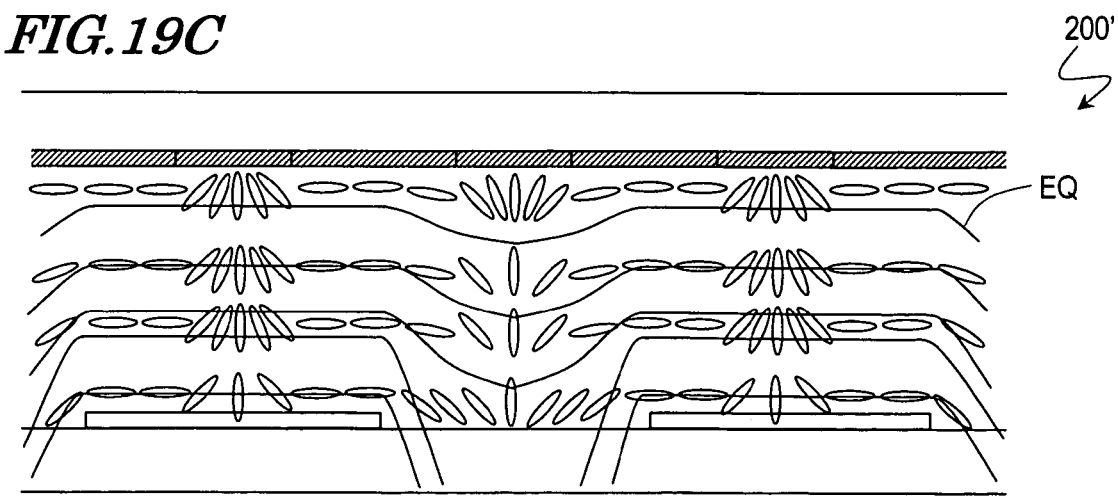

Even if no orientation-regulating structure is provided in a region corresponding to the opening 14b1 as in the liquid crystal display device 200', substantially the same radially-inclined orientation as that of the liquid crystal display device 200 is obtained, as schematically illustrated in FIG. 19A to FIG. 19C, and also the stress resistance thereof is at a practical level.

Figure 20A:
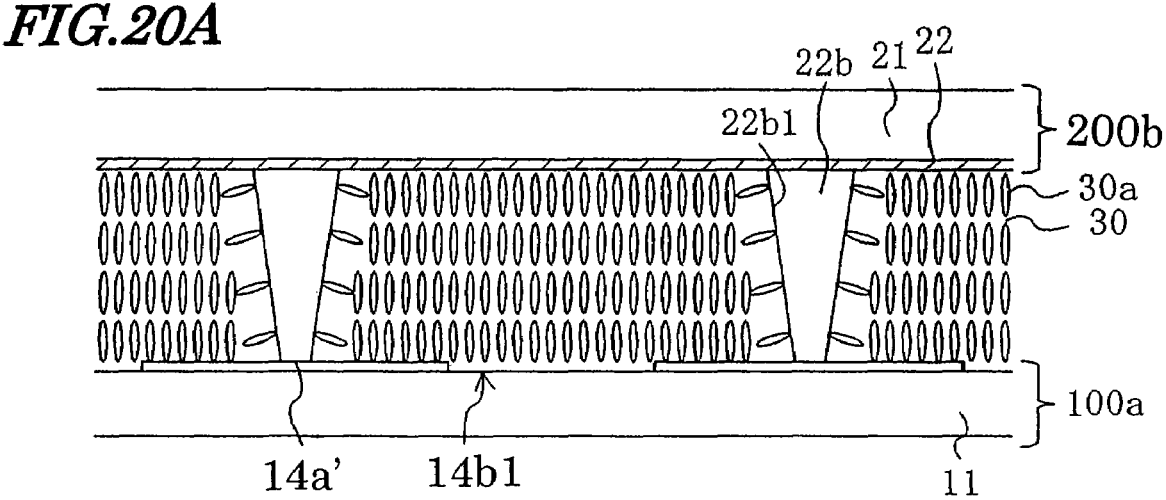

In a case where the protrusion 22b as illustrated in FIG. 15B is employed as the orientation-regulating structure 28, the thickness of the liquid crystal layer 30 may be defined by the protrusion 22b, as illustrated in FIG. 20A. In other words, the protrusion 22b may function also as a spacer that controls the cell gap (the thickness of the liquid crystal layer 30). Such an arrangement is advantageous in that it is not necessary to separately provide a spacer for defining the thickness of the liquid crystal layer 30, thereby simplifying the production process.

In the illustrated example, the protrusion 22b has a truncated cone shape with a side surface 22b1 that is inclined by a taper angle θ less than 90° with respect to the substrate plane of the substrate 21. When the side surface 22b1 is inclined by an angle less than 90° with respect to the substrate plane, the side surface 22b1 of the protrusion 22b has an orientation-regulating force of the same direction as that of the orientation-regulating force exerted by the inclined electric field for the liquid crystal molecules 30a of the liquid crystal layer 30, thereby functioning to stabilize the radially-inclined orientation.

Figure 20B:
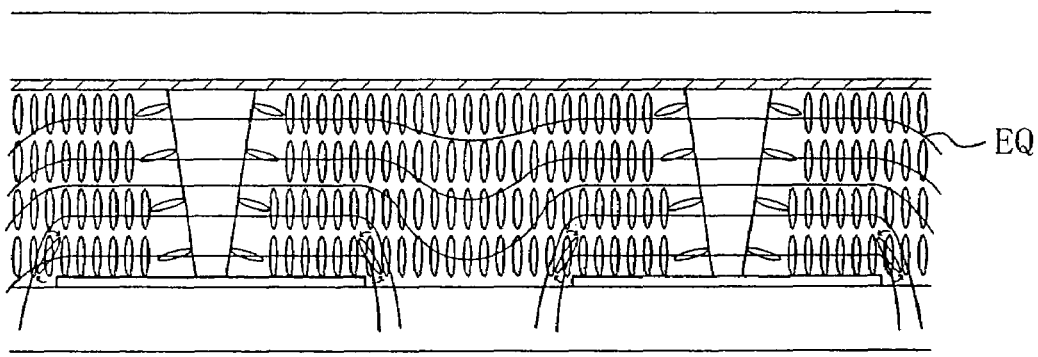
Figure 20C:
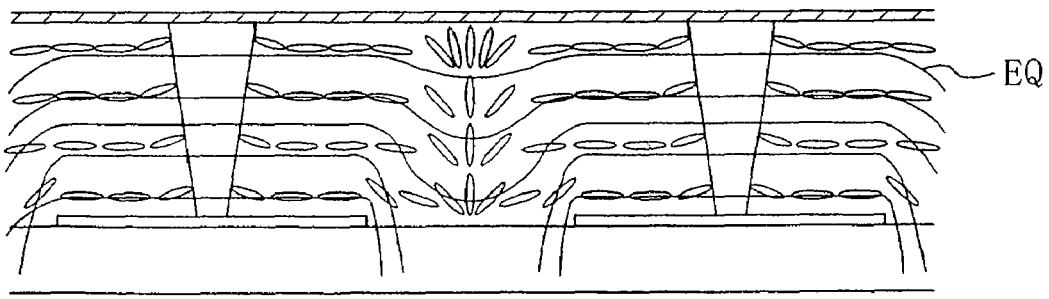

As schematically illustrated in FIG. 20A to FIG. 20C, a radially-inclined orientation similar to that obtained with the liquid crystal display device 200' can be obtained also with the protrusion 22b that functions also as a spacer.

Figure 21:
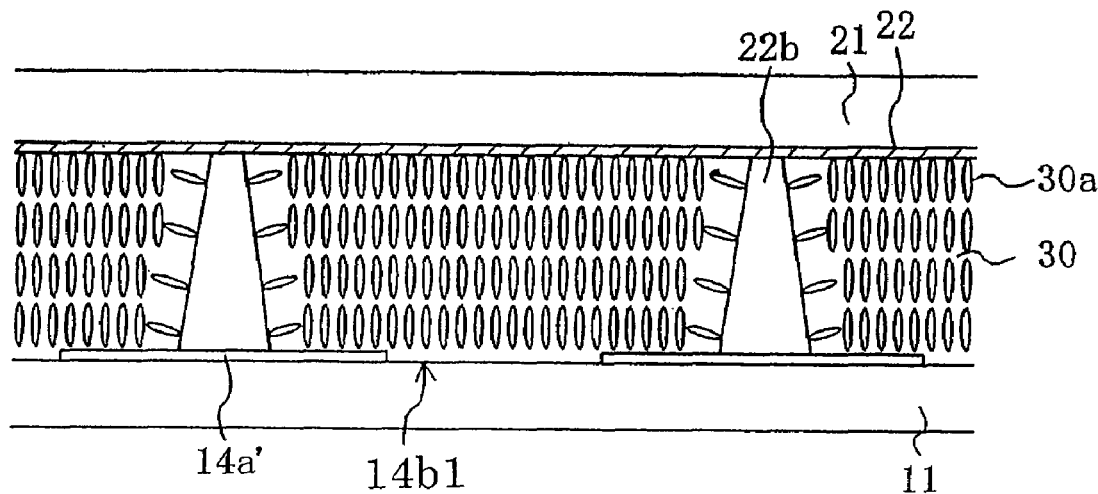
FIG. 21 is a cross-sectional view schematically illustrating a protrusion having a side surface whose inclination angle with respect to the substrate plane significantly exceeds 90°.

While the protrusion 22b has the side surface 22b1 that is inclined by an angle less than 90° with respect to the substrate plane in the example illustrated in FIG. 20A to FIG. 20C, the protrusion 22b may alternatively have the side surface 22b1 that is inclined by an angle of 90° or more with respect to the substrate plane. In view of the stability of the radially-inclined orientation, it is preferred that the inclination angle of the side surface 22b1 does not significantly exceed 90°, and it is more preferred that the inclination angle is less than 90°. Even if the inclination angle exceeds 90°, as long as it is close to 90° (as long as it does not significantly exceed 90°), the liquid crystal molecules 30a in the vicinity of the side surface 22b1 of the protrusion 22b are inclined in a direction substantially parallel to the substrate plane and thus take a radially-inclined orientation conforming with the inclination direction of the liquid crystal molecules 30a at the edge portion, with only a slight twist. However, if the inclination angle of the side surface 22b1 of the protrusion 22b significantly exceeds 90° as illustrated in FIG. 21, the side surface 22b1 of the protrusion 22b will have an orientation-regulating force of the opposite direction to the orientation-regulating force exerted by the inclined electric field for the liquid crystal molecules 30a of the liquid crystal layer 30, whereby the radially-inclined orientation may not be stable.

Figure 22:
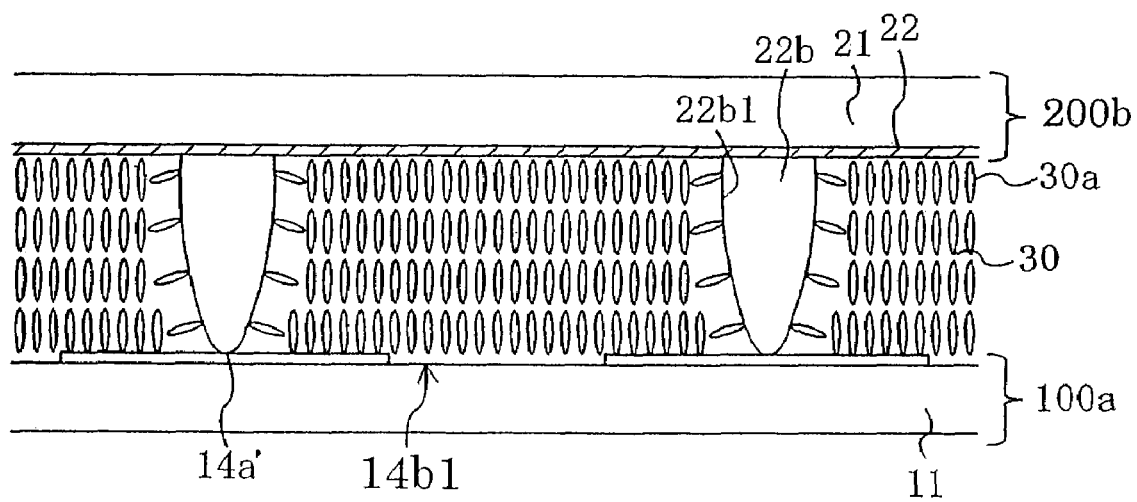
FIG. 22 is a cross-sectional view schematically illustrating a variation of a protrusion that functions also as a spacer.

The protrusion 22b that functions also as a spacer is not limited to a protrusion having a truncated cone shape as illustrated in FIG. 20A to FIG. 20C. For example, the protrusion 22b may have a shape as illustrated in FIG. 22 such that the cross section thereof in a plane vertical to the substrate plane is a part of an ellipse (i.e., a shape such as a part of an elliptical sphere). In the protrusion 22b illustrated in FIG. 22, while the inclination angle (taper angle) of the side surface 22b1 with respect to the substrate plane varies along the thickness of the liquid crystal layer 30, the inclination angle of the side surface 22b1 is less than 90° regardless of the position along the thickness of the liquid crystal layer 30. Thus, the protrusion 22b having such a shape may suitably be used as a protrusion for stabilizing a radially-inclined orientation.

The protrusion 22b as described above that is in contact with both the upper and lower substrates (the TFT substrate and the counter substrate) and functions also as a spacer defining the thickness of the liquid crystal layer 30 may be formed either on the upper substrate or on the lower substrate in the process of producing a liquid crystal display device. Regardless of whether it is formed on the upper or lower substrate, the protrusion 22b will be in contact with both substrates, functioning as a spacer and as an orientation-regulating structure, once the upper and lower substrates are attached to each other.

It is not necessary that all of the protrusions 22b provided in regions opposing the unit solid areas 14a' function as spacers. By forming some of the protrusions 22b to be lower than the other protrusions 22b that function as spacers, it is possible to suppress the occurrence of light leakage.

Alternative liquid crystal display devices of the present embodiment will now be described.

Figure 23A:
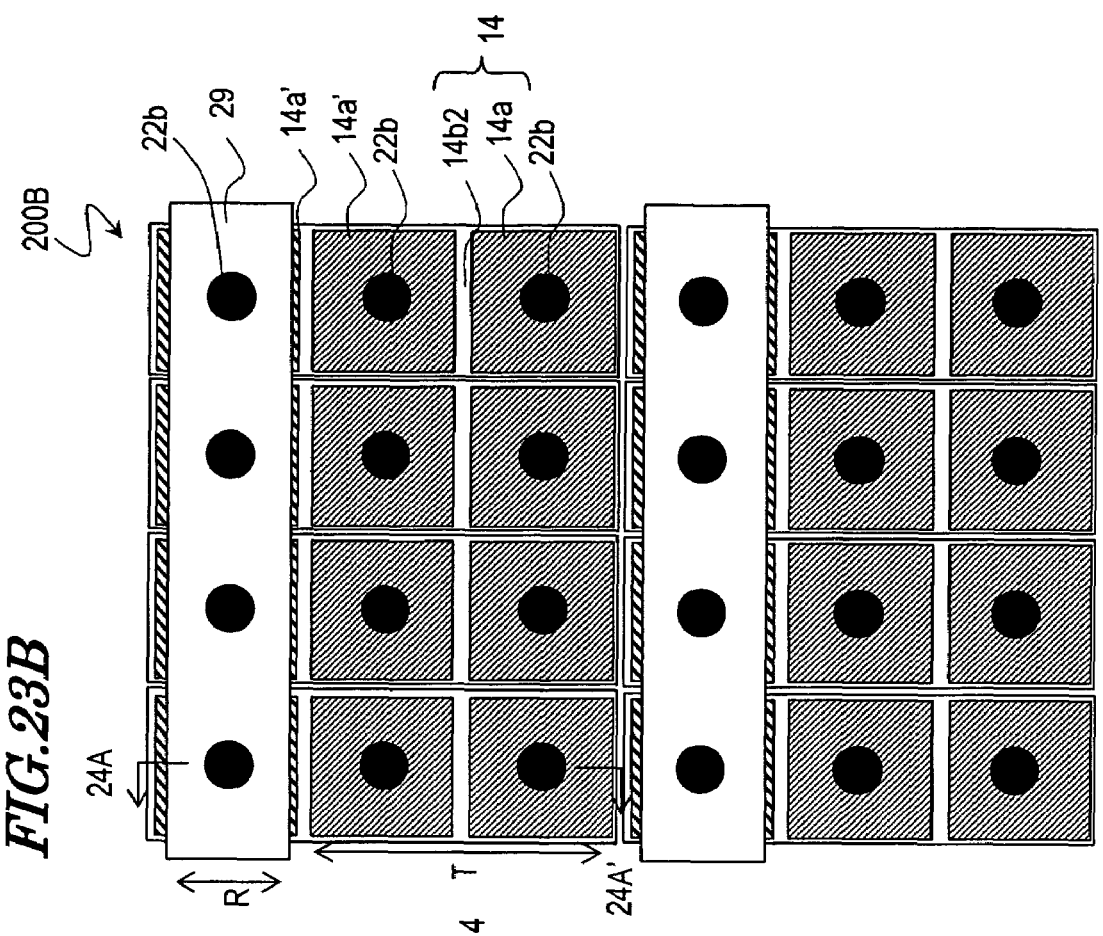
FIG. 23A is a plan view schematically illustrating still another liquid crystal display device 200A of the present invention.
Figure 23B:
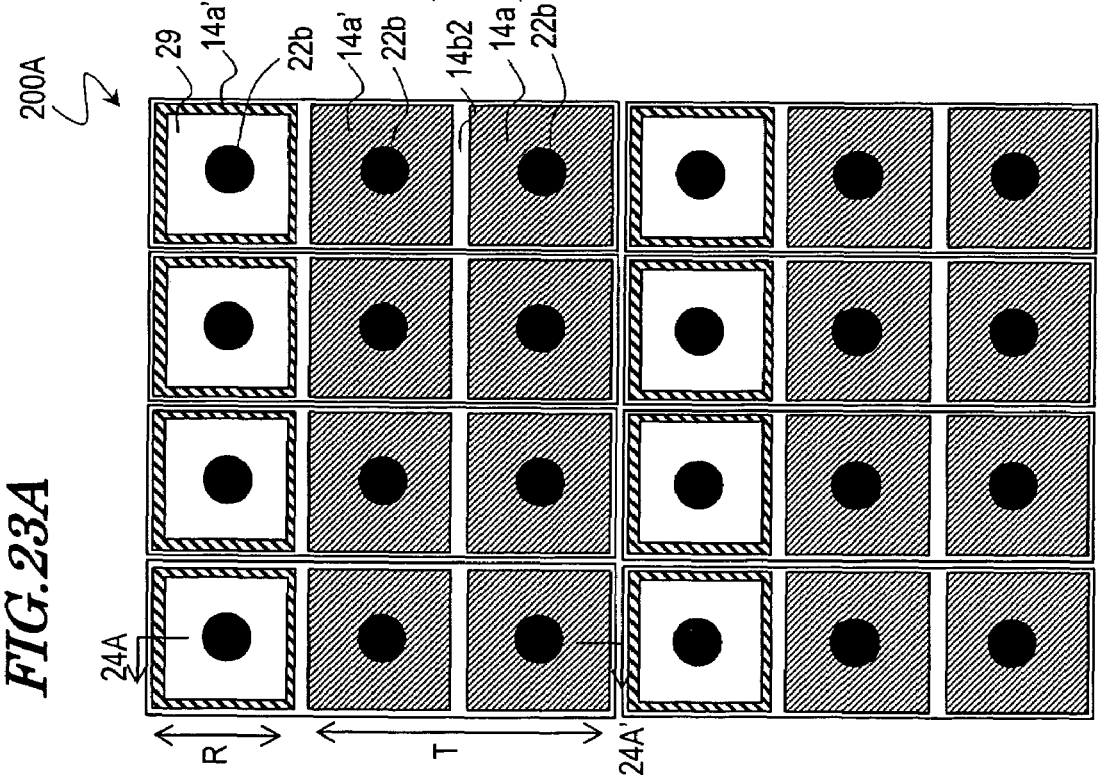
FIG. 23B is a plan view schematically illustrating still another liquid crystal display device 200B of the present invention.
Figure 24:
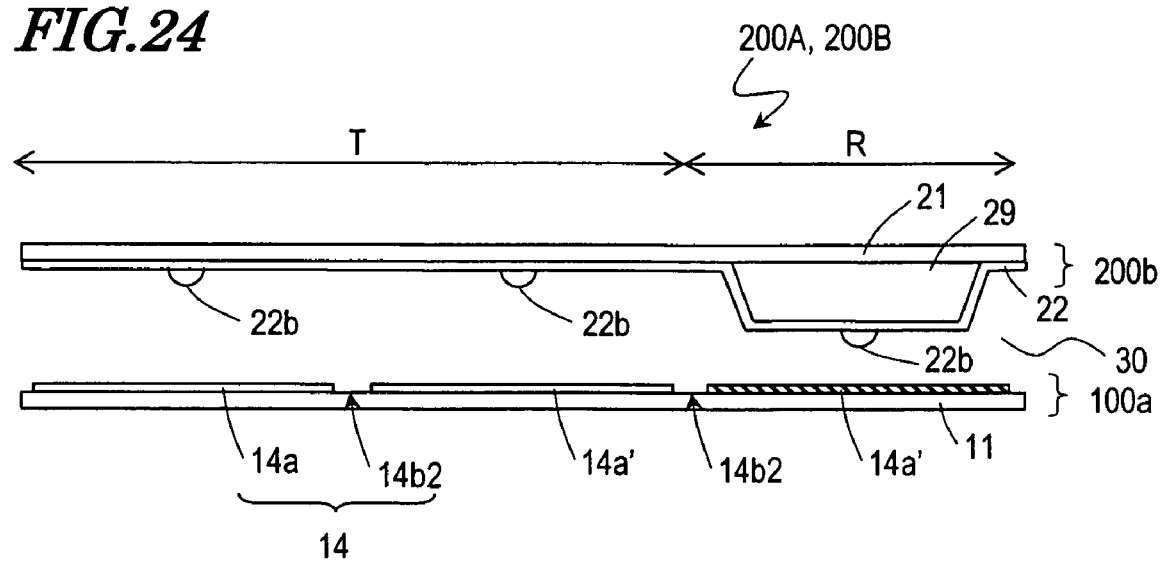
FIG. 24 is a cross-sectional view schematically illustrating the liquid crystal display devices 200A and 200B, taken along line 24A-24A' of FIG. 23A and FIG. 23B.

FIG. 23A, FIG. 23B and FIG. 24 illustrate another liquid crystal display devices 200A and 200B of the present embodiment. FIG. 23A and FIG. 23B are plan views schematically illustrating a structure of eight picture element regions of the liquid crystal display devices 200A and 200B, respectively. FIG. 24 is a cross-sectional view taken along line 24A-24A' of FIG. 23A and FIG. 23B.

The picture element electrode 14 of each of the liquid crystal display devices 200A and 200B includes three unit solid areas 14a' arranged in one line in the picture element region, but does not include any opening 14b1; i.e., the non-solid area 14b of the picture element electrode 14 only include cut-out areas 14b2. Two of the three unit solid areas 14a' included in each picture element region are transparent electrodes, and the remaining one unit solid area 14a' is a reflection electrode. Each unit solid area 14a' is square. The counter electrode 200b of each of the liquid crystal display devices 200A and 200B includes a protrusion (rib) 22b as an orientation-regulating structure in a region opposing each unit solid area 14a'.

The picture element electrode 14 of the liquid crystal display devices 200A and 200B does not include any opening 14b1. However, in this case, it is capable of forming the liquid crystal domain taking a radially-inclined orientation above the unit solid area 14a'. By forming at least one cut-out area 14*b*2, a plurality of unit solid area 14*a*' can be formed in the picture element electrode 14. Thus, a plurality of liquid crystal domains each taking a radially-inclined orientation can be formed. The liquid crystal domain formed above the unit solid area 14*a*' is stabilized by the protrusion 22*b* provided in correspondence with each of the unit solid area 14*a*'.

The liquid crystal display device 200A illustrated in FIG. 23A and the liquid crystal display device 200B illustrated in FIG. 23B are different from each other in the structure of the transparent dielectric layer 29 of the counter substrate 200*b*. Specifically, in the liquid crystal display device 200A, the transparent dielectric layer 29 is formed separately (individually) in each picture element region as illustrated in FIG. 23A, whereas in the liquid crystal display device 200B, the transparent dielectric layer 29 in a picture element region is continuous with the transparent dielectric layers 29 in other picture element regions that are adjacent to the picture element region in one of two periodic arrangement directions (the directions in which the picture element regions are periodically arranged) as illustrated in FIG. 23B. Where the transparent dielectric layer 29 in a picture element region is continuous with the transparent dielectric layers 29 in the other picture element regions that are adjacent to the picture element region in a certain direction as illustrated in FIG. 23B, it is no longer necessary to consider the alignment margin for the transparent dielectric layers 29 in that direction, whereby it is possible to reduce the picture element interval in the direction, thus improving the aperture ratio and the productivity.

In the liquid crystal display devices 200A and 200B illustrated in FIG. 23A and FIG. 23B, respectively, the picture element regions are arranged so that the reflection regions R of picture element regions adjacent to one another in one periodic arrangement direction are adjacent to one another. In contrast, in liquid crystal display devices 200C, 200D, 200E and 200F illustrated in FIG. 25A, FIG. 25B, FIG. 26A and FIG. 26B, respectively, the reflection region R of each picture element region is not only adjacent to the reflection region R of a next picture element region in one periodic arrangement direction but also adjacent to the reflection region R of a next picture element region in the other periodic arrangement direction.

Figure 25A:
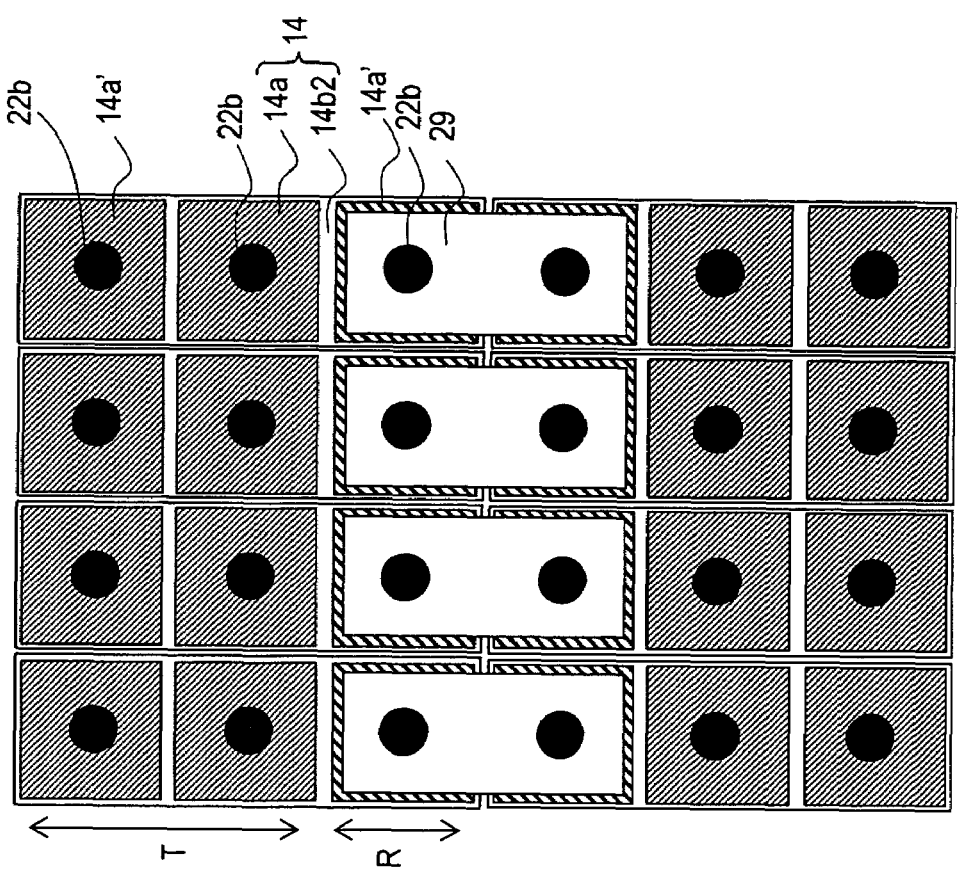
FIG. 25A is a plan view schematically illustrating still another liquid crystal display device 200C of the present invention.
Figure 25B:
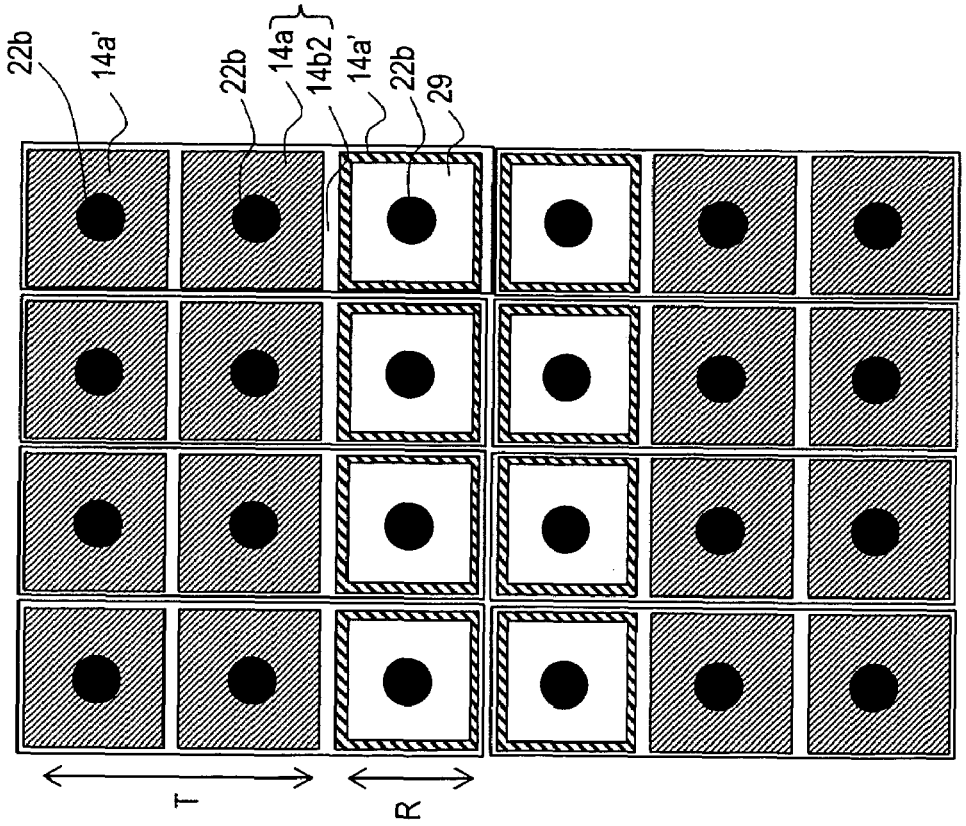
FIG. 25B is a plan view schematically illustrating still another liquid crystal display device 200D of the present invention.

In the liquid crystal display device 200C illustrated in FIG. 25A, the transparent dielectric layer 29 is formed separately in the reflection region R in each picture element region. In contrast, in the liquid crystal display devices 200D, 200E and 200F illustrated in FIG. 25B, FIG. 26A and FIG. 26B, respectively, the transparent dielectric layer 29 in a picture element region is continuous with the transparent dielectric layers 29 in other picture element regions that are adjacent to the picture element region, whereby it is possible to improve the aperture ratio and the productivity. Particularly, in the liquid crystal display device 200F illustrated in FIG. 26B, the transparent dielectric layer 29 in a picture element region is continuous with the transparent dielectric layers 29 in the other picture element regions that are adjacent to the picture element region in both of the periodic arrangement directions. Therefore, it is no longer necessary to consider the alignment margin for the transparent dielectric layers 29 in both of the periodic arrangement directions. This arrangement is highly effective in improving the aperture ratio and the productivity.

While FIG. 23A to FIG. 26B illustrate arrangements where each picture element region is equally divided; i.e., where regions defined by the unit solid areas 14*a*' (referred to as "sub-picture element regions") have the same size and the same shape, it is not necessary in the present invention that the picture element region is divided equally. One or more of the sub-picture element regions of one picture element region may have a different size/shape from that of the other sub-picture element regions, or a sub-picture element region in the transmission region T may have a different size/shape from that of a sub-picture element region in the reflection region R. Moreover, while FIG. 23A to FIG. 26B illustrate arrangements where a sub-picture element region has a square shape and has an aspect ratio of 1:1, it is not necessary in the present invention that the aspect ratio of the sub-picture element region is 1:1.

Figure 27B:
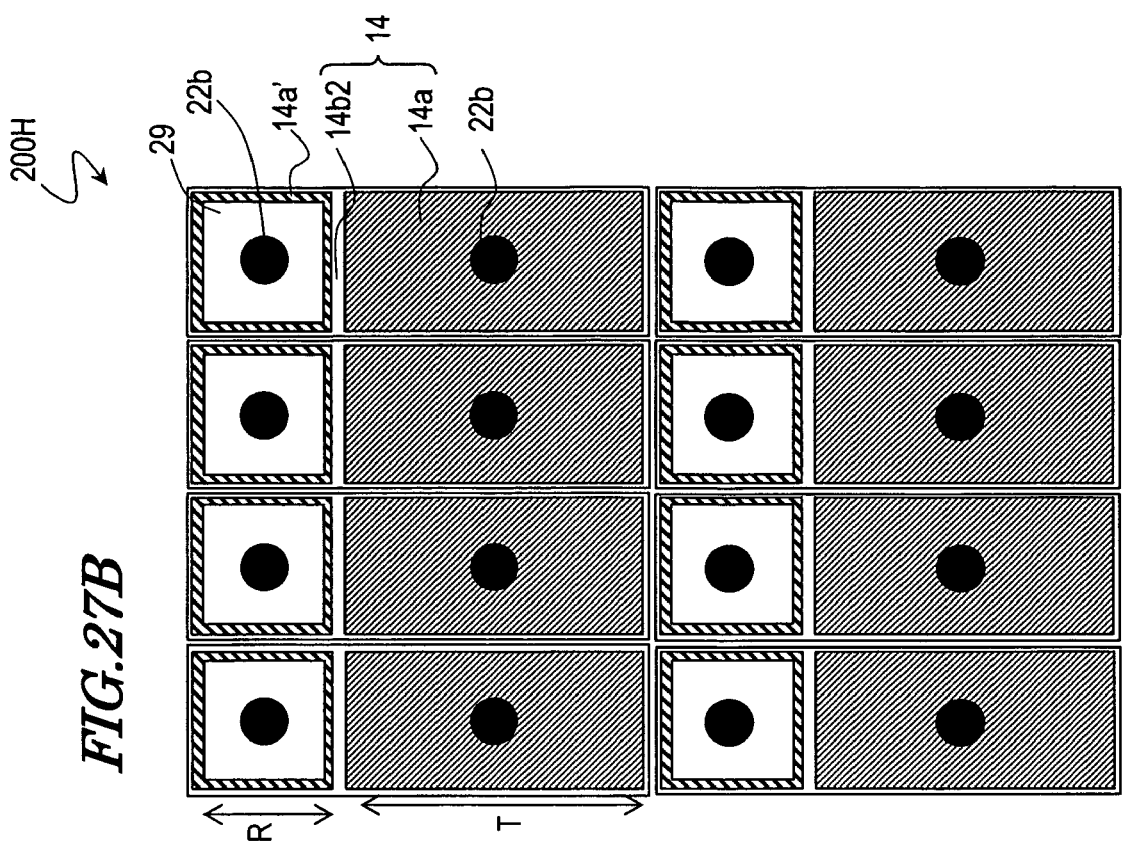
FIG. 27B is a plan view schematically illustrating still another liquid crystal display device 200H of the present invention.
Figure 27A:
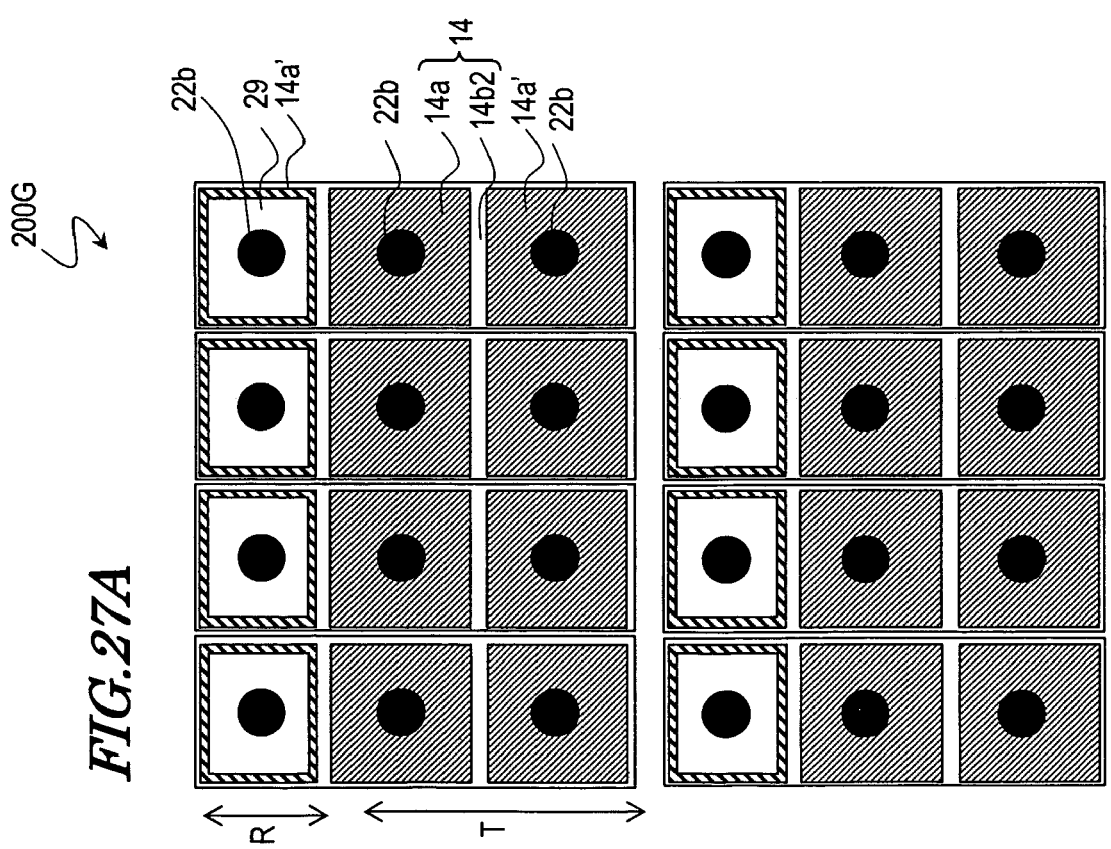
FIG. 27A is a plan view schematically illustrating still another liquid crystal display device 200G of the present invention.

A liquid crystal display device 200G illustrated in FIG. 27A is different from the liquid crystal display device 200A illustrated in FIG. 23A in that the unit solid area 14*a*' provided in the reflection region R has an oblong rectangular shape, and the sub-picture element region in the reflection region R has an oblong rectangular shape. While it may be difficult to form all the sub-picture element regions in the picture element region with an aspect ratio of 1:1 depending on the aspect ratio of the picture element region, if one or more of the sub-picture element regions have a different shape (e.g., an oblong rectangular shape) from the others as illustrated in FIG. 27A, the plurality of unit solid areas 14*a*' can be arranged within a picture element region as closely as possible, whereby it is possible to increase the area ratio of the unit solid areas 14*a*' in each picture element region, thus increasing the aperture ratio. Note that where the size/shape of one or more of the sub-picture element regions is adjusted according to the aspect ratio of the picture element region, the display is less influenced if the size/shape of the sub-picture element region in the reflection region R is adjusted. This is because the reflection region R, having a smaller cell gap (the thickness of the liquid crystal layer 30), has a better response characteristic in the first place, and the required level of display quality is lower than that in the transmission region T.

A liquid crystal display device 200H illustrated in FIG. 27B is similar to the liquid crystal display device 200A illustrated in FIG. 23A except that two square-shaped sub-picture element regions (the square unit solid areas 14*a*') arranged in the transmission region T are replaced by a single oblong rectangular sub-picture element region (an oblong rectangular unit solid area 14*a*') with a larger aspect ratio (about 1:2). In the case where the number of sub-picture element regions (unit solid areas 14*a*') in each picture element region is reduced by using sub-picture element regions (unit solid areas 14*a*') of a larger aspect ratio, although the orientation stability and the response speed decrease, the area ratio of the non-solid area 14*b* in the picture element region can be reduced, whereby it is possible to further improve the aperture ratio. A research by the present inventor revealed that a sufficiently stable radially-inclined orientation can be obtained even with the unit solid areas 14*a*' having an aspect ratio of about 1:2.

Moreover, depending on the shape of the picture element region, all of the sub-picture element regions (unit solid areas 14*a*') in each picture element region may be oblong rectangular, as in liquid crystal display devices 200I and 200J illustrated in FIG. 28A and FIG. 28B, respectively, to improve the aperture ratio. In the liquid crystal display device 200I illustrated in FIG. 28A, two sub-picture element regions (unit solid areas 14*a*') in the transmission region T and one sub-picture element region (unit solid area 14*a*') in the reflection region R are all oblong rectangular. Moreover, in the liquid crystal display device 200J illustrated in FIG. 28B, one sub-picture element region (unit solid area 14*a*') in the transmission region T and one sub-picture element region (unit solid area 14a') in the reflection region R are both oblong rectangular.

Note that FIG. 23A to FIG. 28B illustrate arrangements where an image is displayed preferentially in the transmission mode, with the area ratio between the transmission region T and the reflection region R being about 2:1. It is understood that where an image is displayed preferentially in the reflection mode, the area ratio of the reflection region R can be made higher than that of the transmission region T as in liquid crystal display devices 200K and 200L illustrated in FIG. 29A and FIG. 29B, respectively.

In the liquid crystal display device 200K illustrated in FIG. 29A, two of the three square-shaped unit solid areas 14a' in each picture element region are reflection electrodes and the remaining one square-shaped unit solid area 14a' is a transparent electrode, with the area ratio between the transmission region T and the reflection region R being about 1:2.

In the liquid crystal display device 200L illustrated in FIG. 29B, each picture element region includes one square-shaped unit solid area 14a' as a transparent electrode and one oblong rectangular unit solid area 14a' (aspect ratio: about 1:2) as a reflection electrode, with the area ratio between the transmission region T and the reflection region R also being about 1:2.

Figure 30B:
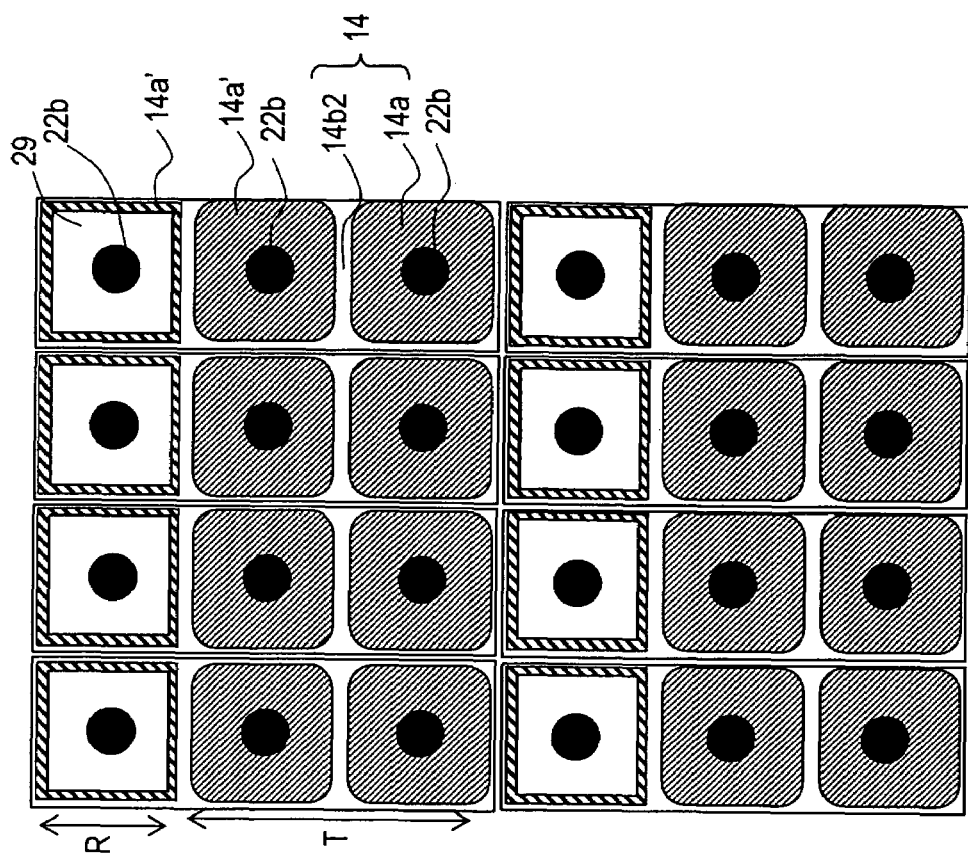
FIG. 30B is a plan view schematically illustrating still another liquid crystal display device 200N of the present invention.
Figure 30A:
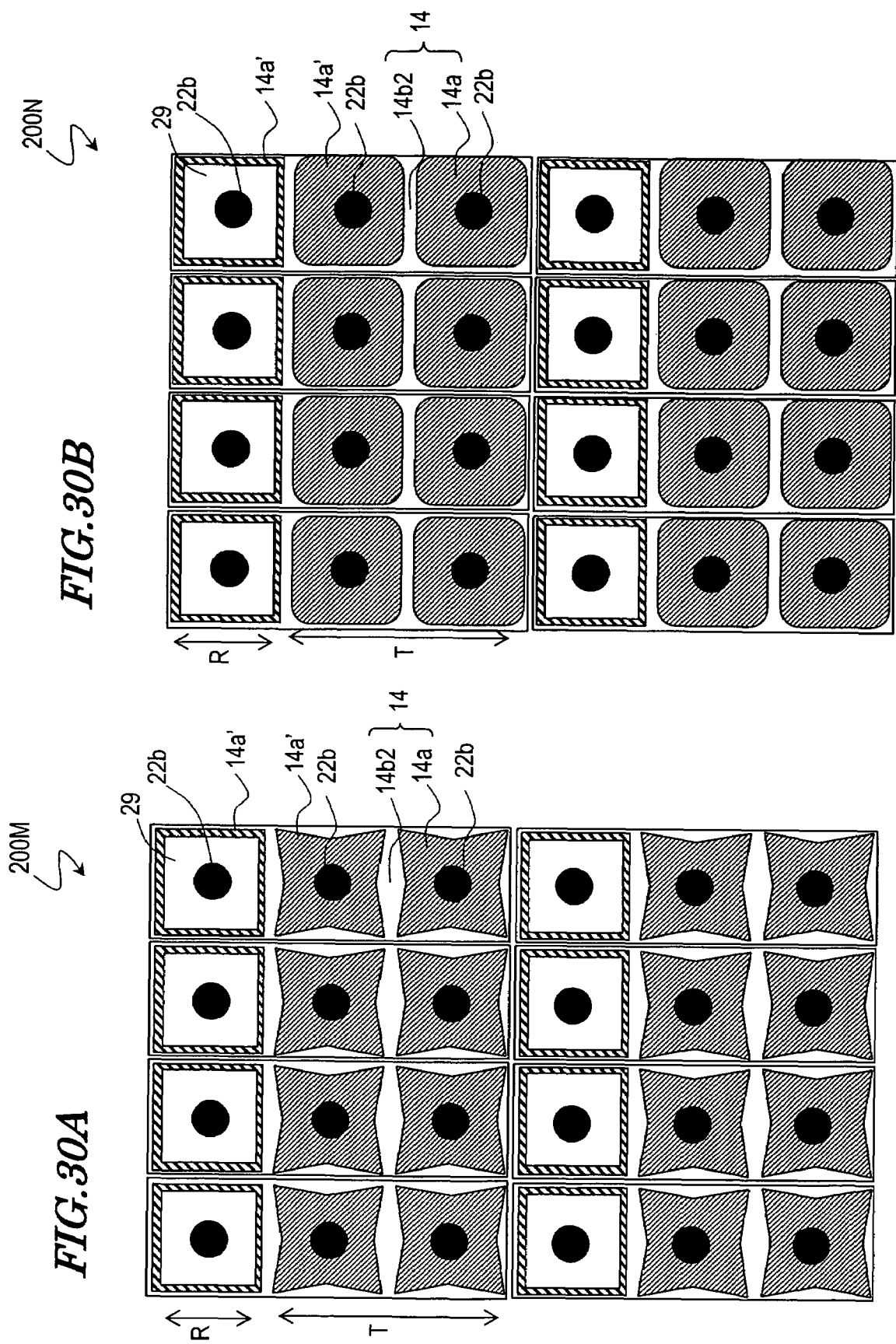
FIG. 30A is a plan view schematically illustrating still another liquid crystal display device 200M of the present invention.

Moreover, in order to improve the response characteristic of the liquid crystal layer 30 in the transmission region T, each unit solid area 14a' in the transmission region T may have a shape with acute angle corners as in a liquid crystal display device 200M illustrated in FIG. 30A. Alternatively, in order to increase both the orientation stability and the transmittance for the transmission region T, each unit solid area 14a' in the transmission region T may be formed in a barrel-like shape (a generally square shape with generally arc-shaped corner portions), as in a liquid crystal display device 200N illustrated in FIG. 30B.

Variations having structures in which unit solid areas 14a' are arranged in one line in each picture element region have been described with reference to FIG. 23A to FIG. 30B. The above description is also applicable to structures in which unit solid areas 14a' are arranged in a plurality of lines in each picture element region.

Figure 31A:
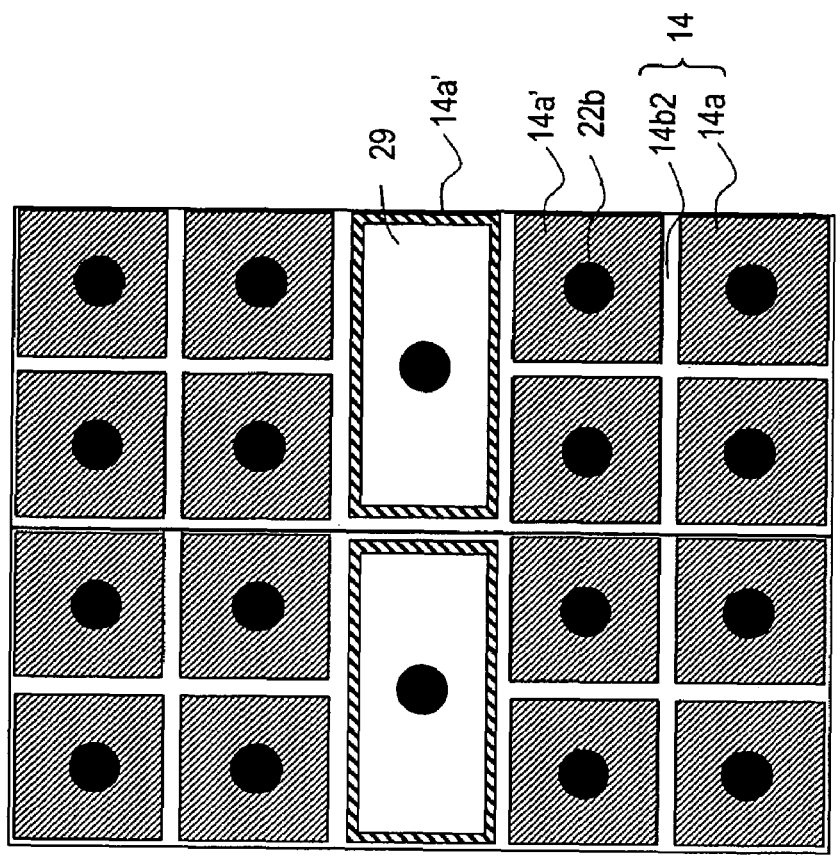
FIG. 31A is a plan view schematically illustrating still another liquid crystal display device 200O of the present invention.
Figure 31B:
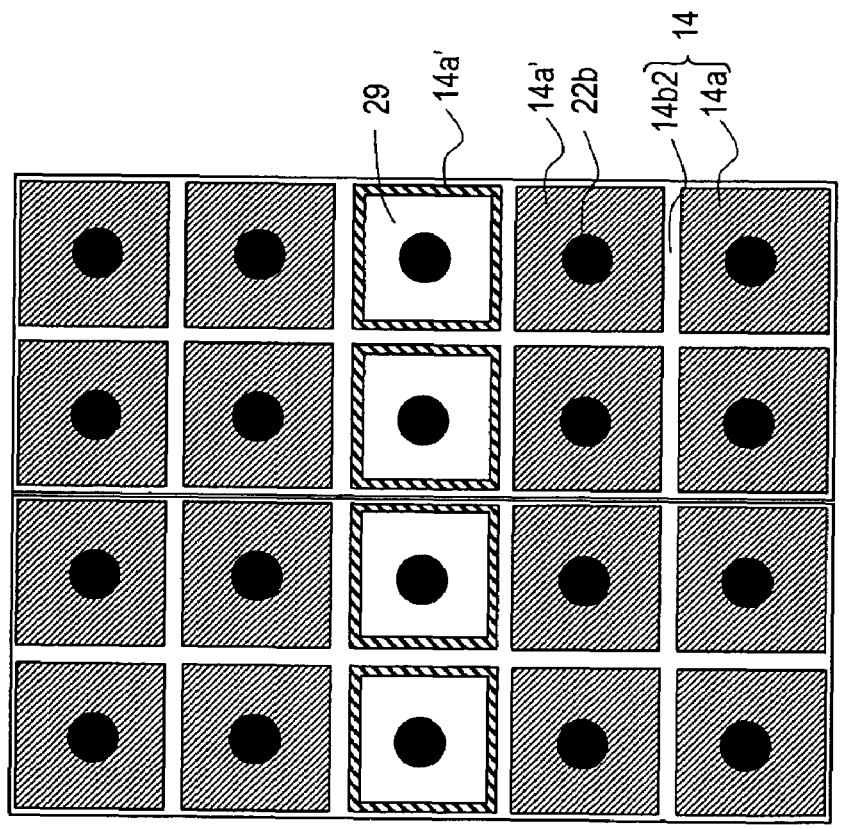
FIG. 31B is a plan view schematically illustrating still another liquid crystal display device 200P of the present invention.

FIG. 31A illustrates a liquid crystal display device 200O. In FIG. 31A, the picture element electrode 14 of the liquid crystal display device 200O includes ten unit solid areas 14a' arranged in a matrix of 5 rows×2 columns. Each unit solid area 14a' is square. The two unit solid areas 14a' in the third row are reflection electrodes, and the remaining unit solid areas 14a' are transparent electrodes. Various modifications described above are applicable to the liquid crystal display device 200O. For example, the two reflection electrodes (unit solid areas 14a') of the liquid crystal display device 200O may be replaced with one oblong rectangular reflection electrode to provide a liquid crystal display device 200P illustrated in FIG. 31B.

FIG. 32A illustrates a liquid crystal display device 200Q. In FIG. 32A, the picture element electrode 14 of the liquid crystal display device 200Q includes 24 unit solid areas 14a' arranged in a matrix of 8 rows×3 columns. Each unit solid area 14a' is square. The three unit solid areas 14a' in the fifth row are reflection electrodes, and the remaining unit solid areas 14a' are transparent electrodes. Various modifications described above are also applicable to the liquid crystal display device 200Q. For example, the three reflection electrodes (unit solid areas 14a') of the liquid crystal display device 200Q may be replaced with one oblong rectangular reflection electrode to provide a liquid crystal display device 200R illustrated in FIG. 32B.

Figure 33A:
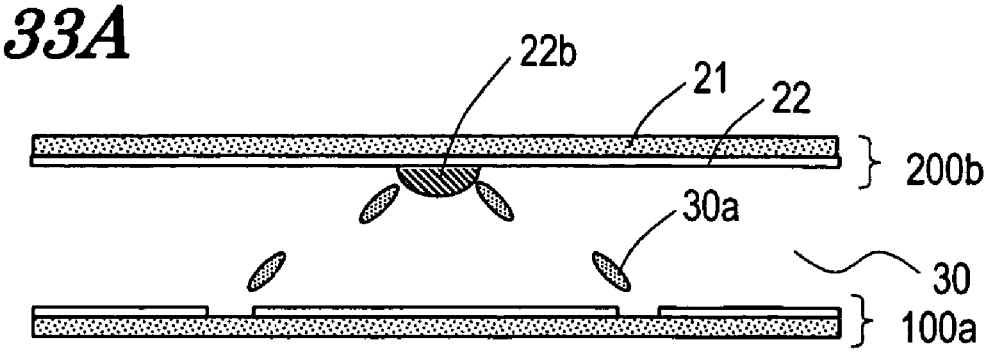
FIG. 33A is a cross-sectional view schematically illustrating an orientation of liquid crystal molecules where a protrusion is provided on a counter substrate.
Figure 33B:
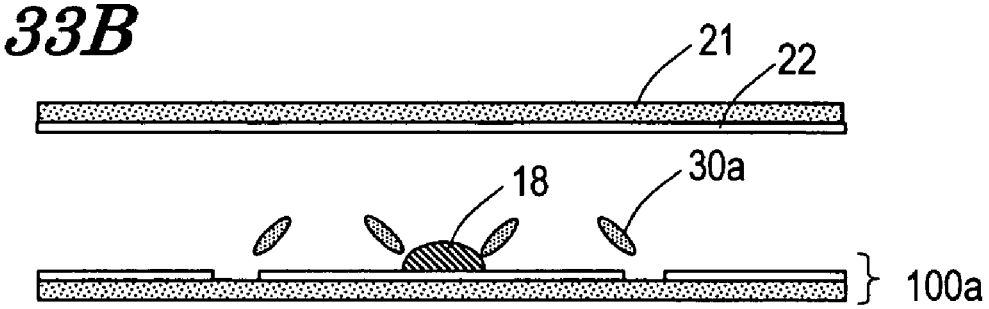
FIG. 33B is a cross-sectional view schematically illustrating an orientation of liquid crystal molecules where a protrusion is provided on a TFT substrate.

Note that while the present embodiment is directed to liquid crystal display devices including orientation-regulating structures on the counter substrate 200b, a research by the present inventor on various arrangements revealed that a stable radially-inclined orientation can be formed also by providing a protrusion (rib) on a central portion of the unit solid area 14a' of the TFT substrate 100a. Where the protrusion 22b as an orientation-regulating structure is provided on the counter substrate 200b in a region opposing the unit solid area 14a' as illustrated in FIG. 33A, the orientation-regulating force of the protrusion 22b conforms with the orientation-regulating force of an inclined electric field produced at the edge portion of the non-solid area 14b. In contrast, where a protrusion (rib) 18 is provided on a central portion of the unit solid area 14a' of the TFT substrate 100a as illustrated in FIG. 33B, the orientation-regulating force thereof does not appear to conform with the orientation-regulating force of an inclined electric field produced at the edge portion of the non-solid area 14b. However, since the protrusion 18 exerts a strong orientation-regulating force by virtue of the surface configuration thereof, the liquid crystal molecules 30a above the unit solid area 14a' in the presence of an applied voltage create a twisted metastable state so as to conform with the orientation of the liquid crystal molecules 30a around the edge portion of the non-solid area 14b, whereby a stable radially-inclined orientation can be formed.

Figure 34A:
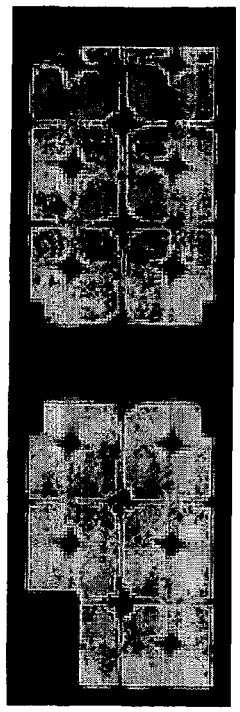
FIG. 34A and FIG. 34B are each a micrograph showing an orientation in the case where a protrusion is provided on a counter substrate.
Figure 34B:
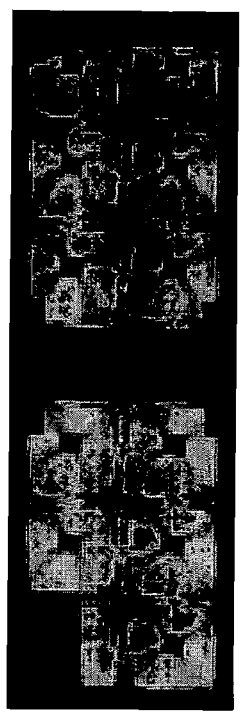
Figure 35A:
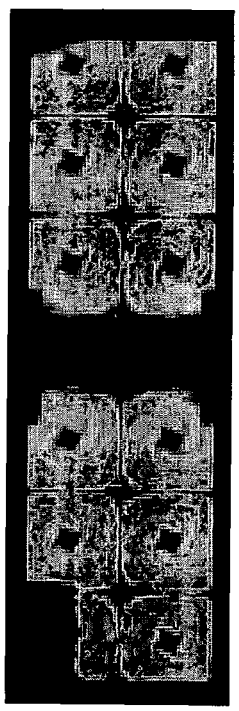
FIG. 35A and FIG. 35B are each a micrograph showing an orientation in the case where a protrusion is provided on a TFT substrate.
Figure 35B:
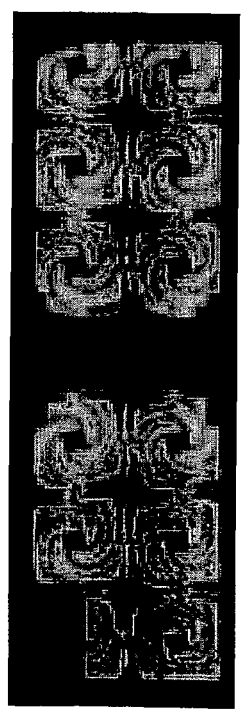

FIG. 34A and FIG. 34B show the orientation in picture element regions in the case where the protrusion 22b is provided on the counter substrate 200b, and FIG. 35A and FIG. 35B show the orientation in the case where the protrusion 18 is provided on the TFT substrate 100a. FIG. 34A to FIG. 35B are each a micrograph showing picture element regions in the presence of an applied voltage. The micrographs in FIG. 34A to FIG. 35B are obtained when a pair of polarization plates are provided in a crossed Nicols state. FIG. 34A and FIG. 35A show the orientation in the case where the polarization axis of the polarization plates is parallel or perpendicular to the top-bottom direction (or the right-left direction) of the sheet of the figures. FIG. 34B and FIG. 35B show the orientation in the case where the polarization axis of the polarization plates is parallel or perpendicular to a direction inclined by about 45° with respect to the top-bottom direction (or the right-left direction) of the sheet of the figures.

As understood by comparing FIG. 34A and FIG. 34B with FIGS. 35A and 35B, even when the protrusion 18 is provided on the TFT substrate 100a, liquid crystal domains taking a radially-inclined orientation is formed in correspondence with each unit solid area 14a' although the orientation state is slightly different from the orientation state obtained when the protrusion 22b is provided on the counter substrate 200b.

Embodiment 3

Figure 36:
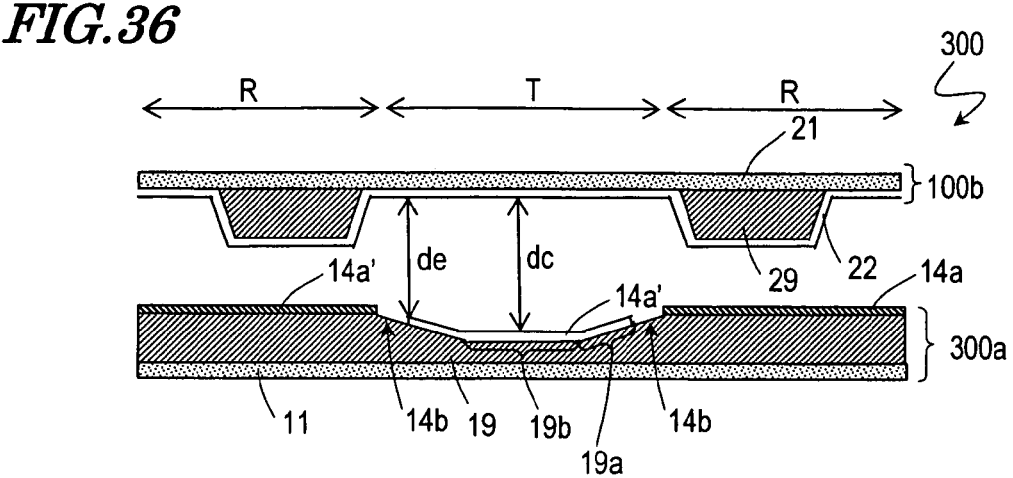
FIG. 36 is a cross-sectional view schematically illustrating a structure of still another liquid crystal display device 300 of the present invention.

A liquid crystal display device 300 of the present embodiment will now be described with reference to FIG. 36. The liquid crystal display device 300 is different from the liquid crystal display device 100 illustrated in FIG. 1A and FIG. 1B in that the thickness de of the liquid crystal layer 30 at an edge portion of the unit solid area 14a' placed in the transmission region T is smaller than the thickness dc of the liquid crystal layer 30 at a central portion of the unit solid area 14a', as illustrated in FIG. 36.

The response speed of the liquid crystal molecules 30a is typically higher as the thickness of the liquid crystal layer 30 (cell gap) is smaller (whereby the effect of the electric field is more significant), and it is generally inversely proportional to the square of the thickness of the liquid crystal layer 30. Therefore, if the thickness de of the liquid crystal layer 30 at the edge portion (outer periphery) of the unit solid area 14a' is smaller than the thickness dc of the liquid crystal layer 30 at the central portion of the unit solid area 14a' as in the present embodiment, the response speed of the liquid crystal molecules 30a above the edge portion of the unit solid area 14a' is higher than that of the liquid crystal molecules 30a above the central portion of the unit solid area 14a'. The liquid crystal molecules 30a above the edge portion are those that trigger the formation of a radially-inclined orientation. Therefore, if the response speed of the liquid crystal molecules 30a above the edge portion is increased, a liquid crystal domain is formed more quickly. As a result, the response speed of the entire region of the liquid crystal layer 30 where a liquid crystal domain is formed is increased. Therefore, the liquid crystal display device 300 of the present embodiment has a desirable response characteristic.

Note that while the response speed can be further increased by decreasing the cell gap across the entire picture element region, it is then necessary to increase the refractive index anisotropy (Δn) of the liquid crystal material to give a predetermined retardation to light passing through the liquid crystal layer 30. With common liquid crystal materials, however, the viscosity increases as the refractive index anisotropy increases, thereby canceling out the advantage of an improved response speed obtained by reducing the cell gap. Therefore, it is not possible to sufficiently improve the response speed by simply reducing the thickness of the liquid crystal layer 30 entirely across the picture element region.

In contrast, in the liquid crystal display device 300 of the present embodiment, the cell gap is reduced only in a portion of the picture element region (a region corresponding to the edge portion of the unit solid area 14a'), and it is not necessary to increase the refractive index anisotropy (Δn) of the liquid crystal material, whereby it is possible to sufficiently improve the response speed.

In order to sufficiently improve the response speed, the difference between the thickness de of the liquid crystal layer 30 at the edge portion of the unit solid area 14a' and the thickness dc of the liquid crystal layer 30 at the central portion thereof is preferably 0.5 μm or more, more preferably 1 μm or more, and even more preferably 1.5 μm or more.

Note that while a structure where the cell gap is smaller at the edge portion of the unit solid area 14a' than at the central portion of the unit solid area 14a' is employed for the transmission region T in the present embodiment, such a structure may alternatively be employed for the reflection region R or for both the transmission region T and the reflection region R. Note, however, that since the reflection region R has a smaller cell gap in the first place, a desirable effect of improving the response speed can be obtained by reducing the cell gap at the edge portion at least in the transmission region T.

In the present embodiment, the thickness de of the liquid crystal layer 30 at the edge portion is made smaller than the thickness dc of the liquid crystal layer 30 at the central portion by setting the height of the surface of the unit solid area 14a' at the edge portion to be larger than that at the central portion of the unit solid area 14a', as illustrated in FIG. 36. More specifically, an interlayer insulating film 19 is provided between the picture element electrode 14 and a transparent substrate 11 with the height of the surface of the interlayer insulating film 19 being locally changed, whereby the surface of the unit solid area 14a' at the edge portion thereof is higher than that at the central portion thereof.

The interlayer insulating film 19 of the present embodiment includes a first region 19a where the height of the surface thereof on the side closer to the liquid crystal layer 30 changes continuously and a second region 19b where the height of the surface thereof on the side closer to the liquid crystal layer 30 is substantially constant. The edge portion of the unit solid area 14a' in the transmission region T is located on the first region 19a and the central portion of the unit solid area 14a' is located on the second region 19b.

In view of the display quality, it is preferred that the inclination angle of the first region 19a of the interlayer insulating film 19 (the inclination angle with respect to the surface of the substrate 11) is small. Since the vertical alignment film formed on the first region 19a has an orientation-regulating force for orienting the liquid crystal molecules 30a vertical to the surface thereof, the liquid crystal molecules 30a on the first region 19a are oriented in an inclined direction with respect to the surface of the substrate 11. The degree of inclination of the liquid crystal molecules 30a is larger as the inclination angle of the first region 19a is larger. Since the orientation-regulating force from the vertical alignment film exists irrespective of the presence/absence of a voltage application, light leakage occurs in a black display due to the inclined liquid crystal molecules 30a above the first region 19a. Therefore, if the inclination angle of the first region 19a of the interlayer insulating film 19 is excessively large, the contrast ratio decreases. Thus, the inclination angle of the first region 19a of the interlayer insulating film 19 is preferably small, and the interlayer insulating film 19 preferably has a gentle slope. Specifically, the inclination angle of the first region 19a of the interlayer insulating film 19 with respect to the surface of the substrate 11 is preferably 30° or less, and more preferably 20° or less.

Note that if the height of the surface of the unit solid area 14a' changes continuously across the entire unit solid area 14a', the retardation of the liquid crystal layer 30 is no longer constant across the unit solid area 14a', whereby the display quality may deteriorate. In such a case, it is difficult to suitably compensate for the phase difference by using a phase difference compensator. In the case where the interlayer insulating film 19 includes the second region 19b where the height of the surface on the side closer to the liquid crystal layer 30 is substantially constant, as in the present embodiment, such problems can be suppressed.

The interlayer insulating film 19 having a gentle slope as described above can be formed by, for example, exposing and developing a photosensitive resin film using a photomask and then thermally deforming the film in a heat treatment. Specifically, the interlayer insulating film 19 having a gentle slope as illustrated in FIG. 36 can be obtained by first forming a photosensitive resin film on the surface of the transparent substrate 11, exposing the film using a photomask so that a portion corresponding to the reflection region R is unexposed while a portion corresponding to the transmission region T is exposed to a predetermined amount of light, developing the film, and then subjecting the film to a heat treatment at a predetermined temperature. Note that the exposure process is performed with such an exposure value that a portion of the photosensitive resin film corresponding to the transmission region T will not be completely removed but will partly remain after the development process. Such an exposure process is sometimes called a "half exposure process".

Figure 37:
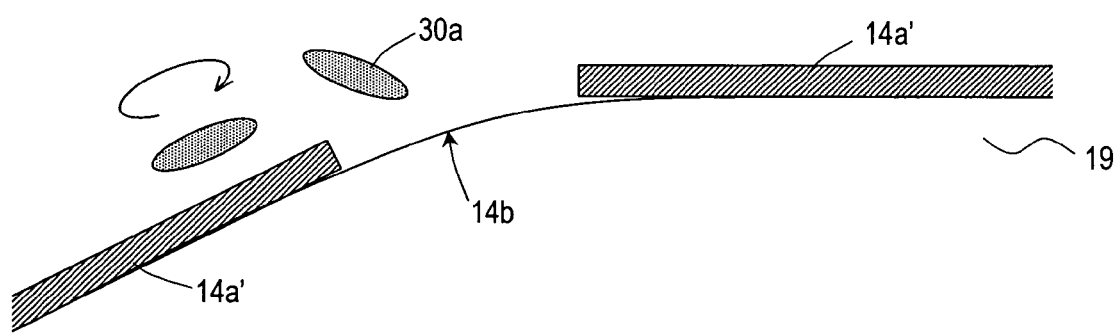
FIG. 37 is an enlarged cross-sectional view illustrating an edge portion of a unit solid area of the liquid crystal display device 300.

Note that with an arrangement where the cell gap is locally reduced at the edge portion of the unit solid area 14a', as in the present embodiment, it is preferred to employ a display mode using circularly-polarized light, i.e., a display mode in which light to be incident upon the liquid crystal layer 30 is circularly-polarized light and the circularly-polarized light is modulated through the liquid crystal layer 30 to display an image. The reason for this will now be described with reference to FIG. 37. FIG. 37 is an enlarged cross-sectional view illustrating an edge portion of the unit solid area 14a' in the presence of an applied voltage.

As illustrated in FIG. 37, if the edge portion of the unit solid area 14a' is formed on an inclined surface, the degree of continuity may be poor between the orientation of the liquid crystal molecules 30a above the edge portion of the unit solid area 14a' and that above the non-solid area 14b in the presence of an applied voltage. Therefore, referring to FIG. 37, the liquid crystal molecule 30a above the edge portion once falls down due to the electric field effect, after which it changes the azimuth angle of its orientation as indicated by an arrow in FIG. 37 so as to maintain a degree of orientation continuity with other adjacent liquid crystal molecules 30a. Thus, the liquid crystal molecules 30a near the edge portion show a two-step response behavior in response to a voltage application. The second step, in which the azimuth angle of orientation changes slowly, causes a change in the transmittance (brightness) in a display mode using linearly-polarized light, whereby it may not be possible in such a display mode to obtain a sufficient effect of improving the response speed by locally decreasing the cell gap at the edge portion of the unit solid area 14a'. In contrast, in a display mode using circularly-polarized light, the change in the azimuth angle of the liquid crystal molecules 30a does not substantially influence the transmittance, whereby it is possible to obtain a desirable effect of improving the response speed.

A display mode using circularly-polarized light can be realized by, for example, providing a circular polarization plate (e.g., a combination of a linear polarization plate and a λ/4 plate) on both sides of the liquid crystal layer 30.

Embodiment 4

Figure 38A:
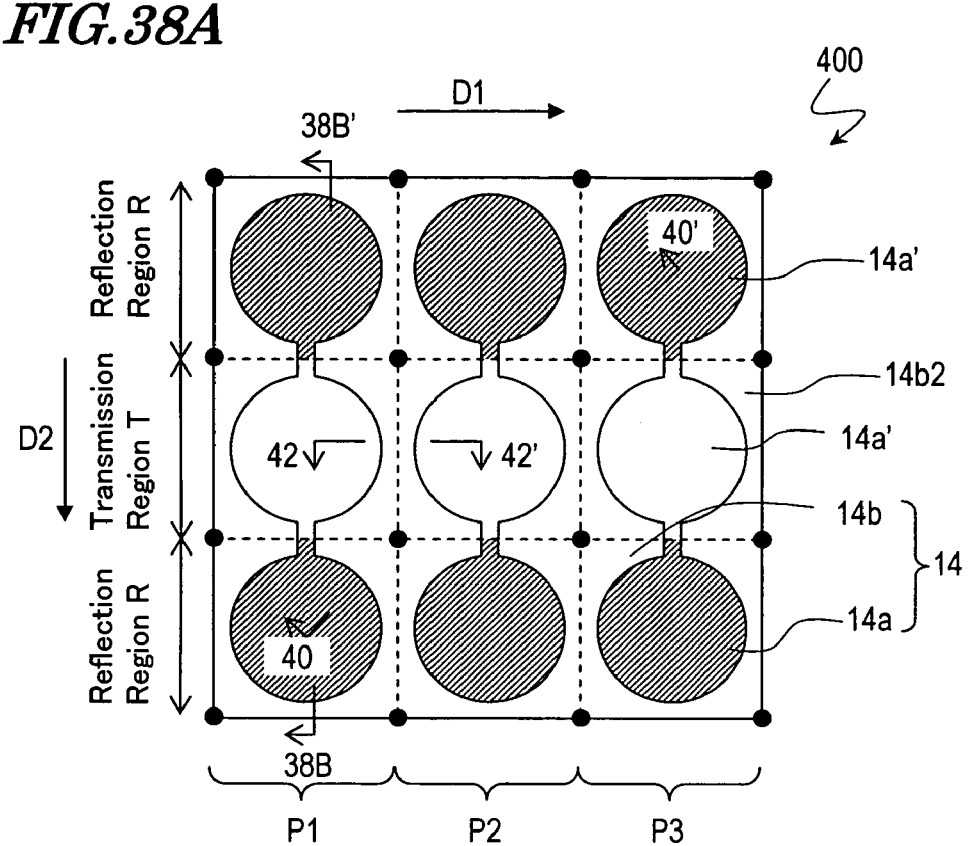
Figure 38B:
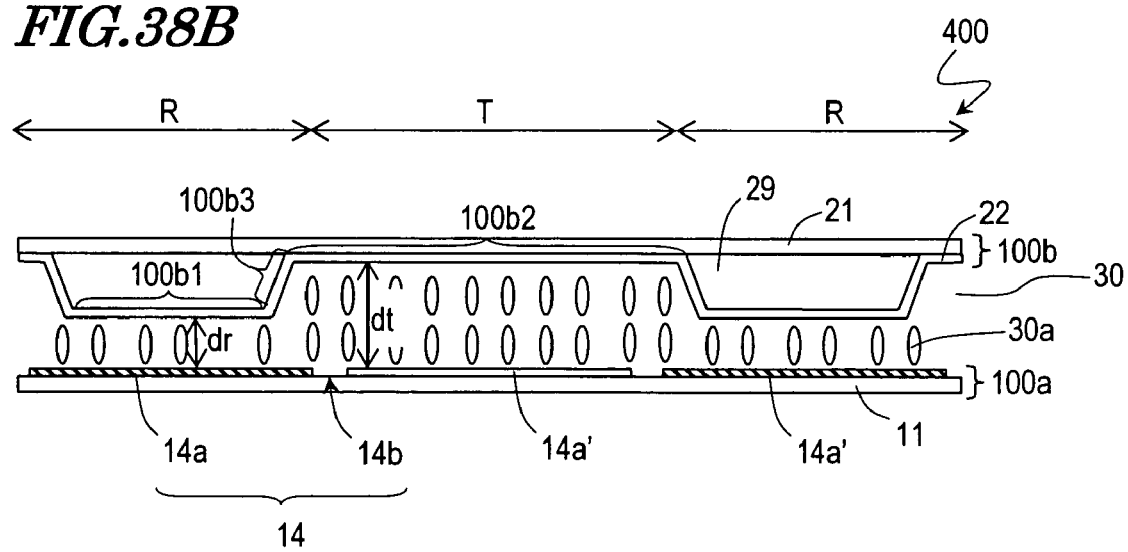

With reference to FIG. 38A and FIG. 38B, a liquid crystal display device 400 of the present embodiment will be described. FIG. 38A is a plan view of three picture element regions P1, P2 and P3 of the liquid crystal display device 400 as viewed in a substrate normal direction. FIG. 38B is a cross-sectional view taken along line 38B-38B' of FIG. 38A.

A plurality of picture element regions of the liquid crystal display device 400 are arranged in a matrix, i.e., in rows and columns. FIG. 38A shows the row direction by arrow D1 and the column direction by arrow D2. The three picture element regions P1, P2 and P3 are adjacent to one another in the row direction D1. The row direction D1 and the column direction. D2 will also be referred to as the "periodic arrangement directions" of picture elements (picture element regions). Typically, the row direction D1 and the column direction D2 are perpendicular to each other. In the present embodiment, each picture element region (picture element) has a generally oblong rectangular shape with a shorter side along the row direction D1 and a longer side along the column direction D2. Therefore, the picture element regions are arranged at different periods (referred to as the "picture element pitches") in the row direction D1 and in the column direction D2. In this specification, one of the two periodic arrangement directions in which the picture elements are arranged is referred to as the "row direction", and the other periodic arrangement direction is referred to as the "column direction", for the sake of convenience. In other words, the row direction may be defined in either the vertical direction or the horizontal direction of the display plane, and the same is true with the column direction.

Figure 39:
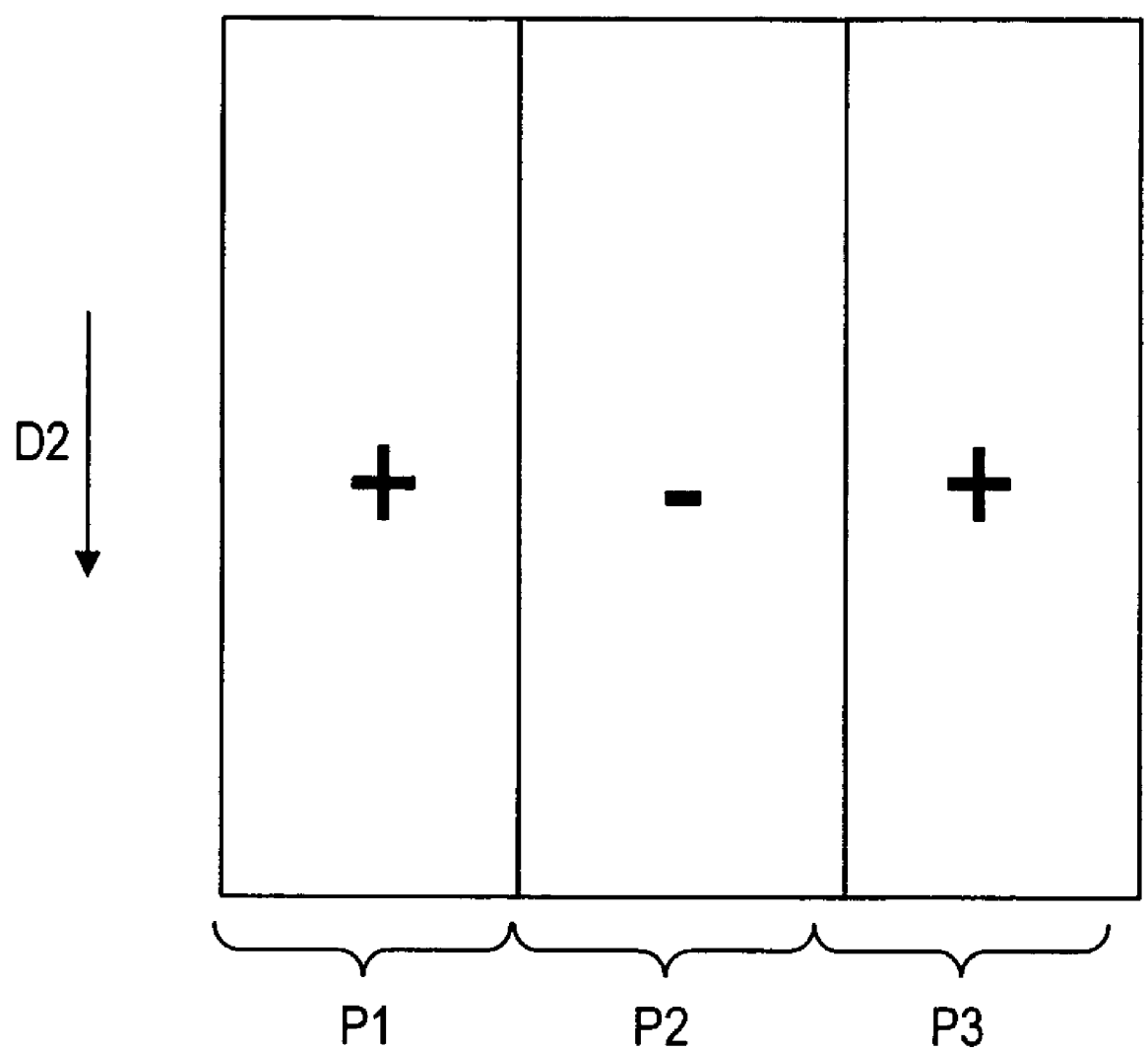
FIG. 39 schematically illustrates picture element regions adjacent in a row direction which are supplied with voltages of different polarities.

In the liquid crystal display device 400 in the present embodiment, as illustrated in FIG. 39, every two picture elements adjacent to each other in the row direction D1 are inversely driven in a period in which data is written to all the picture elements (1 frame). Regions of liquid crystal layer 30 corresponding to the picture element regions P1 and P3 indicated with "+" in FIG. 39 are supplied with a voltage of a different (the opposite) polarity to the polarity of the voltage supplied to a region of the liquid crystal layer 30 corresponding to picture element region P2 indicated with "−".

Figure 40A:
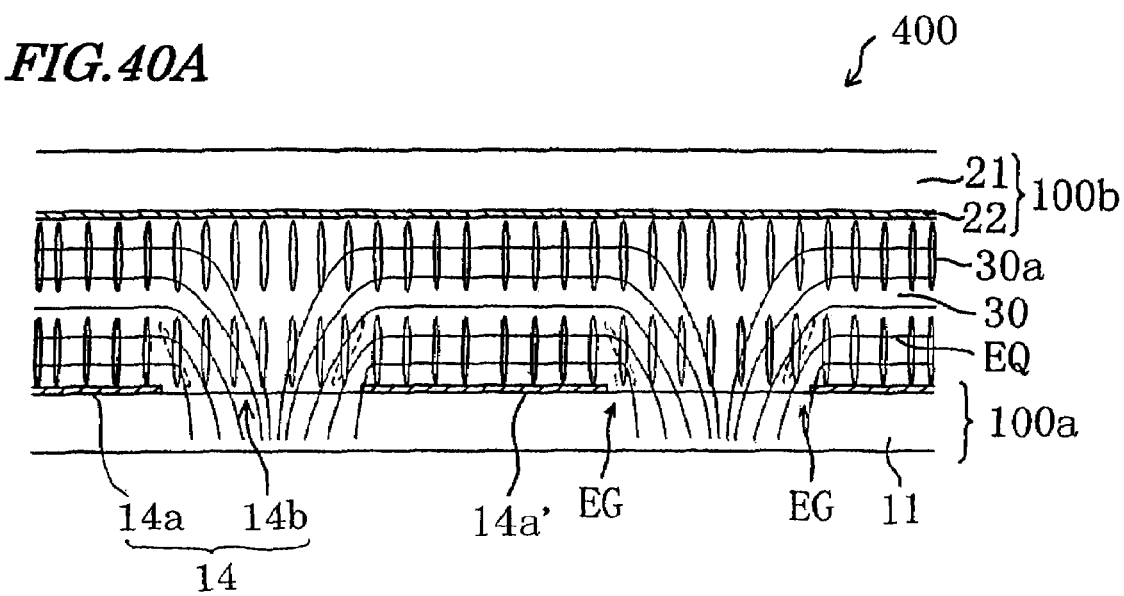
FIG. 40A and FIG. 40B illustrate a liquid crystal layer 30 of the liquid crystal display device 400 in the presence of an applied voltage thereacross, wherein FIG. 40A schematically illustrates a state where an orientation has just started to change (initial ON state), and FIG. 40B schematically illustrates a steady state.
Figure 40B:
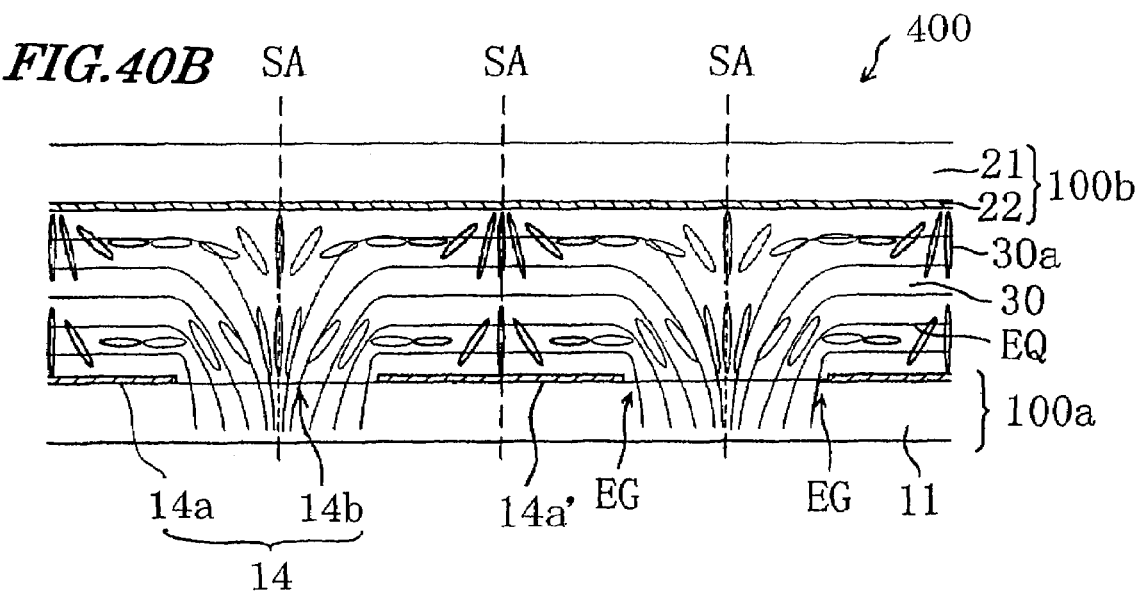

FIG. 40A and FIG. 40B illustrate the liquid crystal layer 30 of the liquid crystal display device 400 in the presence of an applied voltage. FIG. 40A schematically illustrates a state where the orientation of the liquid crystal molecules 30a has just started to change (initial ON state) according to the voltage applied across the liquid crystal layer 30. FIG. 40B schematically illustrates a state where the orientation of the liquid crystal molecules 30a has changed and become steady according to the applied voltage. FIG. 40A and FIG. 40B are cross-sectional views taken along line 40-40' of FIG. 38A, but the stepped portions of the counter substrate 100b are omitted for the sake of simplicity.

Figure 41:
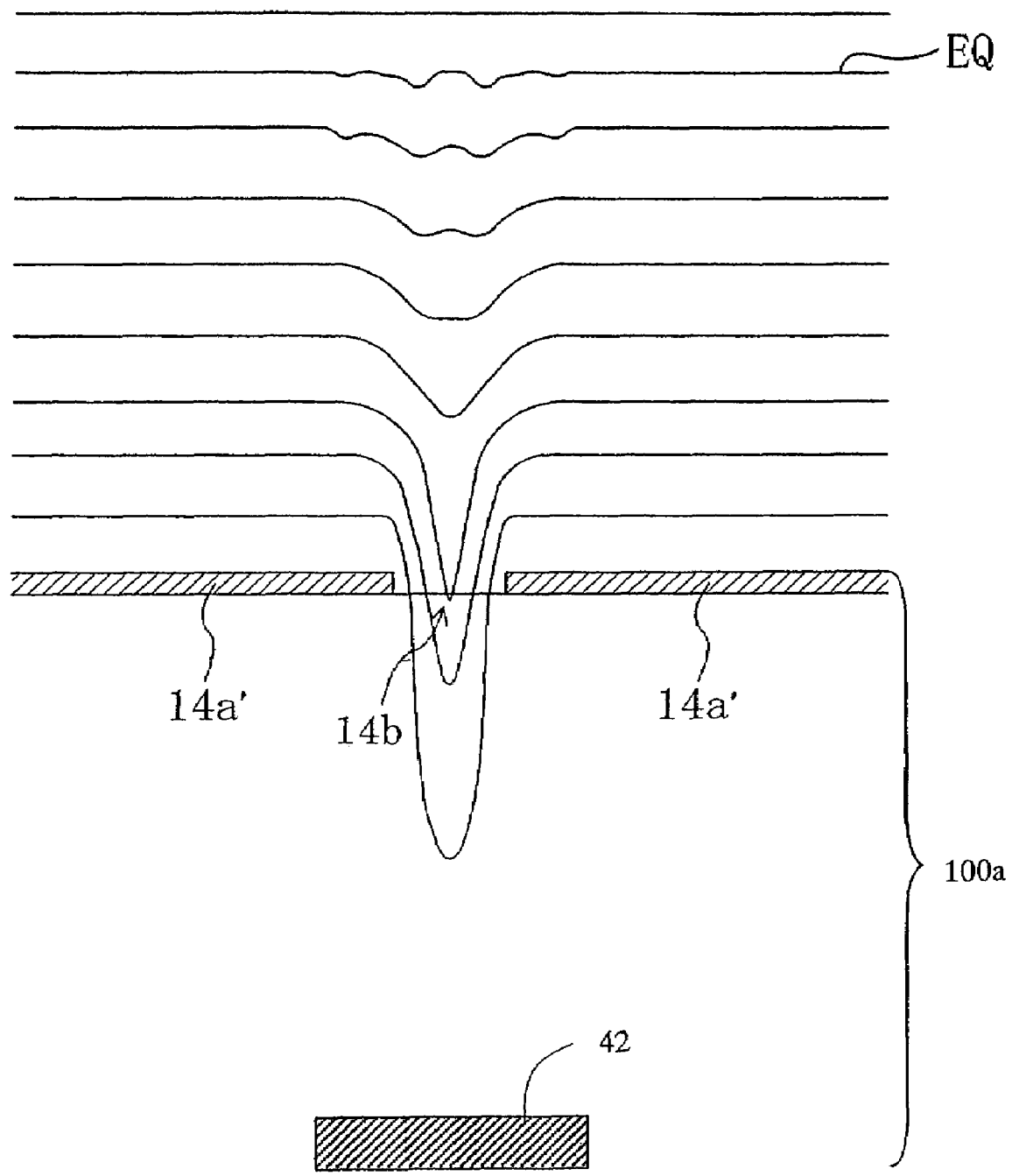
FIG. 41 schematically illustrates equipotential lines EQ obtained when voltages of the same polarity are applied to two picture element regions adjacent to each other in the row direction.
Figure 42:
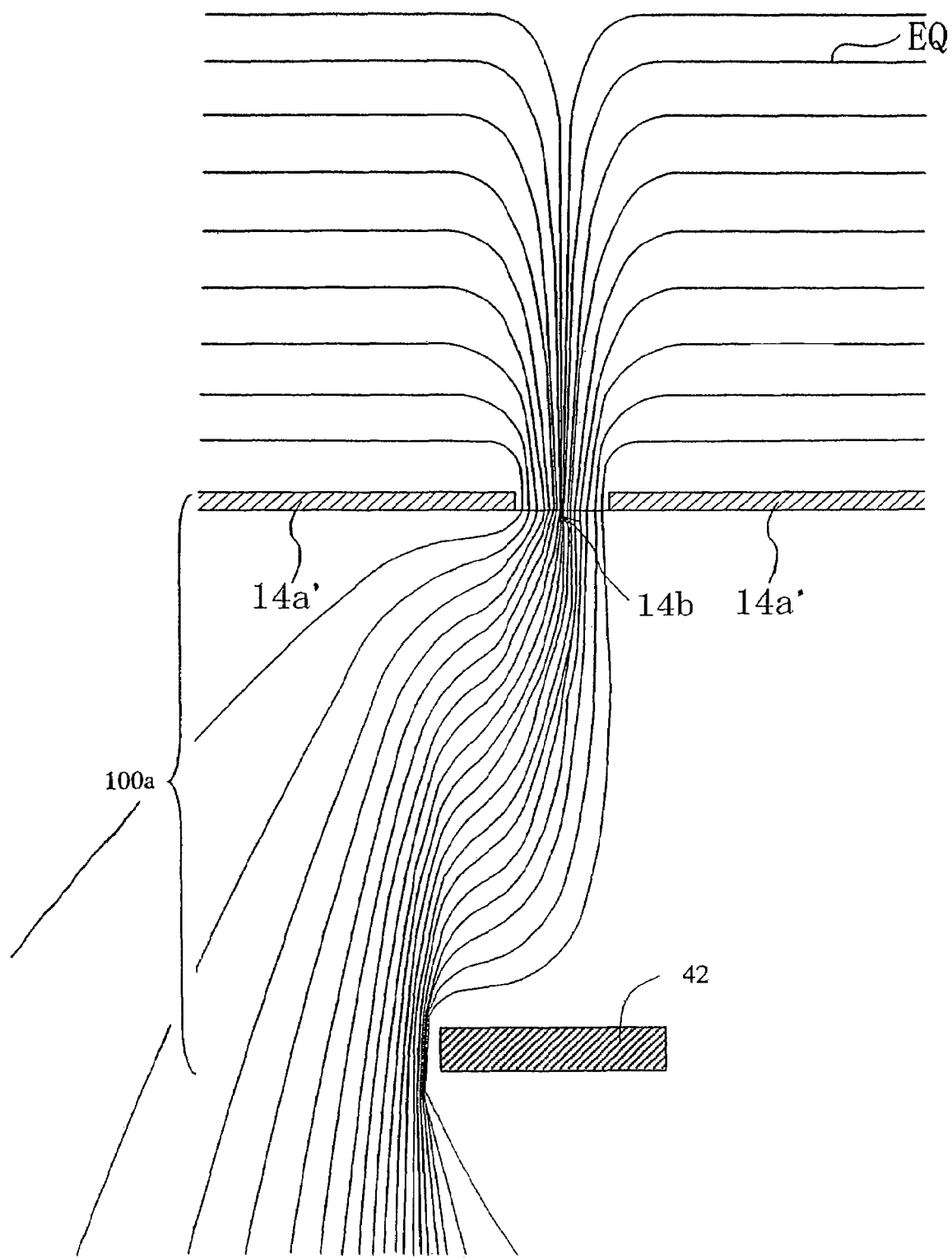
FIG. 42 schematically illustrates equipotential lines EQ obtained when voltages of different polarities are applied to two picture element regions adjacent to each other in the row direction.

When a voltage is applied across the liquid crystal layer 30, an inclined electric field is formed in an edge portion of the non-solid area 14b as illustrated in FIG. 40A. By the inclined electric field, the liquid crystal molecules 30a in the liquid crystal layer 30 take a radially-inclined orientation as illustrated in FIG. 40B. In the present embodiment, since every two picture elements adjacent to each other in the row direction D1 are inversely driven, a strong inclined electric field can be generated between the picture element regions adjacent to each other in the row direction D1. The reason for this will be described with reference to FIG. 41 and FIG. 42. FIG. 41 and FIG. 42 show bus lines provided on the transparent substrate 11 (e.g., signal lines) with no omission.

When voltages of the same polarity are applied across the liquid crystal layer in two adjacent picture element regions, as illustrated in FIG. 41, the equipotential lines EQ are continuous in the two adjacent picture element regions although once dropping in a region corresponding to the non-solid area 14b. By contrast, when voltages of different polarities are applied across the liquid crystal layer in two adjacent picture element regions, as illustrated in FIG. 42, the equipotential lines EQ which represent the electric fields respectively generated in the two picture element regions are not continuous to each other, but drastically drop in a region corresponding to the non-solid area 14b. As a result, a steep potential gradient is formed in the edge portion of the non-solid area 14b, i.e., in the vicinity of the unit solid areas 14a', which generates a stronger inclined electric field than that illustrated in FIG. 41.

In order to generate an inclined electric field which is sufficient to provide a stable radially-inclined orientation, the interval between the picture element electrodes 14 in adjacent picture element regions (i.e., the interval between the solid areas 14a of the picture element electrodes 14) needs to have a certain width. In the present embodiment, the polarity of driving voltage is inverted for every picture element in the row direction D1 such that every two picture elements adjacent to each other in the row direction D1 are driven by opposite polarities. In such a case, a sufficient orientation-regulating force is obtained even with a shorter interval between the picture element regions, as compared with the case where the polarity of driving voltage is not inverted in the row direction D1. Thus, it is possible to employ a structure in which the interval between the picture element electrodes 14 adjacent in the row direction D1 is shorter so as to increase the aperture ratio.

In the present embodiment, the polarity of driving voltage is inverted for every picture element along the shorter side of the picture element region. Alternatively, the polarity of driving voltage may be inverted for every picture element along the longer side of the picture element region. Notably, it is preferred to invert the polarity of driving voltage for the picture elements at least along the shorter side of the picture element region. The reason is that such driving generates a strong inclined electric field in the vicinity of the longer side of the picture element region and thus provides a high effect of stabilizing the orientation of the liquid crystal molecules in the entire picture element region.

Figure 43A:
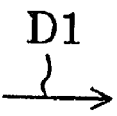
FIG. 43A to FIG. 43C each illustrate an exemplary driving method used for a liquid crystal display device of the present invention.

Referring to FIG. 43A, as long as the polarity of driving voltage is inverted for every picture element in the row direction D1 (one of the two periodic arrangement directions), the aperture ratio can be sufficiently improved even though the polarity of driving voltage is not inverted for the picture elements in the column direction D2 (the other periodic arrangement direction) (i.e., so-called source line inversion driving or gate line inversion driving). For the purpose of, for example, suppressing flicker, it is preferred to invert the polarity of driving voltage for every picture element in the row direction D1 and also invert the polarity of driving voltage for every n rows of picture elements in the column direction D2 (n is an integer of 1 or greater). Namely, the polarity of voltage applied across the liquid crystal layer corresponding to the same column of picture element regions is preferably inverted for every n rows in one frame.

Figure 43B:
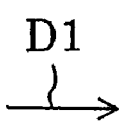
Figure 43C:
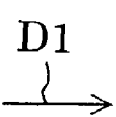

As illustrated in FIG. 43B, the polarity of driving voltage may be inverted for every two rows of picture elements in the column direction D2 (so-called 2H dot inversion driving). As illustrated in FIG. 43C, the polarity of driving voltage may be inverted for every picture element in the column direction D2 (so-called dot inversion driving). In the case where, as illustrated in FIG. 43C, the polarity of driving voltage is inverted for every picture element in the row direction D1 and also for every picture element in the column direction D2, the interval between the picture element electrodes 14 adjacent in the column direction D2 can be shortened, thus further improving the aperture ratio.

In the present embodiment, the unit solid areas 14a' are arranged in one line in each picture element region. Even where the unit solid areas 14a' are arranged in a plurality of lines in each picture element region, substantially the same effect can be provided by inverting the polarity of driving voltage for the picture elements in one of the two periodic arrangement directions. In the case where the unit solid areas 14a' are arranged in one line, the area ratio of the unit solid areas 14a' in the picture element region can be increased and thus the ratio of the area contributing to display in the picture element region (effective aperture ratio) can be increased. The reason for this will be described with reference to FIG. 44 and FIG. 45.

Figure 45:
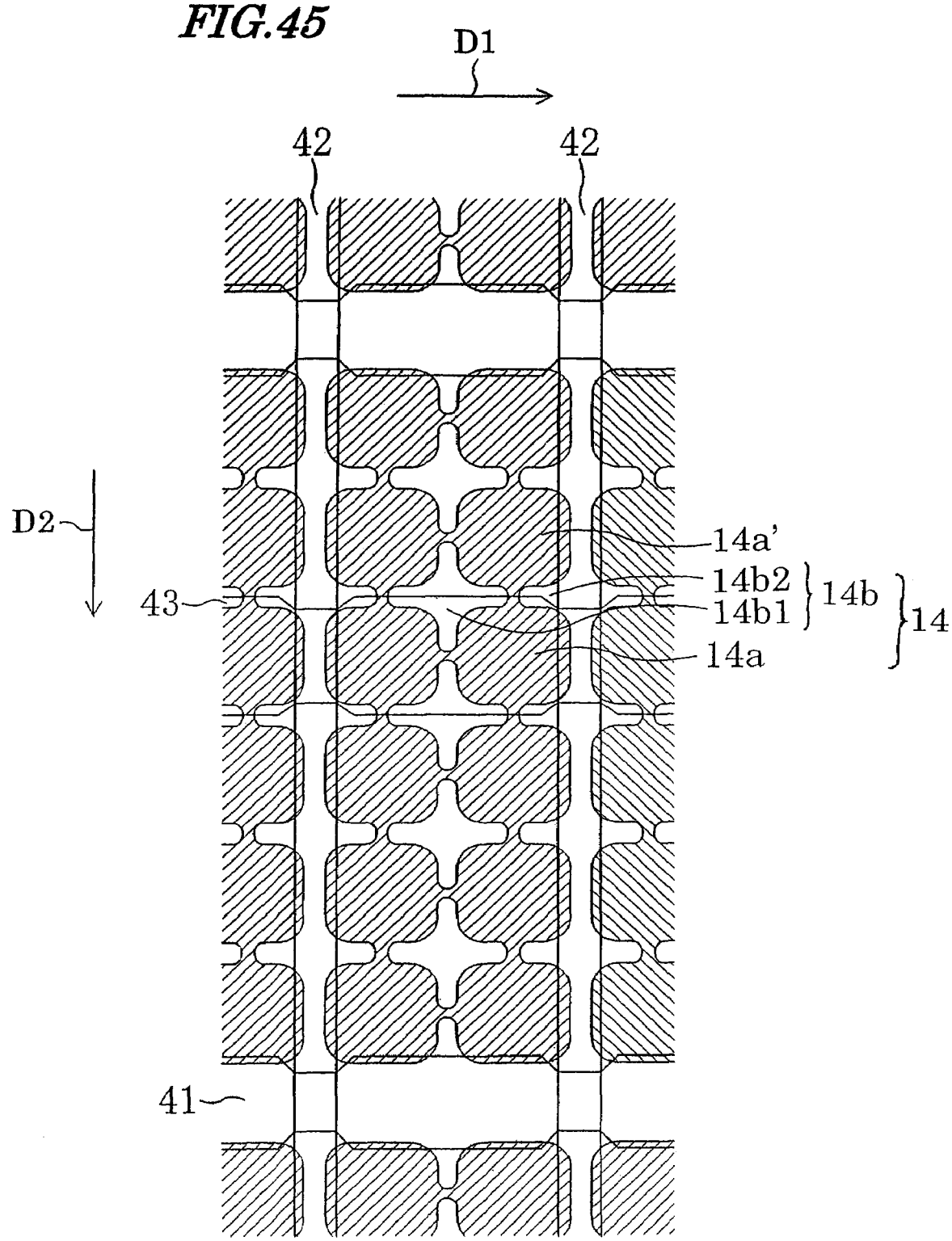
FIG. 45 illustrates a structure of a picture element electrode in which unit solid areas are arranged in two lines.

As illustrated in FIG. 44 and FIG. 45, the TFT substrate 100a, in actuality, includes gate bus lines (scanning lines) 41 extending parallel to one another in the row direction D1 and source bus lines (signal lines) 42 extending parallel to one another in the column direction D2. The gate bus lines 41 are each electrically connected to a respective gate electrode of a TFT (not shown) provided for each picture element region. The source bus lines 42 are each electrically connected to a respective source electrode of the TFT. A drain electrode of the TFT is electrically connected to the picture element electrode 14. The TFT substrate 100a also includes storage capacitance lines 43.

In the structure illustrated in FIG. 44, a plurality of unit solid areas 14a' are arranged in one line in one picture element region. Thus, a part of the non-solid area 14b (cut-out area 14b2) overlaps the gate bus line 41 or the source bus line 42 and is located outside the picture element region.

In the structure illustrated in FIG. 45, a plurality of unit solid areas 14a' are arranged in two or more lines. In such a case, the picture element region includes an opening 14b1 surrounded by the unit solid areas 14a'. This opening 14b1 is entirely located in the picture element region. As a result, the area ratio of the non-solid area 14b in the picture element region is increased, and the area ratio of the solid area 14a in the picture element region is decreased.

By contrast, in the structure illustrated in FIG. 44 where the plurality of unit solid areas 14a' are arranged in one line in each picture element region, at least a part of each cut-out area 14b is outside the picture element region, which can decrease the area ratio of the unit solid area 14b and increase the area ratio of the solid area 14a in the picture element region. As a result, the aperture ratio can be improved.

Here, improvement in the aperture ratio of a liquid crystal display device having particular specifications will be specifically described. A liquid crystal display device, in which the display area is 15 inches by the diagonal length, the unit solid areas 14a' are square with generally arc-shaped corner portions (illustrated in FIG. 44), the light shielding layers on the gate bus lines and the source bus lines have a width of 12 μm, and the interval between the unit solid areas 14a' is 8.5 μm, was used. With this liquid crystal display device, the transmittance obtained where the unit solid areas 14a' are arranged in one line and the transmittance obtained where the unit solid areas 14a' are arranged in a plurality of lines were compared. Where the unit solid areas 14a' are arranged in one line, the transmittance was improved as compared where the unit solid areas 14a' are arranged in a plurality of lines by 6% in SXGA (1280×1024 pixels), by 9% in UXGA (1600×1200 pixels), and by 11% in QXGA (2048×1536 pixels). The effect of increasing the aperture ratio provided by arranging the unit solid areas 14a' in one line in a picture element region is especially high in high precision liquid crystal display devices.

In the structures illustrated in FIG. 44 and FIG. 45 where the picture element electrodes 14 partially overlap the gate bus lines 41 and the source bus lines 42, it is preferred to form the picture element electrodes 14 on an insulating film (e.g., an organic insulating film) which is provided on the bus lines, so that the influence from the bus lines is minimized.

Using the above-described liquid crystal display device (in which the display area is 15 inches by the diagonal length, the unit solid areas 14a' are square with generally arc-shaped corner portions, the light shielding layers on the gate bus lines and the source bus lines have a width of 12 μm, and the interval between the unit solid areas 14a' is 8.5 μm), the orientation stability when the polarity of driving voltage is inverted for every picture element in the row direction D1 was compared with the orientation stability when the polarity of driving voltage is not inverted. When the polarity is not inverted in the row direction D1, the interval between the picture element electrodes 14 (more strictly, the interval between the solid areas 14a of the picture element electrodes 14) required to realize a stable radially-inclined orientation was 8.5 µm, which is equal to the interval between the unit solid areas 14a' in the picture element region. By contrast, when the polarity is inverted in the row direction D1, a stable radially-inclined orientation was obtained even when the interval between the picture element electrodes 14 adjacent in the row direction D1 was as short as 3 µm.

Embodiment 5

Figure 46A:
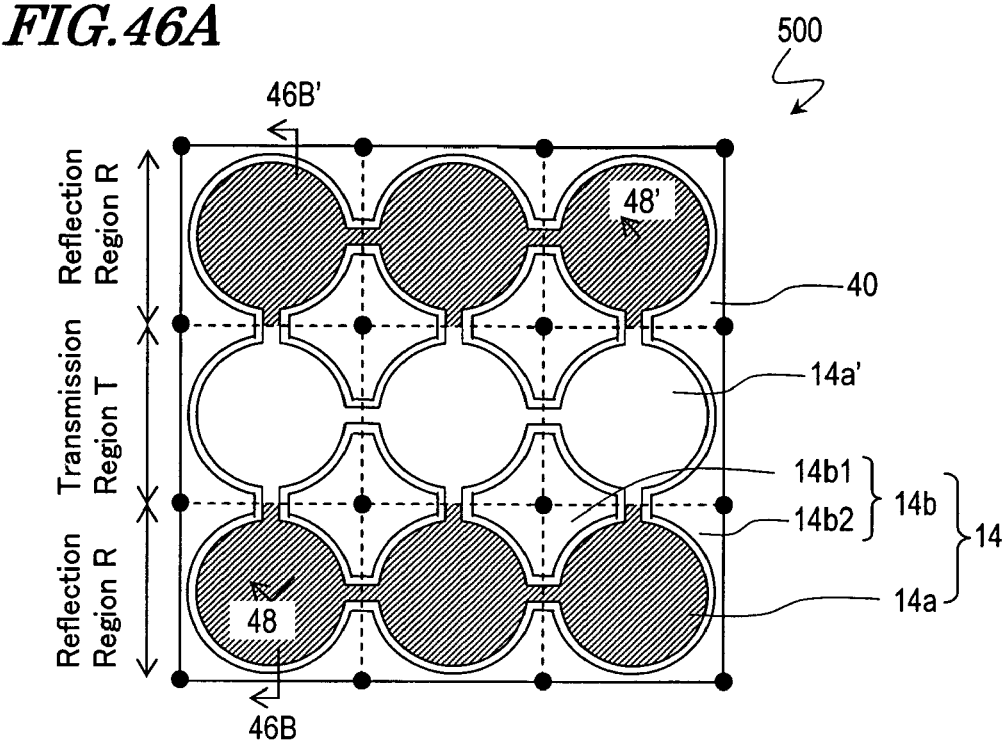
Figure 46B:
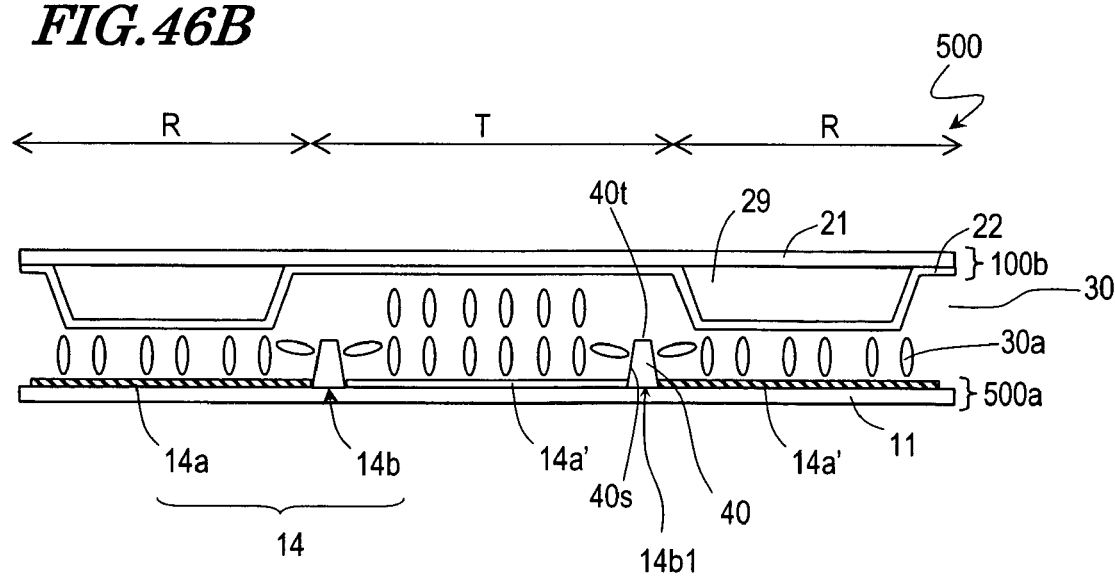

With reference to FIG. 46A and FIG. 46B, a structure of a liquid crystal display device 500 of the present embodiment will be described. FIG. 46A is a plan view of the liquid crystal display device 500 as viewed in a substrate normal direction, and FIG. 46B is a cross-sectional view taken along line 46B-46B' of FIG. 46A. FIG. 46B illustrates a state where no voltage is applied across the liquid crystal layer 30.

As illustrated in FIG. 46A and FIG. 46B, the liquid crystal display device 500 is different from the liquid crystal display device 100 illustrated in FIG. 1A and FIG. 1B in that a TFT substrate 500a of the liquid crystal display device 500 includes a protrusion 40 on the non-solid area 14b of the picture element electrode 14. A vertical alignment film (not shown) is provided on a surface of the protrusion 40.

As illustrated in FIG. 46A, the shape of the cross section of the protrusion 40 in a plane of the transparent substrate 11 is conformed to the shape of the boundary between the solid area 14a and the non-solid area 14b. The cross-sectional shape of a protrusion 40 located in the opening 14b1 is the same as (more strictly, similar to) the shape of the opening 14b1, and is generally star-like in this embodiment. The cross-sectional shape of a protrusion 40 located in the cut-out area 14b2 is the same as (more strictly, similar to) the shape of the cut-out area 14b2, and corresponds to a half or a quarter of the shape of the protrusion 40 in the opening 14b1. As illustrated in FIG. 46B, the shape of the cross section of the protrusion 40 in a plane vertical to the transparent substrate 11 is trapezoidal. More specifically, the protrusion 40 has a top surface 40t parallel to the substrate plane and a side surface 40s inclined with respect to the substrate plane at taper angle θ (<90°). Since the vertical alignment film (not shown) is formed so as to cover the protrusion 40, the side surface 40s of the protrusion 40 has an orientation-regulating force exerted on the liquid crystal molecules 30a in the liquid crystal layer 30 in the same direction as that of the orientation-regulating force exerted by the inclined electric field. The orientation-regulating force of the side surface 40s acts to stabilize the radially-inclined orientation.

With reference to FIG. 47A to FIG. 47D, and FIG. 48A and FIG. 48B, the action of the protrusion 40 will be described.

First, with reference to FIG. 47A to FIG. 47D, the relationship between the orientation of the liquid crystal molecules 30a and the shape of a surface providing a vertical orientation will be described.

Figure 47A:
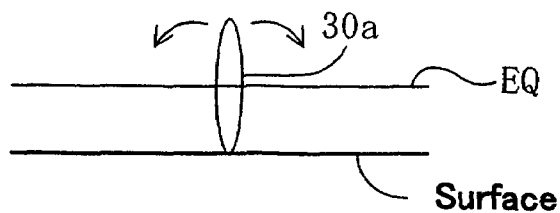
FIG. 47A to FIG. 47D schematically illustrate the relationship between the orientation of the liquid crystal molecules and the shape of the surface providing a vertical orientation.

As illustrated in FIG. 47A, a liquid crystal molecule 30a on a horizontal surface is vertically oriented with respect to the surface by the orientation-regulating force of a surface providing a vertical orientation (typically, the surface of a vertical alignment film). When an electric field represented by an equipotential line EQ vertical to the axial orientation of the liquid crystal molecule 30a is applied to the liquid crystal molecule 30a in such a vertical orientation, a torque for inclining the liquid crystal molecule 30a clockwise and a torque for inclining the liquid crystal molecule 30a counterclockwise act upon the liquid crystal molecule 30a at an equal probability. Therefore, the liquid crystal layer 30 between two parallel plate-shaped electrodes includes both the liquid crystal molecules 30a receiving a clockwise torque and the liquid crystal molecules 30a receiving a counterclockwise torque in a mixed state. As a result, a change to the orientation in accordance with the voltage applied across the liquid crystal layer 30 may not smoothly occur.

Figure 47B:
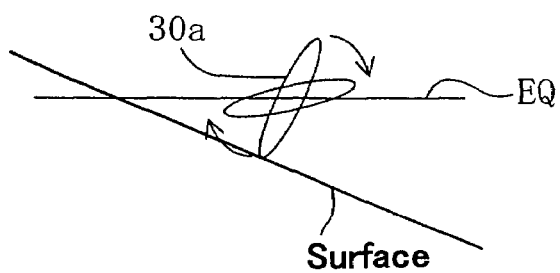
Figure 47C:
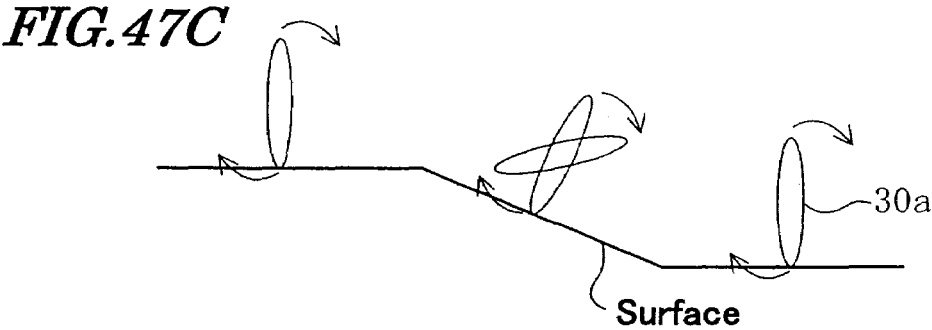

As illustrated in FIG. 47B, when an electric field represented by a horizontal equipotential line EQ is applied to a liquid crystal molecule 30a oriented vertical to the inclined surface, the liquid crystal molecule 30a is inclined in a direction in which the liquid crystal molecule 30a can be parallel to the equipotential line EQ by a smaller inclination angle (clockwise in FIG. 47B). As illustrated in FIG. 47C, a liquid crystal molecule 30a oriented vertical to the horizontal surface is inclined in the same direction as the liquid crystal molecule 30a located on the inclined surface (clockwise), such that the orientation direction of the liquid crystal molecule 30a on the horizontal surface is continuous (in conformity) with the orientation direction of the liquid crystal molecule 30a oriented vertical to the inclined surface.

Figure 47D:
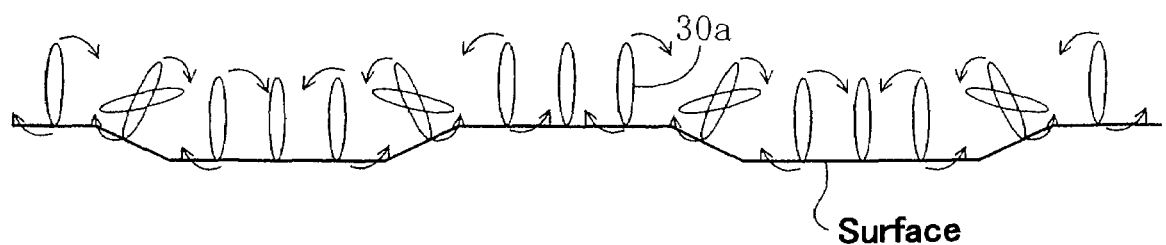

As illustrated in FIG. 47D, on a surface having a continuous concave/convex pattern and thus having a continuous trapezoidal cross section, liquid crystal molecules 30a on the top surface and the bottom surface are oriented in such a direction as to be in conformity with the orientation direction regulated by the liquid crystal molecules 30a on the inclined surfaces.

The liquid crystal display device of the present embodiment stabilizes the radially-inclined orientation by matching the direction of the orientation-regulating force exerted by such a shape of the surface (protrusion) with the orientation-regulating force exerted by the inclined electric field.

FIG. 48A and FIG. 48B each illustrate the liquid crystal display device 500 in a state obtained by applying an electric field across the liquid crystal layer 30 illustrated in FIG. 46B. FIG. 48A schematically illustrates a state where the orientation of the liquid crystal molecules 30a has just started to change (initial ON state) according to the voltage applied across the liquid crystal layer 30. FIG. 48B schematically illustrates a state where the orientation of the liquid crystal molecules 30a has changed and become steady according to the applied voltage. Curves EQ represent equipotential lines. FIG. 48A and FIG. 48B are each a cross-sectional view taken along line 48-48' of FIG. 46A, but the stepped portions of the counter substrate 100b are omitted for the sake of simplicity.

When the picture element electrode 14 and the counter electrode 22 are at the same potential (in the absence of a voltage applied across the liquid crystal layer 30), the liquid crystal molecules 30a in the picture element region are oriented vertical to the surface of the substrates 11 and 21 as illustrated in FIG. 46B. In this state, the liquid crystal molecules 30a in contact with the vertical alignment film (not shown) on the side surface 40s of the protrusion 40 are oriented vertical to the side surface 40s, and the liquid crystal molecules 30a in the vicinity of the side surface 40s are inclined by the mutual action with the surrounding liquid crystal molecules 30a (by the nature as an elastic body).

When a voltage is applied across the liquid crystal layer 30, a potential gradient represented by the equipotential lines EQ illustrated in FIG. 48A is formed. The equipotential lines EQ are parallel to the surface of the solid area 14a of the picture element electrode 14 and the surface of the counter electrode 22 in regions of the liquid crystal layer 30 between the solid area 14a and the counter electrode 22. The equipotential lines EQ drop in a region corresponding to the non-solid area 14b of the picture element electrode 14. In a region of the liquid crystal layer 30 corresponding to an edge portion EG of the non-solid area 14b (in the vicinity of the inner periphery of the non-solid area 14b including the boundary between the non-solid area 14b and the solid area 14a), an inclined electric field represented by the inclined equipotential lines EQ is formed.

As described above and indicated by arrows in FIG. 48A, by virtue of the inclined electric field, the liquid crystal molecules 30a on the edge portion EG on the right of the opening 14b1 (in FIG. 48A) are inclined (rotated) clockwise whereas the liquid crystal molecules 30a on the edge portion EG on the left of the opening 14b1 (in FIG. 48A) are inclined (rotated) counterclockwise. As a result, the liquid crystal molecules 30a on the edge portions EG are oriented parallel to the equipotential lines EQ. The orientation-regulating direction provided by the inclined electric field is the same as the orientation-regulating direction provided by the side surface 40s of the protrusion 40 at the edge portions EG.

As described above, when a change in the orientation direction starting from the liquid crystal molecules 30a on the inclined part of the equipotential lines EQ proceeds and the orientation reaches the steady state, the orientation illustrated in FIG. 48B is obtained. The liquid crystal molecules 30a located in the central portion of the opening 14b1, i.e., at about the center of the top surface 40t of the protrusion 40 are equally influenced by the orientation of the liquid crystal molecules 30a at opposing edge portions EG of the opening 14b1, and therefore remain oriented vertical to the equipotential lines EQ. The liquid crystal molecules 30a far from the central portion of the opening 14b1 (the top surface 40t of the protrusion 40) are inclined by the influence of the orientation of the liquid crystal molecules 30a in the respective edge portion EG close thereto, and therefore form a symmetrically inclined orientation with respect to the center SA of the opening 14b1 (the top surface 40t of the protrusion 40). Also in a region corresponding to the unit solid area 14a' substantially surrounded by the opening 14b1 and the protrusion 40, the liquid crystal molecules 30a form a symmetrically inclined orientation with respect to the center SA of the unit solid area 14a'.

As described above, in the liquid crystal display device 500 of the present embodiment, like in the liquid crystal display device 100 of Embodiment 1, liquid crystal domains taking a radially-inclined orientation are formed in correspondence with the opening 14b1 and the unit solid area 14a'. Since the protrusion 40 is formed so as to substantially surround the unit solid area 14a' in a generally circular pattern, the liquid crystal domain is formed in correspondence with the generally circular region surrounded by the protrusion 40. The side surface 40s of the protrusion 40 located inside the opening 14b1 acts to incline the liquid crystal molecules 30a in the vicinity of the edge portions EG of the opening 14b1 in the same direction as the orientation direction provided by the inclined electric field. Thus, the side surface 40s stabilizes the radially-inclined orientation.

The orientation-regulating force by the inclined electric field naturally acts only in the presence of an applied voltage, and the strength thereof depends on the strength of the electric field (magnitude of the applied voltage). When the electric field is weak (i.e., when the applied voltage is low), the orientation-regulating force by the inclined electric field is weak. In such a case, when an external force is applied to the liquid crystal panel, the radially-inclined orientation may be destroyed by the flowing of the liquid crystal material. Once destroyed, the radially-inclined orientation is not recovered unless a voltage enough to generate an inclined electric field having a sufficiently strong orientation-regulating force is applied. By contrast, the orientation-regulating force exerted by the side surface 40s of the protrusion 40 acts regardless of the magnitude of the applied voltage and is so strong as understood by the fact that the orientation-regulating force is known as providing the anchoring effect of the alignment film. Therefore, even though the radially-inclined orientation is once destroyed by the flowing of the liquid crystal material, the liquid crystal molecules 30a in the vicinity of the side surface 40s of the protrusion 40 maintain the same orientation direction as that of the radially-inclined orientation. Thus, once the liquid crystal material stops flowing, the radially-inclined orientation is easily recovered.

As described above, the liquid crystal display device 500 of the present embodiment has a feature of being durable against external forces in addition to the features of the liquid crystal display device 100 in Embodiment 1. Owing to such features, the liquid crystal display device 500 is preferably usable for personal computers or PDAs which are often carried around and likely to receive external forces.

The protrusion 40, when formed of a highly transparent dielectric material, has an advantage of improving the contribution of the liquid crystal domains formed in correspondence with the opening 14b1 to display. The protrusion 40, when formed of an opaque dielectric material, has an advantage of preventing light leakage caused by the retardation of the liquid crystal molecules 30a inclined by the side surface 40s of the protrusion 40. Which material is to be used can be determined in accordance with, for example, the use of the liquid crystal display device. In either case, use of a photosensitive resin provides an advantage of simplifying the patterning step of forming the protrusion 40 in correspondence with the opening 14b1. In order to obtain a sufficient orientation-regulating force, the height of the protrusion 40 is preferably in the range of about 0.5 μm to about 2 μm when the thickness of the liquid crystal material 30 is about 3 μm. In general, the height of the protrusion 40 is preferably in the range of about ⅙ to about ⅔ of the thickness of the liquid crystal material 30.

Figure 49A:
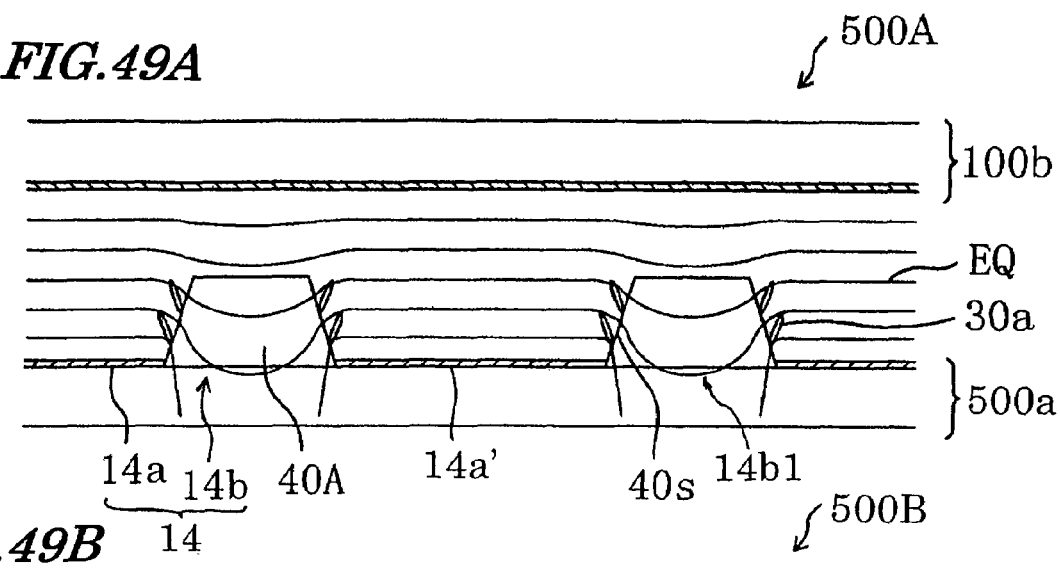
FIG. 49A to FIG. 49C are respectively schematic cross-sectional views of liquid crystal display devices 500A, 500B and 500C having a different positional relationship of the non-solid area and the protrusion of the picture element electrode from that of the liquid crystal display device 500.
Figure 49B:
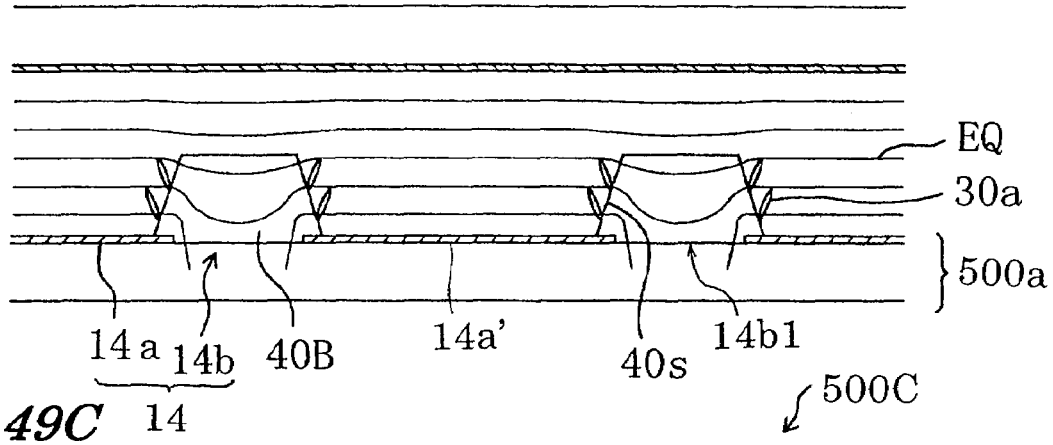
Figure 49C:
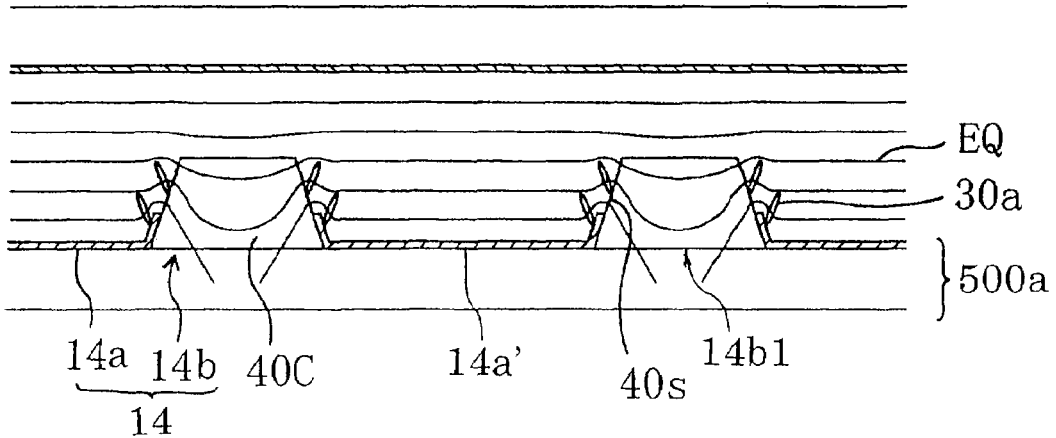

As described above, the liquid crystal display device 500 includes a protrusion 40 inside the non-solid area 14b of the picture element electrode 14, and the side surface 40s of the protrusion 40 has an orientation-regulating force exerted on the liquid crystal molecules 30a in the same direction as that of the orientation-regulating force of the inclined electric field. With reference to FIG. 49A to FIG. 49C, preferable conditions for the side surface 40s to have an orientation-regulating force exerted in the same direction as that of the orientation-regulating force of the inclined electric field will be described.

FIG. 49A, FIG. 49B and FIG. 49C are schematic cross-sectional views of liquid crystal display devices 500A, 500B and 500C, respectively, and correspond to FIG. 48A. The liquid crystal display devices 500A, 500B and 500C all have a protrusion on the non-solid area 14b but is different from the liquid crystal display device 500 in term of the positional relationship between the protrusion 40 as one structural body and the non-solid area 14b.

In the liquid crystal display device 500, as illustrated in FIG. 48A, the protrusion 40 as a structural body is entirely formed inside the opening 14b1, and the bottom surface of the protrusion 40 is smaller than that of the opening 14b1. In the liquid crystal display device 500A illustrated in FIG. 49A, the bottom surface of a protrusion 40A is equal to that of the opening 14b1. In the liquid crystal display device 500B illustrated in FIG. 49B, the bottom surface of a protrusion 40B is larger than that of the opening 14b1 and covers an edge portion (outer periphery) of the solid area 14a of the picture element electrode 14. The solid area 14a is not formed on the side surface 40s of any of the protrusions 40, 40A and 40B. As a result, the equipotential lines EQ are generally flat above the solid area 14a and drop in the opening 14b1 as shown in the respective figures. Therefore, the side surface 40s of the protrusions 40A and 40B of the liquid crystal display devices 500A and 500B exhibits an orientation-regulating force in the same direction as that of the orientation-regulating force of the inclined electric field, thus stabilizing the radially-inclined orientation, like the protrusion 40 of the liquid crystal display device 500.

By contrast, the bottom surface of a protrusion 40C of the liquid crystal display device 500C illustrated in FIG. 49C is larger than that of the opening 14b1, and a part of the solid area 14a around the opening 14b1 is formed on the side surface 40s of the protrusion 40C. By the influence of the part of the solid area 14a on the side surface 40s, the equipotential lines EQ have a hump-like curve. The hump-like curve of the equipotential lines EQ are inclined in the opposite direction to a part of equipotential lines EQ dropping in the opening 14b1. This indicates that in correspondence with the part of the solid area 14a on the side surface 40s, an electric field is formed which is inclined in the opposite direction to that of the inclined electric field for providing a radially-inclined orientation to the liquid crystal molecules 30a. In order to provide the side surface 40s with an orientation-regulating force in the same direction as that of the orientation-regulating force of the inclined electric field, it is preferred that the solid area (conductive film) 14a is not formed on the side surface 40s. In the present embodiment, a protrusion formed in the opening 14b1 as illustrated in FIG. 49A to FIG. 49C is described as an example. The same is applicable to a protrusion formed in the cut-out area 14b2.

The effect of stabilizing the radially-inclined orientation by forming a protrusion 40 on the non-solid area 14b is not only provided by the non-solid area 14b1 of the pattern shown in the present embodiment, but is provided also by the non-solid area 14b1 of all the above-described patterns. In order to allow the protrusion 40 to fully exhibit the effect of stabilizing the orientation against the external forces, the protrusion 40 preferably has a pattern surrounding a maximum possible area of the liquid crystal layer 30 (as viewed in the substrate normal direction). Thus, the effect of stabilizing the orientation is larger with, for example, a positive pattern having a circular unit solid area 14a' than with a negative pattern having a circular opening 14b1.

Embodiment 6

Figure 50:
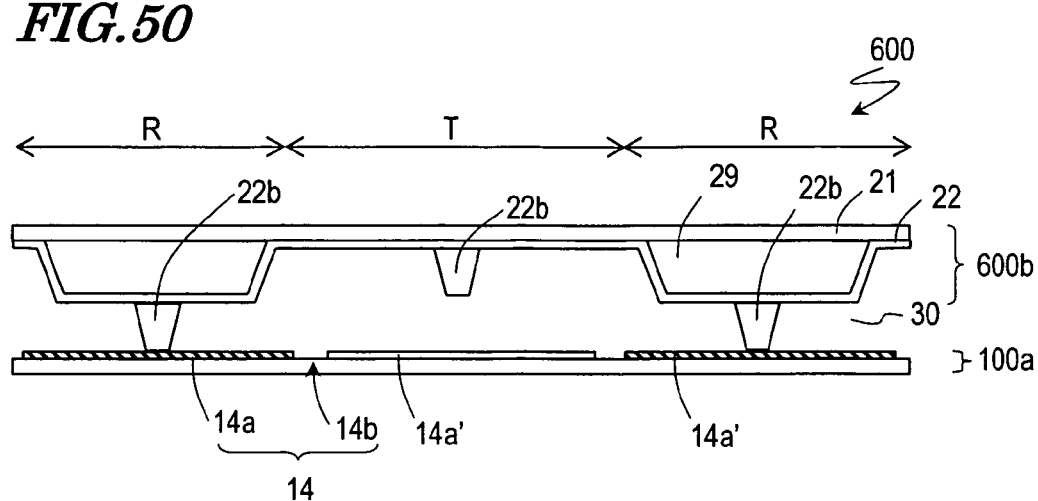
FIG. 50 is a cross-sectional view schematically illustrating a structure of still another liquid crystal display device 600 of the present invention.

With reference to FIG. 50, a structure of a liquid crystal display device 600 of the present embodiment will be described.

As illustrated in FIG. 50, a counter substrate 600b of the liquid crystal display device 600 has a protrusion (rib) 22b provided in a region opposing the unit solid area 14a' of the picture element electrode 14. One protrusion 22b is provided in a transparent region T and one protrusion 22b is provided in a reflection region R. The protrusions 22b act as orientation-regulating structures. The protrusions 22b are formed of, for example, a photosensitive resin.

The protrusion 22b located in the reflection region R has a top surface in contact with the TFT substrate 100a, so that the thickness of the liquid crystal layer 30 is defined by the protrusion 22b. In other words, the protrusion 22b located in the reflection region R functions also as a spacer.

In the case where at least one of the protrusions 22b (the protrusion 22b located in the reflection region R) provided as the orientation-regulating structures functions also as a spacer as in the present embodiment, it is not necessary to separately form the orientation-regulating structures and the spacers, which can simplify the production process and lower the production cost.

In the case where the surface of the reflection electrode is provided with minute irregularities in order to realize a white display close to paper white, it is preferred to avoid providing the irregularities on a part of the surface of the reflection electrode which is to be in contact with the protrusion 22b. With no irregularities provided on the part to be in contact with the protrusion 22b, the cell gap (the thickness of the liquid crystal display layer 30) can be controlled to be more uniform.

The liquid crystal molecules in the vicinity of the protrusion 22b are inclined with respect to the substrate plane even in the absence of an applied voltage. This causes light leakage in a black display in a normally black mode. Therefore, where the size of the protrusion 22b is excessively large, the contrast ratio is unacceptably lowered. Especially when the contrast ratio is significantly lowered in the transmission region T, the display quality is seriously influenced.

Figure 51A:
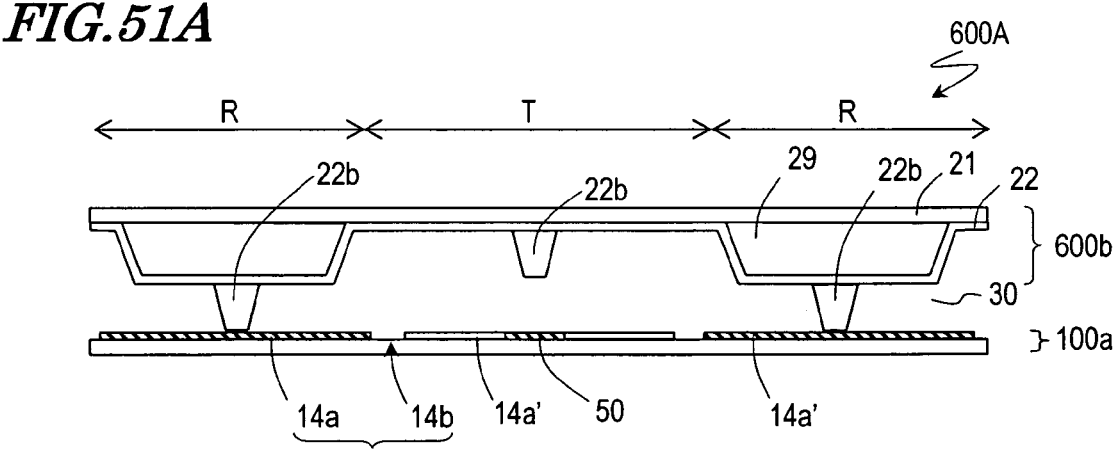
FIG. 51A is a cross-sectional view schematically illustrating a structure of still another liquid crystal display device 600A of the present invention.
Figure 51B:
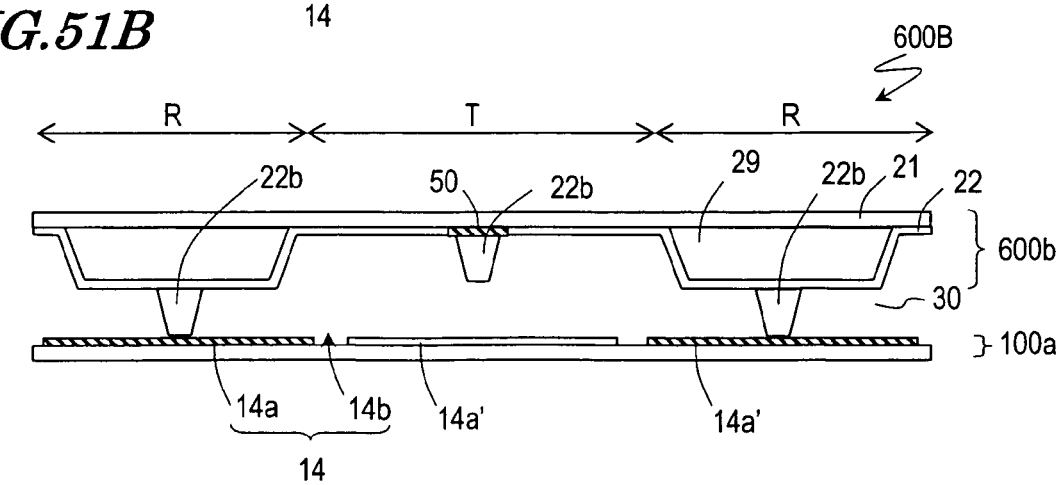
FIG. 51B is a cross-sectional view schematically illustrating a structure of still another liquid crystal display device 600B of the present invention.

In order to avoid this, as in liquid crystal display devices 600A and 600B respectively illustrated in FIG. 51A and FIG. 51B, a light shielding layer 50 may be provided for shielding light against the protrusion 22b located in the transmission region T, depending on the size of the protrusion 22b.

In the liquid crystal display device 600A illustrated in FIG. 51A, the TFT substrate 100a includes the light shielding layer 50 so as to overlap the protrusion 22b in the transmission region T. In the liquid crystal display device 600B illustrated in FIG. 51B, the counter substrate 600b includes the light shielding layer 50 so as to overlap the protrusion 22b in the transmission region T. By providing the light shielding layer 50 overlapping the protrusion 22b in the transmission region T, the light leakage in the transmission region T, and thus the decrease in the contrast ratio, can be suppressed.

In order to prevent light leakage with a higher certainty, it is preferred that the light shielding layer 50 has a larger area. The light leakage can be sufficiently suppressed, however, as long as the light shielding layer 50 overlaps the protrusion 22b as viewed in the substrate normal direction.

The light shielding layer 50 may be formed of any light-shielding material. The light shielding layer 50 may be formed in the same step as that of the other element(s) of the TFT substrate 100b and/or the counter substrate 600b which is(are) formed of a light-shielding material. In this case, a separate step of forming the light shielding layer 50 is not necessary. For example, in the structure illustrated in FIG. 51A where the light shielding layer 56 is included in the TFT substrate 100b, the light shielding layer 50 may be formed of the same material as, and in the same step as, that of forming the gate bus lines. Thus, the light shielding layer 50 can be easily formed. The structure illustrated in FIG. 51B, where the light shielding layer 50 is included in the counter substrate 600b, can prevent light shielding from being insufficient due to the positional offset occurring when attaching TFT substrate 100b and the counter substrate 600b together (attachment offset).

Figure 52A:
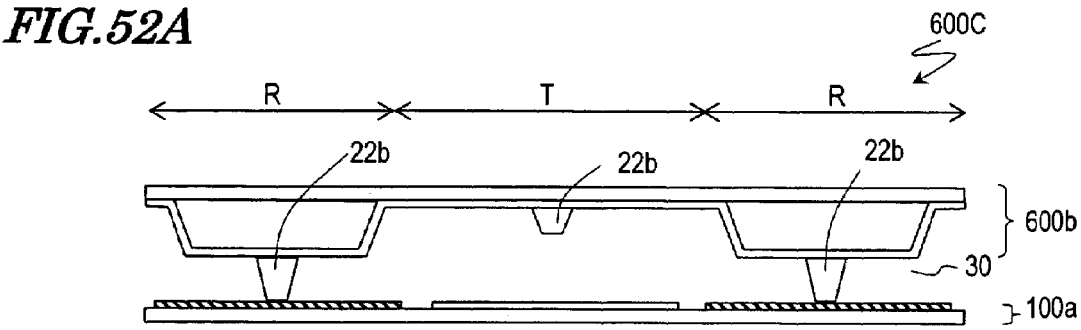
FIG. 52A is a cross-sectional view schematically illustrating a structure of still another liquid crystal display device 600C of the present invention.
Figure 52B:
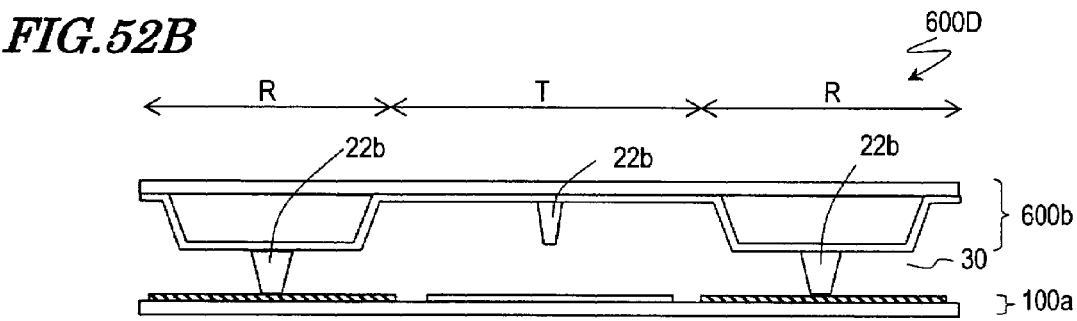
FIG. 52B is a cross-sectional view schematically illustrating a structure of still another liquid crystal display device 600D of the present invention.

The light leakage in the transmission region T can also be prevented by forming the protrusion 22b in the transmission region T to be slightly smaller than the protrusion 22b in the reflection region R. For example, as in a liquid crystal display device 600C illustrated in FIG. 52A, the protrusion 22b in the transmission region T may be lower than the protrusion 22b in the reflection region R. Alternatively, as in a liquid crystal display device 600D illustrated in FIG. 52B, the protrusion 22b in the transmission region T may be thinner than the protrusion 22b in the reflection region R. The protrusion 22b in the transmission region T can be formed to be lower than the protrusion 22b in the reflection region R by, for example, changing the exposure amount of the photosensitive resin for the protrusion 22b in the transmission region T and for the protrusion 22b in the reflection region R. The protrusion 22b in the transmission region T can be formed to be thinner than the protrusion 22b in the reflection region R by, for example, changing the diameter of the light-shielding portion (or the opening) of the photomask used for exposing the photosensitive resin for the protrusion 22b in the transmission region T and for the protrusion 22b in the reflection region R.

Since the protrusion 22b located in the transmission region T lowers the contrast ratio as described above, the number of the protrusions 22b in the transmission region T is preferably smaller in order to improve the contrast ratio. The counter substrate 600b preferably includes one protrusion 22b in the transmission region T of each picture element region.

Figure 53A:
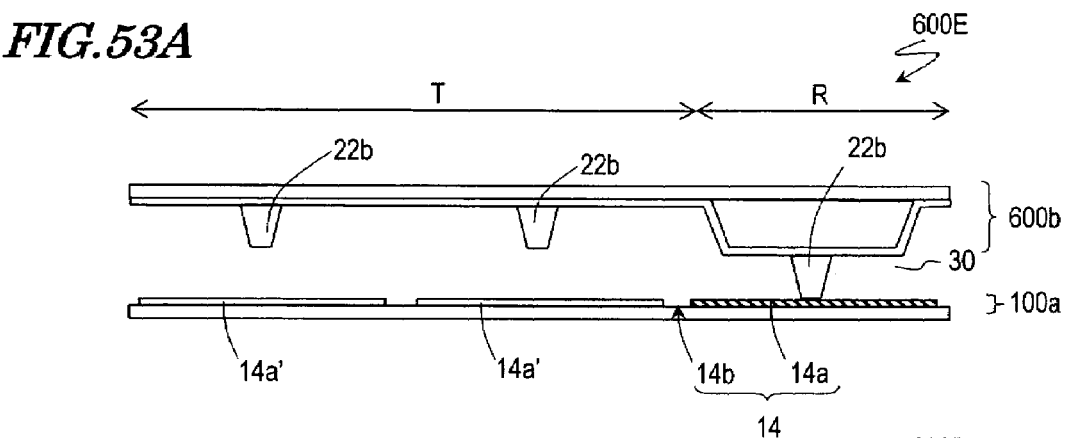
FIG. 53A is a cross-sectional view schematically illustrating a structure of still another liquid crystal display device 600E of the present invention.

FIG. 53A illustrates a liquid crystal display device 600E which includes two unit solid areas 14a' in the transmission region T and one unit solid area 14a' in the reflection region R, and also includes protrusions 22b respectively corresponding to the unit solid areas 14a'. Thus, the liquid crystal display device 600E includes two protrusions 22b in the transmission region T.

Figure 53B:
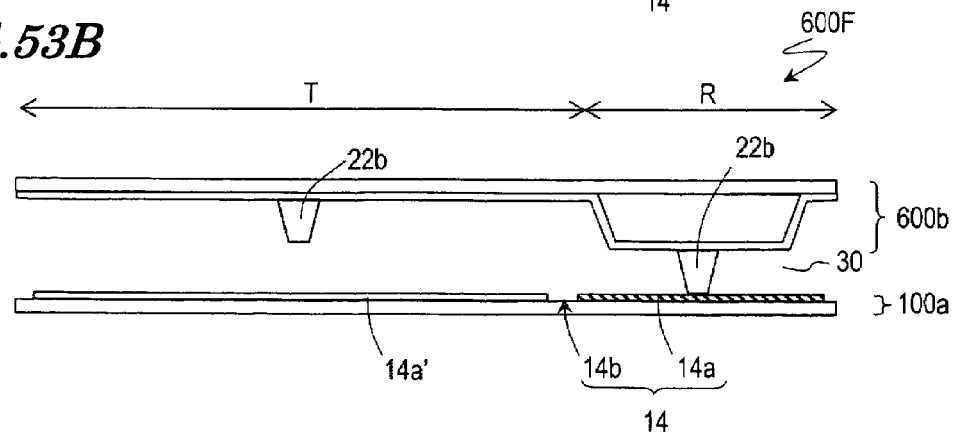
FIG. 53B is a cross-sectional view schematically illustrating a structure of still another liquid crystal display device 600F of the present invention.

FIG. 53B illustrates a liquid crystal display device 600F, which is different from the liquid crystal display device 600E illustrated in FIG. 53A in that the two unit solid areas 14a' in the transmission region T of the liquid crystal display device 600E are replaced with one larger unit solid area 14a'. Since only one protrusion 22b is sufficient in the transmission region T with this structure, the contrast ratio and the light transmittance can be improved. For example, two square unit solid areas 14a' provided in the transmission region T may be replaced with one oblong rectangular unit solid area 14a'.

The structures illustrated in FIG. 51A, FIG. 51B, FIG. 52A, FIG. 52B and FIG. 53B, which are preferable to suppress light leakage in the transmission region T, provide a high effect when employed in a liquid crystal display device having a small cell gap. The reason is as follows: when the cell gap is small, the refractive index anisotropy (Δn) of the liquid crystal material needs to be increased in order to obtain a predetermined retardation; and this causes the light to be leaked easily by the protrusion 22b in a black display.

Exemplary liquid crystal display devices having a small cell gap include liquid crystal display devices in mobile electronic devices such as mobile phones and PDAs. In liquid crystal display devices of the mobile electronic devices, the cell gap is often set to be small such that the driving voltage is lowered to minimize the power consumption. In the future, there will be more opportunities of displaying high quality moving images with mobile electronic devices along with the full-scale use of the digital terrestrial broadcasting. With such a background, it is expected that the cell gap will be set to be smaller in a larger number of devices in order to provide preferable display moving images. In general, as the cell gap is smaller, the effect of the electric field is stronger and thus the response characteristics are improved. For this reason, a liquid crystal display device having a small cell gap is suitable for displaying moving images.

Embodiment 7

Figure 54A:
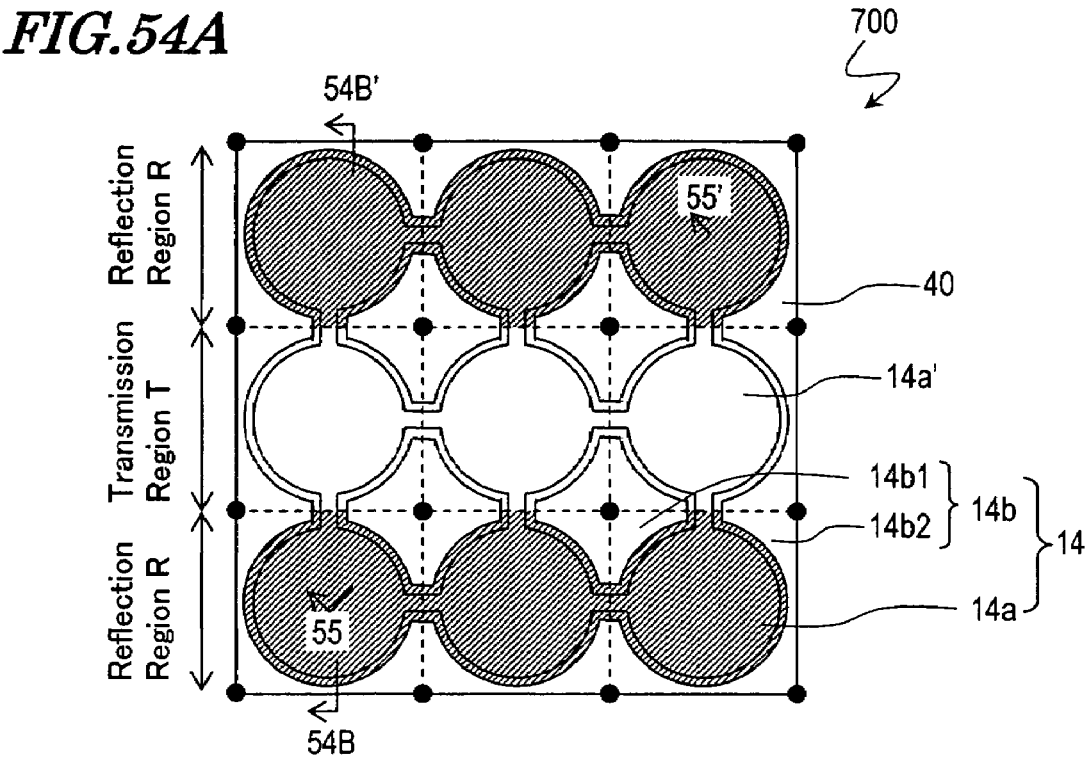
Figure 54B:
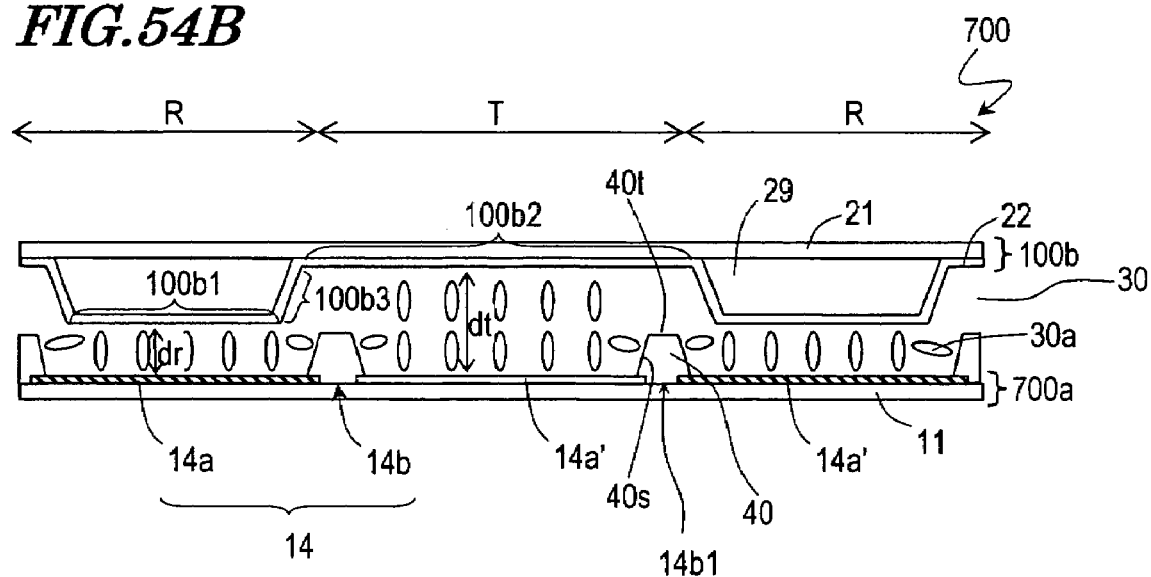

With reference to FIG. 54A and FIG. 54B, a structure of a liquid crystal display device 700 of the present embodiment will be described. FIG. 54A is a plan view of the liquid crystal display device 700 as viewed in a substrate normal direction, and FIG. 54B is a cross-sectional view taken along line 54B-54B' of FIG. 54A. FIG. 54B illustrates a state where no voltage is applied across the liquid crystal layer 30.

The liquid crystal display device 700 has substantially the same structure as that of the liquid crystal display device 500B illustrated in FIG. 49B. More specifically, the liquid crystal display device 700 includes a protrusion 40 provided on the non-solid area 14b as illustrated in FIG. 54A and FIG. 54B.

Figure 55A:
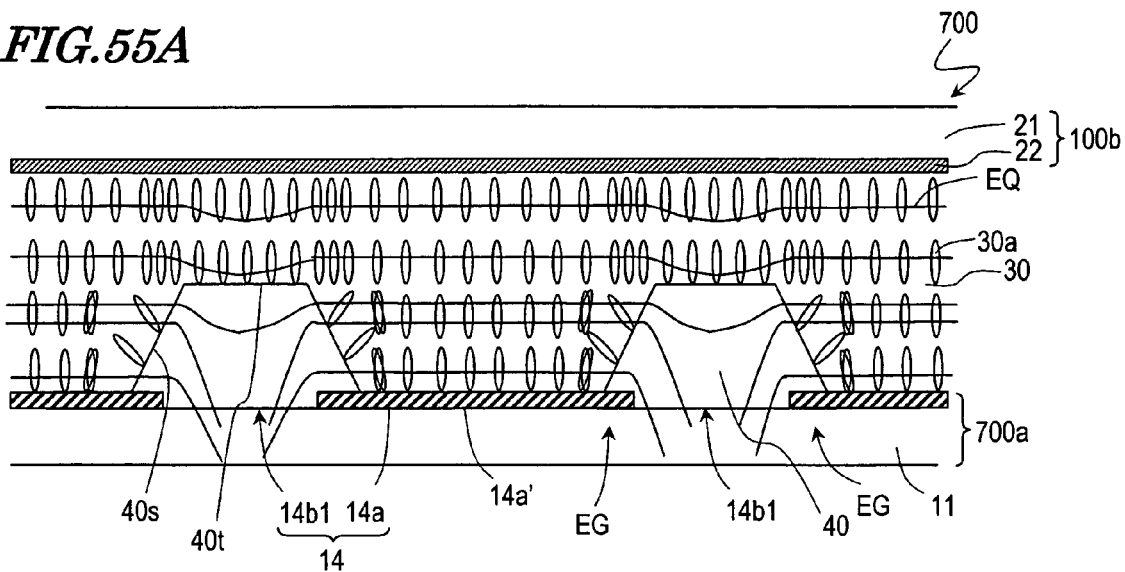
FIG. 55A and FIG. 55B illustrate a liquid crystal layer 30 of the liquid crystal display device 700 in the presence of an applied voltage thereacross, wherein FIG. 54A schematically illustrates a state where an orientation has just started to change (initial ON state), and FIG. 54B schematically illustrates a steady state.
Figure 55B:
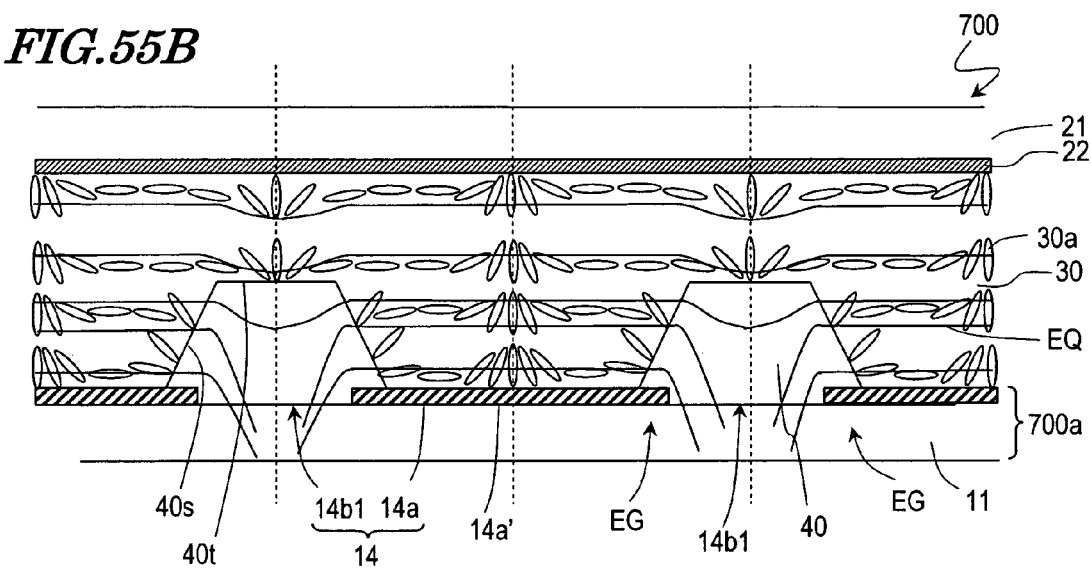

The side surface 40s of the protrusion 40 has an orientation-regulating force in the direction conformed with that of the orientation-regulating force of the inclined electric field generated by the picture element electrode 14. Therefore, in the presence of an applied voltage, a stable radially-inclined orientation is generated as illustrated in FIG. 55A and FIG. 55B. In FIG. 55A and FIG. 55B, the stepped portions of the counter substrate 100b are omitted.

The protrusion 40 has a bottom surface larger than that of the opening 14b1 and covers an edge portion (outer periphery) of the solid area 14a. Thus, a stable radially-inclined orientation is obtained regardless of the driving voltage conditions.

Figure 56A:
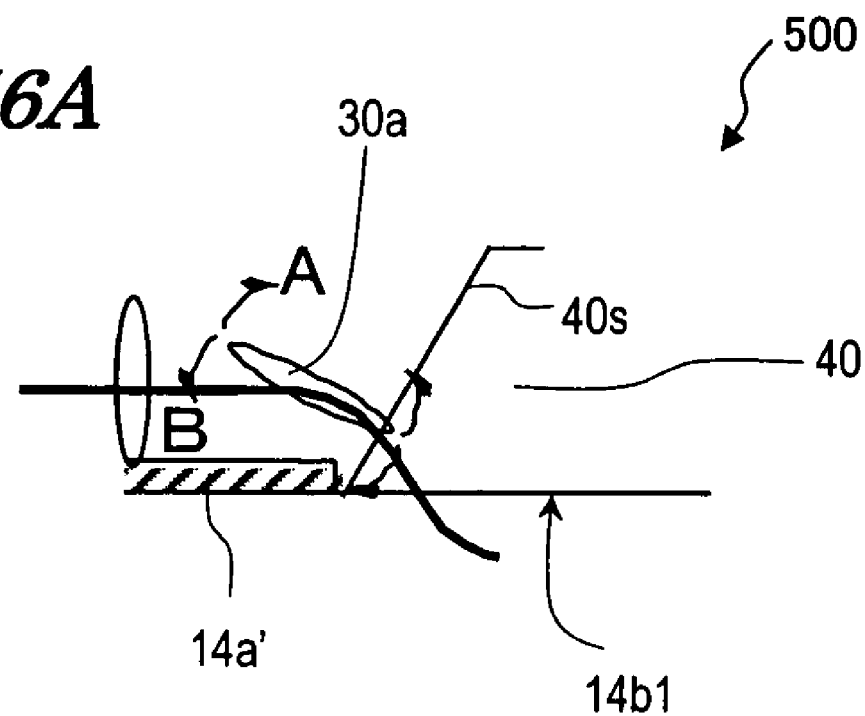
FIG. 56A is an enlarged view of a protrusion 40 and the vicinity thereof of the liquid crystal display device 500.
Figure 56B:
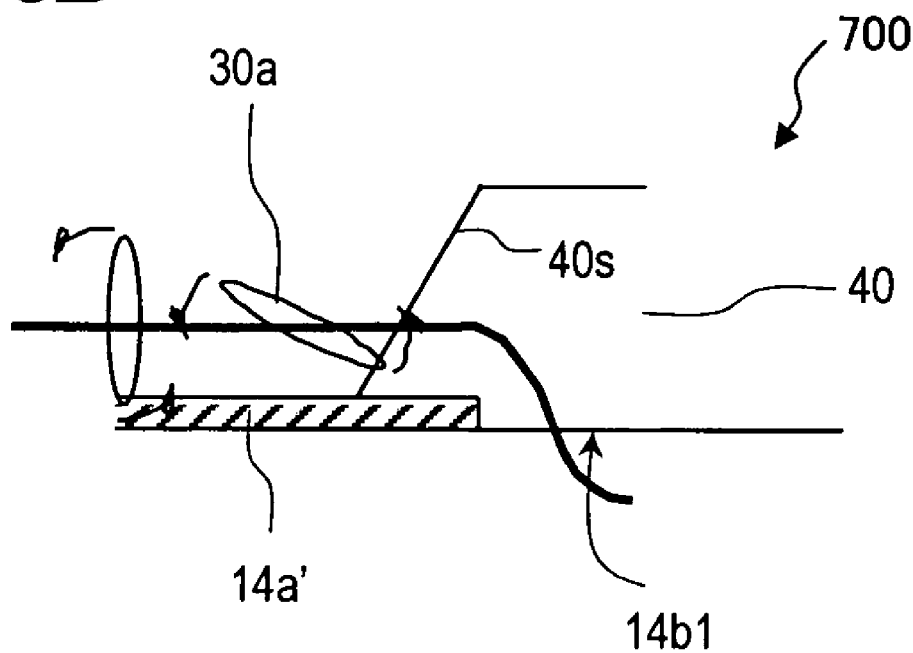
FIG. 56B is an enlarged view of a protrusion 40 and the vicinity thereof of the liquid crystal display device 700.

The reason for this will be described with reference to FIG. 56A and FIG. 56B. FIG. 56A is an enlarged view of the protrusion 40 and the vicinity thereof in the liquid crystal display device 500 illustrated in FIG. 46A and FIG. 46B. FIG. 56B is an enlarged view of the protrusion 40 and the vicinity thereof in the liquid crystal display device 700 of the present embodiment. FIG. 56A and FIG. 56B each show a state immediately after a voltage is applied across the liquid crystal layer 30.

In the liquid crystal display device 500 in FIG. 46A and FIG. 46B, the protrusion 40 is entirely formed inside the opening 14b1 and has a bottom surface smaller than that of the opening 14b1. With such a structure, the side surface 40s of the protrusion 40 is located on the edge portion of the opening 14b1 as illustrated in FIG. 56A. Therefore, a liquid crystal molecule 30a in the vicinity of the side surface 40s of the protrusion 40 is on the inclined equipotential line EQ in the presence of an applied voltage. In the example shown in FIG. 56A, the axial orientation of the liquid crystal molecules 30a oriented vertical to the side surface 40s is substantially parallel to the inclined equipotential line EQ. In such a case, almost no torque for changing the orientation direction acts upon the liquid crystal molecule 30a. When a higher voltage is applied than in the example shown in FIG. 56A, the equipotential line EQ drops more drastically in the opening 14b1 (i.e., the inclination of the equipotential line EQ is steeper). In such a case, the liquid crystal molecule 30a oriented vertical to the side surface 40s receives a torque for inclining the liquid crystal molecule 30a clockwise (in the direction of arrow A in FIG. 56A). When a lower voltage is applied than in the example shown in FIG. 56A, the equipotential line EQ drops more slowly in the opening 14b1 (i.e., the inclination of the equipotential line EQ is milder). In such a case, the liquid crystal molecule 30a oriented vertical to the side surface 40s receives a torque for inclining the liquid crystal molecule 30a counterclockwise (in the direction of arrow B in FIG. 56A).

In the structure where the entirety of the protrusion 40 is located inside the opening 14b1, the direction of the torque acting upon the liquid crystal molecules 30a oriented vertical to the side surface 40s of the protrusion 40 varies in accordance with the value of the applied voltage. This may disturb the orientation depending on the driving voltage conditions.

By contrast, in the liquid crystal display device 700 of the present embodiment, the protrusion 40 covers the edge portion (outer periphery) of the solid area 14a (the unit solid area 14a') of the picture element electrode 14. In such a structure, the side surface 40s of the protrusion 40 can be located on the solid area 14 (the unit solid area 14a') of the picture element electrode 14, not on the edge portion of the opening 14b1, as illustrated in FIG. 56B. Thus, the liquid crystal molecules 30a in the vicinity of the side surface 40s of the protrusion 40 can be located on the equipotential line EQ which is parallel to the surface of the solid area 14a in the presence of an applied voltage. In this case, the direction of the torque acting upon the liquid crystal molecules 30a oriented vertical to the side surface 40s is uniquely defined (counterclockwise in the example shown in FIG. 56B) regardless of the value of the applied voltage. Thus, a stable radially-inclined orientation is obtained regardless of the driving voltage conditions. The above description is directed to a protrusion provided in the opening 14b1, but the same is applicable to the protrusion 40 provided in the cut-out area 14b2.

There is no particular limitation on the width of the overlapping area of the protrusion 40 and the solid area 14a, but it is preferred to set the width such that even if the protrusion 40 and/or the solid area 14a are positionally offset during the production, the protrusion 40 can cover the edge portion of the solid area 14a (the width is preferably set to be, for example, about 2 μm).

As described above, a TFT substrate 700a of the liquid crystal display device 700 of the present embodiment includes a picture element electrode 14 for generating an inclined electric field and a protrusion 40 having a side surface 40s having an orientation-regulating force conformed with the orientation-regulating force exerted by the inclined electric field. Owing to such a structure, the liquid crystal display device 700 can realize a display having a wide viewing angle while preventing the display quality from being lowered by an external force. In addition, since the protrusion 40 covers the edge portion of the solid area 14a, a desirable display is provided regardless of the driving voltage conditions.

Embodiment 8

Figure 57A:
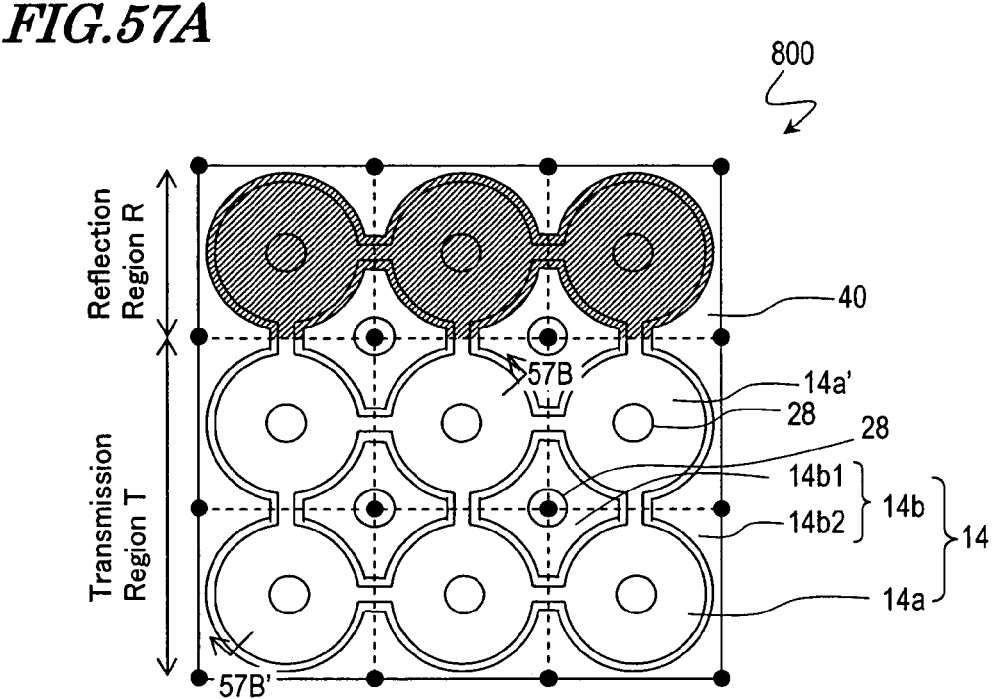
Figure 57B:
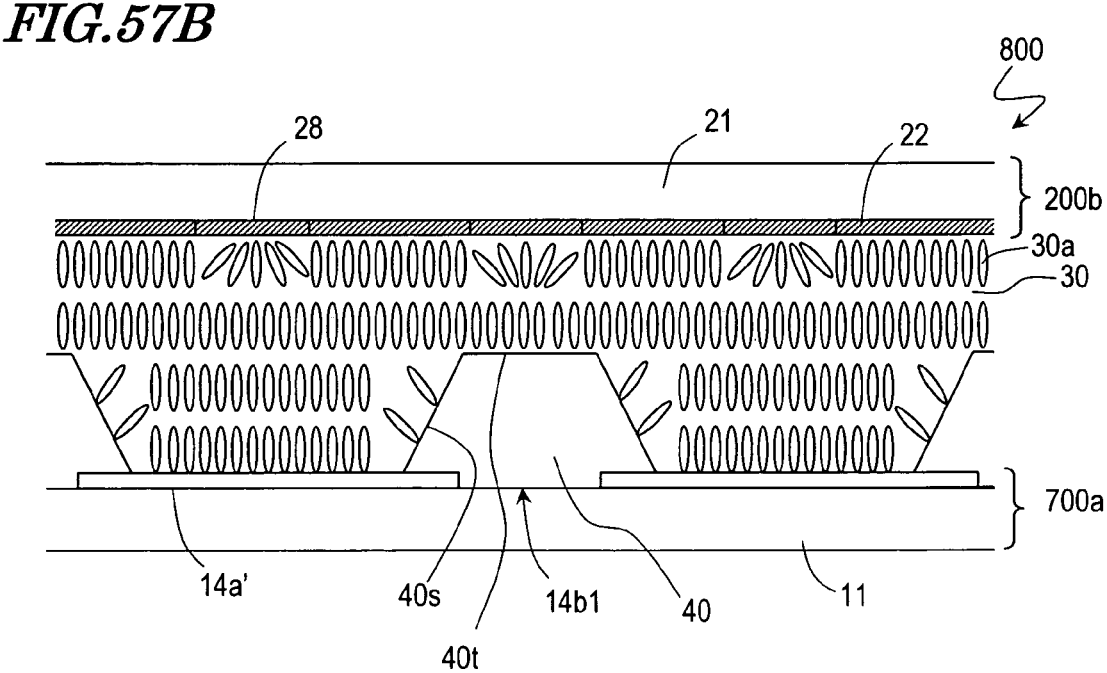

With reference to FIG. 57A and FIG. 57B, a structure of a liquid crystal display device 800 of the present embodiment will be described. FIG. 57A is a plan view of the liquid crystal display device 800 as viewed in a substrate normal direction, and FIG. 57B is a cross-sectional view taken along line 57B-57B' of FIG. 57A. FIG. 57B illustrates a state where no voltage is applied across the liquid crystal layer 30.

The liquid crystal display device 800 of the present embodiment is different from the liquid crystal display device 700 described in Embodiment 7 in that the counter substrate 200b of the liquid crystal display device 800 includes orientation-regulating structures 28. Among the orientation-regulating structures 28 included in the counter substrate 200b, the one provided at about the central portion of a region opposing the unit solid area 14a' of the picture element electrode 14 may be any one shown in FIG. 15B to FIG. 15D. The orientation-regulating structure 28 provided at about the central portion of a region opposing the opening 14b1 of the picture element electrode 14 is the one shown in FIG. 15E. In this embodiment, the orientation-regulating structures 28 having an orientation-regulating force even in the absence of an applied voltage (FIG. 15B to FIG. 15D and FIG. 15E) will be described, but the one shown in FIG. 15A is also usable instead of the orientation-regulating structure 28 shown in FIG. 15B to FIG. 15D.

Figure 58A:
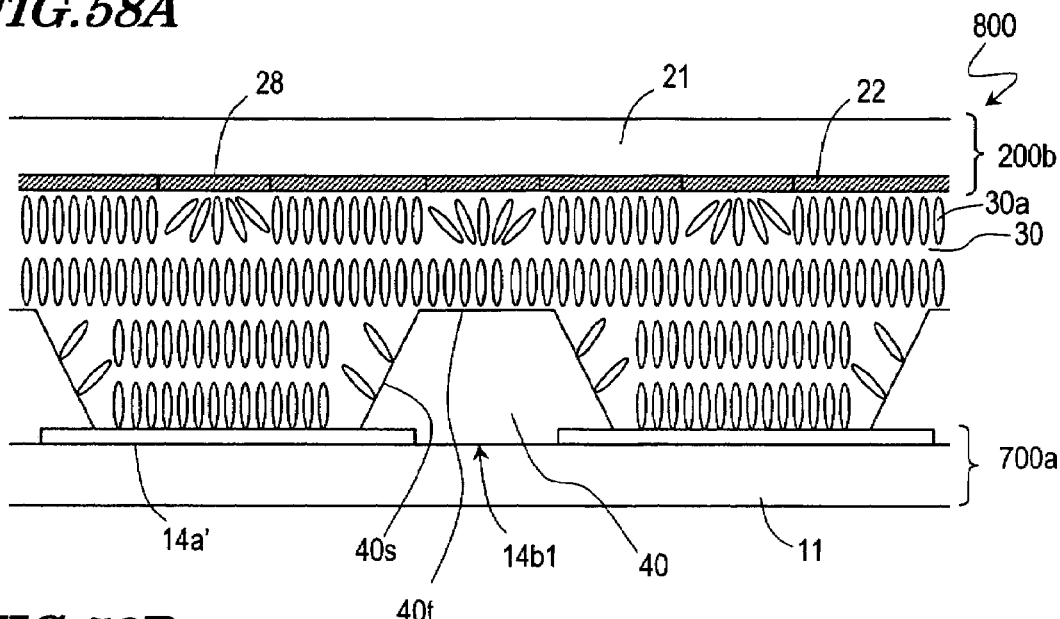
Figure 58B:
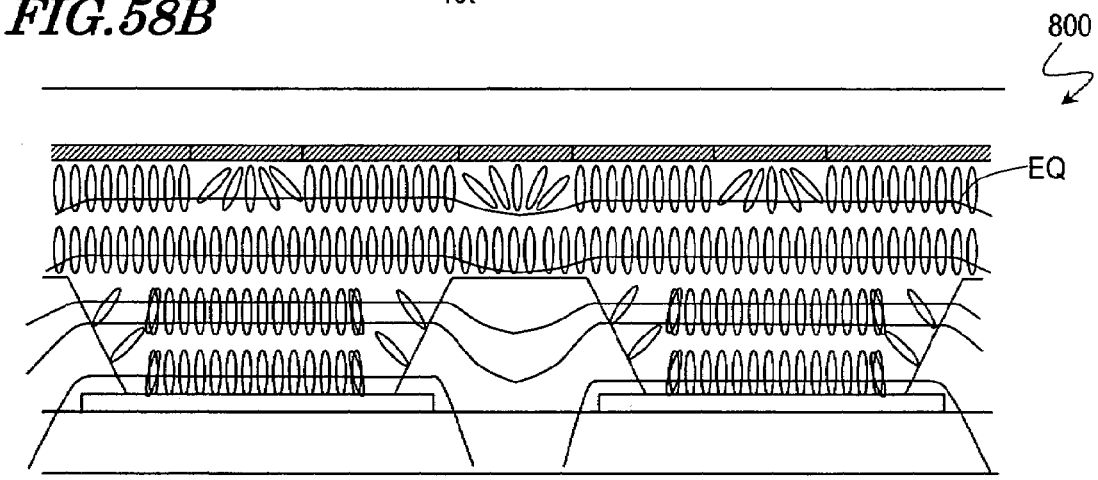
Figure 58C:
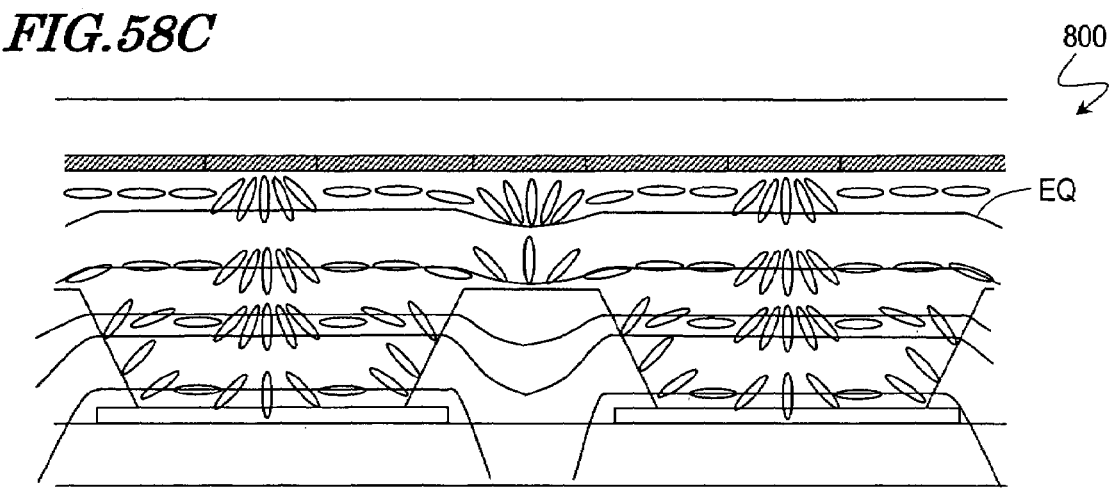

In the liquid crystal display device 800, in the state where a voltage is applied across the liquid crystal layer 30, i.e., between the picture element electrode 14 and the counter electrode 22, the direction of the radially-inclined orientation formed by the picture element electrode 14 and the protrusion 40 is conformed with the direction of the radially-inclined orientation formed by the orientation-regulating structure 28. As a result, the radially-inclined orientation is stable as illustrated in FIG. 58A to FIG. 58C.

Figure 59A:
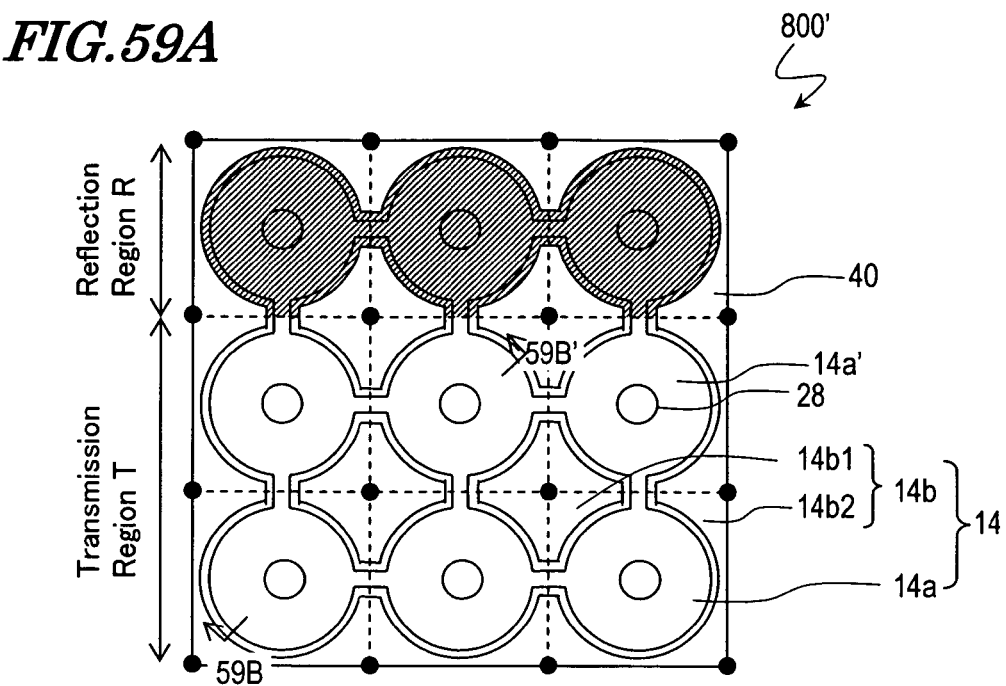
Figure 59B:
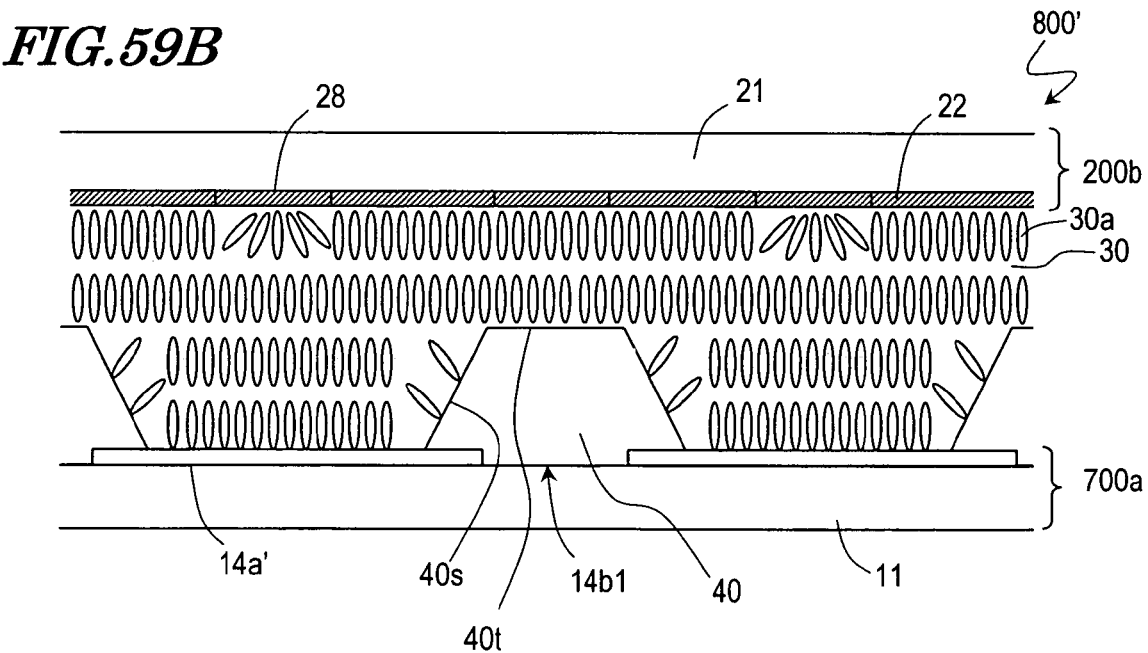

FIG. 59A and FIG. 59B illustrate another liquid crystal display device 800' including orientation-regulating structures. The liquid crystal display device 800' does not include any orientation-regulating structure in a region opposing the opening 14b1 of the picture element electrode 14. It involves process-related difficulty to form the orientation-regulating structure 28 shown in FIG. 15E which should be formed in a region opposing the opening 14b1. In view of the productivity, therefore, it is preferred to use any of the orientation-regulating structures 28 shown in FIG. 15A to FIG. 15D. Especially, the orientation-regulating structure 28 shown in FIG. 15B is preferable since it can be produced in a simple process.

Figure 60A:
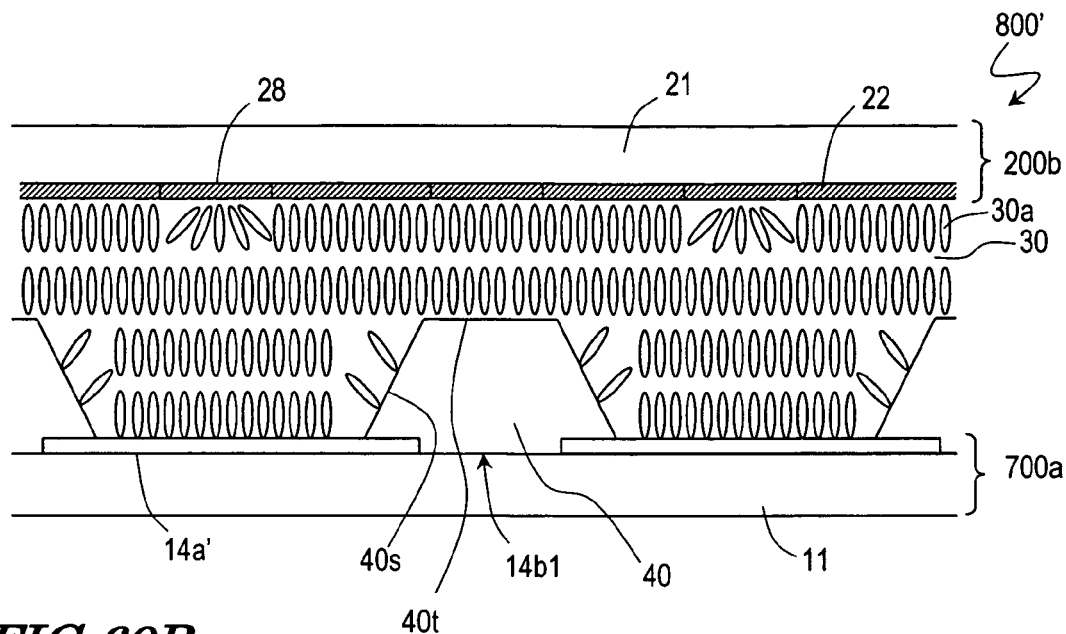
Figure 60B:
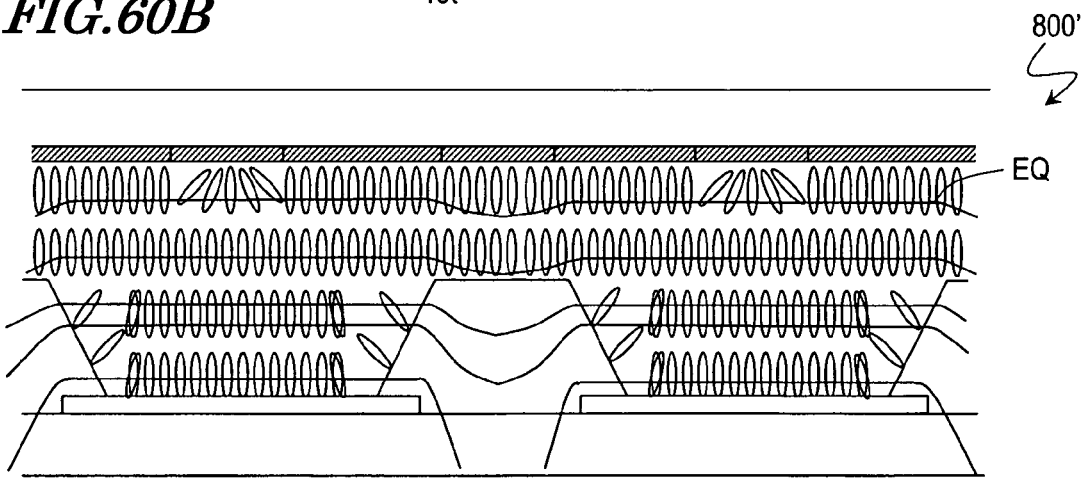
Figure 60C:
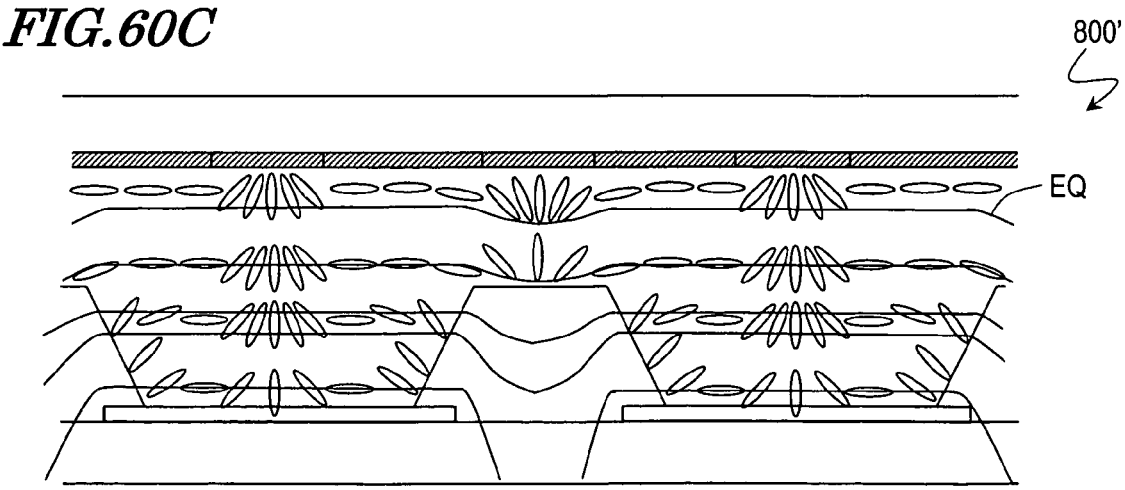

Even without the orientation-regulating structure provided in a region opposing the opening 14b1, the liquid crystal display device 800' obtains substantially the same radially-inclined orientation as that of the liquid crystal display device 800 as schematically illustrated in FIG. 60A to FIG. 60C. The stress resistance of the radially-inclined orientation is at a practically acceptable level.

Figure 61A:
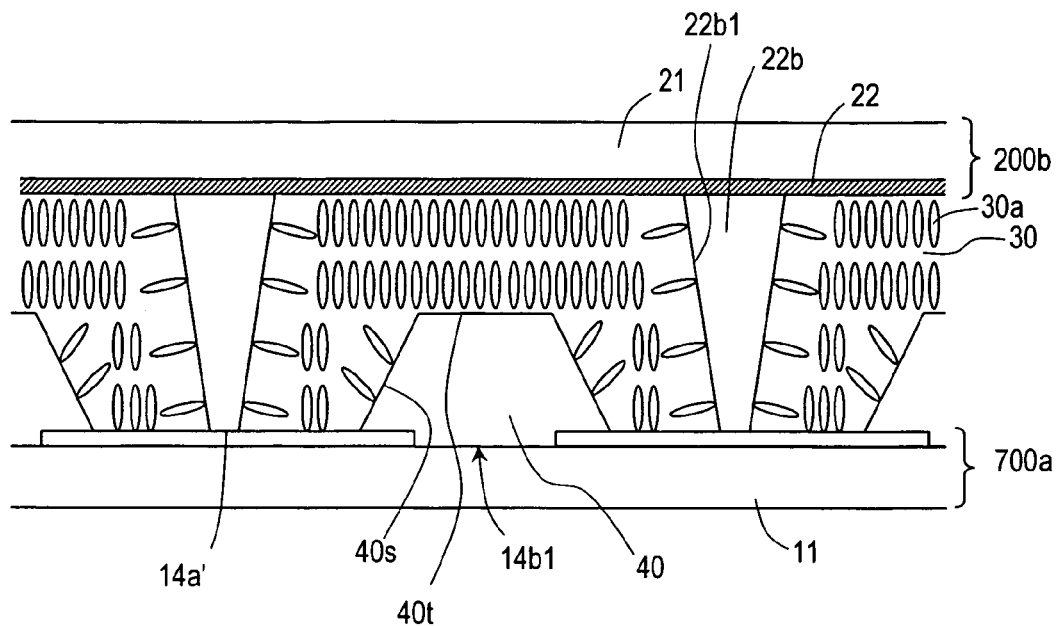

In the case where the protrusion 22b as shown in FIG. 15B is used as the orientation-regulating structure 28, the structure as illustrated in FIG. 61A in which the thickness of the liquid crystal layer 30 is defined by the protrusion 22b, i.e., the protrusion 22b functions also as a spacer for controlling the cell gap (the thickness of the liquid crystal layer 30) may be used. Such a structure is advantageous in that it is not necessary to provide a separate spacer for defining the thickness of the liquid crystal layer 30, which simplifies the production process.

Figure 61B:
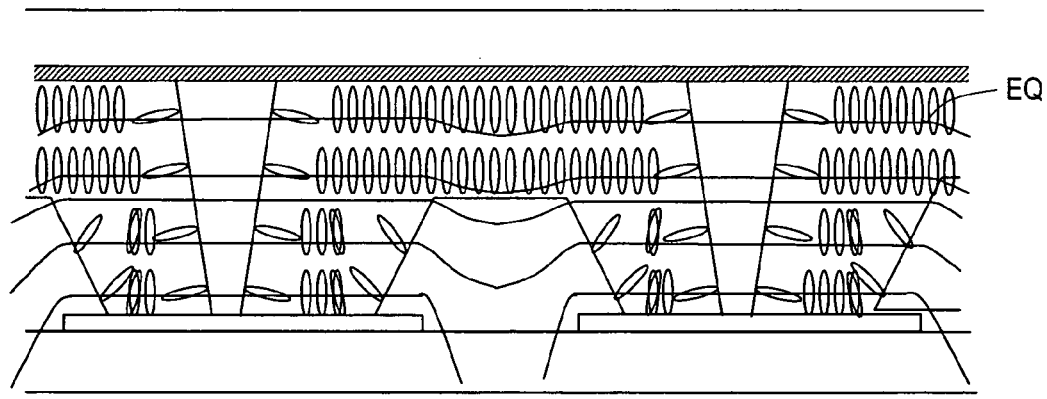
Figure 61C:
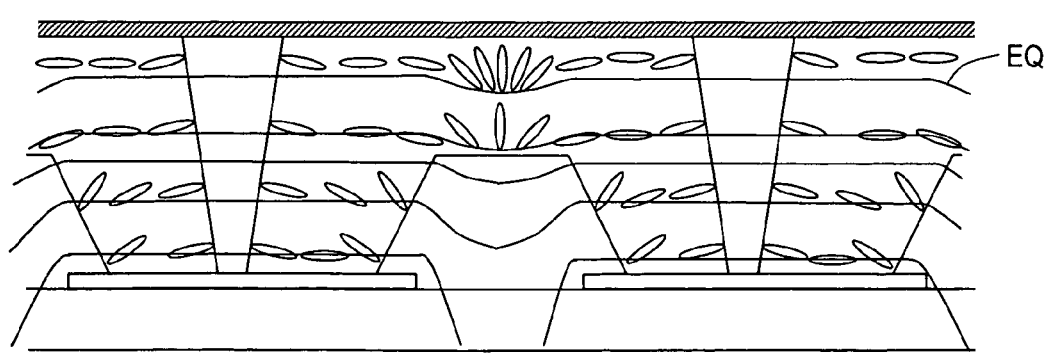

In the example shown in FIG. 61A to FIG. 61C, the protrusion 22b has a truncated cone shape and has a side surface 22b1 inclined with respect to the surface of the substrate 21 at a taper angle less than 90°. The side surface 22b1, which is inclined with respect to the surface of the substrate 21 at a taper angle less than 90°, has an orientation-regulating force on the liquid crystal molecules 30a in the liquid crystal layer 30 in the same direction as that of the orientation-regulating force exerted by the inclined electric field. Thus, the side surface 22b1 acts to stabilize the radially-inclined orientation.

In a structure including the protrusion 22b functioning also as a spacer, as illustrated in FIG. 61A to FIG. 61C, substantially the same radially-inclined orientation is obtained as that of the liquid crystal display device 800'.

Figure 62:
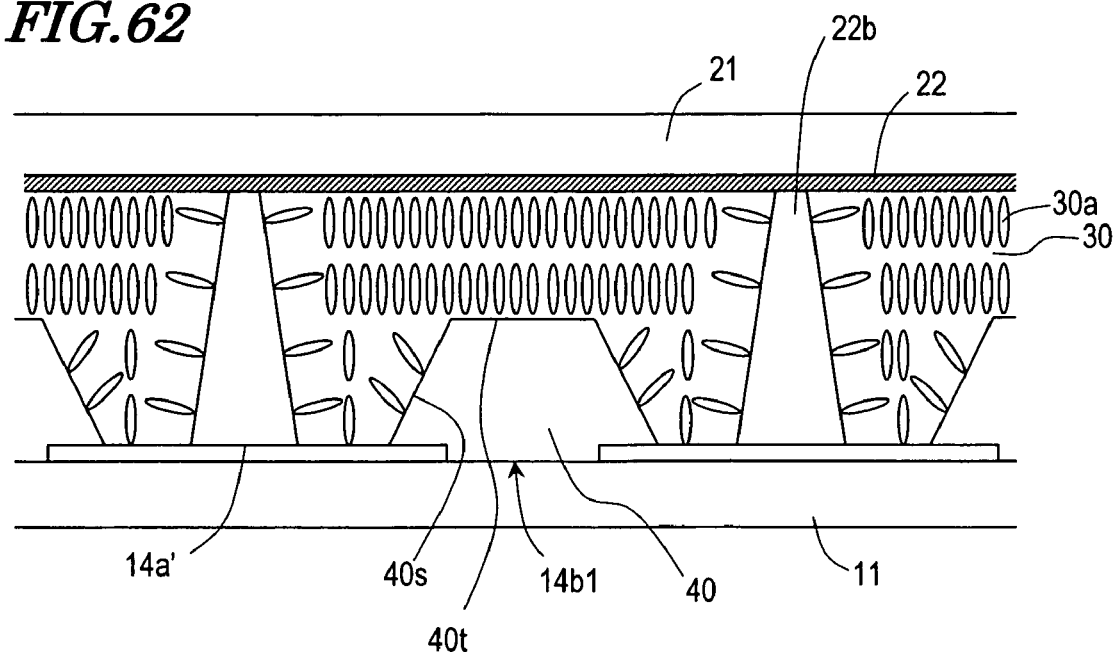
FIG. 62 is a cross-sectional view schematically illustrating a protrusion having a side surface inclined with respect to the substrate plane at an inclination angle significantly exceeding 90°.

In FIG. 61A to FIG. 61C, the side surface 22b1 of the protrusion 22 is inclined with respect to the substrate plane at an angle less than 90°. Alternatively, the side surface 22b1 may be inclined with respect to the substrate plane at an angle of 90° or more. For the purpose of stabilizing the radially-inclined orientation, the inclination angle of the side surface 22b1 preferably does not significantly exceed 90°, and more preferably is less than 90°. Even where the inclination angle exceeds 90°, as long as it is close to 90° (as long as it does not significantly exceed 90°), the liquid crystal molecules 30a in the vicinity of the side surface 22b1 of the protrusion 22b are inclined in a direction substantially parallel to the substrate plane and thus take a radially-inclined orientation conforming with the inclination direction of the liquid crystal molecules 30a at the edge portion, with only a slight twist. However, if the inclination angle of the side surface 22b1 of the protrusion 22b significantly exceeds 90° as illustrated in FIG. 62, the side surface 22b1 of the protrusion 22b will have an orientation-regulating force of the opposite direction to the orientation-regulating force exerted by the inclined electric field on the liquid crystal molecules 30a of the liquid crystal layer 30. This may result in an unstable radially-inclined orientation.

Figure 63:
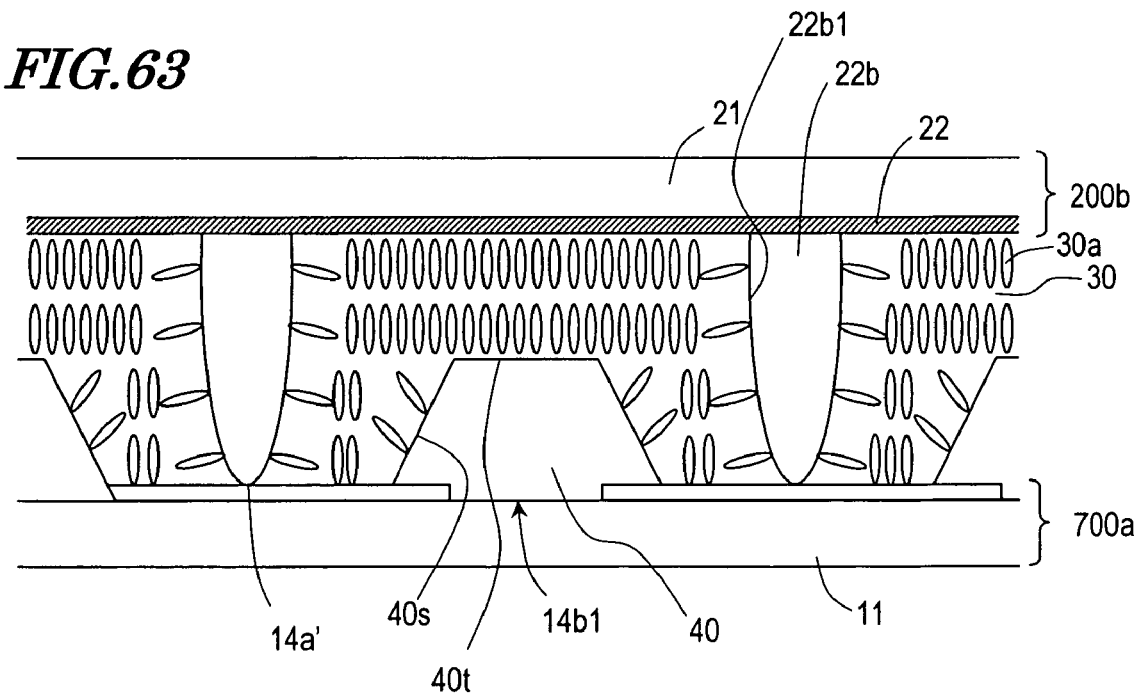
FIG. 63 is a cross-sectional view schematically illustrating a variation of the protrusion that functions also as a spacer.

The protrusion 22b functioning also as a spacer is not limited to a truncated cone-shaped protrusion illustrated in FIG. 61A to FIG. 61C. For example, the protrusion 22b may have a shape as illustrated in FIG. 63 such that the cross section thereof in a plane vertical to the substrate plane is a part of an ellipse (i.e., a shape such as a part of an elliptical sphere). With the protrusion 22b illustrated in FIG. 63, while the inclination angle (taper angle) of the side surface 22b1 with respect to the substrate plane varies along the thickness of the liquid crystal layer 30, the inclination angle of the side surface 22b1 is less than 90° regardless of the position along the thickness of the liquid crystal layer 30. Thus, the protrusion 22b having such a shape may suitably be used as a protrusion for stabilizing a radially-inclined orientation.

The protrusion 22b as described above that is in contact with both the upper and lower substrates (the TFT substrate and the counter substrate) and functions also as a spacer defining the thickness of the liquid crystal layer 30 may be formed either on the upper substrate or on the lower substrate in the process of producing a liquid crystal display device. Regardless of whether it is formed on the upper or lower substrate, the protrusion 22b will be in contact with both substrates, functioning as a spacer and as an orientation-regulating structure, once the upper and lower substrates are attached to each other.

It is not necessary that all of the protrusions 22b provided in regions opposing the unit solid areas 14a' function as spacers. By forming some of the protrusions 22b to be lower than the other protrusions 22b that function as spacers, it is possible to suppress the occurrence of light leakage.

Alternative liquid crystal display devices of the present embodiment will now be described.

Figure 64:
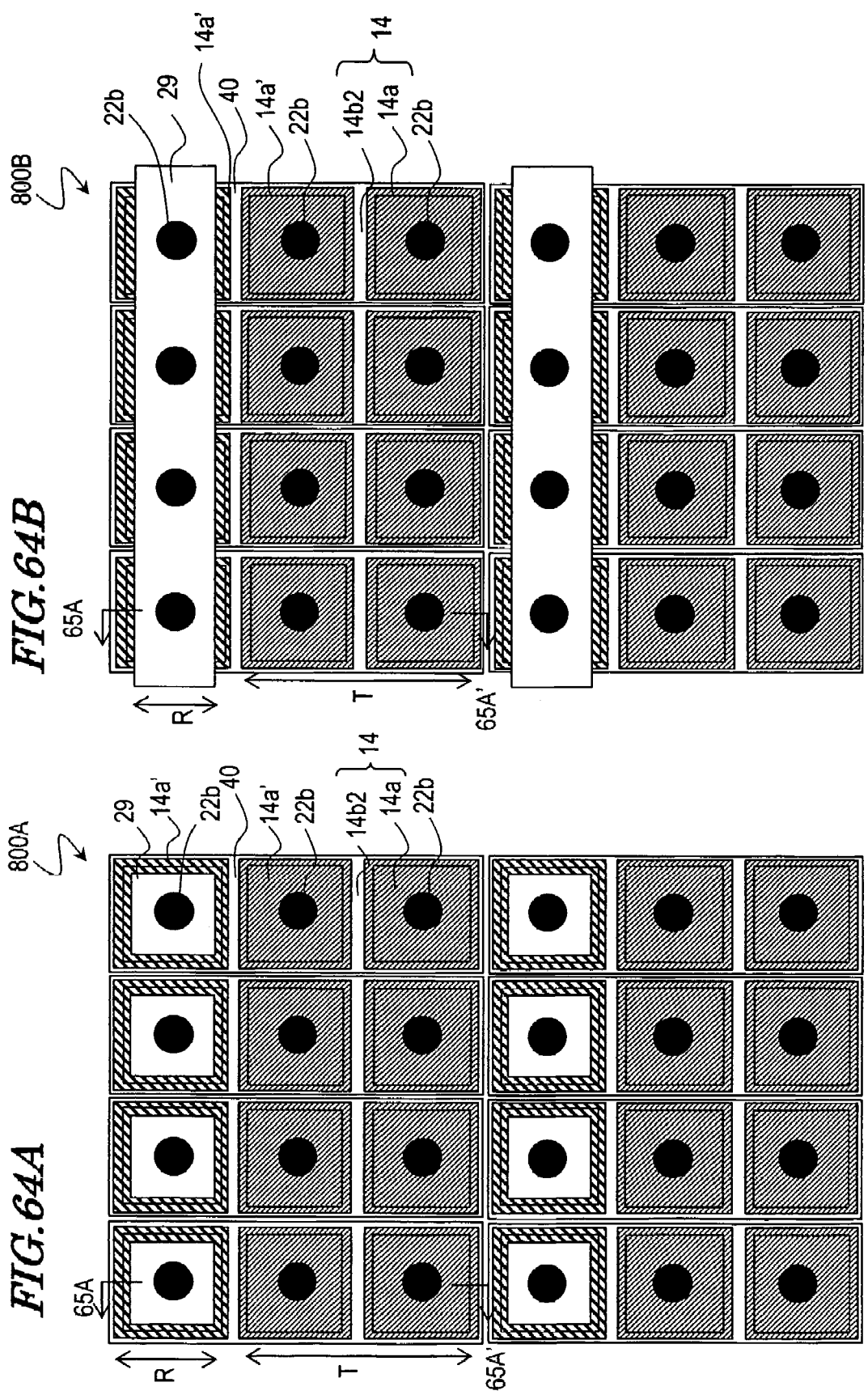
FIG. 64A is a plan view schematically illustrating still another liquid crystal display device 800A of the present invention.
FIG. 64B is a plan view schematically illustrating still another liquid crystal display device 800B of the present invention.
Figure 65:
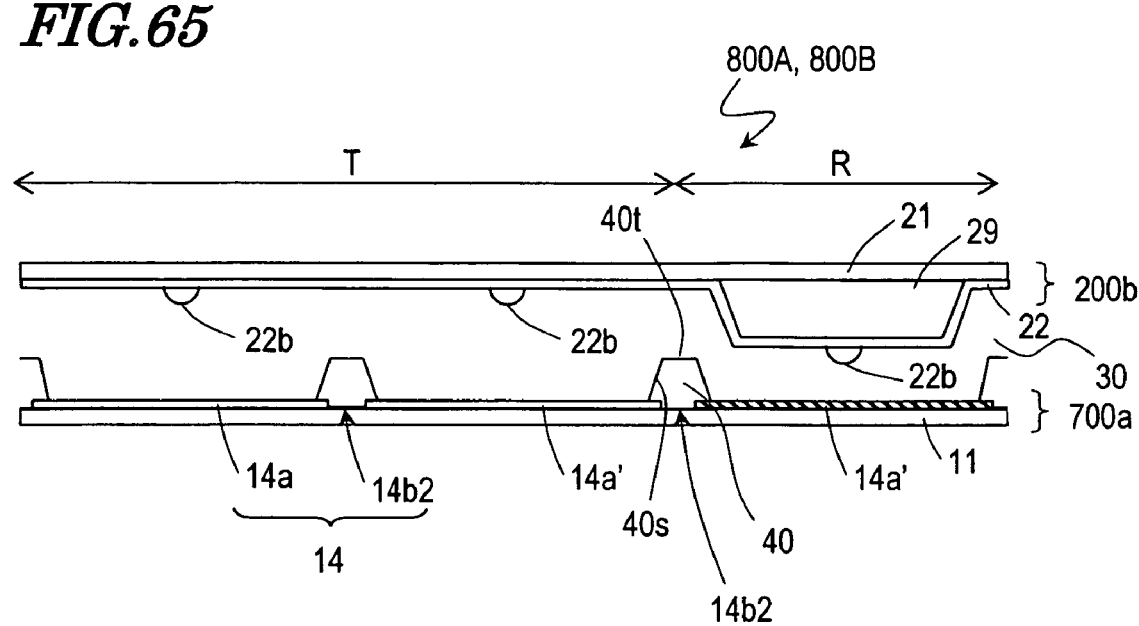
FIG. 65 is a cross-sectional view schematically illustrating the liquid crystal display devices 800A and 800B, which corresponds to a cross-sectional view taken along line 65A-65A' of FIG. 64A and FIG. 64B.

FIG. 64A, FIG. 64B and FIG. 65 illustrate still another liquid crystal display devices 800A and 800B of the present embodiment. FIG. 64A and FIG. 64B are plan views schematically illustrating a structure of eight picture element regions of the liquid crystal display devices 800A and 800B, respectively. FIG. 65 is a cross-sectional view taken along line 65A-65A' of FIG. 64A and FIG. 64B.

The picture element electrode 14 of each of the liquid crystal display devices 800A and 800B includes three unit solid areas 14a' arranged in one line in the picture element region, but does not include any opening 14b1; i.e., the non-solid area 14b of the picture element electrode 14 only includes cut-out areas 14b2. Two of the three unit solid areas 14a' included in each picture element region are transparent electrodes, and the remaining one unit solid area 14a' is a reflection electrode. Each unit solid area 14a' is square. The counter electrode 200b of each of the liquid crystal display devices 800A and 800B includes a protrusion (rib) 22b as an orientation-regulating structure in a region opposing each unit solid area 14a'.

Although the picture element electrode 14 of each of the liquid crystal display devices 800A and 800B does not have any opening 14b1, liquid crystal domains taking a radially-inclined orientation can be formed above each unit solid area 14a' as described above. By forming at least one cut-out area 14b2, a plurality of unit solid area 14a' can be formed in the picture element electrode 14. Thus, a plurality of liquid crystal domains each taking a radially-inclined orientation can be formed. The liquid crystal domain formed above each unit solid area 14a' is stabilized by the protrusion 22b provided in correspondence with the respective unit solid area 14a'.

The unit solid areas 14a' in the picture element electrode 14 are arranged in one line. With such an arrangement, the area ratio of the unit solid areas 14a' in the picture element region can be made higher more easily, and thus the aperture ratio and the brightness can be increased, than in an arrangement where the unit solid areas 14a' are in a plurality of lines. In order to rapidly recover the orientation destroyed by pressure or the like, the interval between the unit solid areas 14a' (defined both in each picture element region and between adjacent picture element regions) preferably has a certain width, for example, 8.5 μm or greater.

The liquid crystal display device 800A illustrated in FIG. 64A and the liquid crystal display device 800B illustrated in FIG. 64B are different from each other in the structure of the transparent dielectric layer 29 of the counter substrate 200b. Specifically, in the liquid crystal display device 800A, the transparent dielectric layer 29 is formed separately (individually) in each picture element region as illustrated in FIG. 64A, whereas in the liquid crystal display device 800B, the transparent dielectric layer 29 in a picture element region is continuous with the transparent dielectric layers 29 in other picture element regions that are adjacent to the picture element region in one of two periodic arrangement directions (the directions in which the picture element regions are periodically arranged) as illustrated in FIG. 64B. Where the transparent dielectric layer 29 in a picture element region is continuous with the transparent dielectric layers 29 in the other picture element regions that are adjacent to the picture element region in a certain direction as illustrated in FIG. 64B, it is no longer necessary to consider the alignment margin for the transparent dielectric layers 29 in that direction, whereby it is possible to reduce the picture element interval in the direction, thus improving the aperture ratio and the productivity.

In the liquid crystal display devices 800A and 800B illustrated in FIG. 64A and FIG. 64B, respectively, the picture element regions are arranged so that the reflection regions R, of picture element regions adjacent to one another in one periodic arrangement direction, are adjacent to one another. In contrast, in liquid crystal display. devices 800C, 800D, 800E and 800F illustrated in FIG. 66A, FIG. 66B, FIG. 67A and FIG. 67B, respectively, the reflection region R of each picture element region is not only adjacent to the reflection region R of a next picture element region in one periodic arrangement direction but also adjacent to the reflection region R of a next picture element region in the other periodic arrangement direction.

Figure 66A:
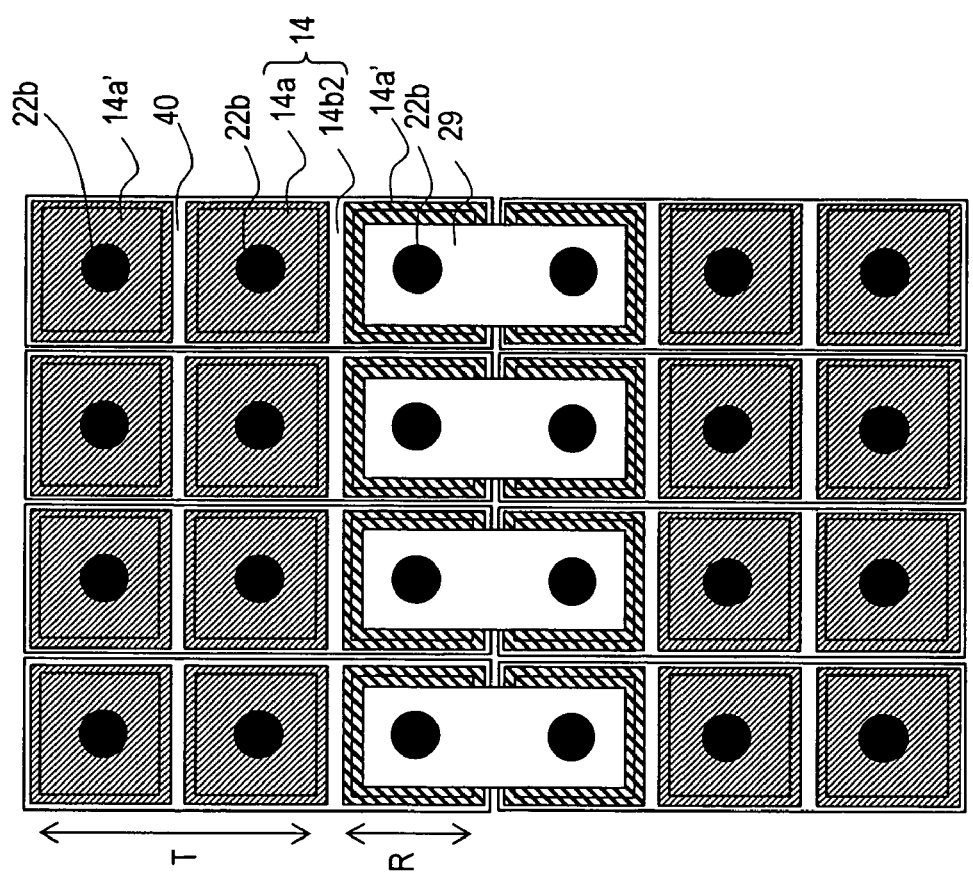
FIG. 66A is a plan view schematically illustrating still another liquid crystal display device 800C of the present invention.
Figure 66B:
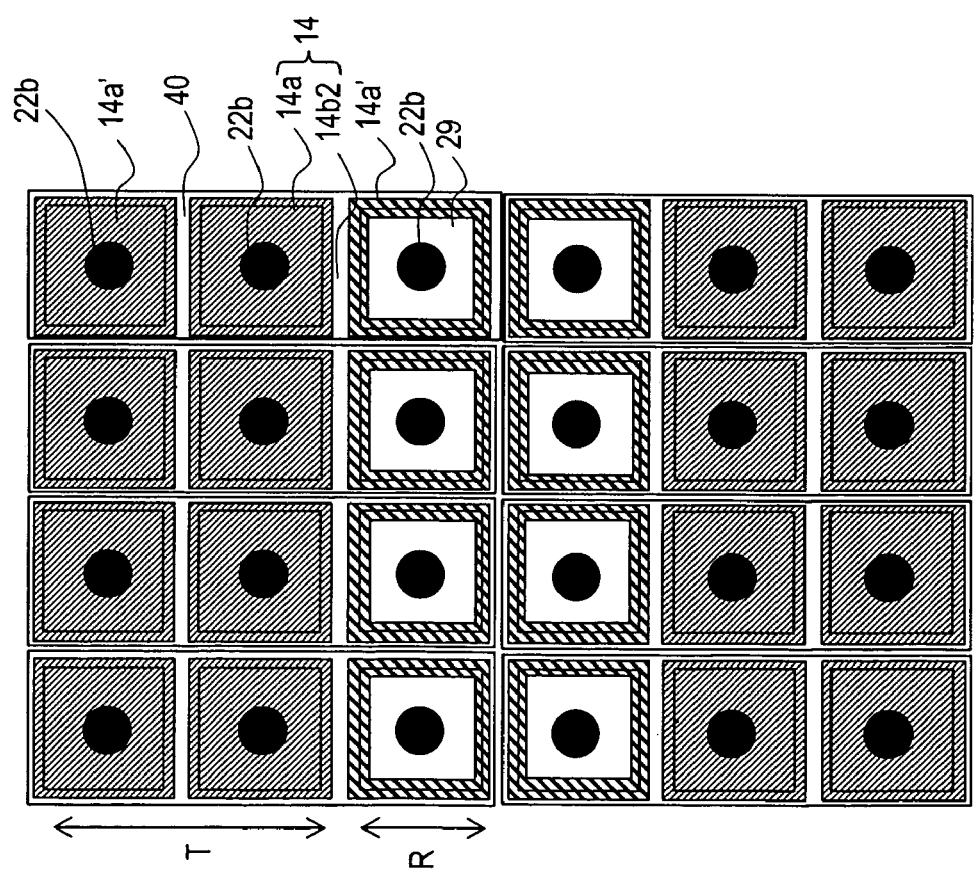
FIG. 66B is a plan view schematically illustrating still another liquid crystal display device 800D of the present invention.

In the liquid crystal display device 800C illustrated in FIG. 66A, the transparent dielectric layer 29 is formed separately in the reflection region R in each picture element region. In contrast, in the liquid crystal display devices 800D, 800E and 800F illustrated in FIG. 66B, FIG. 67A and FIG. 67B, respectively, the transparent dielectric layer 29 in a picture element region is continuous with the transparent dielectric layers 29 in other picture element regions that are adjacent to the picture element region, whereby it is possible to improve the aperture ratio and the productivity. Particularly, in the liquid crystal display device 800F illustrated in FIG. 67B, the transparent dielectric layer 29 in a picture element region is continuous with the transparent dielectric layers 29 in the other picture element regions that are adjacent to the picture element region in both of the periodic arrangement directions. Therefore, it is no longer necessary to consider the alignment margin for the transparent dielectric layers 29 in both of the periodic arrangement directions. This arrangement is highly effective in improving the aperture ratio and the productivity.

While FIG. 64A to FIG. 67B illustrate arrangements where each picture element region is equally divided; i.e., where regions defined by the unit solid areas 14a' (referred to as "sub-picture element regions") have the same size and the same shape, it is not necessary in the present invention that the picture element region is divided equally. One or more of the sub-picture element regions of one picture element region may have a different size/shape from that of the other sub-picture element regions, or a sub-picture element region in the transmission region T may have a different size/shape from that of a sub-picture element region in the reflection region R. Moreover, while FIG. 64A to FIG. 67B illustrate arrangements where a sub-picture element region has a square shape and has an aspect ratio of 1:1, it is not necessary in the present invention that the aspect ratio of the sub-picture element region is 1:1.

Figure 68B:
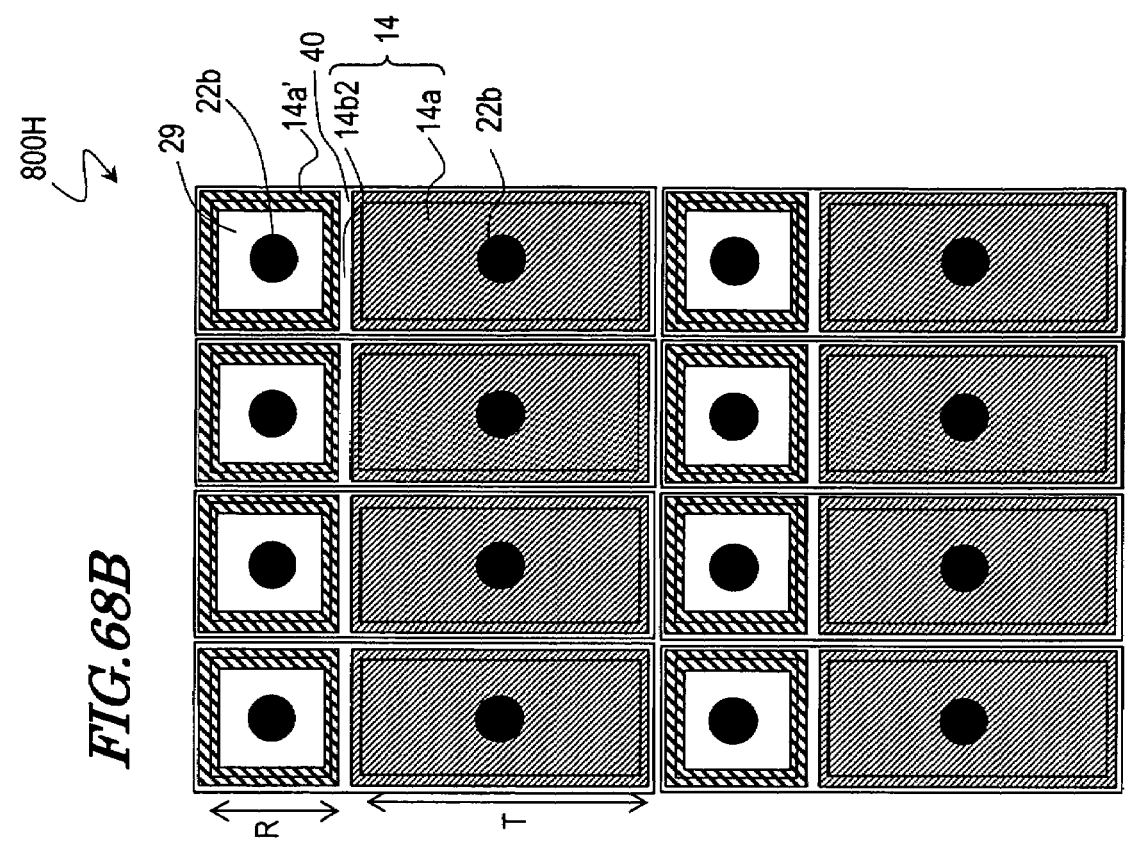
FIG. 68B is a plan view schematically illustrating still another liquid crystal display device 800H of the present invention.
Figure 68A:
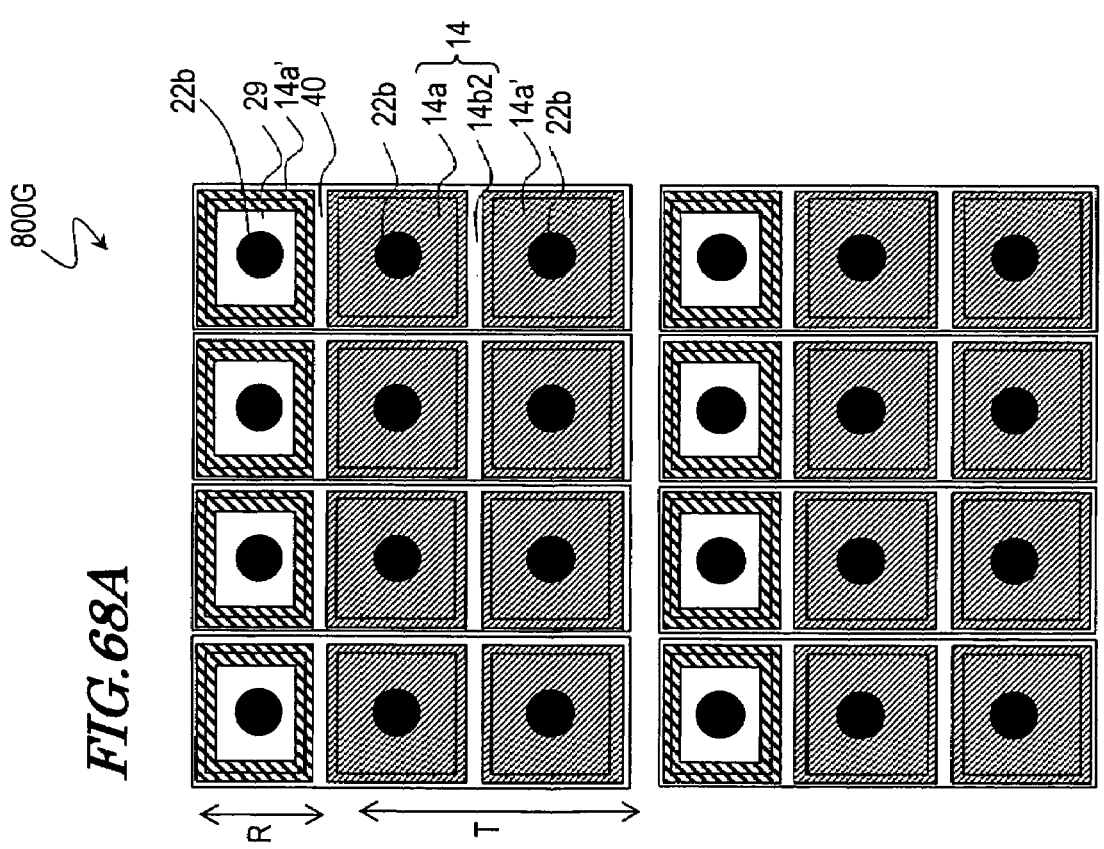
FIG. 68A is a plan view schematically illustrating still another liquid crystal display device 800G of the present invention.

A liquid crystal display device 800G illustrated in FIG. 68A is different from the liquid crystal display device 800A illustrated in FIG. 64A in that the unit solid area 14a' provided in the reflection region R has an oblong rectangular shape, and the sub-picture element region in the reflection region R has an oblong rectangular shape. While it may be difficult to form all the sub-picture element regions in the picture element region with an aspect ratio of 1:1 depending on the aspect ratio of the picture element region, if one or more of the sub-picture element regions have a different shape (e.g., an oblong rectangular shape) from the others as illustrated in FIG. 68A, the plurality of unit solid areas 14a' can be arranged within a picture element region as closely as possible, whereby it is possible to increase the area ratio of the unit solid areas 14a' in each picture element region, thus increasing the aperture ratio. Note that where the size/shape of one or more of the sub-picture element regions is adjusted according to the aspect ratio of the picture element region, the display is less influenced if the size/shape of the sub-picture element region in the reflection region R is adjusted. This is because the reflection region R, having a smaller cell gap (the thickness of the liquid crystal layer 30), has a better response characteristic in the first place, and the required level of display quality is lower than that in the transmission region T.

A liquid crystal display device 800H illustrated in FIG. 68B is similar to the liquid crystal display device 800A illustrated in FIG. 64A except that two square-shaped sub-picture element regions (the square unit solid areas 14a') arranged in the transmission region T are replaced by a single oblong rectangular sub-picture element region (an oblong rectangular unit solid area 14a') with a larger aspect ratio (about 1:2). In the case where the number of sub-picture element regions (unit solid areas 14a') in each picture element region is reduced by using sub-picture element regions (unit solid areas 14a') of a larger aspect ratio, although the orientation stability and the response speed decrease, the area ratio of the non-solid area 14b in the picture element region can be reduced, whereby it is possible to further improve the aperture ratio. A research by the present inventor revealed that a sufficiently stable radially-inclined orientation can be obtained even with the unit solid areas 14a' having an aspect ratio of about 1:2.

Moreover, depending on the shape of the picture element region, all of the sub-picture element regions (unit solid areas 14a') in each picture element region may be oblong rectangular, as in liquid crystal display devices 800I and 800J illustrated in FIG. 69A and FIG. 69B, respectively, to improve the aperture ratio. In the liquid crystal display device 800I illustrated in FIG. 69A, two sub-picture element regions (unit solid areas 14a') in the transmission region T and one sub-picture element region (unit solid area 14a') in the reflection region R are all oblong rectangular. Moreover, in the liquid crystal display device 800J illustrated in FIG. 69B, one sub-picture element region (unit solid area 14a') in the transmission region T and one sub-picture element region (unit solid area 14a') in the reflection region R are both oblong rectangular.

Note that FIG. 64A to FIG. 69B illustrate arrangements where an image is displayed preferentially in the transmission mode, with the area ratio between the transmission region T and the reflection region R being about 2:1. It is understood that where an image is displayed preferentially in the reflection mode, the area ratio of the reflection region R can be made higher than that of the transmission region T as in liquid crystal display devices 800K and 800L illustrated in FIG. 70A and FIG. 70B, respectively.

Figure 70B:
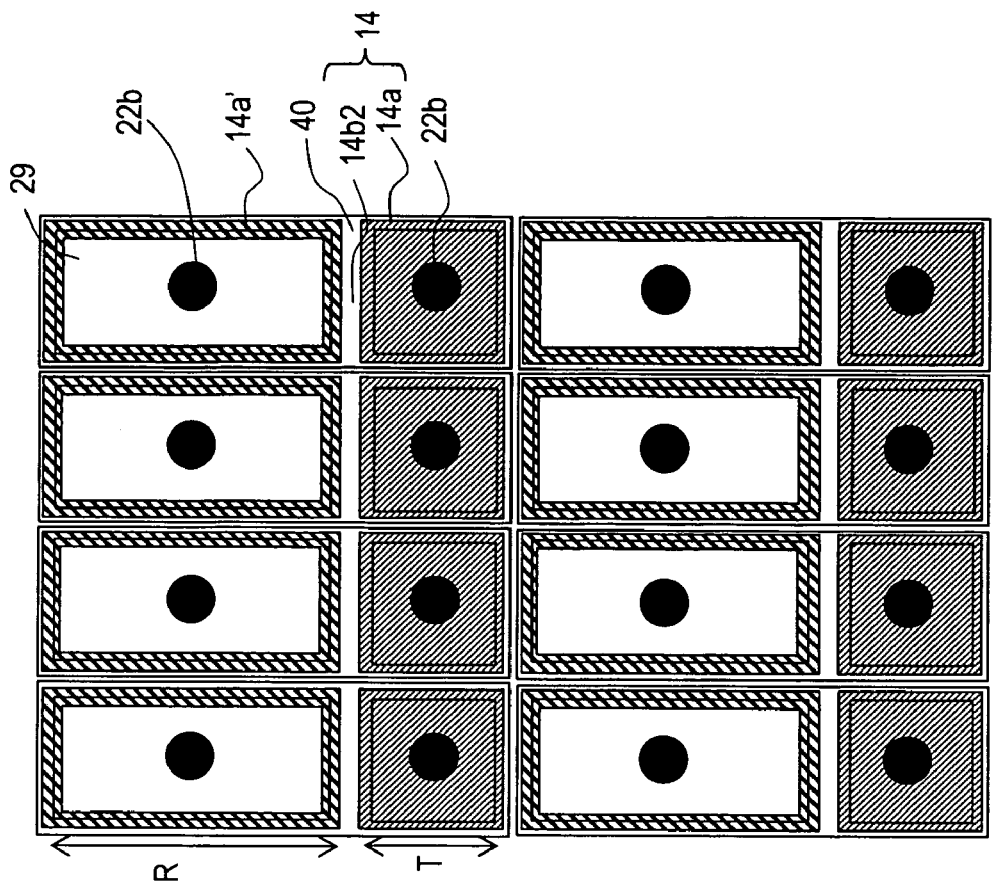
FIG. 70B is a plan view schematically illustrating still another liquid crystal display device 800L of the present invention.
Figure 70A:
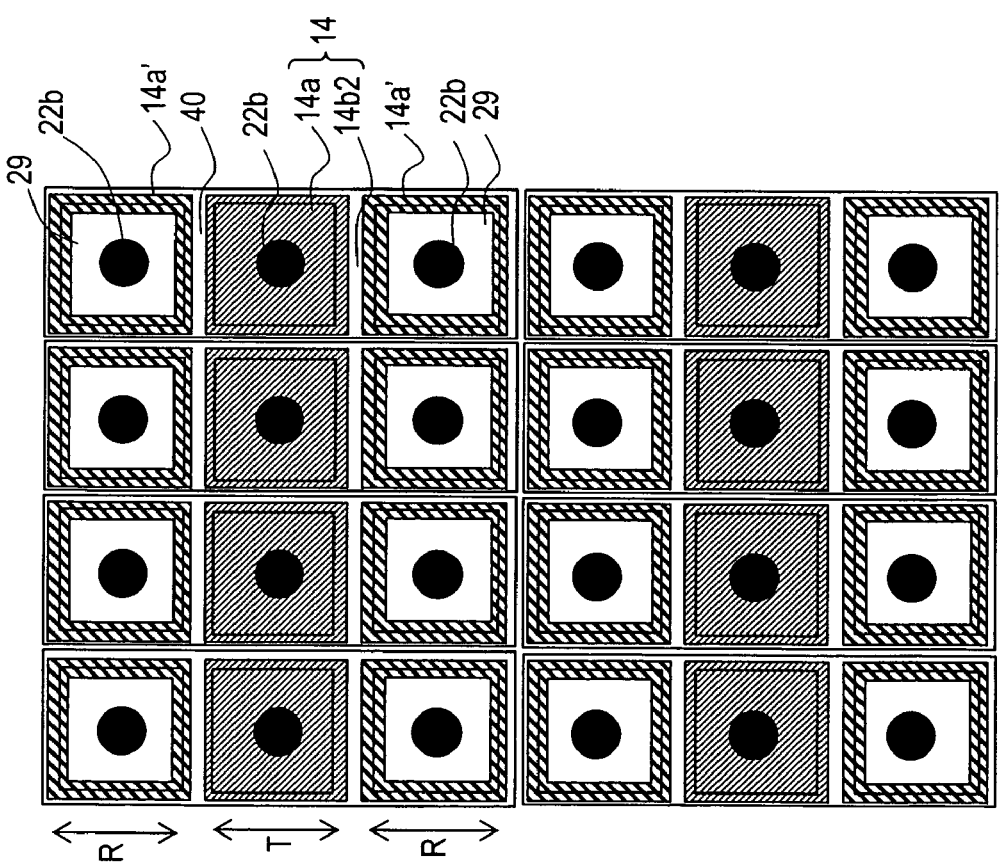
FIG. 70A is a plan view schematically illustrating still another liquid crystal display device 800K of the present invention.

In the liquid crystal display device 800K illustrated in FIG. 70A, two of the three square-shaped unit solid areas 14a' in each picture element region are reflection electrodes and the remaining one square-shaped unit solid area 14a' is a transparent electrode, with the area ratio between the transmission region T and the reflection region R being about 1:2.

In the liquid crystal display device 800L illustrated in FIG. 70B, each picture element region includes one square-shaped unit solid area 14a' as a transparent electrode and one oblong rectangular unit solid area 14a' (aspect ratio: about 1:2) as a reflection electrode, with the area ratio between the transmission region T and the reflection region R also being about 1:2.

Figure 71B:
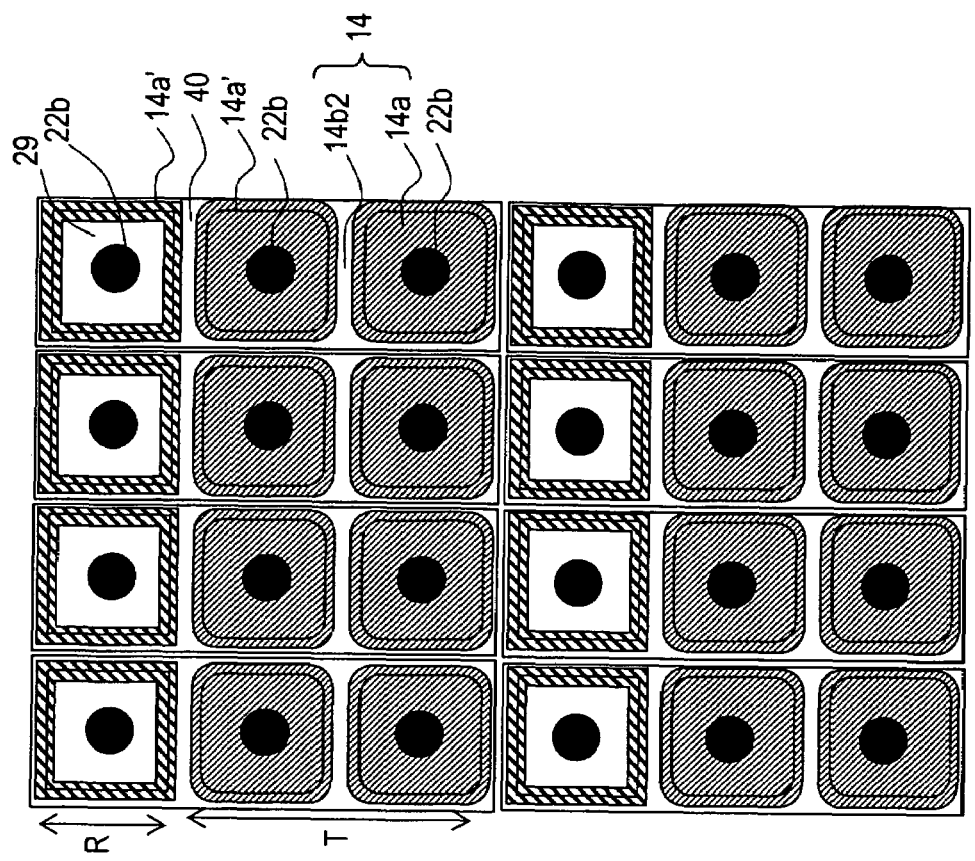
FIG. 71B is a plan view schematically illustrating still another liquid crystal display device 800N of the present invention.
Figure 71A:
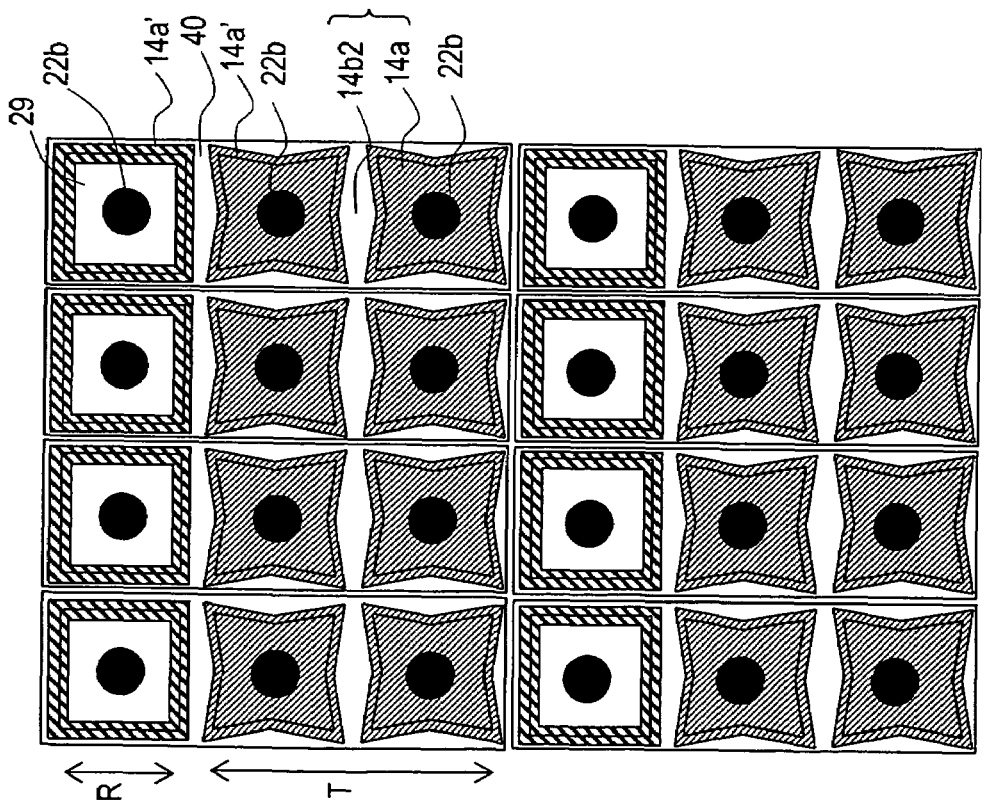
FIG. 71A is a plan view schematically illustrating still another liquid crystal display device 800M of the present invention.

Moreover, in order to improve the response characteristic of the liquid crystal layer 30 in the transmission region T, each unit solid area 14a' in the transmission region T may have a shape with acute angle corners as in a liquid crystal display device 800M illustrated in FIG. 71A. Alternatively, in order to increase both the orientation stability and the transmittance for the transmission region T, each unit solid area 14a' in the transmission region T may be formed in a barrel-like shape (a generally square shape with generally arc-shaped corner portions), as in a liquid crystal display device 800N illustrated in FIG. 71B.

Variations having structures in which unit solid areas 14a' are arranged in one line in each picture element region have been described with reference to FIG. 64A to FIG. 71B. The above description is also applicable to structures in which unit solid areas 14a' are arranged in a plurality of lines in each picture element region.

Figure 72A:
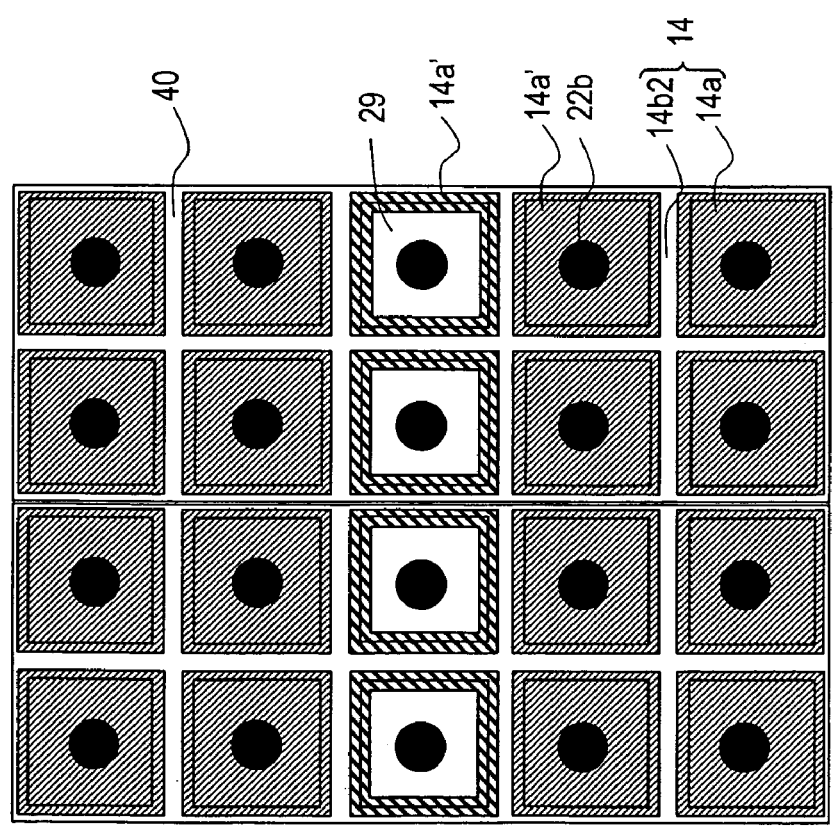
FIG. 72A is a plan view schematically illustrating still another liquid crystal display device 800O of the present invention.
Figure 72B:
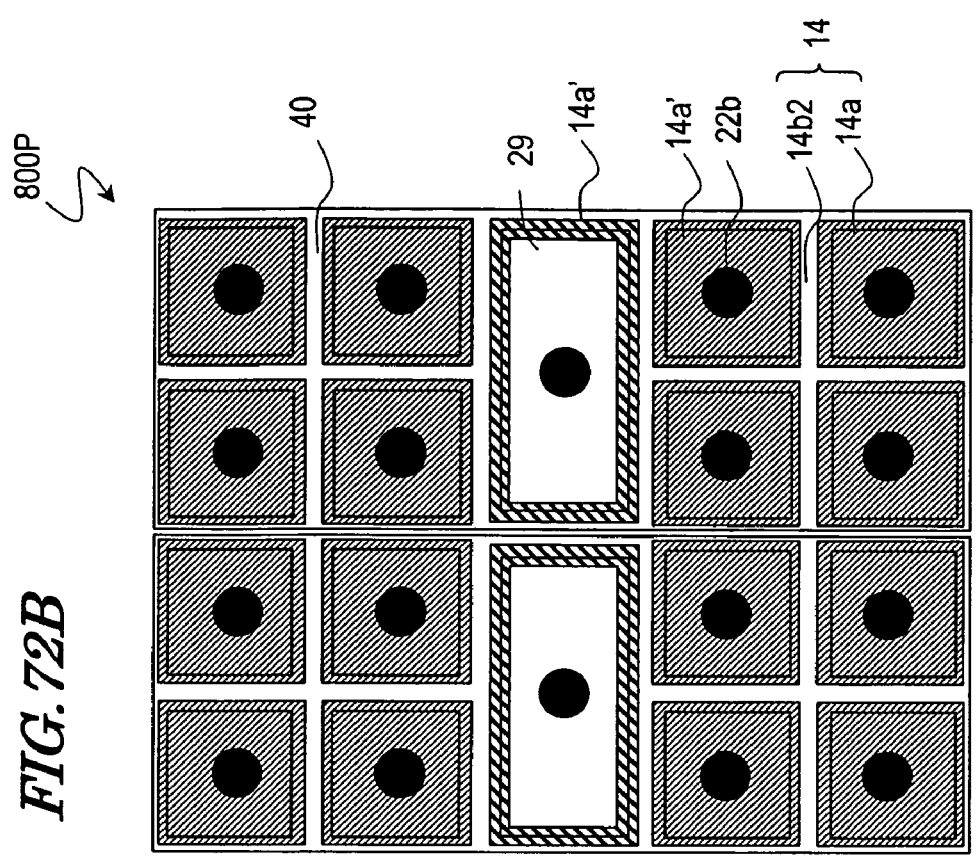
FIG. 72B is a plan view schematically illustrating still another liquid crystal display device 800P of the present invention.

FIG. 72A illustrates a liquid crystal display device 800O. In FIG. 72A, the picture element electrode 14 of the liquid crystal display device 800O includes ten unit solid areas 14a' arranged in a matrix of 5 rows×2 columns. Each unit solid area 14a' is square. The two unit solid areas 14a' in the third row are reflection electrodes, and the remaining unit solid areas 14a' are transparent electrodes. Various modifications described above are applicable to the liquid crystal display device 800O. For example, the two reflection electrodes (unit solid areas 14a') of the liquid crystal display device 800O may be replaced with one oblong rectangular reflection electrode to provide a liquid crystal display device 800P illustrated in FIG. 72B.

FIG. 73A illustrates a liquid crystal display device 800Q. In FIG. 73A, the picture element electrode 14 of the liquid crystal display device 800Q includes 24 unit solid areas 14a' arranged in a matrix of 8 rows×3 columns. Each unit solid area 14a' is square. The three unit solid areas 14a' in the fifth row are reflection electrodes, and the remaining unit solid areas 14a' are transparent electrodes. Various modifications described above are also applicable to the liquid crystal display device 800Q. For example, the three reflection electrodes (unit solid areas 14a') of the liquid crystal display device 800Q may be replaced with one oblong rectangular reflection electrode to provide a liquid crystal display device 800R illustrated in FIG. 73B.

The present invention provides a transmission-reflection liquid crystal display device having a wide viewing angle characteristic and a high display quality. The transmission-reflection liquid crystal display device according to the present invention is preferably usable as a display device in various types of electronic devices including personal computers, TVs and mobile information terminal devices.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Applications No. 2004-25197 filed in Japan on Feb. 2, 2004, No. 2004-34892 filed in Japan on Feb. 12, 2004 and No. 2004-173547 filed in Japan on Jun. 11, 2004, the entire contents of which are hereby incorporated by reference.

What is claimed is:
1. A liquid crystal display device, comprising:
a first substrate;
a second substrate; and
a liquid crystal layer provided between the first substrate and the second substrate, wherein:
a plurality of picture element regions are each defined by a first electrode provided on one surface of the first substrate and a second electrode provided on the second substrate and opposing the first electrode with the liquid crystal layer therebetween;
in each of the plurality of picture element regions, the first electrode includes a solid area formed of a conductive film and a non-solid area with no conductive film provided, the liquid crystal layer is in a vertical orientation state when no voltage is applied between the first electrode and the second electrode, and when a voltage is applied between the first electrode and the second electrode, the liquid crystal layer forms a plurality of first liquid crystal domains each in a radially-inclined orientation at least above the solid area of the first electrode by an inclined electric field generated in the vicinity of the solid area;
the plurality of picture element regions each include a transparent region for providing a transmission mode display using light incident in a direction from the first substrate and a reflection region for providing a reflection mode display using light incident in a direction from the second substrate; and
in each of the plurality of picture element regions a thickness dr of the liquid crystal layer in the reflection region is smaller than a thickness dt of the liquid crystal layer in the transmission region,
wherein the second substrate includes:
a stepped portion having an upper tier located in the reflection region,
a lower tier located in the transmission region and a side surface connecting the upper tier and the lower tier to each other, and
wherein the side surface of the stepped portion is located in the reflection region and is covered with the second electrode.

2. The liquid crystal display device of claim 1, wherein an orientation of the plurality of first liquid crystal domains is continuous with an orientation of the liquid crystal layer above the non-solid area.

3. The liquid crystal display device of claim 1, wherein the solid area of the first electrode includes a plurality of unit solid areas each substantially surrounded by the non-solid area, and each of the plurality of first liquid crystal domains is formed in correspondence with each of the plurality of unit solid areas.

4. The liquid crystal display device of claim 3, wherein each of the plurality of unit solid areas has a shape having rotational symmetry.

5. The liquid crystal display device of claim 4, wherein each of the plurality of unit solid areas has a generally circular shape.

6. The liquid crystal display device of claim 4, wherein each of the plurality of unit solid areas has a generally rectangular shape.

7. The liquid crystal display device of claim 4, wherein each of the plurality of unit solid areas has a generally rectangular shape with generally arc-shaped corner portions.

8. The liquid crystal display device of claim 4, wherein each of the plurality of unit solid areas has a shape with acute angle corners.

9. The liquid crystal display device of claim 3, wherein in each of the plurality of picture element regions, a thickness de of the liquid crystal layer above an edge portion of at least one unit solid area of the plurality of unit solid areas is smaller than a thickness dc of the liquid crystal layer above a central portion of the at least one unit solid area.

10. The liquid crystal display device of claim 9, wherein a height of a surface of the edge portion of the at least one unit solid area is higher than a height of a surface of the central portion of the at least one unit solid area.

11. The liquid crystal display device of claim 10, wherein:
the first substrate includes a transparent substrate and an interlayer insulating film provided between the transparent substrate and the first electrode;
the interlayer insulating film has a first region in which a height of one surface of the interlayer insulating film which is closer to the liquid crystal layer continuously changes; and
the edge portion of the at least one unit solid area is located on the first region.

12. The liquid crystal display device of claim 11, wherein:
the interlayer insulating film has a second region in which the height of the one surface of the interlayer insulating film which is closer to the liquid crystal layer is substantially constant; and
the central portion of the at least one unit solid area is located on the second region.

13. The liquid crystal display device of claim 9, wherein light incident on the liquid crystal layer is circularly-polarized light, and the liquid crystal layer modulates the circularly-polarized light to perform display.

14. The liquid crystal display device of claim 1, wherein when a voltage is applied between the first electrode and the second electrode, at least one second liquid crystal domain in a radially-inclined orientation is formed above the non-solid area by the inclined electric field.

15. The liquid crystal display device of claim 14, wherein an orientation of the plurality of first liquid crystal domains is continuous with an orientation of the at least one second liquid crystal domain.

16. The liquid crystal display device of claim 1, wherein the non-solid area of the first electrode has at least one opening.

17. The liquid crystal display device of claim 16, wherein the at least one opening is a plurality of openings, and at least some of the plurality of openings have substantially the same shape and substantially the same size and are located to form at least one unit lattice having rotational symmetry.

18. The liquid crystal display device of claim 17, wherein each of the at least some of the plurality of openings has a shape having rotational symmetry.

19. The liquid crystal display device of claim 1, wherein the non-solid area of the first electrode includes at least one cut-out area.

20. The liquid crystal display device of claim 1, wherein in each of the plurality of picture element regions, the non-solid area of the first electrode has an area which is smaller than an area of the solid area of the first electrode.

21. The liquid crystal display device of claim 1, wherein the second substrate includes an orientation-regulating structure in a region corresponding to at least one first liquid crystal domain of the plurality of first liquid crystal domains, the orientation-regulating structure exerting an orientation-regulating force for placing liquid crystal molecules in the at least one first liquid crystal domain into a radially-inclined orientation at least in the presence of an applied voltage.

22. The liquid crystal display device of claim 21, wherein the orientation-regulating structure is provided in a region corresponding to a central portion of the at least one liquid crystal domain.

23. The liquid crystal display device of claim 21, wherein the orientation-regulating structure exerts an orientation-regulating force for placing the liquid crystal molecules into a radially-inclined orientation also in the absence of an applied voltage.

24. The liquid crystal display device of claim 23, wherein the orientation-regulating structure is at least one protrusion protruding into the liquid crystal layer.

25. The liquid crystal display device of claim 24, wherein the at least one protrusion includes a protrusion located in the reflection region, and a thickness of the liquid crystal layer is defined by the protrusion located in the reflection region.

26. The liquid crystal display device of claim 25, wherein the at least one protrusion includes a protrusion located in the transmission region.

27. The liquid crystal display device of claim 26, wherein at least one of the first substrate and the second substrate includes a light shielding layer for shielding light against the protrusion located in the transmission region.

28. The liquid crystal display device of claim 26, wherein the second substrate includes a single protrusion located in the transmission region in each of the plurality of picture element regions.

29. The liquid crystal display device of claim 1, wherein the first substrate includes at least one protrusion having an inclining surface above the non-solid area, a cross-sectional shape of the protrusion in a plane of the first substrate is conformed to a shape of a boundary between the solid area and the non-solid area, and the inclining surface of the protrusion has an orientation-regulating force for inclining liquid crystal molecules in the liquid crystal layer in the same direction as an orientation-regulating direction provided by the inclined electric field.

30. The liquid crystal display device of claim 29, wherein the protrusion covers an edge portion of the solid area of the first electrode.

31. The liquid crystal display device of claim 1, wherein the first electrode includes a transparent electrode for defining the transmission region and a reflection electrode for defining the reflection region.

32. The liquid crystal display device of claim 1, wherein the second substrate further includes a transparent dielectric layer selectively provided in the reflection region in each of the plurality of picture element regions.

33. The liquid crystal display device of claim 32, wherein the transparent dielectric layer provided in each of the plurality of picture element regions is continuous with the transparent dielectric layer provided in at least one of the picture element regions adjacent to each picture element region.

34. The liquid crystal display device of claim 1, wherein:
the first substrate further includes a switching device provided in correspondence with each of the plurality of picture element regions; and
the first electrode is a picture element electrode provided for each of the plurality of picture element regions and switched by the switching device, and the second electrode is at least one counter electrode opposing the plurality of picture element electrodes.

35. A liquid crystal display device, comprising:
a first substrate;
a second substrate; and
a liquid crystal layer provided between the first substrate and the second substrate, wherein:
a plurality of picture element regions are each defined by a first electrode provided on one surface of the first substrate which is closer to the liquid crystal layer and a second electrode provided on the second substrate and opposing the first electrode with the liquid crystal layer therebetween;

in each of the picture element regions, the first electrode includes a solid area formed of a conductive film and a non-solid area with no conductive film provided, the liquid crystal layer is in a vertical orientation state when no voltage is applied between the first electrode and the second electrode, and when a voltage is applied between the first electrode and the second electrode, forms a plurality of first liquid crystal domains each in a radially-inclined orientation at least above the solid area of the first electrode by an inclined electric field generated in the vicinity of the solid area;

the plurality of picture element regions each include a transparent region for providing a transmission mode display using light incident from the side of the first substrate and a reflection region for providing a reflection mode display using light incident from the side of the second substrate, and a thickness dr of the liquid crystal layer in the reflection region is smaller than a thickness dt of the liquid crystal layer in the transmission region;

the second substrate includes a stepped portion having an upper tier located in the reflection region, a lower tier located in the transmission region and a side surface connecting the upper tier and the lower tier to each other, and the side surface of the stepped portion is located in the reflection region and is covered with the second electrode; and in each of the plurality of picture element regions, first substrate includes at least one protrusion having an inclining surface above the non-solid area, a cross-sectional shape of the protrusion in a plane of the first substrate is conformed to a shape of a boundary between the solid area and the non-solid area, the inclining surface of the protrusion has an orientation-regulating force for inclining liquid crystal molecules in the liquid crystal layer in the same direction as an orientation-regulating direction provided by the inclined electric field, and the protrusion covers an edge portion of the solid area of the first electrode.

* * * * *